US012627721B2

(12) United States Patent
Wang et al.

(10) Patent No.: US 12,627,721 B2
(45) Date of Patent: *May 12, 2026

(54) DISTRIBUTED MESSAGING COMMUNICATION SYSTEM INTEGRATED WITH A CROSS-ENTITY COLLABORATION PLATFORM

(71) Applicant: Sure Market, LLC, San Marino, CA (US)

(72) Inventors: Luojia Wang, San Marino, CA (US); Douglas R. Heckmann, Pasadena, CA (US)

(73) Assignee: Sure Market, LLC, San Marino, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 18/769,244

(22) Filed: Jul. 10, 2024

(65) Prior Publication Data

US 2024/0364763 A1     Oct. 31, 2024

Related U.S. Application Data

(63) Continuation-in-part of application No. 18/421,282, filed on Jan. 24, 2024, now abandoned, which is a
(Continued)

(51) Int. Cl.
*H04L 65/4053* (2022.01)
*G06F 16/176* (2019.01)
(Continued)

(52) U.S. Cl.
CPC ........ *H04L 65/4053* (2013.01); *G06F 16/176* (2019.01); *H04L 51/046* (2013.01); *H04L 63/0272* (2013.01)

(58) Field of Classification Search
CPC .......................... H04L 65/4053; H04L 51/046
See application file for complete search history.

(56) References Cited

U.S. PATENT DOCUMENTS

| | | | |
|---|---|---|---|
| 5,893,079 A | 4/1999 | Cwenar | |
| 7,110,967 B1 | 9/2006 | Espenes | |
| (Continued) | | | |

FOREIGN PATENT DOCUMENTS

| | | |
|---|---|---|
| CN | 202887252 U | 4/2013 |
| CN | 106779917 A | 5/2017 |
| (Continued) | | |

*Primary Examiner* — Hee Soo Kim
(74) *Attorney, Agent, or Firm* — Knobbe, Martens, Olson & Bear LLP

(57) ABSTRACT

A communication/collaboration system enables a first user at a first entity to define a collaboration object, and to invite a second entity to collaborate on the collaboration object in accordance with a hierarchy with corresponding permissions. A second user at a second entity is enabled to collaborate on the collaboration object. A communications log regarding the collaboration between the first user and the second user is maintained. A communications log between the first user and other users at the first entity is maintained. A communication interface is displayed on the first user computer system that displays the log of communications between the first user and the second user on the collaboration object, together with the log of communications regarding the collaboration object between the first user and other users at the first entity, and excluding communications regarding the collaboration object between the second user and other users at the second entity.

24 Claims, 148 Drawing Sheets

---

202N
ENABLE ENTITIES TO DEFINE HIERARCHY

204N
ENABLE ENTITIES TO DEFINE PERMISSIONS ASSOCIATED WITH RESPECTIVE HIERARCHY

206N
DETECT USER 'A' OF ENTITY 'A' SYSTEM ACCESS

208N
DETERMINE USER 'A' HIERARCHY POSITION

210N
DETERMINE USER 'A' COMMUNICATION PERMISSIONS

212N
ENABLE USER 'A' TO GENERATE COLLABORATION OBJECT

214N
ENABLE USER 'A' TO GENERATE TO GENERATE COLLABORATION INVITATION AND IDENTIFY RECIPIENTS

216N
IDENTIFY ENTITY ACCEPTANCES OF INVITATIONS

218N
ENABLE USERS AT ENTITIES TO COLLABORATE WITH USER A ON COLLABORATION OBJECT IN ACCORDANCE WITH PERMISSIONS

220N
MAINTAIN LOGS OF INTER-ENTITY COLLABORATION COMMUNICATIONS

222N
MAINTAIN LOGS OF INTRA-ENTITY COLLABORATION COMMUNICATIONS

224N
FILTER AND DISPLAY COLLABORATION COMMUNICATION LOGS IN ACCORDANCE WITH COMMUNICATION PERMISSIONS

226N
FILTER AND DISPLAY COLLABORATION OBJECT RELATED DATA IN ACCORDANCE WITH ACCESS PERMISSIONS

Related U.S. Application Data continuation of application No. 18/054,128, filed on Nov. 9, 2022, now Pat. No. 11,895,169, which is a continuation-in-part of application No. 17/584,294, filed on Jan. 25, 2022, now Pat. No. 11,582,276, which is a continuation of application No. 16/883, 729, filed on May 26, 2020, now Pat. No. 11,240,278, which is a continuation-in-part of application No. 16/248,529, filed on Jan. 15, 2019, now Pat. No. 10,681,095.

(60) Provisional application No. 62/618,577, filed on Jan. 17, 2018.

(51) Int. Cl.
*H04L 9/40* (2022.01)
*H04L 51/046* (2022.01)

(56) References Cited

U.S. PATENT DOCUMENTS

| | | | | |
|---|---|---|---|---|
| 7,499,972 | B1* | 3/2009 | Buonanno | G06Q 10/10 |
| | | | | 379/221.12 |
| 7,970,686 | B1 | 6/2011 | Irwin et al. | |
| 8,280,779 | B2 | 10/2012 | Davis et al. | |
| 8,510,204 | B2 | 8/2013 | Lord | |
| 8,738,720 | B2* | 5/2014 | De Kezel | G06Q 10/107 |
| | | | | 705/300 |
| 8,977,754 | B2 | 3/2015 | Curry, Jr. et al. | |
| 9,595,056 | B2 | 3/2017 | Taylor et al. | |
| 10,331,303 | B1 | 6/2019 | Gurtin et al. | |
| 10,402,371 | B2 | 9/2019 | Johnston | |
| 10,541,825 | B2 | 1/2020 | Jin | |
| 10,585,562 | B2 | 3/2020 | Gurtin et al. | |
| 10,862,931 | B1 | 12/2020 | Jamison et al. | |
| 10,880,111 | B2 | 12/2020 | Jin et al. | |
| 11,089,095 | B1 | 8/2021 | Henkens et al. | |
| 11,178,251 | B2 | 11/2021 | Sullivan et al. | |
| 11,206,231 | B2 | 12/2021 | Rosania et al. | |
| 11,223,590 | B2 | 1/2022 | Delp et al. | |
| 2001/0049634 | A1 | 12/2001 | Stewart | |
| 2002/0143669 | A1* | 10/2002 | Scheer | G06Q 10/087 |
| | | | | 705/28 |
| 2002/0156719 | A1 | 10/2002 | Finebaum et al. | |
| 2007/0233786 | A1* | 10/2007 | Rothley | G06Q 10/06 |
| | | | | 709/204 |
| 2008/0077475 | A1 | 3/2008 | McElhiney | |
| 2008/0222010 | A1 | 9/2008 | Hudak | |
| 2009/0125359 | A1* | 5/2009 | Knapic | G06Q 10/06 |
| | | | | 705/7.23 |
| 2011/0153759 | A1* | 6/2011 | Rathod | G06Q 10/00 |
| | | | | 709/206 |
| 2011/0179114 | A1* | 7/2011 | Dilip | G06Q 30/02 |
| | | | | 709/204 |
| 2012/0010935 | A1 | 1/2012 | Fraser et al. | |
| 2012/0109774 | A1* | 5/2012 | Chernenko | G06Q 30/0611 |
| | | | | 705/26.4 |
| 2012/0316962 | A1* | 12/2012 | Rathod | G06Q 10/107 |
| | | | | 705/14.54 |
| 2013/0211956 | A1 | 8/2013 | Welch et al. | |
| 2013/0227007 | A1* | 8/2013 | Savage | G06Q 10/101 |
| | | | | 709/204 |
| 2013/0332861 | A1* | 12/2013 | D'Agnese | G06Q 10/103 |
| | | | | 715/753 |
| 2014/0250186 | A1* | 9/2014 | Huynh | H04L 65/403 |
| | | | | 709/204 |
| 2014/0278764 | A1 | 9/2014 | Noyes | |
| 2015/0324877 | A1 | 11/2015 | Shaw et al. | |
| 2016/0285838 | A1* | 9/2016 | Ford | H04L 63/10 |
| 2019/0028287 | A1 | 1/2019 | Jin et al. | |
| 2020/0068028 | A1 | 2/2020 | Gurtin et al. | |
| 2020/0137018 | A1 | 4/2020 | Jaimson | |
| 2020/0167048 | A1 | 5/2020 | Gurtin et al. | |

FOREIGN PATENT DOCUMENTS

| | | |
|---|---|---|
| CN | 206162692 U | 5/2017 |
| KR | 1020130106054 A | 9/2013 |

* cited by examiner

| Access to 1 | Access to 2 | Access to 3 | Access to 4 | Access to 5 | Access to 6 | Access to 7 | Access to 8 | Access to 9 | Access to 10 | Access to 11 |
|---|---|---|---|---|---|---|---|---|---|---|
| Ryan | Ryan | Ryan | Ryan | Ryan | Ashley | Shawn | Alex | Brittany | Luke | Ryan |
|  | Claire | Claire | Claire | Claire | Brittany | Brittany | Brittany | Luke |  | Claire |
|  |  | Jenny | Katy | Jenny | Luke | Luke | Luke |  |  | Katy |
|  |  |  |  | Ashley |  |  |  |  |  | Alex |
|  |  |  |  | Brittany |  |  |  |  |  | Brittany |
|  |  |  |  | Luke |  |  |  |  |  | Luke |

FIG. 1E

220A
RENDER USER
INTERFACE FOR USER
'A'

222A
RENDER USER
INTERFACE FOR USER
'B'

213A
DETERMINE
TRANSACTION
PROCESS POSITION

214A
ACCESS VIRTUAL
PAGE

216A
SELECT VIRTUAL PAGE
MODULES FOR USER
INTERFACE FOR USER
'A'

218A
SELECT VIRTUAL PAGE
MODULES FOR USER
INTERFACE FOR USER
'B'

208A
DETERMINE
USER 'B' ENTITY

210A
DETERMINE
USER 'B'
FUNCTION

212A
DETERMINE
USER 'B'
PERMISSION/
ACCESS RIGHTS

202A
DETERMINE
USER 'A' ENTITY

204A
DETERMINE
USER 'A'
FUNCTION

206A
DETERMINE
USER 'A'
PERMISSION/
ACCESS RIGHTS

FIG. 1K

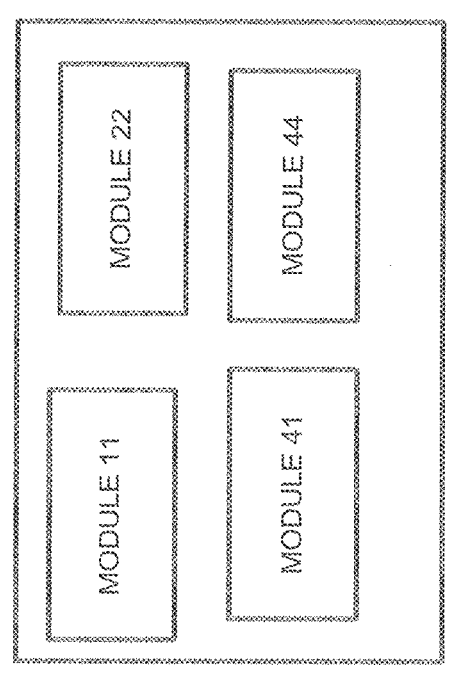
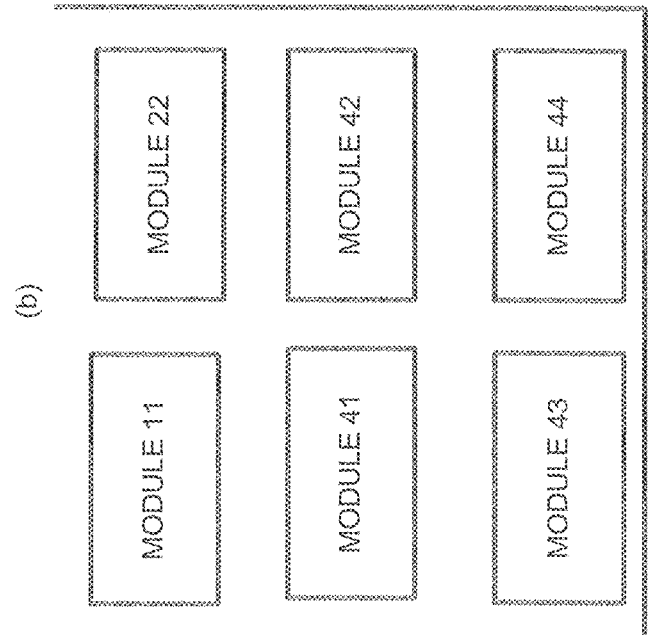
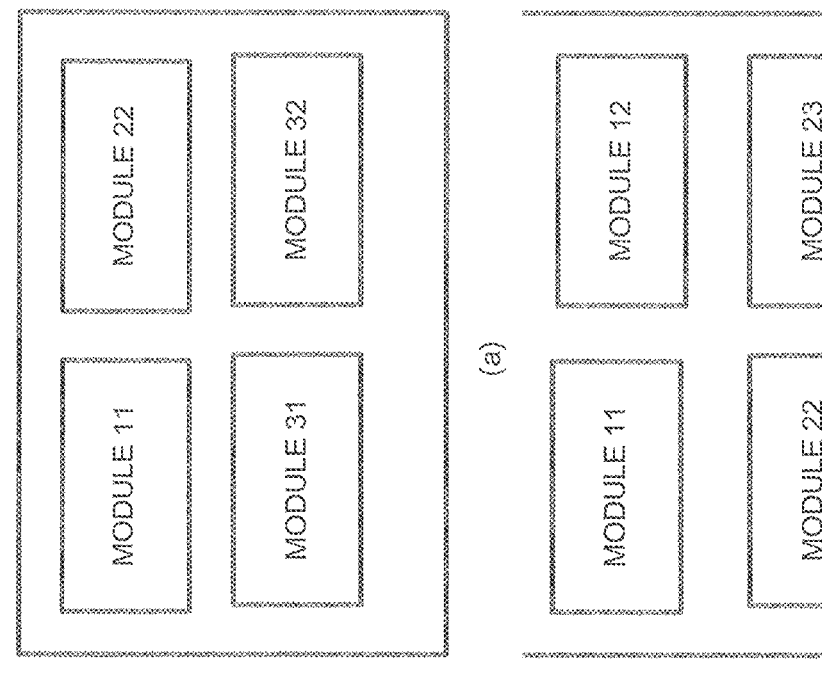
FIG. 1M

224N
FILTER AND DISPLAY COLLABORATION COMMUNICATION LOGS IN ACCORDANCE WITH COMMUNICATION PERMISSIONS

226N
FILTER AND DISPLAY COLLABORATION OBJECT RELATED DATA IN ACCORDANCE WITH ACCESS PERMISSIONS

216N
IDENTIFY ENTITY ACCEPTANCES OF INVITATIONS

218N
ENABLE USERS AT ENTITIES TO COLLABORATE WITH USER A ON COLLABORATION OBJECT IN ACCORDANCE WITH PERMISSIONS

220N
MAINTAIN LOGS OF INTER-ENTITY COLLABORATION COMMUNICATIONS

222N
MAINTAIN LOGS OF INTRA-ENTITY COLLABORATION COMMUNICATIONS

202N
ENABLE ENTITIES TO DEFINE HIERARCHY

204N
ENABLE ENTITIES TO DEFINE PERMISSIONS ASSOCIATED WITH RESPECTIVE HIERARCHY

206N
DETECT USER 'A' OF ENTITY 'A' SYSTEM ACCESS

208N
DETERMINE USER 'A' HIERARCHY POSITION

210N
DETERMINE USER 'A' COMMUNICATION PERMISSIONS

212N
ENABLE USER 'A' TO GENERATE COLLABORATION OBJECT

214N
ENABLE USER 'A' TO GENERATE TO GENERATE COLLABORATION INVITATION AND IDENTIFY RECIPIENTS

Configure Page Views

| | Data | | | | Cancel | Save | | Add Fields | | |
|---|---|---|---|---|---|---|---|---|---|---|

Default

Page Views | Default

| Person | First Name | Data Type | Field Type |
|---|---|---|---|
| 1 = | xxxx | Short Text | Standard |
| 2 = | Set | Dropdown | Standard |
| 3 = | Cube | Dropdown | Standard |
| 4 = | Material | Short Text | Standard |
| 5 = | Strong Weight | Number | Standard |
| 6 = | Mother Pack | Short Text | Standard |
| 7 = | Inner Pack | Short Text | Standard |
| 8 = | Carton Dimension | Short Text | Standard |
| 9 = | Cube | Short Text | Standard |
| 10 = | UPC# | Short Text | Standard |
| 11 = | MCQ | Short Text | Standard |
| 12 = | Load Time | Short Text | Standard |
| 13 = | Lift Assist | Yes/No | User Different (x |
| 14 = | Features Outlets | Long Text | User Different (x |
| 15 = | Number of Legs | Integer | User Different (x |
| 16 = | Trading Traxxxxx xx | xxxx | User Different (x |
| 17 = | Number of Employees | Integer | User Different (x |

Add Fields

Search Q

Field Name and Data Type

Create the Field ⌄

Status | Dropdown ⌄ xxxxx xxxxxx xxx
◯ xxxx

Field Values ◯ Default in first Value

| | | |
|---|---|---|
| 1 = | Active | X |
| 2 = | On Hold | X |
| 3 = | Canceled | X |
| 4 = | Complete | X |
| 5 = | InProgress | X |
| 6 = | Rejected | X |
| 7 = | Handed Off | X |

☐ xxxx xxxx

Cancel | Save

Cancel | Save

☐ Additional Features
Long Text - xxxx

☐ Age Group
xxxx xxxx

☐ Age Range
xxxx xxxx

☐ Animal Type
Short Text-xxx

☐ Assembled Height
xxxx xxxx

☐ Assembled Long
xxxx xxxx

☐ Assembled Weight
xxxx xxxx

☐ Assembled Width
xxxx xxxx

☐ Assembly Informati
Long text- xxxx

☐ Activate
xxxx xxxx

☐ Business Required
xxxx xxxx

☐ Battery Type

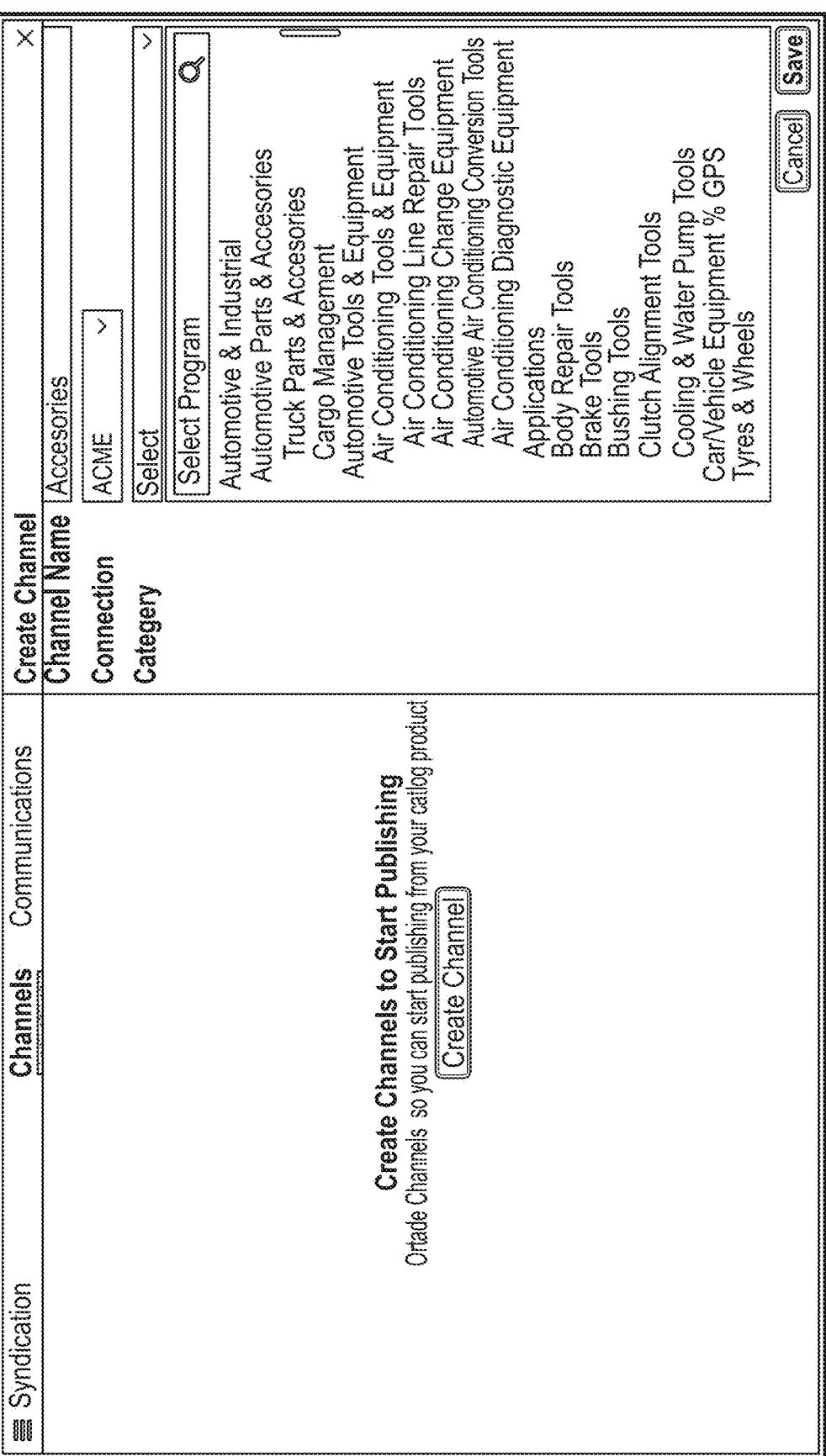
FIG. 1III

Syndication          Channels    Communications          Support

Create Channel          Edit  Duplicate  Events

AMAZON-US
Accessories

Accessories
Amazon-US / Clothing / Shoes & Jewelery / Xxxxx / Jxxxxx / Bxxxxx

ⓘ Changes to this channel will effect future publications of new and existing Products Search Amazon Xxxxxx  🔍                    25 Mapped  View All  ⌄

Required

ASN
Xxxxxx xxxxx xxxx xxxx xx xxxxxx xxx xxxxxx xx  → Xxxx
Short Text                                                    ✎

Description
X xxxxx xxxx xxxx xxxx xx xxxxxx xx xxxxxx xx  → Description
Long Text                                                     ✎

Media and Images

⊂⊃ Autofill with Product Images

Primary Image
Xxxxxx xxxxx xxxx xxxx xx xxxxxx xxx xxxxxx xx  → Primary ACME image
Short Text                                                    ✎

Second Image
Xxxxxx xxxxx xxxx xxxx xx xxxxxx xxx xxxxxx xx  → Second ACME image
Long Text                                                     ✎

Third Image
Xxxxxx xxxxx xxxx xxxx xx xxxxxx xxx xxxxxx xx  → Third ACME image
xxx Text                                                      ✎

Fourth Image
Xxxxxx xxxxx xxxx xxxx xx xxxxxx xxx xxxxxx xx  → ⊕ Add Mapping

Fifth Image
Xxxxxx xxxxx xxxx xxxx xx xxxxxx xxx xxxxxx xx  → ⊕ Add Mapping

Optional

Field Name
Xxxxxx xxxxx xxxx xxxx xx xxxxxx xxx xxxxxx xx  → ⊕ Add Mapping

User Access

⊘ Mike Rxxxxxx  •••
   Sales Manager

⊘ Mike Rxxxxxx  •••
   Sales Manager

⊘ Mike Rxxxxxx  •••
   Sales Manager

⊘ Mike Rxxxxxx  •••
   Sales Manager

⊘ Mike Rxxxxxx  •••
   Sales Manager

FIG. 1JJ

| Product | Publishing Status | Last Published | Product Description | Brand Brand▾ | Size Size ▾ | Colour Colour▾ | Material Material▾ | Material Material▾ |
|---|---|---|---|---|---|---|---|---|
| MB2345-47 | ○ Unpublished | | Sxx Pxxxxx xxxxxx xx at ixxxx.Cxxx xxxx xxxxxxx | JA HOME | Medium | Blue | Denim | Denim |
| MB2345-48 | ○ Unpublished | | Sxx Pxxxxx xxxxxx xx at ixxxx.Cxxx xxxx xxxxxxx | JA HOME | Medium | Blue | Denim | Denim |
| MB2345-49 | ⊘ Published | 12/09/21 11:20am | Sxx Pxxxxx xxxxxx xx at ixxxx.Cxxx xxxx xxxxxxx | JA HOME | Medium | Blue | Denim | Denim |
| MB2345-50 | ○ Unpublished | | Sxx Pxxxxx xxxxxx xx at ixxxx.Cxxx xxxx xxxxxxx | JA HOME | Medium | Blue | Denim | Denim |
| MB2345-51 | ① Pending | 12/09/21 11:20am | Sxx Pxxxxx xxxxxx xx at ixxxx.Cxxx xxxx xxxxxxx | JA HOME | Medium | Blue | Denim | Denim |
| MB2345-52 | ○ Unpublished | | Sxx Pxxxxx xxxxxx xx at ixxxx.Cxxx xxxx xxxxxxx | JA HOME | Medium | Blue | Denim | Denim |

Publish

Connection  Amazon.US  ⌄

Channel  Accessories  ⌄

Catalog

Search

[bracelet]  [XXXXXX]

XXXXXX XXXXXX

XXXXXX XXXXXX

8 Products   [Cancel] [Finish]

FIG. 1LL

Catalog

Products  Published  Showcase  Upload

Support ◇ 🌐

Channels
AMAZON-US

Accessories

Search 🔍

☐∨ XXXXXX  XXXXXX

☐∨  ⟳ Refresh  ☐∨

| # ☐ | Product | | Published Status | Matching Status | Last Refreshed | Product Description | Brand | Size | Colour | Mat |
|---|---|---|---|---|---|---|---|---|---|---|
| Published Mar 16 | | | | | | | | | | |
| 1 ☐ | MB2345-47 | ⋯ | ⊘ Published | ⊘ Matched | 12/09/21 11:20am | Sxx Pxxxxx xxxxxx xx at lxxxx.Cxxx xxxx xxxxxxx | JA HOME | Medium | Blue | Den |
| 1 ☐ | MB2345-48 | ⋯ | ⊘ Published | ⊖ Not Matching | 12/09/21 11:20am | Sxx Pxxxxx xxxxxx xx at lxxxx.Cxxx xxxx xxxxxxx | JA HOME | Medium | Blue | Den |
| 1 ☐ | MB2345-49 | ⋯ | ⊖ Pending | ⊘ Matched | 12/09/21 11:20am | Sxx Pxxxxx xxxxxx xx at lxxxx.Cxxx xxxx xxxxxxx | JA HOME | Medium | Blue | Den |
| 1 ☐ | MB2345-50 | ⋯ | ⊘ Published | ⊘ Matched | 12/09/21 11:20am | Sxx Pxxxxx xxxxxx xx at lxxxx.Cxxx xxxx xxxxxxx | XA HOME | Medium | Blue | Den |
| Published Mar 15 | | | | | | | | | | |
| 1 ☐ | MB2345-51 | ⋯ | ⊘ Published | ⊘ Matched | 12/09/21 11:20am | Sxx Pxxxxx xxxxxx xx at lxxxx.Cxxx xxxx xxxxxxx | JA HOME | Medium | Blue | Den |
| 1 ☐ | MB2345-52 | ⋯ | ⊘ Published | ⊘ Matched | 12/09/21 11:20am | Sxx Pxxxxx xxxxxx xx at lxxxx.Cxxx xxxx xxxxxxx | JA HOME | Medium | Blue | Den |

Published Status
≡ All
⊘ Published
⊖ Pending
⊗ Matched

Matching Status
≡ All
⊘ Matched
⊖ Not Matching

Products 1-100 of 584  Page ☐ of 6

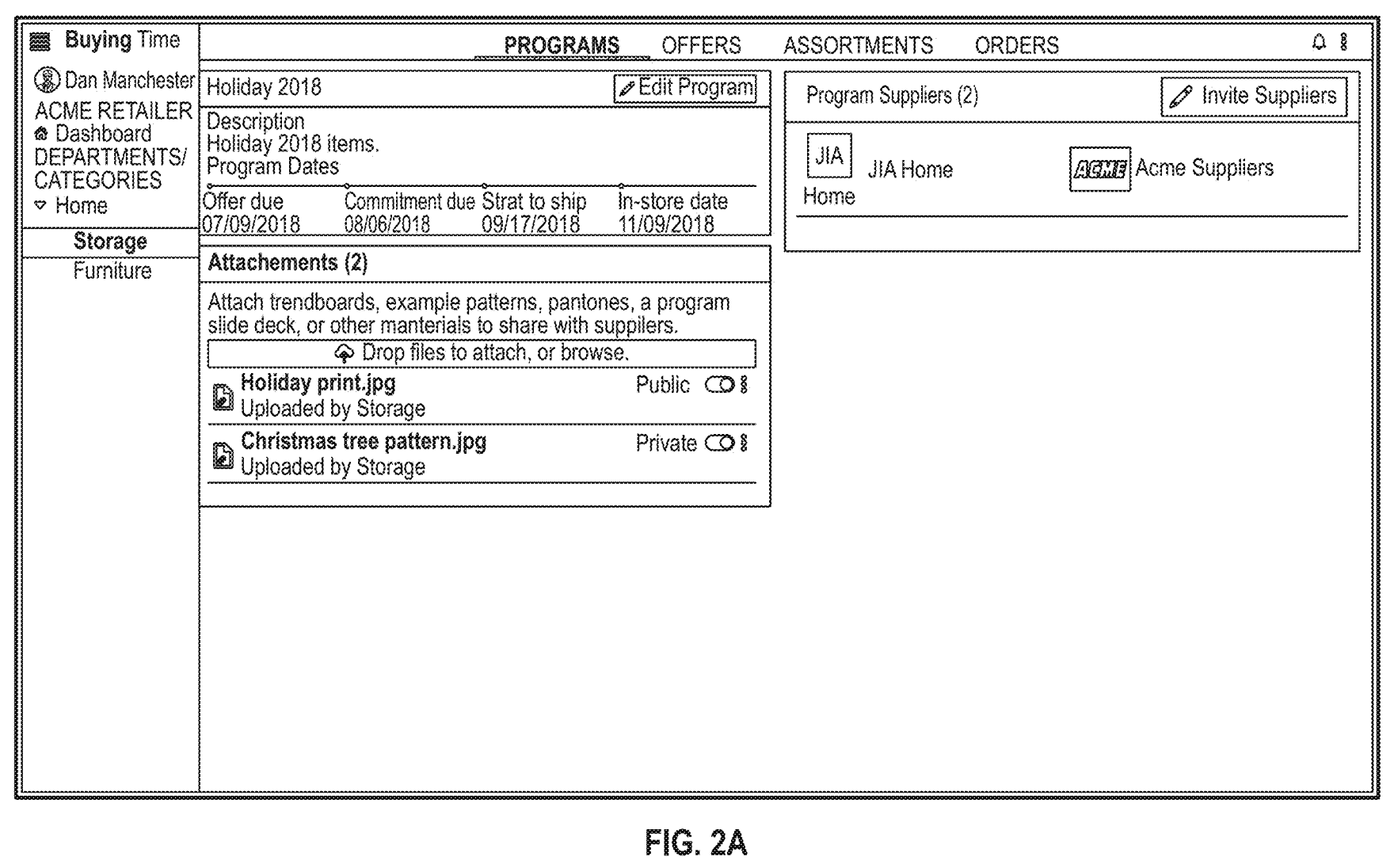

Buying Time                                                                    ◇ ⊗

Dan Manchester

ACME RETAILER

PROGRAMS    OFFERS    ASSORTMENTS    ORDERS

Dashboard

DEPARTMENTS/
CATEGORIES

▽ Home

Storage

Furniture

Holiday 2018                                          ✐ Edit Program

Description
Holiday 2018 items.
Program Dates

Offer due          Commitment due    Strat to ship    In-store date
07/09/2018         08/06/2018         09/17/2018       11/09/2018

Attachements (2)

Attach trendboards, example patterns, pantones, a program
slide deck, or other manterials to share with suppliers.

↳ Drop files to attach, or browse.

🖼 Holiday print.jpg                              Public ⊂◯ ⊗
Uploaded by Storage 🖼 Christmas tree pattern.jpg                    Private ⊂◯ ⊗
Uploaded by Storage Program Suppliers (2)                              ✐ Invite Suppliers

| JIA |        | ACME | Acme Suppliers
  JIA Home
Home

FIG. 2A

Figure 2C:
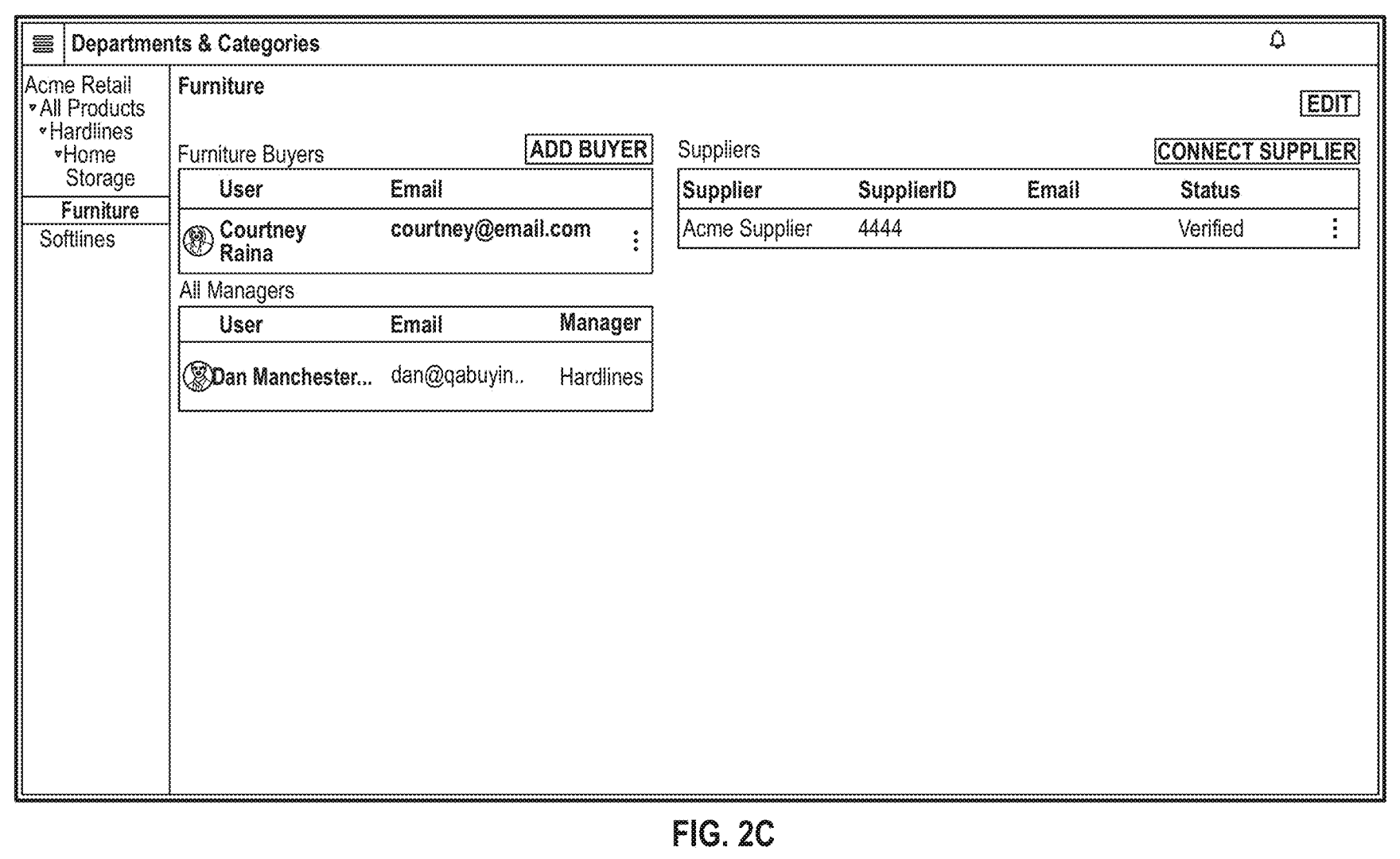

≡ Departments & Categories

Acme Retail
▾ All Products
▾ Hardlines
▾ Home
  Storage

Furniture

Softlines

Furniture

Furniture Buyers     ADD BUYER

| User | Email |
|------|-------|
| Courtney Raina | courtney@email.com ... |

All Managers

| User | Email | Manager |
|------|-------|---------|
| Dan Manchester... | dan@qabuyin... | Hardlines |

Suppliers     CONNECT SUPPLIER

| Supplier | SupplierID | Email | Status |
|----------|-----------|-------|--------|
| Acme Supplier | 4444 | | Verified ... |

EDIT

Departments & Categories

Acme Retail
▾All Products
▾Hardlines
  ▸Home
  Storage
  Furniture
  Softlines

Hardlines

NEW DEPARTMENT | NEW CATEGORY | EDIT

Hardlines Managers                          ADD MANAGER

| User | Email |
|------|-------|
| Dan Manchester | dan@qabuyin.. ⋰ |

All Managers

| User | Email | Manager |
|------|-------|---------|

Buyer Order Requirements    Supplier Order Requirements

| Attribute | Type | Description | Default value |
|-----------|------|-------------|---------------|
| JDA SKU Number | Product | | U-155678-tk |

FIG. 2D

| | | | | | USER DETAILS | |
|---|---|---|---|---|---|---|

ALL USERS

| | | | NEW USER |
|---|---|---|---|

| Photo | Name | Email | Assigned to | Status | |
|---|---|---|---|---|---|
| | Allison Rhodes | allison@qa.b... | | Active | ... |
| | Diane Stark | diane@qa.b... | Home | Active | ... |
| | Drw McCory | drew@qa.b... | Hardner | Active | ... |
| | Betry Larson | betry@qa.b... | Furniture, Storage | Active | ... |
| | Brian Richard | brian@qa.b... | Storage, Furniture | Active | ... |
| | Brooke Jones | brooke@qa.b... | | Active | ... |
| | Dajey Wileon | dajey@qa.bu... | | Deactive | ... |
| | Dakota Xanior | dakota@qa... | Sporting Goods, Toys | Active | ... |
| | Dustin Kerrion | dustin@qa.b... | Automotive, Electronics | Active | ... |
| | David Donnovan | david@qa... | Lawn & Garden, Hardware | Active | ... |
| | Donna Ritenour | donna@qa.b... | Pet Supply | Active | ... |
| | Deirdre O'conner | deirdre@qa.b... | Accessories, Jewelry | Active | ... |

USER DETAILS

First Name: Dan

Last Name: Stark

Email: diane@qa.buyingtimeapp.com

Employee Id:

Department: Home

Categories:

Assigned Departments and Categories

- ☐ Television
- ☐ Videogames
- ☐ Hardware
  - ☐ Building Materials
  - ☐ Fasteners
  - ☐ Tools
- ☑ Home
  - ☐ Bath
  - ☐ Furniture
  - ☐ Storage
- ☐ Lawn & Garden
  - ☐ Garden Tools Update

FIG. 2G

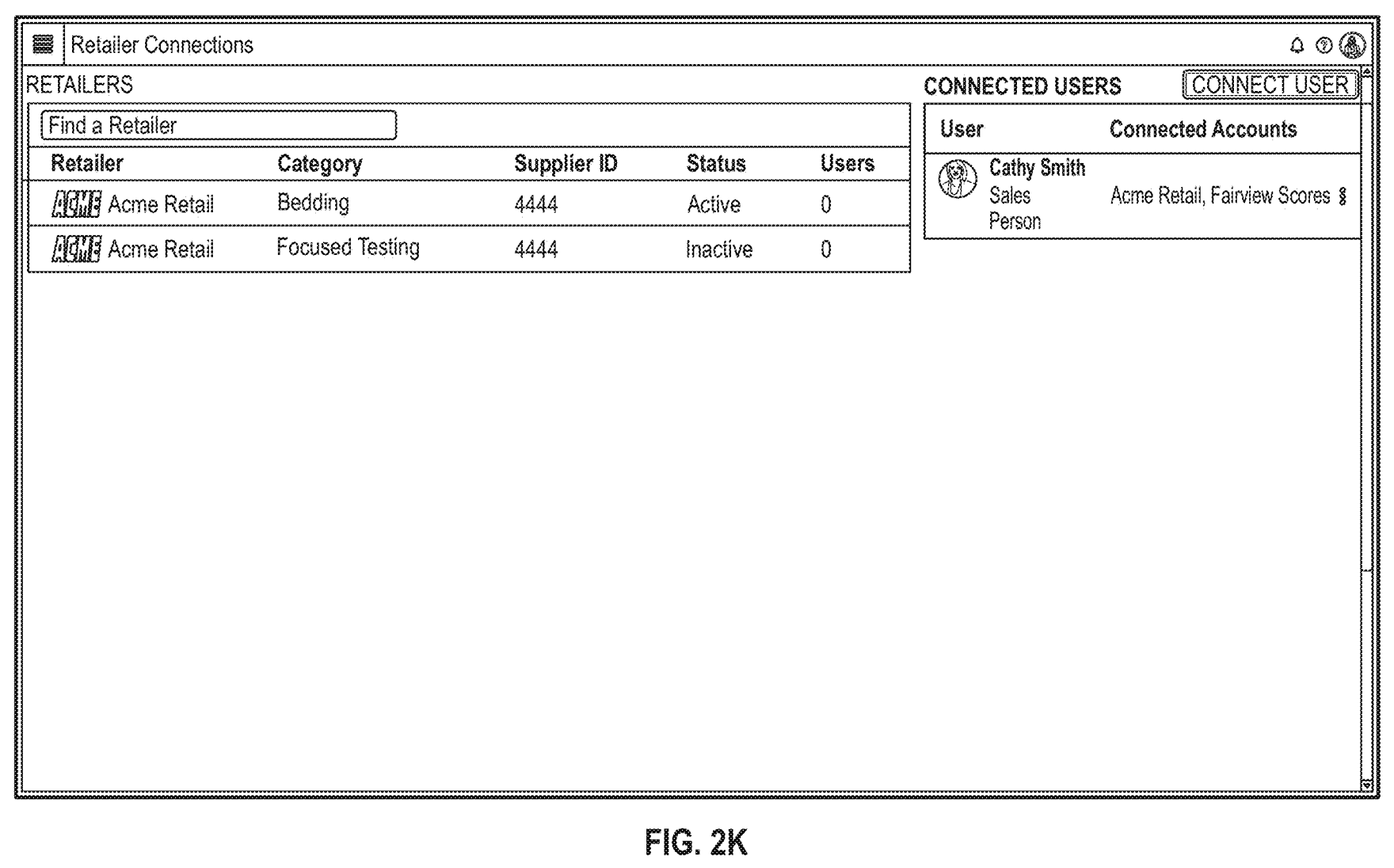

Retailer Connections

RETAILERS | CONNECT USER

Find a Retailer

| Retailer | Category | Supplier ID | Status | Users |
|----------|----------|-------------|--------|-------|
| Acme Retail | Bedding | 4444 | Active | 0 |
| Acme Retail | Focused Testing | 4444 | Inactive | 0 |

CONNECTED USERS

| User | Connected Accounts |
|------|--------------------|
| Cathy Smith<br>Sales Person | Acme Retail, Fairview Scores ⁞ |

FIG. 2K

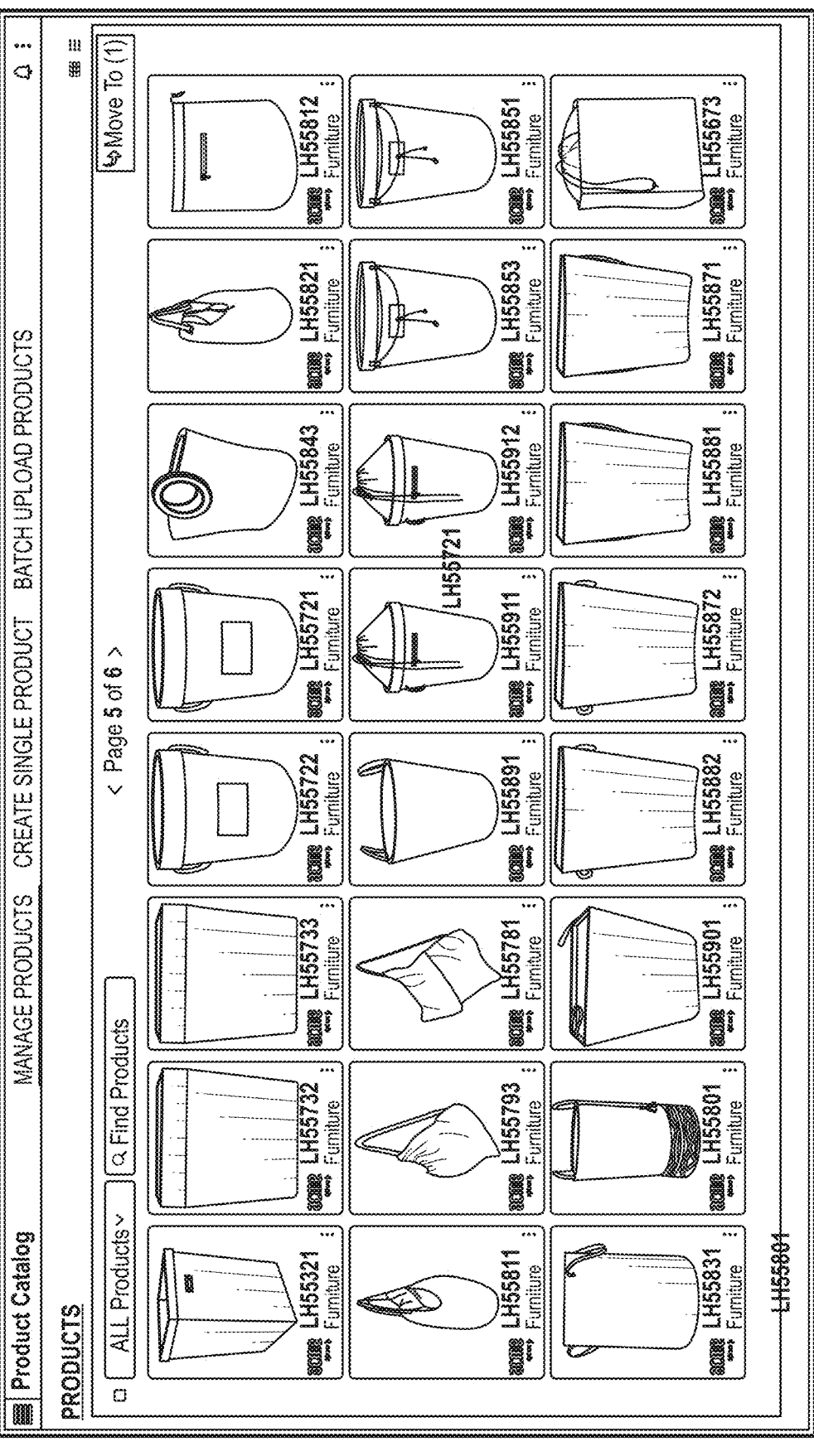
FIG. 3A1

Product Catalog　　MANAGE PRODUCTS　　CREATE SINGLE PRODUCT　　BATCH UPLOAD PRODUCTS

PRODUCTS

ALL Products ∨ | Q Find Products

↳Move To (5)

< Page 5 of 6 >

| Product | Category | Size (L x W x H) | Case/Cube | FOB | List Prize | Date | Status |
|---|---|---|---|---|---|---|---|
| LH55321 Single Square Collapsible Structured fabric Hamper with Magnetic Lid and Front... | Furniture | 16.00' x16.00' x 26.00' | 6/1.82ft | Qingdao | 12.76 | Modified: 01/12/18 Created: 01/12/18 | |
| LH55732 Single Rectangular Foldable fabric Laundry Hamper with Rope Handle, Round Metal ... | Furniture | 19.00' x14.00' x 20.00' | 6/1.80ft | Qingda | 5.82 | Modified: 01/12/18 Created: 01/12/18 | |
| LH55731 Single Rectangular Foldable fabric Laundry Hamper with Rope Handle, Round Metal ... | Furniture | 18.00' x14.00' x 20.00' | 6/1.80ft | Qingda | 5.82 | Modified: 01/12/18 Created: 01/12/18 | |
| LH55722 Single Round Foldable fabric Laundry Hamper with Rope Handle, Round Metal grommets an... | Furniture | 18.00' x18.00' x 20.00' | 6/1.80ft | Qingda | 5.82 | Modified: 01/12/18 Created: 01/12/18 | |
| LH55721 Single Round Foldable fabric Laundry Hamper with Rope Handle, Round Metal grommets an... | Furniture | 18.00' x18.00' x 20.00' | 6/1.80ft | Qingda | 5.82 | Modified: 01/12/18 Created: 01/12/18 | |
| LH55841 Single Oval fabric Laundry bag with Magnetic Circle Handles Gray Fabric | Furniture | 21.00' x11.00' x 25.00' | 6/2.21ft | Qingdao | 8.51 | Modified: 01/12/18 Created: 01/12/18 | |
| LH55821 Single Round Fabric Bag with Back Straps, Exterior Zippered Pocket and Adjustable Spring... | Furniture | 15.50' x15.50' x 27.50' | 6/0.86ft | Qingdao | 6.17 | Modified: 01/12/18 Created: 01/12/18 | |
| LH55812 Single Round fabric Canvas Bag with Webbing Fabric Handles and Adjustable Strings Washed | Furniture | 15.50' x15.50' x 27.50' | 6/0.86ft | Qingdao | 6.16 | Modified: 01/12/18 Created: 01/12/18 | |
| LH55813 Single Round fabric Canvas Bag with Webbing Fabric Handles and Adjustable Strings Washed | Furniture | 15.50' x15.50' x 27.50' | 6/0.86ft | Qingdao | 6.16 | Modified: 01/12/18 Created: 01/12/18 | |

FIG. 3A2

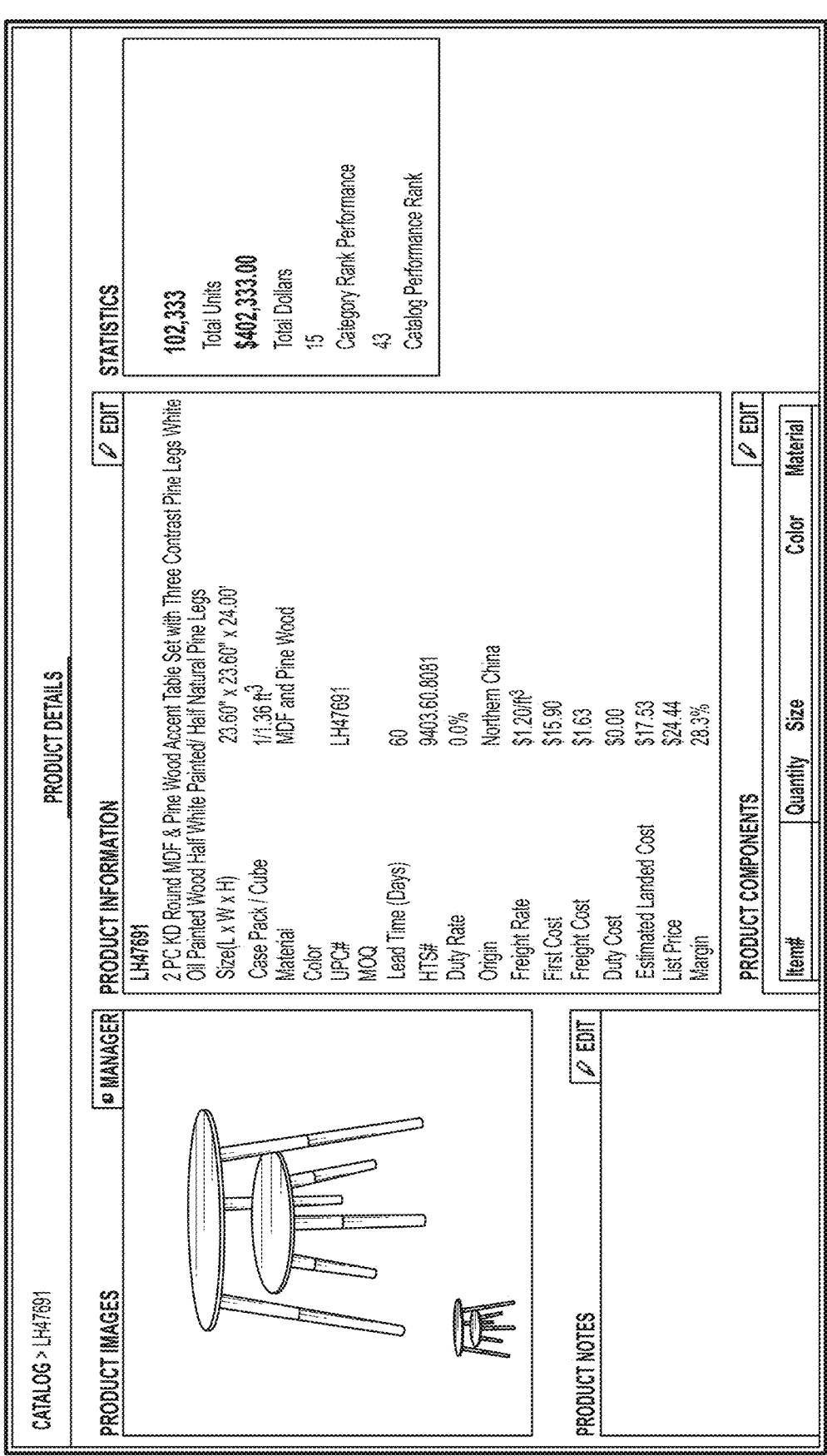
FIG. 3C1

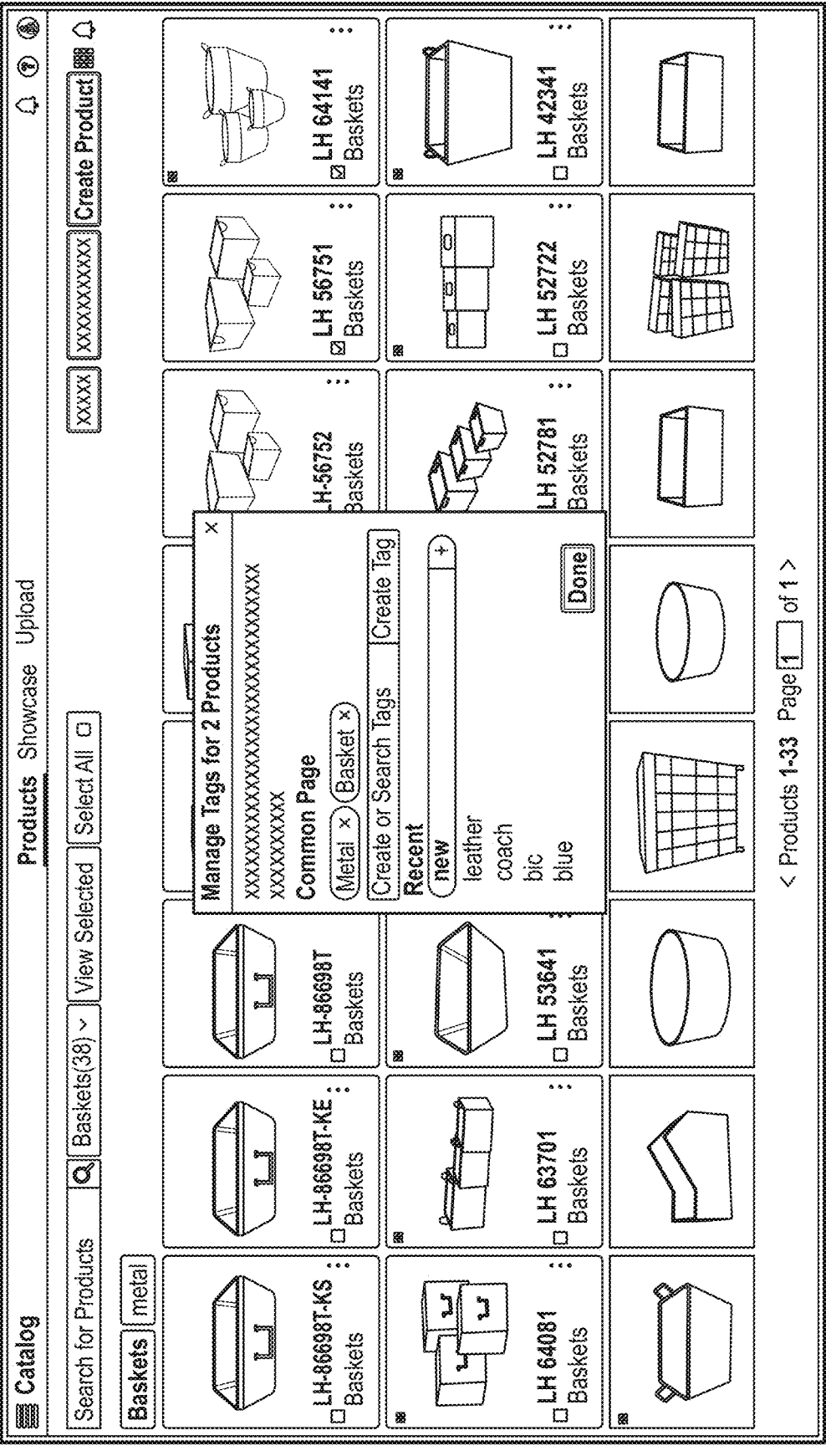
FIG. 3C2

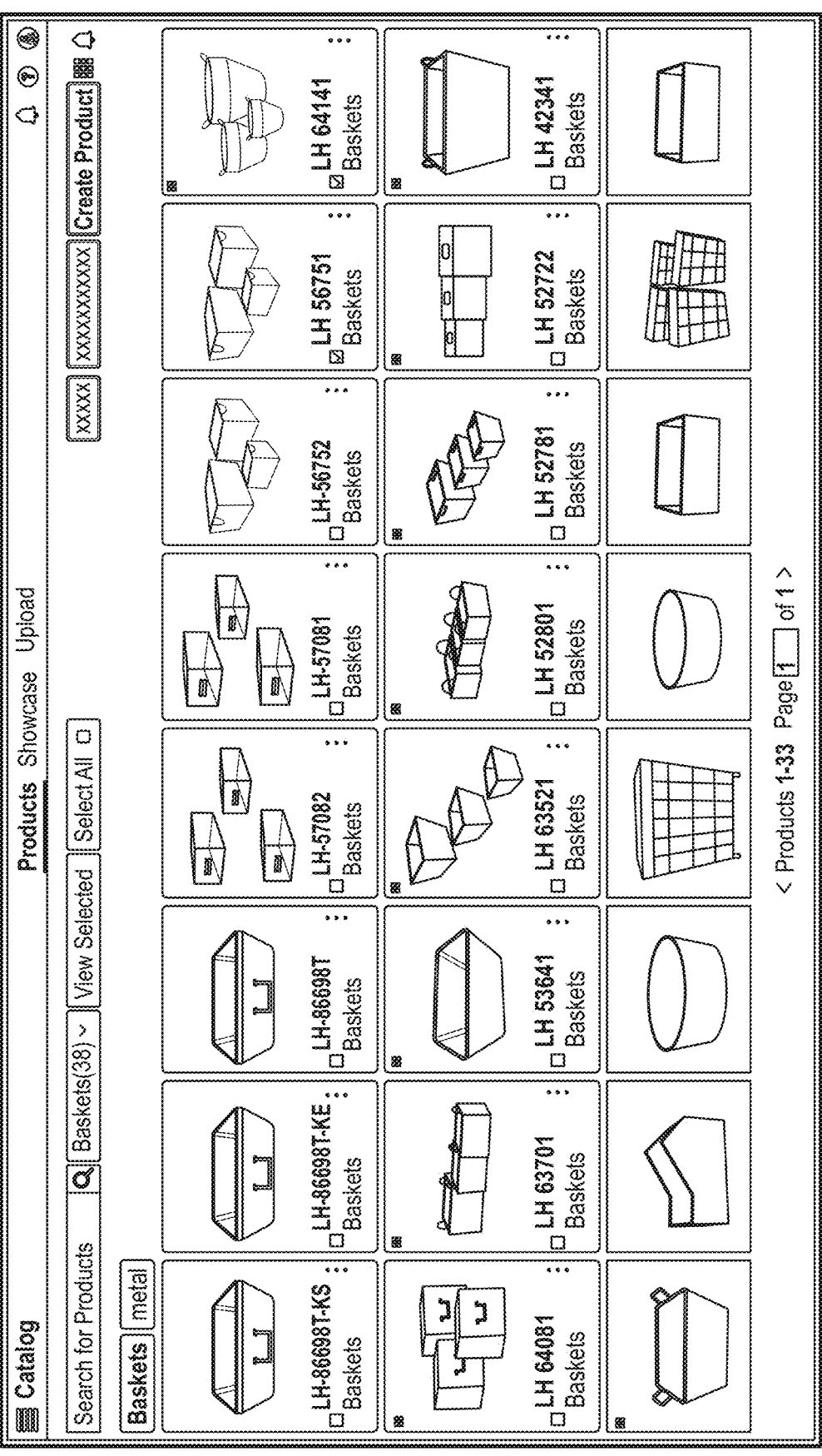
FIG. 3C3

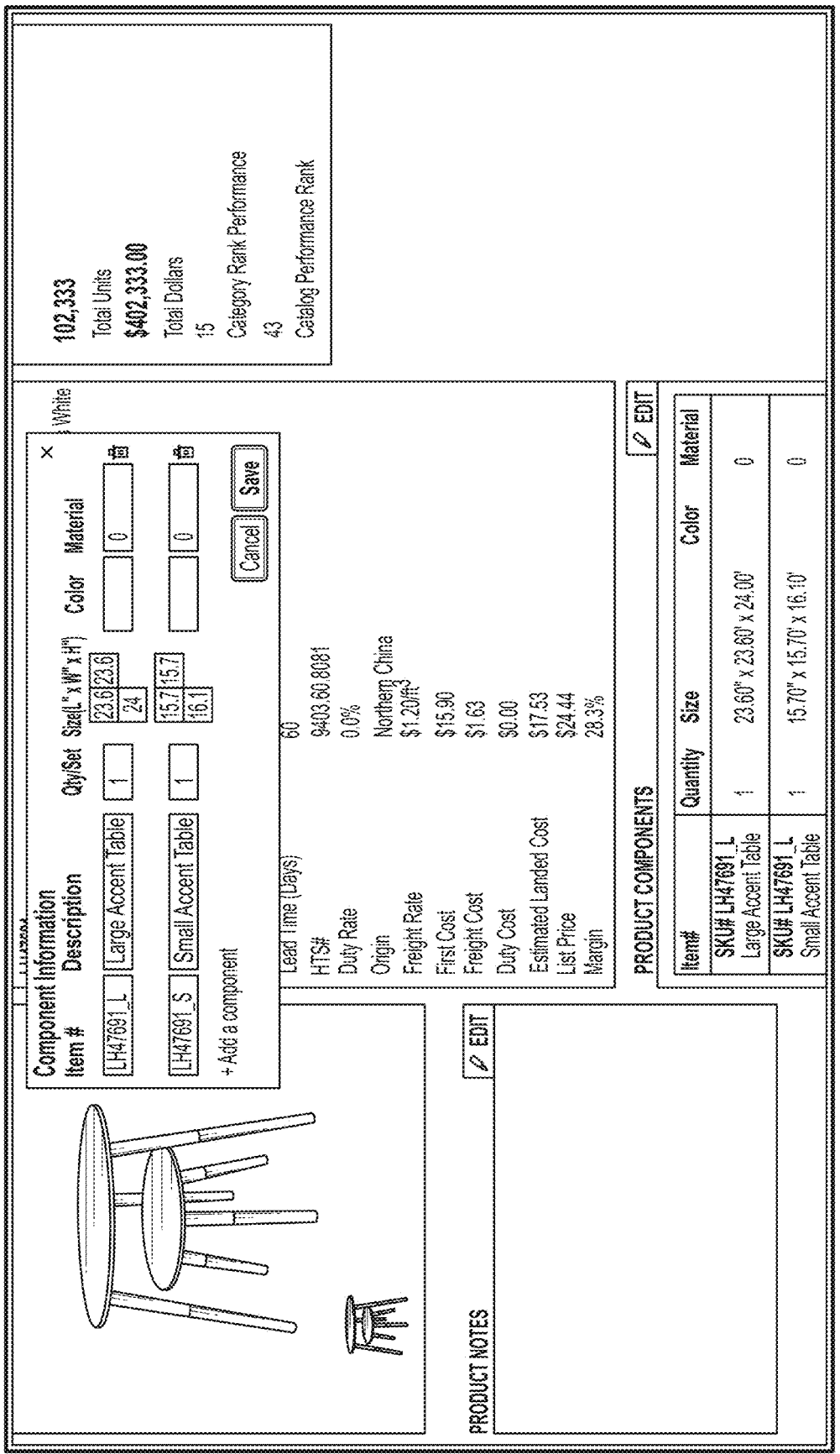
FIG. 3F1

CATALOG > Baskets > LH58373

Product Details        Sales History

Search Sales 🔍

| Customer | Order | Program | Exp Receipt | Ship Date | FOB Point | Unit Price | Est Landed Cost | Quantity | Margin | Amount |
|---|---|---|---|---|---|---|---|---|---|---|
| Acme Retail > Storage | 14660 | Back To School 2018 | 10/01/18 | 12/31/69 | 0 | $20.9800 | $22.08 | 5.24% | 1,000 | $20,980.00 |

FIG. 3F2

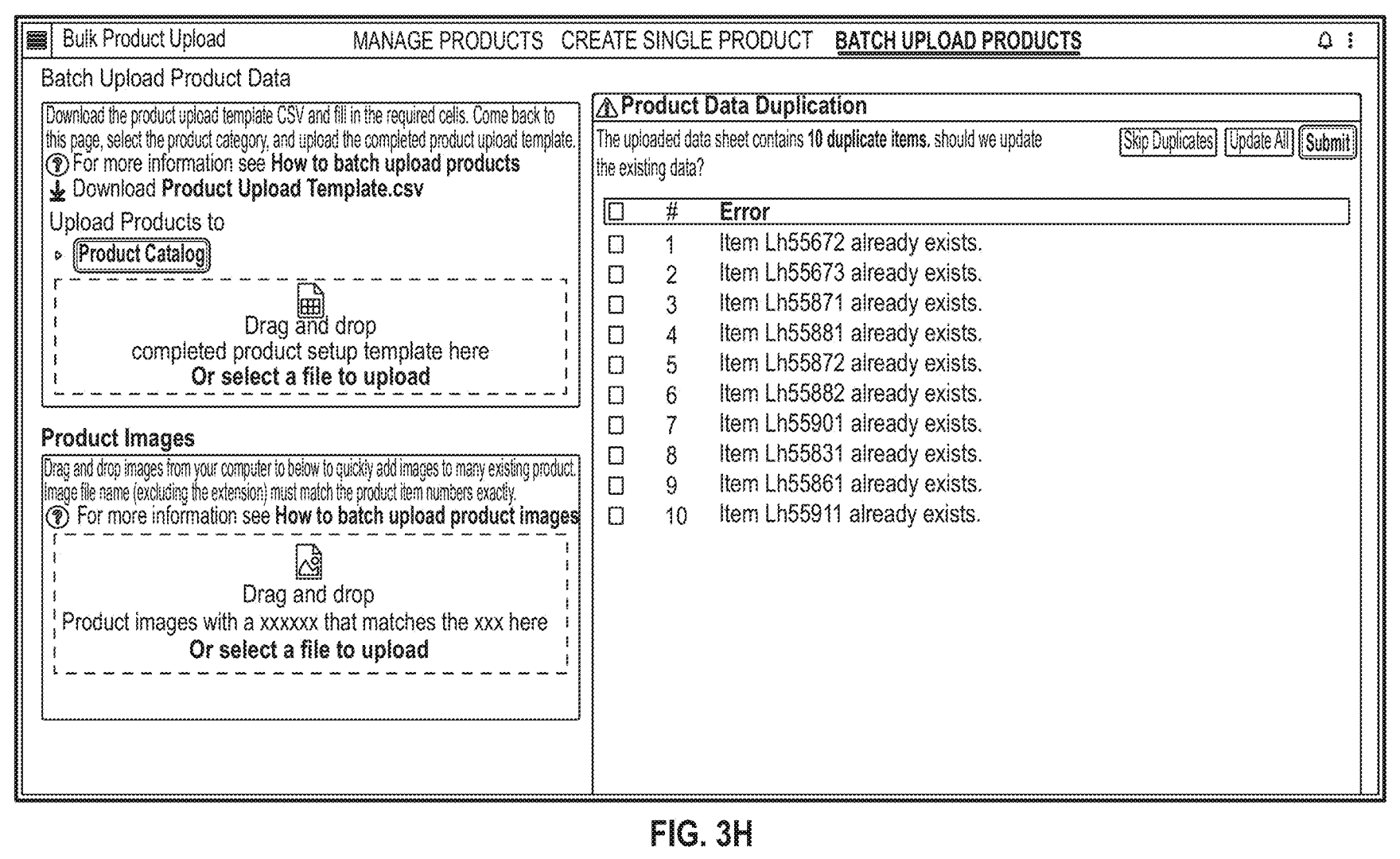

Bulk Product Upload     MANAGE PRODUCTS     CREATE SINGLE PRODUCT     BATCH UPLOAD PRODUCTS Batch Upload Product Data Download the product upload template CSV and fill in the required cells. Come back to this page, select the product category, and upload the completed product upload template.
ⓘ For more information see How to batch upload products
⬇ Download Product Upload Template.csv Upload Products to
[ Product Catalog ]

Drag and drop
completed product setup template here
Or select a file to upload

Product Images

Drag and drop images from your computer to below to quickly add images to many existing product. Image file name (excluding the extension) must match product item numbers exactly.
ⓘ For more information see How to batch upload product images Product images with a xxxxxx that matches the xxx here Drag and drop
Or select a file to upload ⚠ Product Data Duplication The uploaded data sheet contains 10 duplicate items, should we update the existing data?

[Skip Duplicates] [Update All] [Submit]

| ☐ | # | Error |
|---|---|---|
| ☐ | 1 | Item Lh55672 already exists. |
| ☐ | 2 | Item Lh55673 already exists. |
| ☐ | 3 | Item Lh55871 already exists. |
| ☐ | 4 | Item Lh55881 already exists. |
| ☐ | 5 | Item Lh55872 already exists. |
| ☐ | 6 | Item Lh55882 already exists. |
| ☐ | 7 | Item Lh55901 already exists. |
| ☐ | 8 | Item Lh55831 already exists. |
| ☐ | 9 | Item Lh55861 already exists. |
| ☐ | 10 | Item Lh55911 already exists. |

FIG. 3H

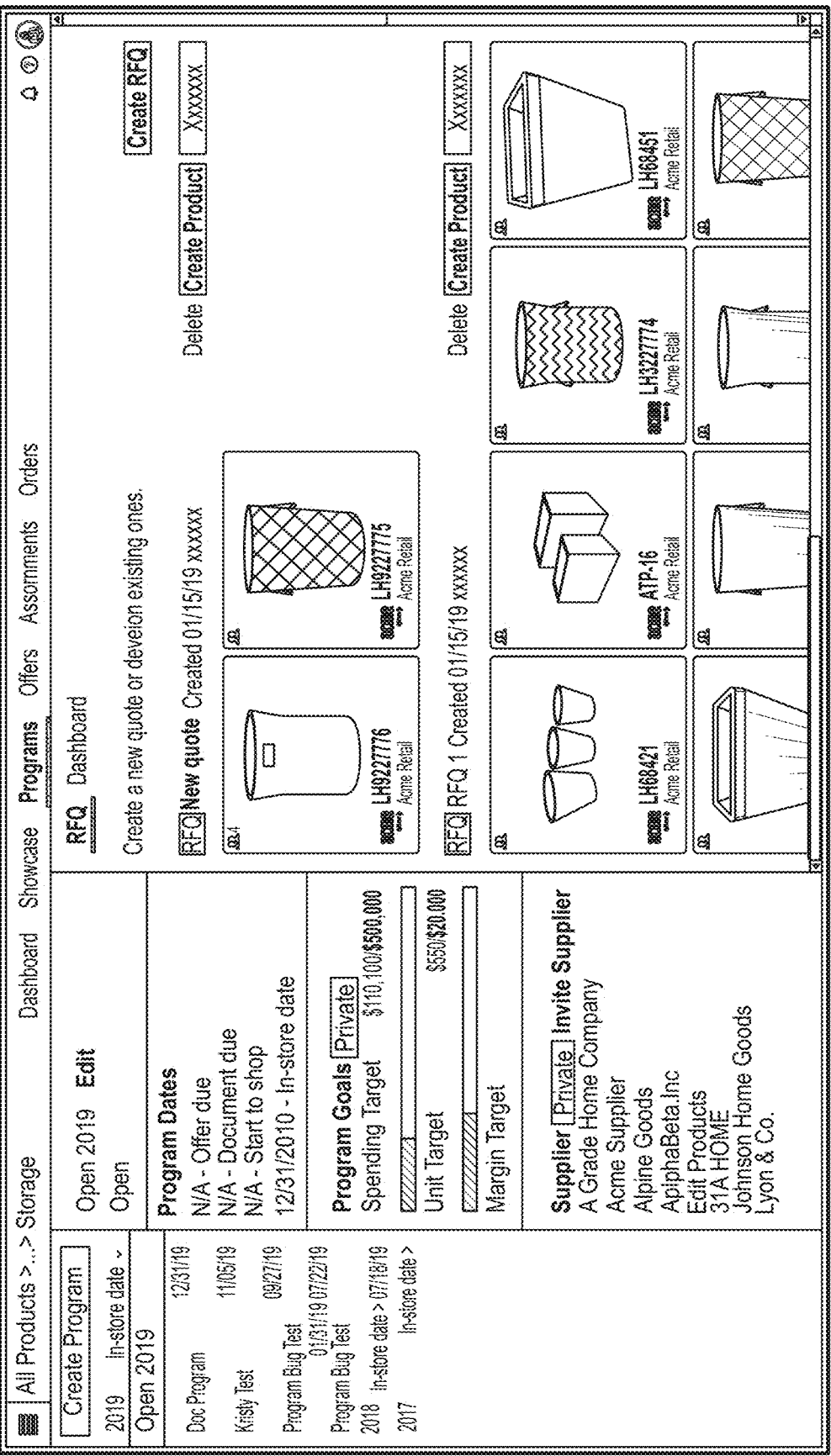
FIG. 4A1

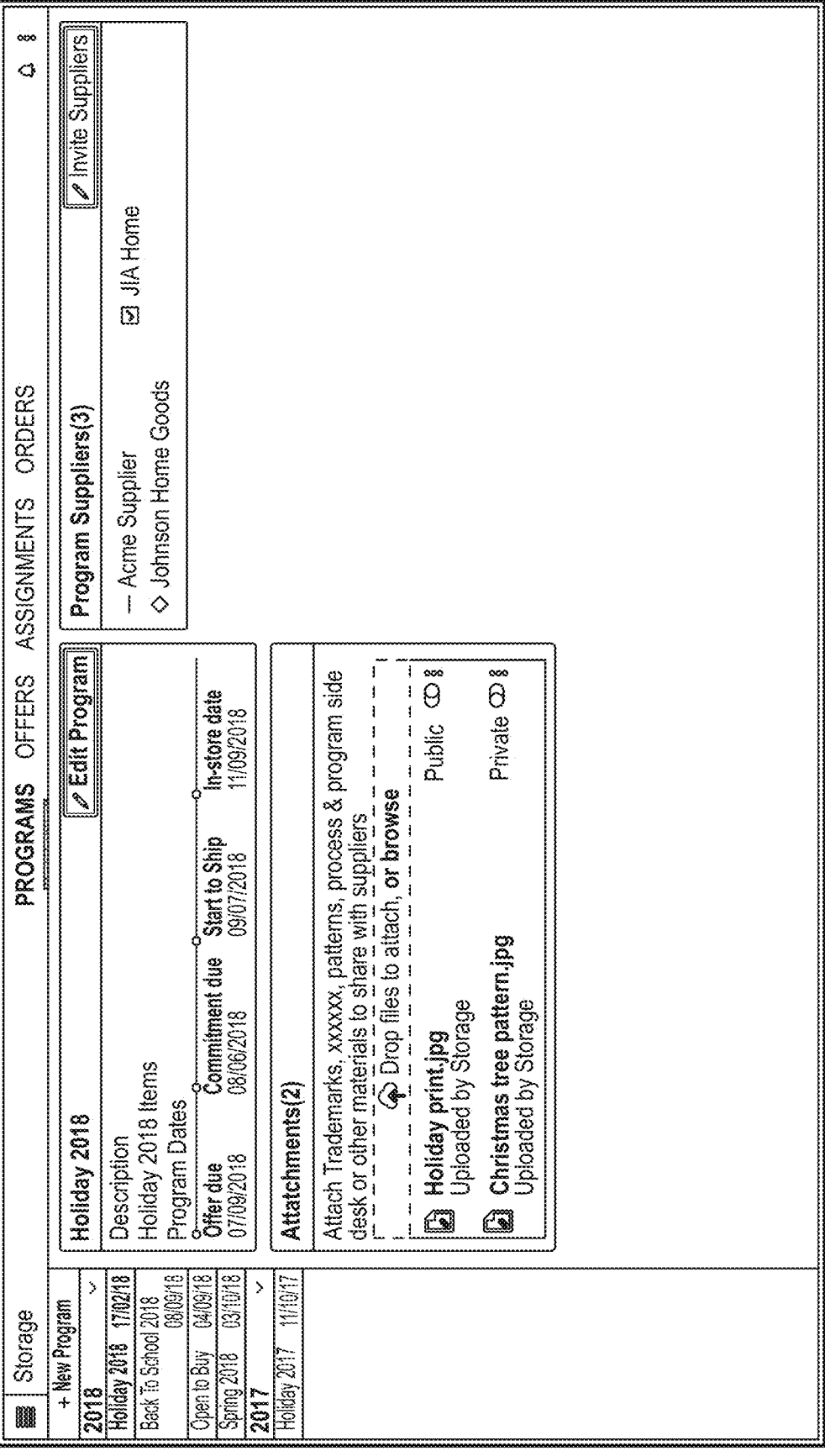
FIG. 4A2

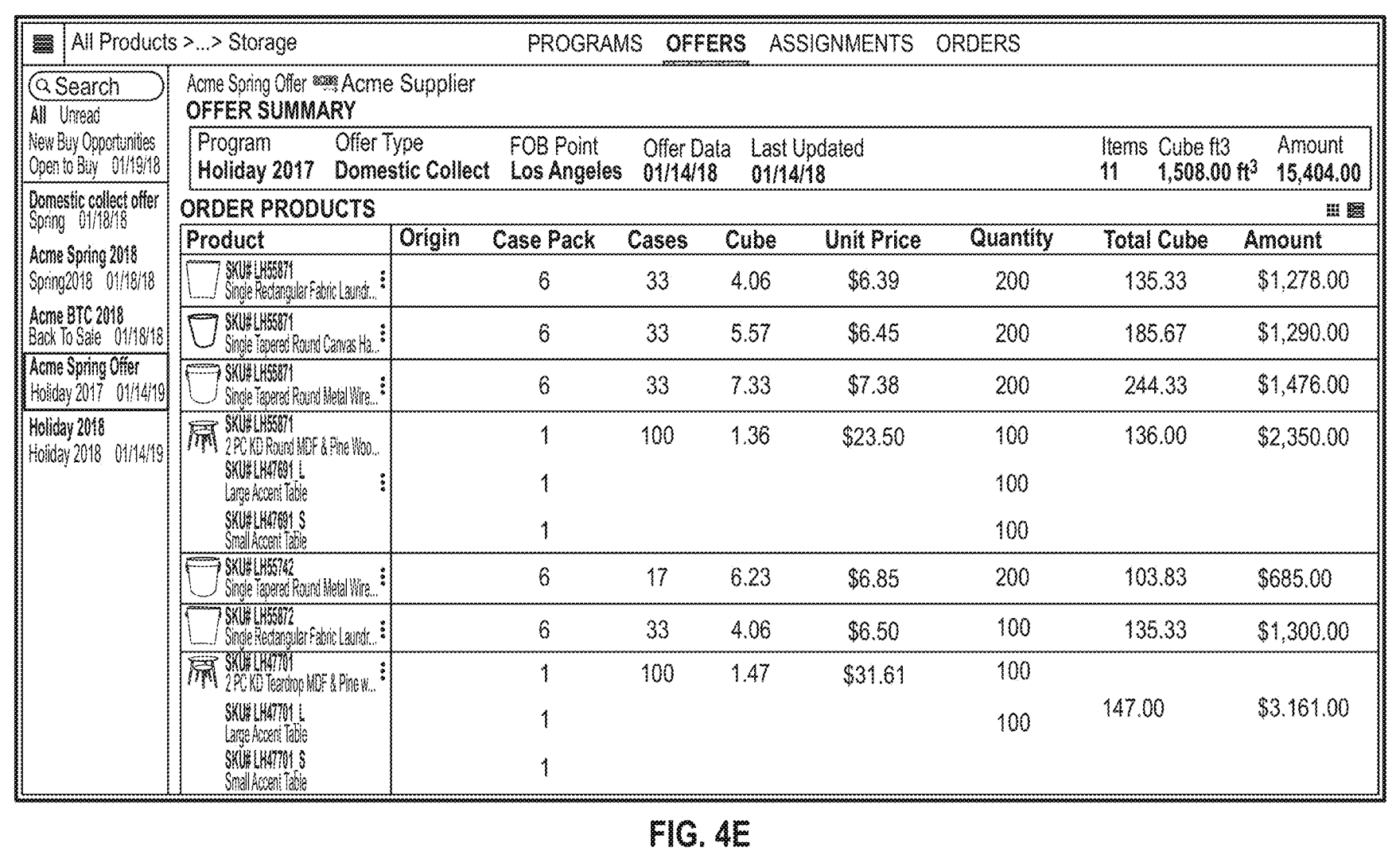

All Products >...> Storage

Search
All Unread
New Buy Opportunities
Open to Buy 01/19/18
Domestic collect offer Spring 01/18/18
Acme Spring 2018 Spring2018 01/18/18
Acme BTC 2018 Back To Sale 01/18/18
Acme Spring Offer Holiday 2017 01/14/19
Holiday 2018 Holiday 2018 01/14/19

PROGRAMS   OFFERS   ASSIGNMENTS   ORDERS

Acme Spring Offer — Acme Supplier
OFFER SUMMARY

| Program | Offer Type | FOB Point | Offer Data | Last Updated | | Items | Cube ft3 | Amount |
|---|---|---|---|---|---|---|---|---|
| Holiday 2017 | Domestic Collect | Los Angeles | 01/14/18 | 01/14/18 | | 11 | 1,508.00 ft3 | 15,404.00 |

ORDER PRODUCTS

| Product | Origin | Case Pack | Cases | Cube | Unit Price | Quantity | Total Cube | Amount |
|---|---|---|---|---|---|---|---|---|
| SKU# LH5871 Single Rectangular Fabric Laundr... | | 6 | 33 | 4.06 | $6.39 | 200 | 135.33 | $1,278.00 |
| SKU# LH5871 Single Tapered Round Canvas Ha... | | 6 | 33 | 5.57 | $6.45 | 200 | 185.67 | $1,290.00 |
| SKU# LH5871 Single Tapered Round Metal Wire... | | 6 | 33 | 7.33 | $7.38 | 200 | 244.33 | $1,476.00 |
| SKU# LH5871 2 PC KD Round MDF & Pine Woo... | | 1 | 100 | 1.36 | $23.50 | 100 | 136.00 | $2,350.00 |
| SKU# LH4781 L Large Accent Table | | 1 | | | | 100 | | |
| SKU# LH4781 S Small Accent Table | | 1 | | | | 100 | | |
| SKU# LH5744 Single Tapered Round Metal Wire... | | 6 | 17 | 6.23 | $6.85 | 200 | 103.83 | $685.00 |
| SKU# LH5872 Single Rectangular Fabric Laundr... | | 6 | 33 | 4.06 | $6.50 | 100 | 135.33 | $1,300.00 |
| SKU# LH4711 2 PC KD Teardrop MDF & Pine w... | | 1 | 100 | 1.47 | $31.61 | 100 | 147.00 | $3,161.00 |
| SKU# LH4711 L Large Accent Table | | 1 | | | | 100 | | |
| SKU# LH4711 S Small Accent Table | | 1 | | | | 100 | | |

FIG. 4E

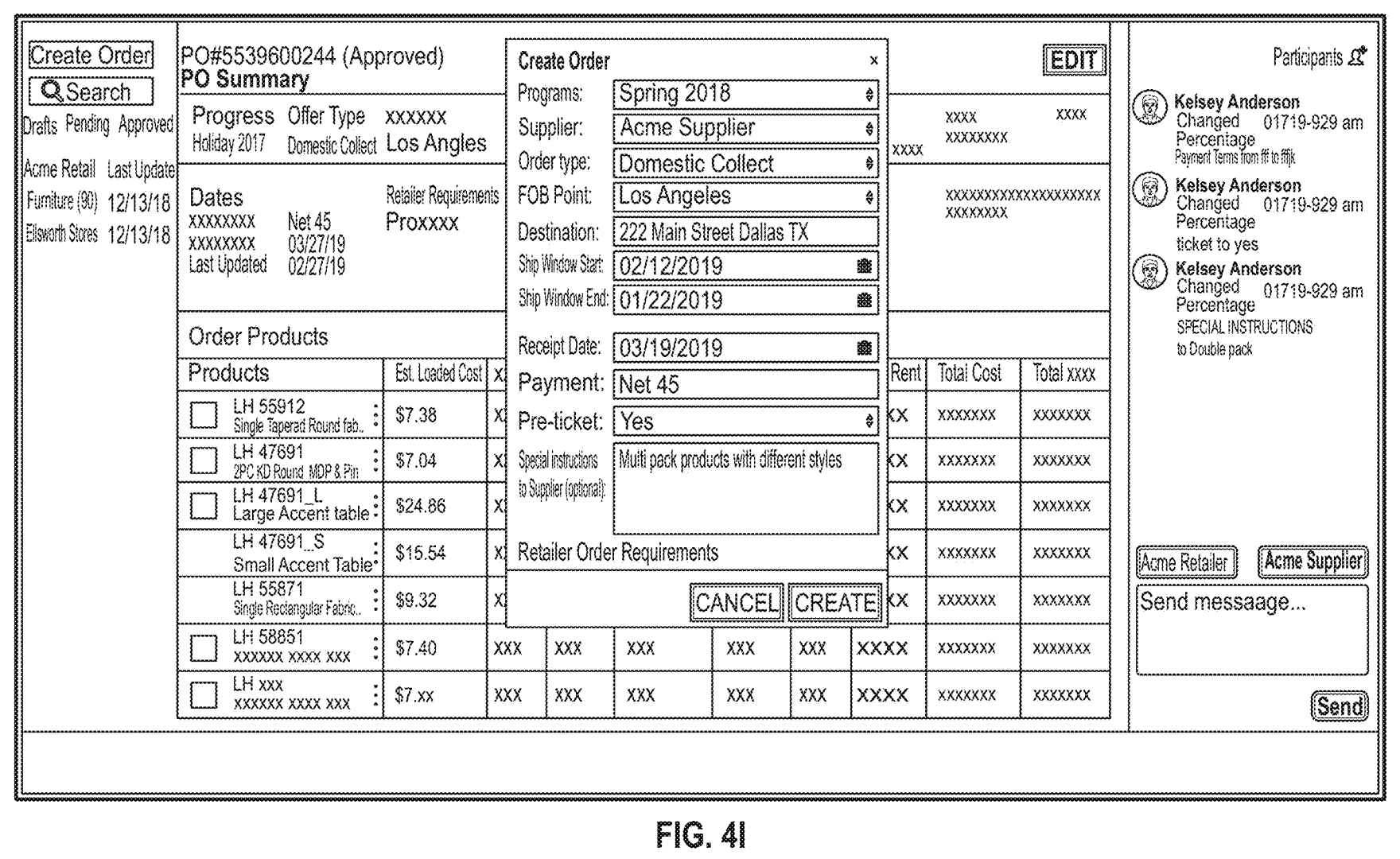

Create Order

Q Search

Drafts   Pending   Approved

Acme Retail   Last Update

Furniture (90)   12/13/18
Ellsworth Stores   12/13/18

PO#5539600244 (Approved)
PO Summary

Progress   Offer Type   xxxxxx
Holiday 2017   Domestic Collect   Los Angles

Dates    Net 45
xxxxxxxx    03/27/19
xxxxxxxx    02/27/19
Last Updated

Retailer Requirements
Proxxxxx

EDIT xxx   xxxx
xxxxxxxx
xxxxxxxxxxxxxxxxxxxxxxx
xxxxxxxx

Create Order   x

Programs:   Spring 2018
Supplier:   Acme Supplier
Order type:   Domestic Collect
FOB Point:   Los Angeles
Destination:   222 Main Street Dallas TX
Ship Window Start:   02/12/2019
Ship Window End:   01/22/2019

Receipt Date:   03/19/2019
Payment:   Net 45
Pre-ticket:   Yes
Special Instructions to Supplier (optional):   Multi pack products with different styles Retailer Order Requirements

CANCEL   CREATE

Order Products

| Products | Est. Loaded Cost | | Rent | Total Cost | Total xxx |
|---|---|---|---|---|---|
| LH 55912 Single Tapered Round fab... | $7.38 | x | XX | xxxxxxx | xxxxxxx |
| LH 47691 2PC KD Round MDP & Pin | $7.04 | x | XX | xxxxxxx | xxxxxxx |
| LH 47691_L Large Accent table | $24.86 | x | XX | xxxxxxx | xxxxxxx |
| LH 4769 L_S Small Accent Table | $15.54 | x | XX | xxxxxxx | xxxxxxx |
| LH 55871 Single Rectangular Fabric... | $9.32 | x | XX | xxxxxxx | xxxxxxx |
| LH 58851 xxxxxx xxxxx xxx | $7.40 | XXX | XXXX | xxxxxxx | xxxxxxx |
| LH xxx xxxxxx xxxx xxx | $7.xx | XXX | XXXX | xxxxxxx | xxxxxxx |

Participants ⌂

Kelsey Anderson
Changed   01?19-929 am
Percentage
Payment Terms from fill to fillk Kelsey Anderson
Changed   01?19-929 am
Percentage
ticket to yes Kelsey Anderson
Changed   01?19-929 am
Percentage
SPECIAL INSTRUCTIONS
to Double pack Acme Retailer   Acme Supplier Send message...

Send

FIG. 4I

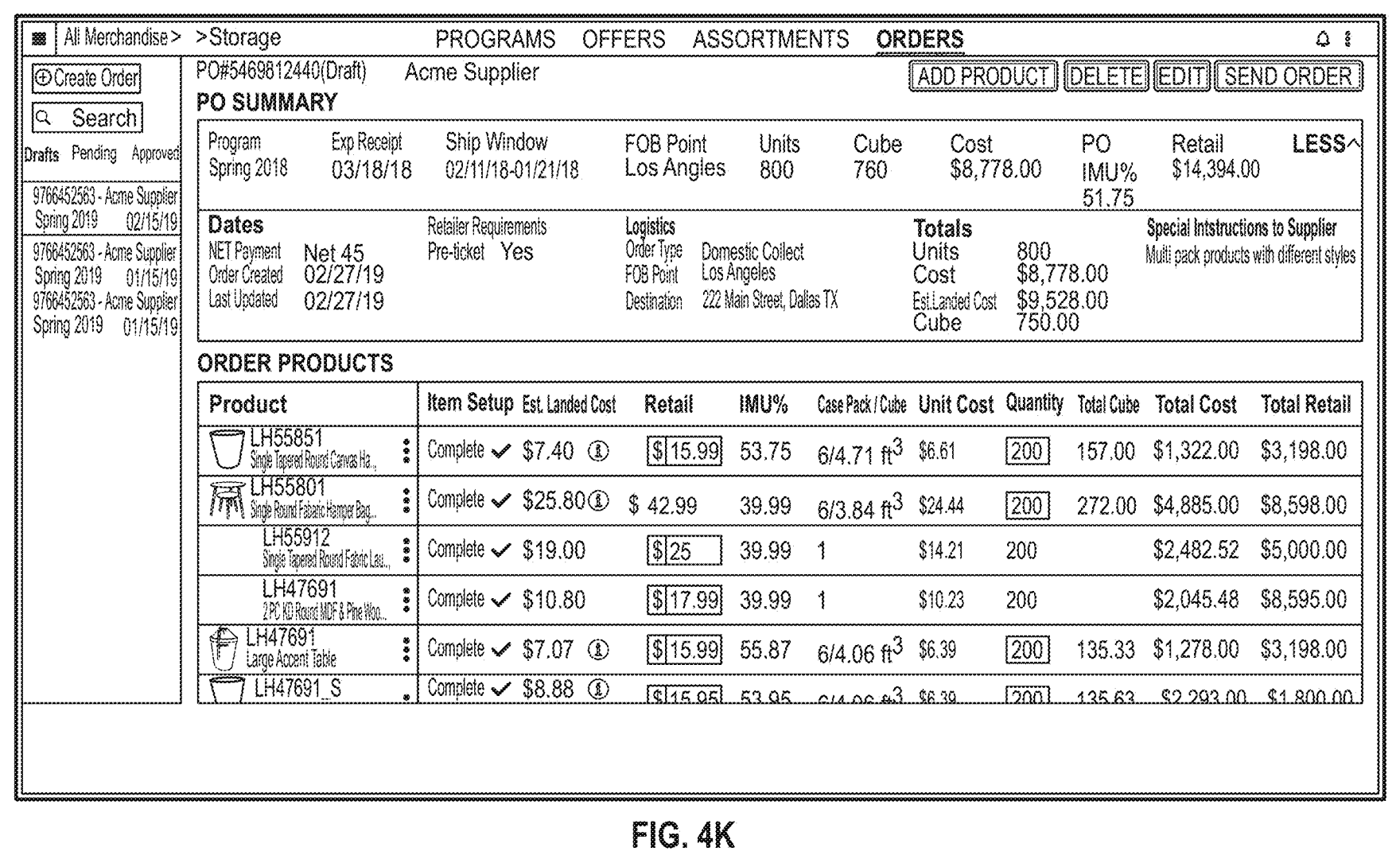

≡ | All Merchandise >    > Storage    PROGRAMS  OFFERS  ASSORTMENTS  ORDERS    ◇ ⋮

⊕ Create Order    PO#5469612440(Draft)    Acme Supplier    ADD PRODUCT  DELETE  EDIT  SEND ORDER 🔍 Search    PO SUMMARY

Drafts  Pending  Approved

9766452363 - Acme Supplier
Spring 2019    02/15/19

9766452363 - Acme Supplier
Spring 2019    01/15/19

9766452363 - Acme Supplier
Spring 2019    01/15/19

| Program | Exp Receipt | Ship Window | FOB Point | Units | Cube | PO | Retail |
|---|---|---|---|---|---|---|---|
| Spring 2018 | 03/18/18 | 02/11/18-01/21/18 | Los Angeles | 800 | 760 | Cost $8,778.00 | IMU% 51.75 | $14,394.00 | LESS⌄ |

Dates
NET Payment  Net 45
Order Created  02/27/19
Last Updated  02/27/19

Retailer Requirements
Pre-ticket  Yes

Logistics
Order Type  Domestic Collect
FOB Point  Los Angeles
Destination  222 Main Street, Dallas TX

Totals
Units  800
Cost  $8,778.00
Est Landed Cost  $9,528.00
Cube  750.00

Special Instructions to Supplier
Multi-pack products with different styles

ORDER PRODUCTS

| Product | Item Setup | Est Landed Cost | | Retail | IMU% | Case Pack/Cube | Unit Cost | Quantity | Total Cube | Total Cost | Total Retail |
|---|---|---|---|---|---|---|---|---|---|---|---|
| LH55851 Single Tapered Round Canvas Ha... | Complete ✓ | $7.40 | ⓘ ⋯ | $15.99 | 53.75 | 6/4.71 ft³ | $6.61 | 200 | 157.00 | $1,322.00 | $3,198.00 |
| LH55801 Single Round Fabric Hamper Bag... | Complete ✓ | $25.80 | ⓘ ⋯ | $42.99 | 39.99 | 6/3.84 ft³ | $24.44 | 200 | 272.00 | $4,885.00 | $8,598.00 |
| LH55912 Single Tapered Round Fabric Lau... | Complete ✓ | $19.00 | ⋯ | $25 | 39.99 | 1 | $14.21 | 200 | | $2,482.52 | $5,000.00 |
| LH47691 2PC KD Round MDF 9 Pine Woo... | Complete ✓ | $10.80 | ⋯ | $17.99 | 39.99 | 1 | $10.23 | 200 | | $2,045.48 | $8,595.00 |
| LH47691 Large Accent Table | Complete ✓ | $7.07 | ⓘ ⋯ | $15.99 | 55.87 | 6/4.06 ft³ | $6.39 | 200 | 135.33 | $1,278.00 | $3,198.00 |
| LH47691_S | Complete ✓ | $8.88 | ⓘ ⋅ | $15.95 | 53.95 | 6/4.06 ft³ | $6.39 | 200 | 135.63 | $2,293.00 | $1,800.00 |

FIG. 4K

Figure 4L:
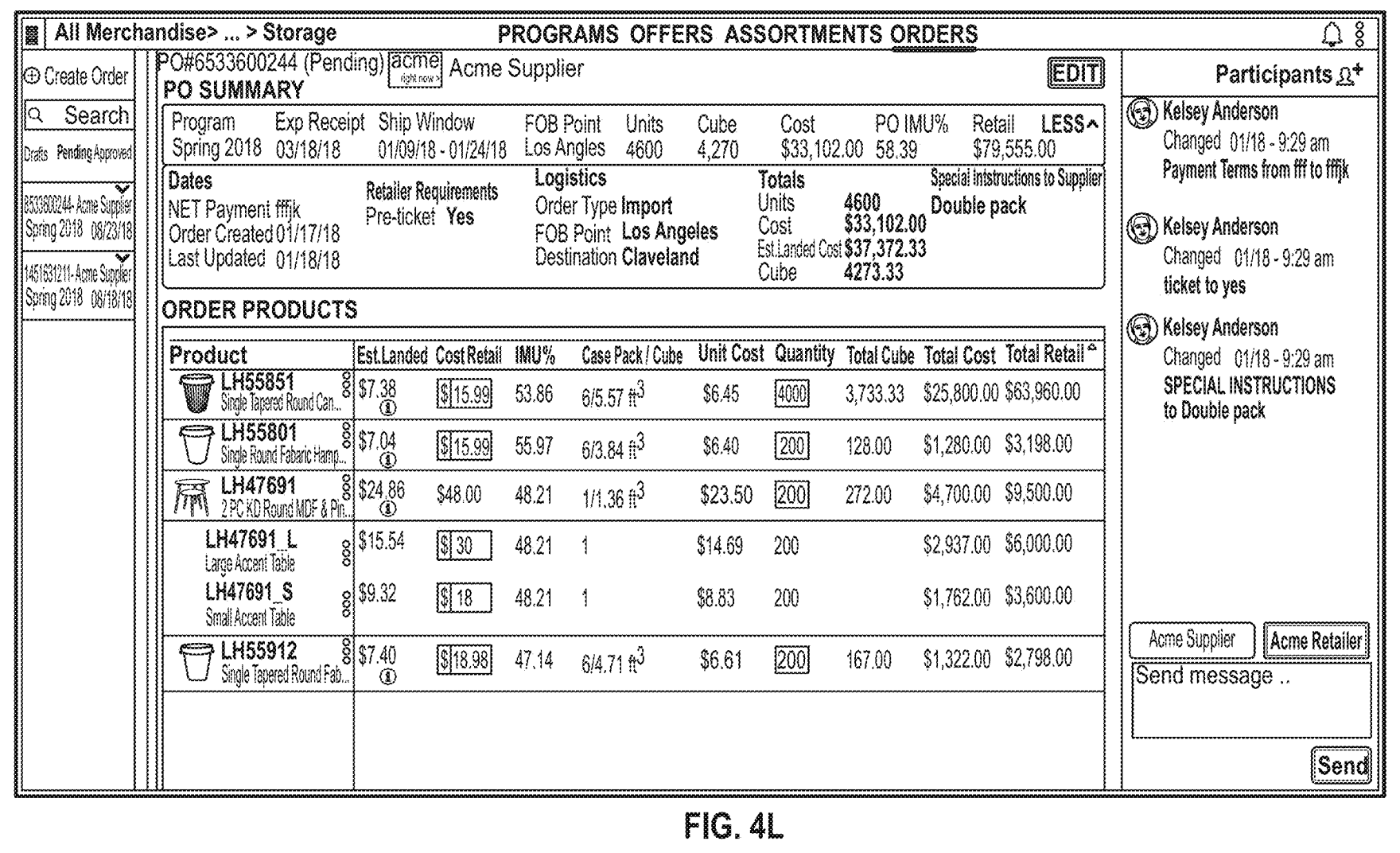

All Merchandise> ... > Storage    PROGRAMS OFFERS ASSORTMENTS ORDERS

⊕ Create Order

Search   [EDIT]   Participants Ω⁺

Drafts   Pending-Approved

PO#6533600244 (Pending) [acme] Acme Supplier

PO SUMMARY

| Program | Exp Receipt | Ship Window | FOB Point | Units | Cube | Cost | PO IMU% | Retail | LESS |
|---|---|---|---|---|---|---|---|---|---|
| Spring 2018 | 03/18/18 | 01/09/18 - 01/24/18 | Los Angles | 4600 | 4,270 | $33,102.00 | 58.39 | $79,555.00 | |

Dates
NET Payment ffffk
Order Created 01/17/18
Last Updated 01/18/18

Retailer Requirements
Pre-ticket Yes

Logistics
Order Type Import
FOB Point Los Angeles
Destination Claveland

Totals
Units 4600
Cost $33,102.00
Est.Landed Cost $37,372.33
Cube 4273.33

Special instructions to Supplier
Double pack

ORDER PRODUCTS

| Product | Est Landed Cost | Retail | IMU% | Case Pack / Cube | Unit Cost | Quantity | Total Cube | Total Cost | Total Retail |
|---|---|---|---|---|---|---|---|---|---|
| LH55851 Single Tapered Round Can... | $7.38 | [$]15.99 | 53.86 | 6/5.57 ft³ | $6.45 | [400] | 3,733.33 | $25,800.00 | $63,960.00 |
| LH55801 Single Round Fabric Hand... | $7.04 | [$]15.99 | 55.97 | 6/3.84 ft³ | $6.40 | [200] | 128.00 | $1,280.00 | $3,198.00 |
| LH47691 2 PC KD Round MDF & Pin... | $24.86 | $48.00 | 48.21 | 1/1.36 ft³ | $23.50 | [200] | 272.00 | $4,700.00 | $9,500.00 |
| LH47691_L Large Accent Table | $15.54 | [$]30 | 48.21 | 1 | $14.69 | 200 | | $2,937.00 | $6,000.00 |
| LH47691_S Small Accent Table | $9.32 | [$]18 | 48.21 | 1 | $8.63 | 200 | | $1,762.00 | $3,600.00 |
| LH55912 Single Tapered Round Fab... | $7.40 | [$]18.98 | 47.14 | 6/4.71 ft³ | $6.61 | [200] | 167.00 | $1,322.00 | $2,798.00 |

Kelsey Anderson
Changed 01/18 - 9:29 am
Payment Terms from fff to ffffk

Kelsey Anderson
Changed 01/18 - 9:29 am
ticket to yes

Kelsey Anderson
Changed 01/18 - 9:29 am
SPECIAL INSTRUCTIONS
to Double pack

Acme Supplier   Acme Retailer

Send message ...

Send

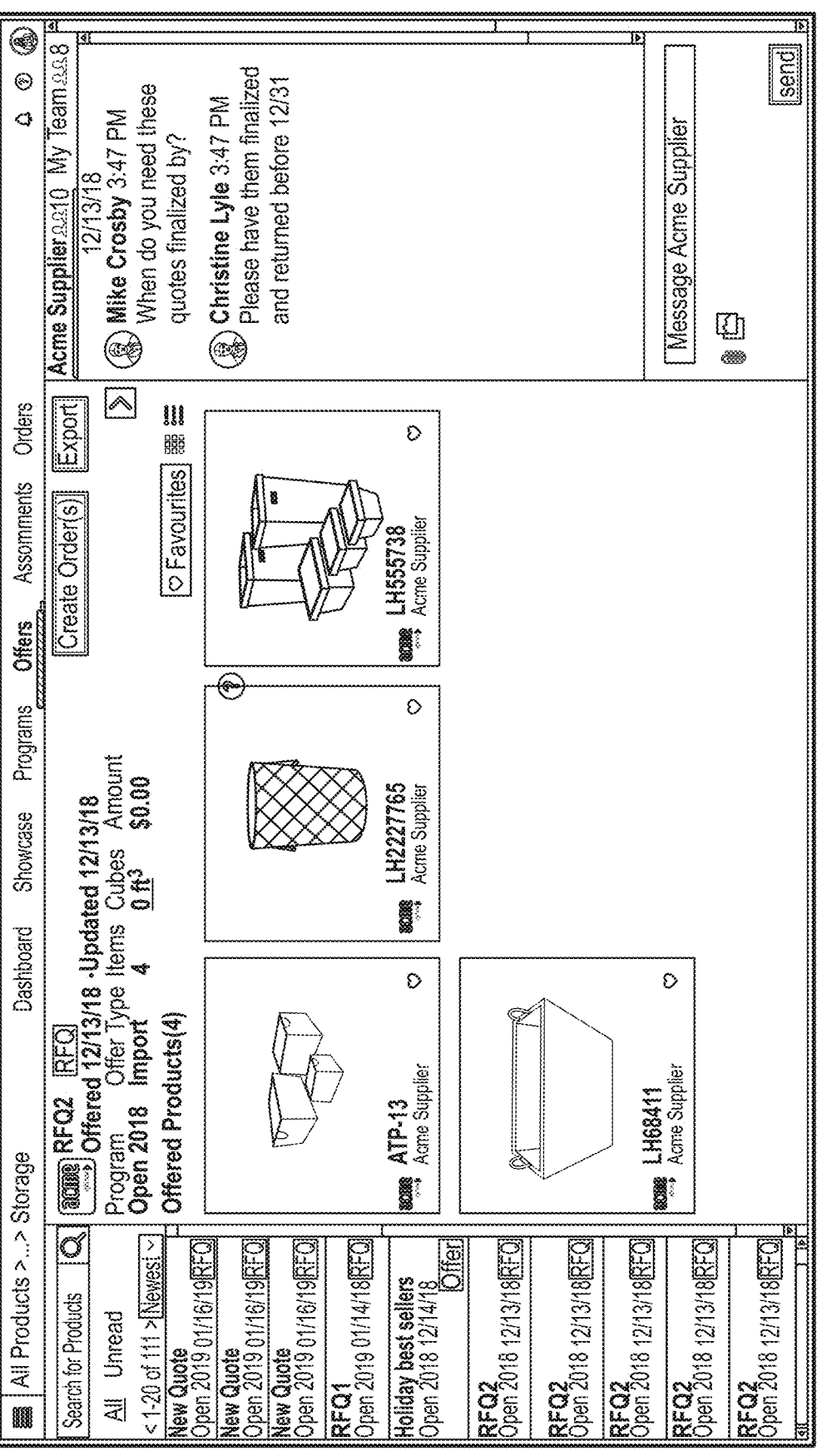
FIG. 4R1

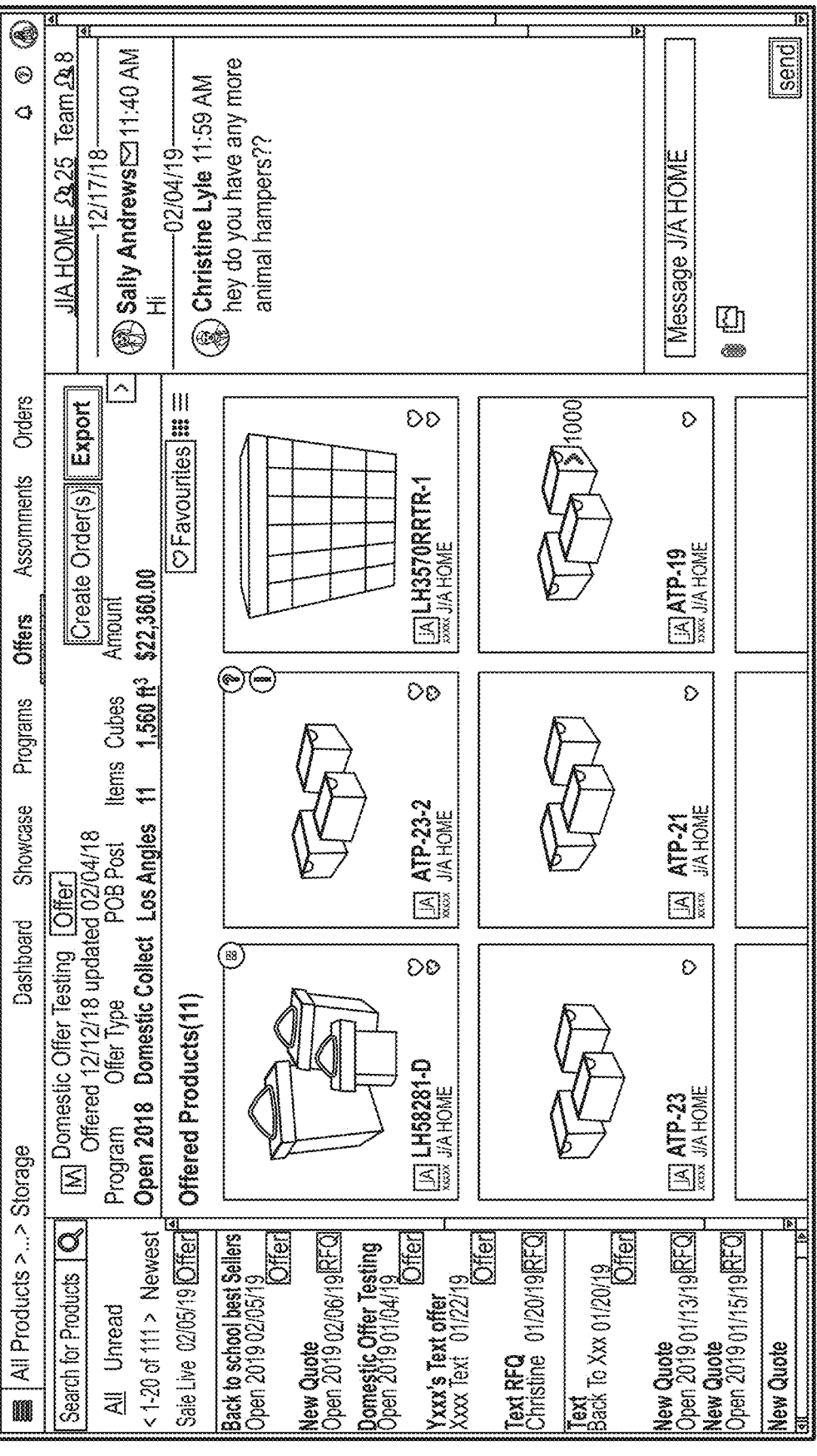
FIG. 4R2

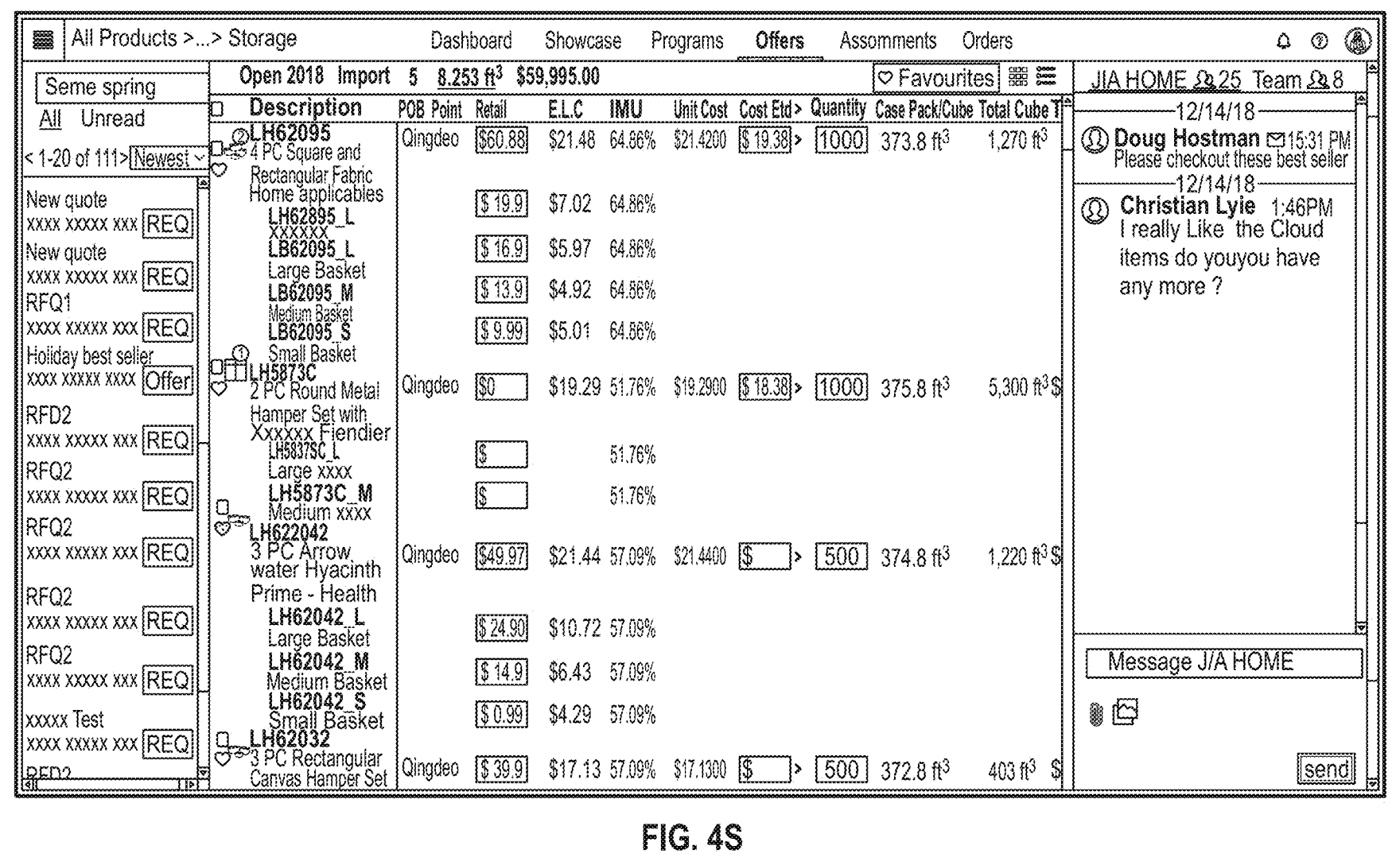

All Products > ... > Storage    Dashboard    Showcase    Programs    Offers    Assortments    Orders Seme spring    Open 2018  Import  5    $59,995.00    8,253 ft³    ♡ Favourites All  Unread < 1-20 of 111 > | Newest ⌄

| Description | POB Point | Retail | E.L.C | IMU | Unit Cost | Cost Etd > | Quantity | Case Pack/Cube | Total Cube |
|---|---|---|---|---|---|---|---|---|---|
| LH62095 4 PC Square and Rectangular Fabric Home applicables | Qingdeo | $60.88 | $21.48 | 64.86% | $21.4200 | $19.38 > | 1000 | 373.8 ft³ | 1,270 ft³ |
| LH62895_L XXxxxx | | $19.9 | $7.02 | 64.86% | | | | | |
| LB62095_L Large Basket | | $16.9 | $5.97 | 64.86% | | | | | |
| LB62095_M Medium Basket | | $13.9 | $4.92 | 64.86% | | | | | |
| LB62095_S Small Basket | | $9.99 | $5.01 | 64.86% | | | | | |
| LH5873C 2 PC Round Metal Hamper Set with Xxxxxx Fiendier | Qingdeo | $0 | $19.29 | 51.76% | $19.2900 | $18.38 > | 1000 | 375.8 ft³ | 5,300 ft³ |
| LH5875C_L Large xxxx | | | | 51.76% | | | | | |
| LH5873C_M Medium xxxx | | | | 51.76% | | | | | |
| LH62042 3 PC Arrow water Hyacinth Prime - Health | Qingdeo | $49.97 | $21.44 | 57.09% | $21.4400 | $ > | 500 | 374.8 ft³ | 1,220 ft³ |
| LH62042_L Large Basket | | $24.90 | $10.72 | 57.09% | | | | | |
| LH62042_M Medium Basket | | $14.9 | $6.43 | 57.09% | | | | | |
| LH62042_S Small Basket | | $0.99 | $4.29 | 57.09% | | | | | |
| LH62032 3 PC Rectangular Canvas Hamper Set | Qingdeo | $39.9 | $17.13 | 57.09% | $17.1300 | $ > | 500 | 372.8 ft³ | 403 ft³ |

New quote    REQ    xxxx xxxxx xxx xxx
New quote    REQ    xxxxx xxxxx xxx
RFQ1    REQ    xxxxx xxxxx xxx xxx
Holiday best seller    Offer    xxx xxxxx xxxx xxxx
RFD2    REQ    xxxxx xxxxx xxx
RFQ2    REQ    xxxx xxxxx xxx xxx
RFQ2    REQ    xxxx xxxxx xxx xxx
RFQ2    REQ    xxxxx xxxxx xxx xxx
RFQ2    REQ    xxxx xxxxx xxx
xxxxx Test    REQ    xxxx xxxxx xxx xxx
RFD2

J/A HOME ♙25 Team ♙8    ⌂ ⊘ ◌

—12/14/18—

☺ Doug Hostman ✉15:31 PM
Please checkout these best seller

—12/14/18—

☺ Christian Lyie  1:46PM
I really Like the Cloud items do youyou have any more ?

Message J/A HOME    send

FIG. 4S

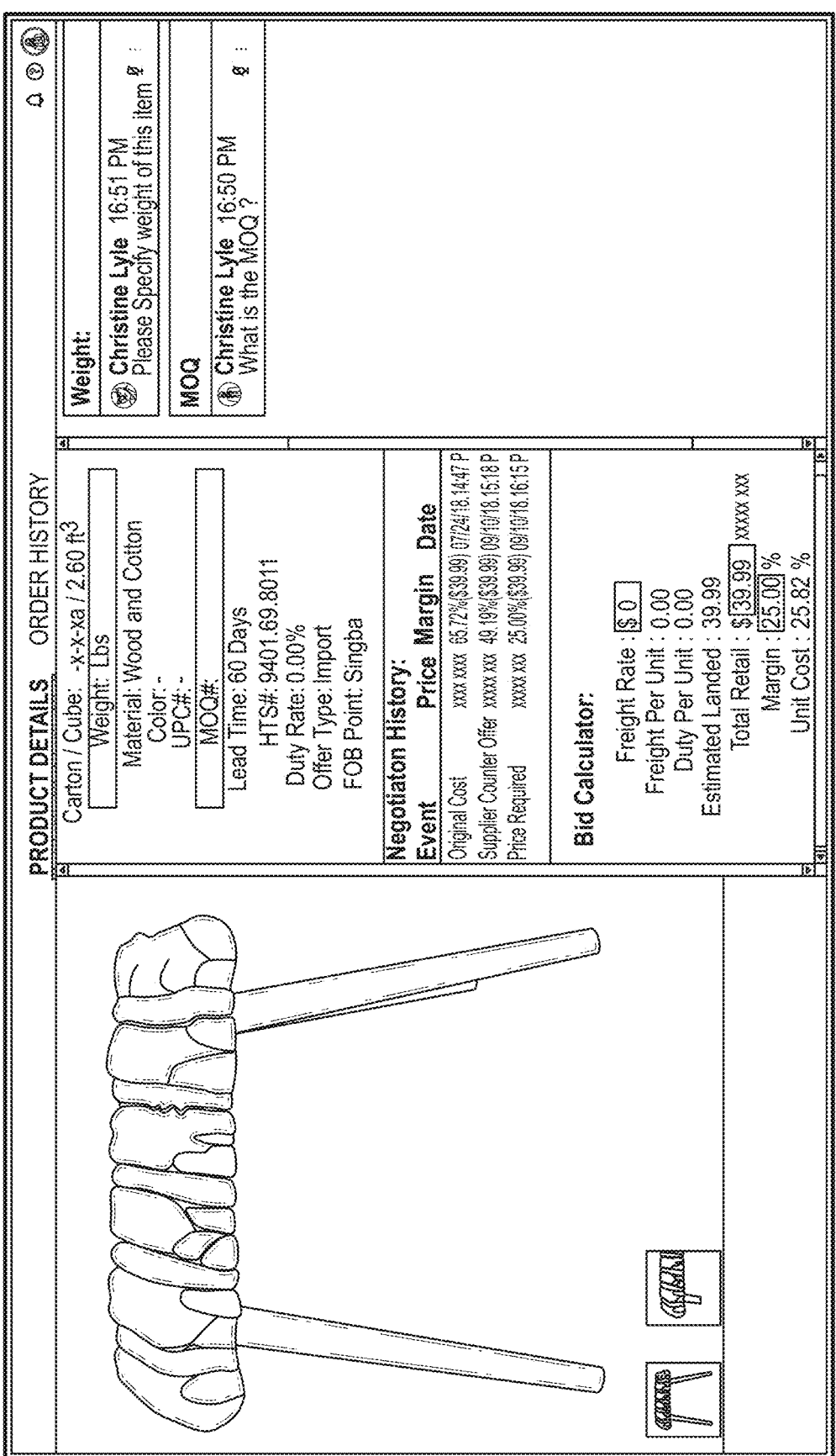

PRODUCT DETAILS     ORDER HISTORY

Carton / Cube:   -x-x-xa / 2.60 ft³
Weight: Lbs
Material: Wood and Cotton
Color: -
UPC#: -
MOQ#:
Lead Time: 60 Days
HTS#: 9401.69.8011
Duty Rate: 0.00%
Offer Type: Import
FOB Point: Singba

Negotiation History:

| Event | Price | Margin | Date |
|---|---|---|---|
| Original Cost | xxxx xxxx | 65.72%($39.99) | 07/24/18.14:47 P |
| Supplier Counter Offer | xxxxx xxx | 49.19%($39.99) | 09/10/18.15:18 P |
| Price Required | xxxxx xxx | 25.00%($39.99) | 09/10/18.16:15 P |

Bid Calculator:

Freight Rate : |$ 0|
Freight Per Unit : 0.00
Duty Per Unit : 0.00
Estimated Landed : 39.99
Total Retail : $|39.99|  xxxxx xxx
Margin : |25.00|%
Unit Cost : 25.82 %

Weight:

Christine Lyle  16:51 PM
Please Specify weight of this item

MOQ

Christine Lyle  16:50 PM
What is the MOQ?

FIG. 4V

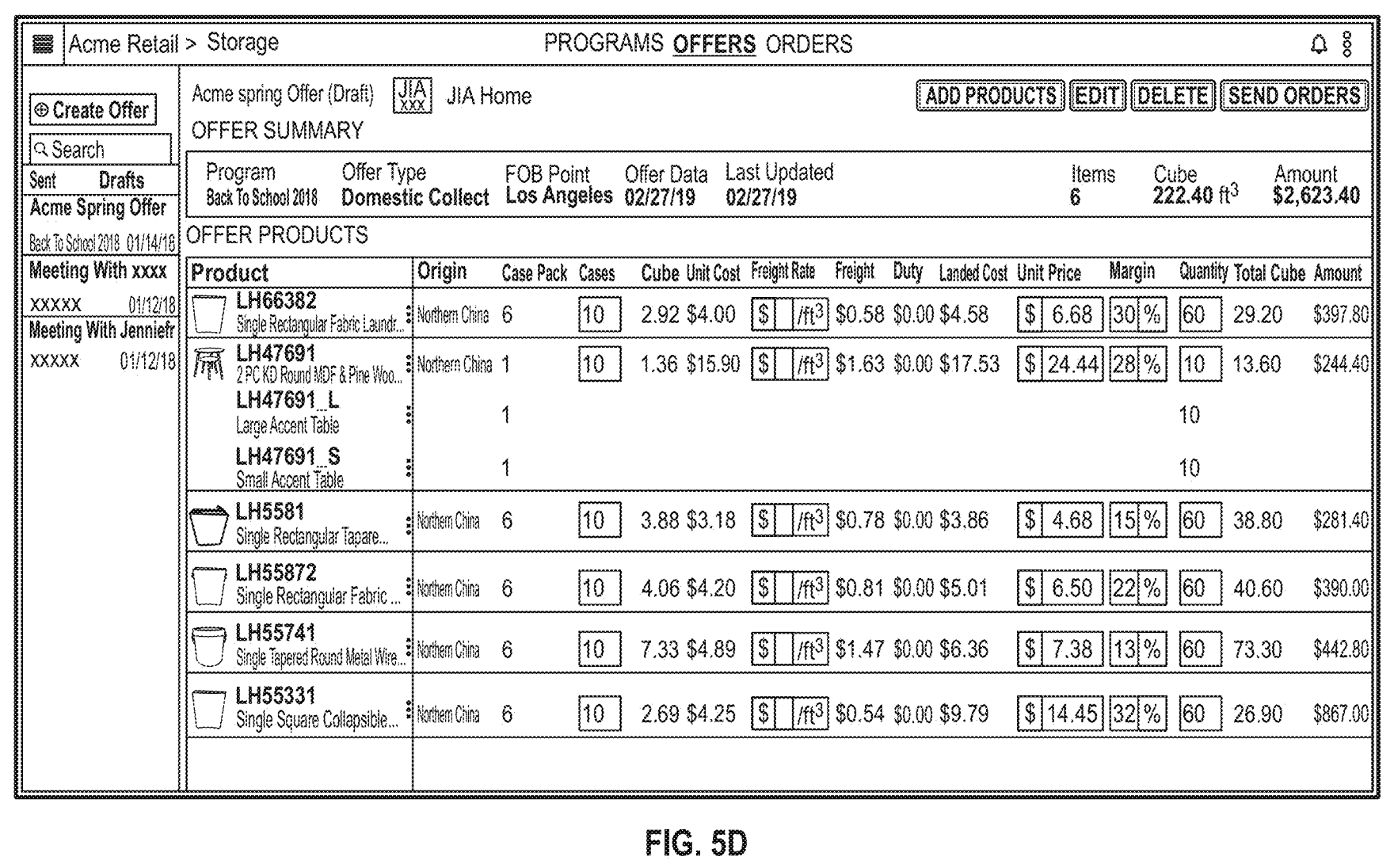

Acme Retail > Storage  PROGRAMS OFFERS ORDERS

⊕ Create Offer  
🔍 Search

Sent  Drafts  
Acme Spring Offer  
Back To School 2018 01/14/18  
Meeting With xxxx  XXXXX 01/12/18  
Meeting With Jennifer  xxxxxx 01/12/18

Acme spring Offer (Draft) [JIA xxx] JIA Home

OFFER SUMMARY

| Program | Offer Type | FOB Point | Offer Data | Last Updated |
|---|---|---|---|---|
| Back To School 2018 | Domestic Collect | Los Angeles | 02/27/19 | 02/27/19 |

Items: 6  Cube: 222.40 ft³  Amount: $2,623.40

ADD PRODUCTS | EDIT | DELETE | SEND ORDERS

OFFER PRODUCTS

| Product | Origin | Case Pack | Cases | Cube | Unit Cost | Freight Rate | Freight | Duty | Landed Cost | Unit Price | Margin | Quantity | Total Cube | Amount |
|---|---|---|---|---|---|---|---|---|---|---|---|---|---|---|
| LH66382 Single Rectangular Fabric Laund... | Northern China | 6 | [10] | 2.92 | $4.00 | [$ ] /ft³ | $0.58 | $0.00 | $4.58 | [$ 6.68] | [30]% | [60] | 29.20 | $397.80 |
| LH47691 2 PC KD Round MDF & Pine Woo... | Northern China | 1 | [10] | 1.36 | $15.90 | [$ ] /ft³ | $1.63 | $0.00 | $17.53 | [$ 24.44] | [28]% | [10] | 13.60 | $244.40 |
| LH47691_L Large Accent Table | | 1 | | | | | | | | | | 10 | | |
| LH47691_S Small Accent Table | | 1 | | | | | | | | | | 10 | | |
| LH5581 Single Rectangular Tapere... | Northern China | 6 | [10] | 3.88 | $3.18 | [$ ] /ft³ | $0.78 | $0.00 | $3.86 | [$ 4.68] | [15]% | [60] | 38.80 | $281.40 |
| LH55872 Single Rectangular Fabric... | Northern China | 6 | [10] | 4.06 | $4.20 | [$ ] /ft³ | $0.81 | $0.00 | $5.01 | [$ 6.50] | [22]% | [60] | 40.60 | $390.00 |
| LH55741 Single Tapered Round Metal Wire... | Northern China | 6 | [10] | 7.33 | $4.89 | [$ ] /ft³ | $1.47 | $0.00 | $6.36 | [$ 7.38] | [13]% | [60] | 73.30 | $442.80 |
| LH55331 Single Square Collapsible... | Northern China | 6 | [10] | 2.69 | $4.25 | [$ ] /ft³ | $0.54 | $0.00 | $9.79 | [$ 14.45] | [32]% | [60] | 26.90 | $867.00 |

FIG. 5D

Acme Retailer > Storage     PROGRAMS   OFFERS   ORDERS

⊕ Create Offer

🔍 Search

Sent   Drafts
Acme Spring Offer   01/14/18
Back To School 2018

BTC 2018   01/12/18
Spring 2018

Holiday 2018   01/12/18
Holiday 2018

Acme spring Offer (Sent)   [JIA xxx]   JIA Home

OFFER SUMMARY

| Program | Offer Type | FOB Point | Offer Data | Last Updated | Items | Cube ft³ | Amount |
|---|---|---|---|---|---|---|---|
| Back To School 2018 | Domestic Collect | Los Angeles | 02/27/19 | 02/27/19 | 11 | 222.40 ft³ | $2,623.40 |

OFFER PRODUCTS

| Product | Origin | Case Pack | Cases | Cube | Unit Cost | Freight Rate | Freight | Duty | Landed Cost | Unit Price | Margin | Quantity | Total Cube | Amount |
|---|---|---|---|---|---|---|---|---|---|---|---|---|---|---|
| LH66382 Single Rectangular Fabric Laundr... | Northern China | 6 | 10 | 2.92 | $4.00 | $1.20/ft³ | $0.58 | $0.00 | $4.58 | $6.63 | 30.86% | 60 | 29.20 | $397.80 |
| LH47691 2 PC kD Round MDF & Pine Woo... | Northern China | 1 | 10 | 1.36 | $15.90 | $1.20/ft³ | $1.63 | $0.00 | $17.53 | $24.46 | 28.27% | 10 | 13.60 | $244.40 |
| LH47691_L Large Accent Table | | 1 | | | | | | | | | | 10 | | |
| LH47691_S Small Accent Table | | 1 | | | | | | | | | | 10 | | |
| LH5581 Single Tapered Round Metal Wire... | Northern China | 6 | 10 | 3.88 | $3.18 | $1.20/ft³ | $0.78 | $0.00 | $3.86 | $4.89 | 15.65% | 60 | 38.80 | $281.40 |
| LH55872 Single Rectangular Fabric Laundr... | Northern China | 6 | 10 | 4.06 | $4.20 | $1.20/ft³ | $0.81 | $0.00 | $5.01 | $6.60 | 22.89% | 60 | 40.60 | $390.00 |
| LH55741 Single Tapered Round Metal Wire... | Northern China | 6 | 10 | 7.33 | $4.89 | $1.20/ft³ | $1.47 | $0.00 | $6.36 | $7.38 | 13.88% | 60 | 73.30 | $442.80 |
| LH55331 Single square collapsible... | Northern China | 6 | 10 | 2.69 | $9.25 | $1.20/ft³ | $0.64 | $0.00 | $9.79 | $14.45 | 32.26% | 60 | 26.90 | $867.00 |
| LH55742 Single Tapered Round Met... | Northern China | 6 | 0 | 6.23 | $4.89 | $1.20/ft³ | $1.28 | $0.00 | $5.94 | $6.88 | 13.34% | 0 | 0.00 | $0.00 |

FIG. 5F

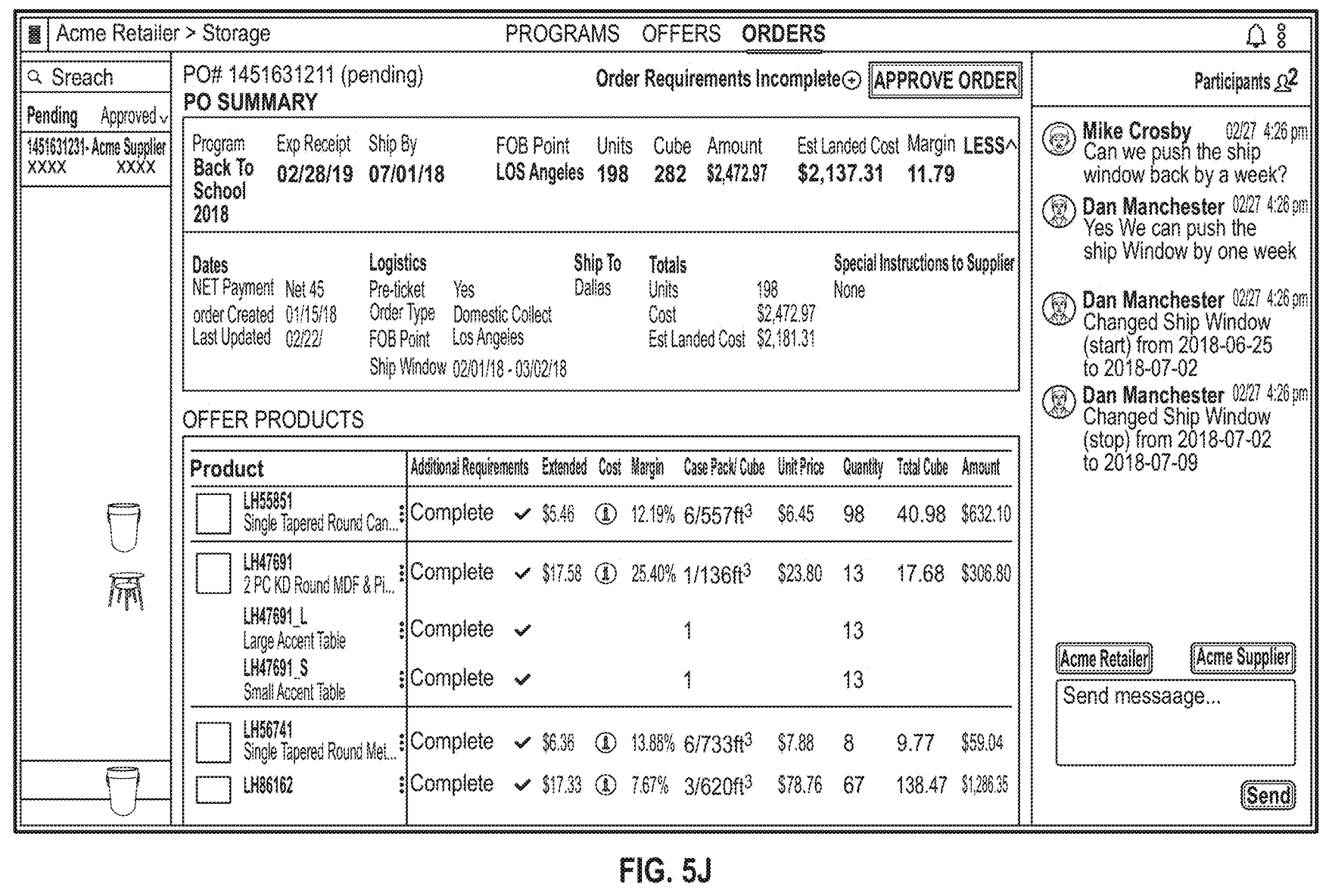

| Acme Retailer > Storage | PROGRAMS  OFFERS  ORDERS | | ✧ ⁸₈ |

Q Sreach

Pending  Approved ∨

145163123I- Acme Supplier
XXXX

PO# 1451631211 (pending)

PO SUMMARY

Order Requirements Incomplete⊕ | APPROVE ORDER |

Participants ♋²

| Program | Exp Receipt | Ship By | FOB Point | Units | Cube | Amount | Est Landed Cost | Margin | LESS∧ |
|---|---|---|---|---|---|---|---|---|---|
| Back To School 2018 | 02/28/19 | 07/01/18 | LOS Angeles | 198 | 282 | $2,472.97 | $2,137.31 | 11.79 | |

| Dates | | Logistics | | Ship To | | Totals | | |
|---|---|---|---|---|---|---|---|---|
| NET Payment | Net 45 | Pre-ticket | Yes | Dallas | | Units | 198 | |
| order Created | 01/15/18 | Order Type | Domestic Collect | | | Cost | $2,472.97 | |
| Last Updated | 02/22/ | FOB Point | Los Angeles | | | Est Landed Cost | $2,181.31 | |
| | | Ship Window | 02/01/18 - 03/02/18 | | | | | |

Special Instructions to Supplier

None

OFFER PRODUCTS

| Product | Additional Requirements | Extended | Cost | Margin | Case Pack/ Cube | Unit Price | Quantity | Total Cube | Amount |
|---|---|---|---|---|---|---|---|---|---|
| LH55851 Single Tapered Round Can... | ::Complete | ✓ | $5.46 | ⓘ 12.19% | 6/557ft³ | $6.45 | 98 | 40.98 | $632.10 |
| LH47691 2 PC KD Round MDF & Pl... | ::Complete | ✓ | $17.58 | ⓘ 25.40% | 1/136ft³ | $23.80 | 13 | 17.68 | $306.80 |
| LH47691_L Large Accent Table | ::Complete | ✓ | | | 1 | | 13 | | |
| LH47691_S Small Accent Table | ::Complete | ✓ | | | 1 | | 13 | | |
| LH56741 Single Tapered Round Met... | ::Complete | ✓ | $6.36 | ⓘ 13.88% | 6/733ft³ | $7.88 | 8 | 9.77 | $59.04 |
| LH86162 | ::Complete | ✓ | $17.33 | ⓘ 7.67% | 3/620ft³ | $78.76 | 67 | 138.47 | $1,286.35 |

Mike Crosby 02/27 4:26 pm
Can we push the ship window back by a week?

Dan Manchester 02/27 4:26 pm
Yes We can push the ship Window by one week

Dan Manchester 02/27 4:26 pm
Changed Ship Window (start) from 2018-06-25 to 2018-07-02

Dan Manchester 02/27 4:26 pm
Changed Ship Window (stop) from 2018-07-02 to 2018-07-09

| Acme Retailer | | Acme Supplier |

Send messaage...

| Send |

FIG. 5J

Figure 5K:
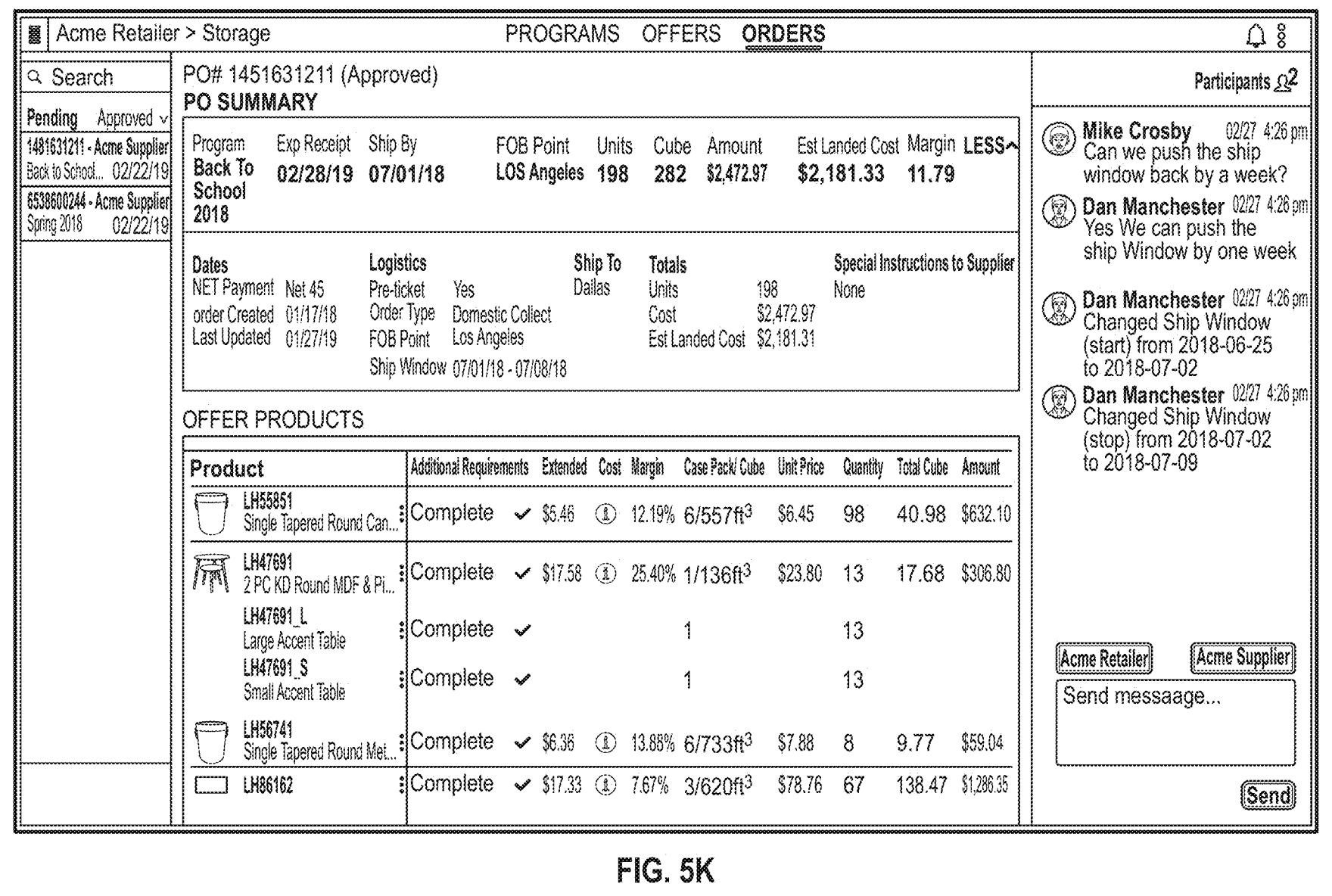

Acme Retailer > Storage    PROGRAMS  OFFERS  ORDERS

Search

Pending | Approved ˅

1491631211 - Acme Supplier
Back to School...  02/22/19

653860244 - Acme Supplier
Spring 2018  02/22/19

PO# 1451631211 (Approved)
PO SUMMARY

| Program | Exp Receipt | Ship By | FOB Point | Units | Cube | Amount | Est Landed Cost | Margin | LESS˄ |
|---|---|---|---|---|---|---|---|---|---|
| Back To School 2018 | 02/28/19 | 07/01/18 | LOS Angeles | 198 | 282 | $2,472.97 | $2,181.33 | 11.79 | |

| Dates | | Logistics | | Ship To | Totals | | |
|---|---|---|---|---|---|---|---|
| NET Payment | Net 45 | Pre-ticket | Yes | Dallas | Units | 198 | |
| order Created | 01/17/18 | Order Type | Domestic Collect | | Cost | $2,472.97 | |
| Last Updated | 01/27/19 | FOB Point | Los Angeles | | Est Landed Cost | $2,181.31 | |
| | | Ship Window | 07/01/18 - 07/08/18 | | | | |

Special Instructions to Supplier
None

OFFER PRODUCTS

| Product | Additional Requirements | Extended | Cost | Margin | Case Pack| Cube | Unit Price | Quantity | Total Cube | Amount |
|---|---|---|---|---|---|---|---|---|---|---|
| LH5851 Single Tapered Round Can... | Complete | ✓ | $5.46 | ⓘ | 12.19% | 6/557ft³ | $6.45 | 98 | 40.98 | $632.10 |
| LH47891 2 PC KD Round MDF & Pl... | Complete | ✓ | $17.58 | ⓘ | 25.40% | 1/136ft³ | $23.80 | 13 | 17.68 | $306.80 |
| LH47891_L Large Accent Table | Complete | ✓ | | | | 1 | | 13 | | |
| LH47891_S Small Accent Table | Complete | ✓ | | | | 1 | | 13 | | |
| LH56741 Single Tapered Round Met... | Complete | ✓ | $6.36 | ⓘ | 13.86% | 6/733ft³ | $7.88 | 8 | 9.77 | $59.04 |
| LH86162 | Complete | ✓ | $17.33 | ⓘ | 7.67% | 3/620ft³ | $78.76 | 67 | 138.47 | $1,286.35 |

Participants ⚲2

Mike Crosby  02/27  4:26 pm
Can we push the ship window back by a week?

Dan Manchester  02/27  4:26 pm
Yes We can push the ship Window by one week

Dan Manchester  02/27  4:26 pm
Changed Ship Window (start) from 2018-06-25 to 2018-07-02

Dan Manchester  02/27  4:26 pm
Changed Ship Window (stop) from 2018-07-02 to 2018-07-09

Acme Retailer    Acme Supplier

Send messaage...

Send

| ▓ Fairview Stores ≫ Bags & Wallets Showcase Programs Projects Quotes Assortments Orders | | | | | | | ☖ ② ⊛ |
|---|---|---|---|---|---|---|---|
| Create | | | | Project Quotes Orders | Workflow | | Delete Edit |
| New Item Workflow | New Item Workflow | | | | | | |
| Overall Item Development | Supplier | Product | Product Creation ⊛ | Price Quotes ⊛ | Sampling ⑤⊛ | Item Creation ⊛ |
| Sample Checklist | CPG | bag180807328 Glitter Clutch Bag With Chain ••• | Andrea Mohr 03/13/20 | Andrea Mohr 03/13/20 | ○ 03/24/20 | ○ 03/31/20 |
| | CPG | bag181025809 Marble Print Clutch Bag With Chain ••• | Andrea Mohr 03/13/20 | ○ 03/17/20 | ○ 03/24/20 | ○ 03/31/20 |
| | Earl & Donovan | bag180807328 Glitter Clutch Bag With Chain ••• | Andrea Mohr 03/13/20 | ○ 03/17/20 | ○ 03/24/20 | ○ 03/31/20 |
| | Epri Products ◇ | bag181203306 Slogan Print Tassel Decor Wallet ••• | Andrea Mohr 02/25/20 | Andrea Mohr 03/02/20 | ○ 03/17/20 | ○ 03/24/20 |
| | Epri Products ◈ | bag181001320 Two Tone Tassel Decor Purse ••• | Andrea Mohr 02/25/20 | Andrea Mohr 03/11/20 | Andrea Mohr 03/11/20 | Andrea Mohr 03/11/20 |
| | Epri Products ◇ | bag181219331 Slogan Print Tassel Decor Wallet ••• | Andrea Mohr 03/11/20 | Andrea Mohr 03/11/20 | Andrea Mohr 03/11/20 | Andrea Mohr 03/11/20 |
| | Epri Products ◇ | bag190305303 Slogan Print Tassel Decor Wallet ••• | Andrea Mohr 03/11/20 | Andrea Mohr 03/11/20 | Andrea Mohr 03/11/20 | ○ 03/13/20 |
| | Epri Products ◈ | bag190313342 Fold Over Side Zip Purse ••• | Andrea Mohr 03/11/20 | Andrea Mohr 03/11/20 | Andrea Mohr 03/13/20 | Andrea Mohr 03/11/20 |
| | Epri Products ◇ | bag190305305 Slogan Print Tassel Decor Wallet ••• | Andrea Mohr 03/11/20 | Andrea Mohr 03/11/20 | Andrea Mohr 03/11/20 | Andrea Mohr 03/11/20 |
| | Epri Products ◇ | bag190430301 Slogan Print Fold Over Purse ••• | Andrea Mohr 03/11/20 | Andrea Mohr 03/11/20 | Andrea Mohr 03/11/20 | Andrea Mohr 03/11/20 |
| | Epri Products | bagxxxxx | | | | |

Update Sales     ✕

Select team members to receive an email notification with this update

☐ Select All

My Team

☐ Andrea Mohr <demo@qa.surefront.com>

☐ Becky LeDeaux <becky@qa.surefront.com.>

☑ Benjamin Barton <benjamin@qa.surefront.com>

☑ Beverly Webber <beverly@qa.surefront.com>

☐ Brandon Umber <brandon@qa.surefront.com>

☐ Breanne Wilson <breanne@qa.surefront.com>

☐ Brian Richards <brian@qa.surefront.com>

☐ Brooke Jones <brooke@qa.surefront.com>

☐ Daisy Wilson <daisy2@qa.surefront.com>

☐ Dakota Kainaroi <dakota@qa.surefront.com>

☐ David Donnovan <david@qa.surefront.com>

☐ Deirdre O'Conner <deirdre@qa.surefront.comd>

☐ Derrick Baum <derrick@qa.surefront.com>

☐ Diane Stark <diane@qa.surefront.com>

☐ Donna Ritenour <donna@qa.surefront.com>

☐ Drew McCoy <drew@qa.surefront.com>

☐ Dustin Kernion <dustin@qa.surefront.com>

Email Message

Please review these updates and let me know if acceptable
to the customer

Cancel    Update

FIG. 7M

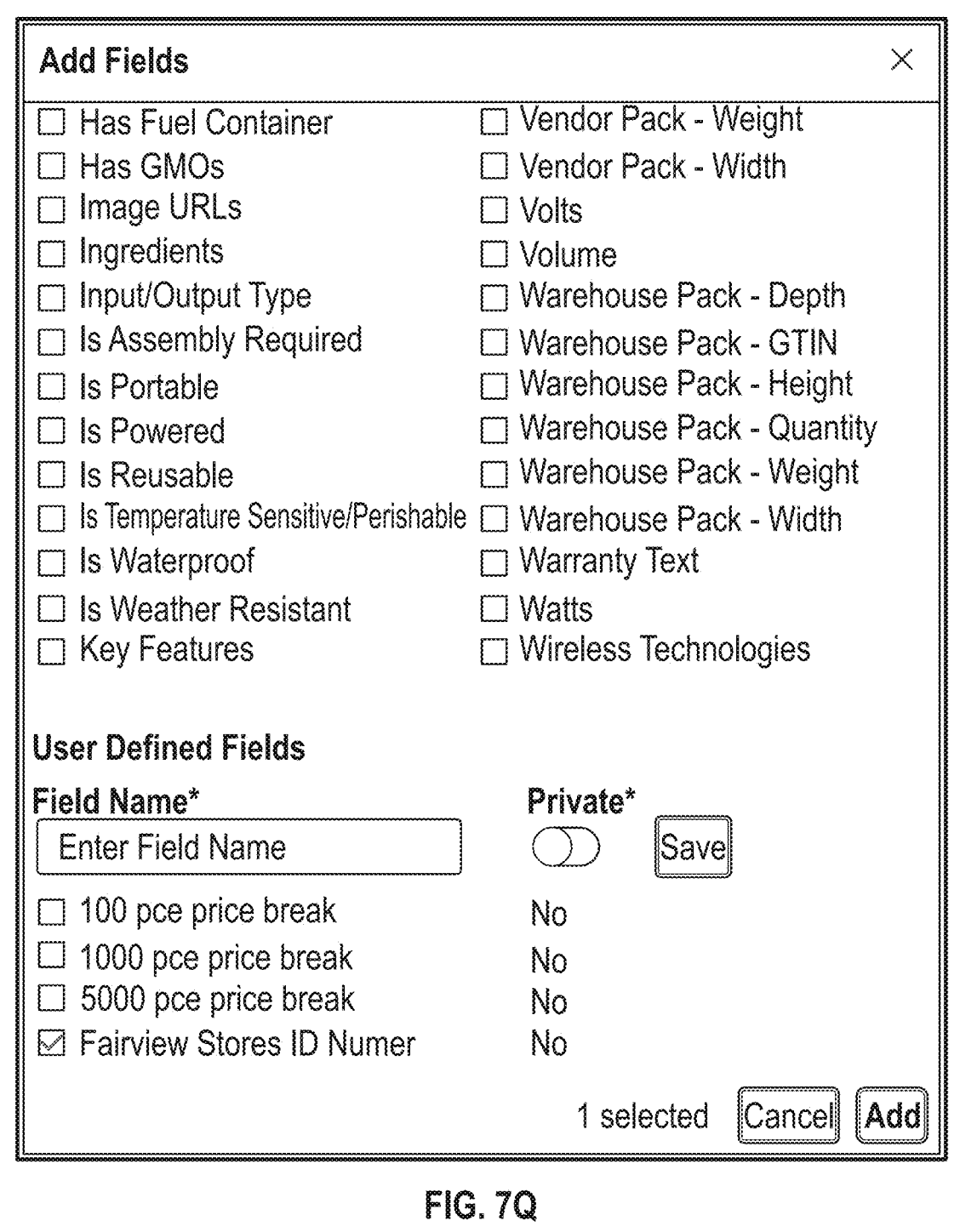

Add Fields                                                    ✕

☐ Has Fuel Container          ☐ Vendor Pack - Weight
☐ Has GMOs                    ☐ Vendor Pack - Width
☐ Image URLs                  ☐ Volts
☐ Ingredients                 ☐ Volume
☐ Input/Output Type           ☐ Warehouse Pack - Depth
☐ Is Assembly Required        ☐ Warehouse Pack - GTIN
☐ Is Portable                 ☐ Warehouse Pack - Height
☐ Is Powered                  ☐ Warehouse Pack - Quantity
☐ Is Reusable                 ☐ Warehouse Pack - Weight
☐ Is Temperature Sensitive/Perishable  ☐ Warehouse Pack - Width
☐ Is Waterproof               ☐ Warranty Text
☐ Is Weather Resistant        ☐ Watts
☐ Key Features                ☐ Wireless Technologies

User Defined Fields

Field Name*                              Private*

[ Enter Field Name ]            ◯⬤      [Save]

☐ 100 pce price break           No
☐ 1000 pce price break          No
☐ 5000 pce price break          No
☑ Fairview Stores ID Numer      No 1 selected  [Cancel] [Add]

FIG. 7Q

Configure Page Views

| Create | | | | | Delete | Edit |
|---|---|---|---|---|---|---|

Page Views
Consumables
Hardlines
Material
Pen
Pricing Breaks

Hardlines

| Position ↑↓ | Field Name | Field Type | Data Type | |
|---|---|---|---|---|
| 1 = | Length | Standard | Float | ▦ |
| 2 = | Width | Standard | Float | ▦ |
| 3 = | Height | Standard | Float | ▦ |
| 4 = | Seating Capacity | Standard | Integer | ▦ |
| 5 = | Fairview stores ID Number | User Defined | Character | ✎ |

⊕ Add Fields

Apply Settings To

Catalog                Departments
☐ All
  ☐ Consumables
  ☐ Hardlines
  ☑ Home
  ☑ Lawn & Garden
  ☐ Pet Supply
  ☐ Softlines
    ☐ Accessories
    ☐ Apparel
      ☐ Athletic Wear
      ☐ Casual Wear
      ☐ Formal Wear

DISTRIBUTED MESSAGING COMMUNICATION SYSTEM INTEGRATED WITH A CROSS-ENTITY COLLABORATION PLATFORM

INCORPORATION BY REFERENCE TO ANY PRIORITY APPLICATIONS

Any and all applications for which a foreign or domestic priority claim is identified in the Application Data Sheet as field with the present application are hereby incorporated by reference under 37 CFR 1.57.

COPYRIGHT NOTICE

BACKGROUND

Communications associated with various types of networked transactions have become essential in many industries. However, with the enormous flow of such communications, it has become increasingly challenging to manage and intelligently present such communications. The failure of conventional systems to adequately manage and present related communications has hindered users from collaborating in an efficient, error-free manner.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to enabling a first entity to establish a hierarchy of permissions with respect to transactions with other entities and to maintaining a record of communications between such entities organized by object. The hierarchy of permissions may control which users of the first entity may communicate regarding an object with users of the second entity. The hierarchy of permissions may control what object-related data users of the first entity may access and what object-related data users of the second entity may access.

An aspect of the present disclosure relates to a communication/collaboration system enables a first user at a first entity to define a collaboration object (e.g., a document, transaction, program, etc.), and to invite a second entity to collaborate on the collaboration object in accordance with a hierarchy with corresponding permissions. A second user at a second entity is enabled to collaborate on the collaboration object. A communications log regarding the collaboration between the first user and the second user is maintained. A communications log between the first user and other users at the first entity is maintained. A communication interface is displayed on the first user computer system (e.g., a desktop, laptop, smart, smart television, smart wearable, etc.) that displays the log of communications between the first user and the second user on the collaboration object, together with the log of communications regarding the collaboration object between the first user and other users at the first entity, and excluding communications regarding the collaboration object between the second user and other users at the second entity.

An aspect of the present disclosure relates to a communication and collaboration system comprising: one or more processing devices; a network interface; non-transitory memory that stores instructions that when executed by the one or more processing devices are configured to cause the communication and collaboration system to perform operations comprising: enable a first entity to establish a first hierarchy of permissions comprising communication permissions with respect to users of the first entity; enable a second entity to establish a second hierarchy with corresponding permissions comprising communication permissions with respect to users of the second entity; detect a first user of the first entity accessing the communication and collaboration system, the first user at a first position in the first hierarchy; enable the first user to define a first collaboration object; access the first hierarchy with corresponding permissions; enable the first user to invite a second entity to collaborate on the first collaboration object in accordance with the first hierarchy with corresponding permissions; in response to receiving over a network via the network interface from a first computer system of the first user an invite instruction for the second entity, the invite instructions regarding collaboration on the first collaboration object, transmit the invitation to collaborate on the first collaboration object to the second entity, the second entity associated with a second user; receive from a second computer system of the second user an acceptance of the invitation to collaborate on the first collaboration object; access the second hierarchy with corresponding permissions the second user at a first position in the second hierarchy; enable the second user to collaborate on the first collaboration object in accordance with the second hierarchy with corresponding permissions; generate a log of communications regarding the collaboration between the first user and the second user on the first collaboration object; generate a log of communications regarding the first collaboration object between the first user and one or more other users at the first entity; generate a log of communications regarding the first collaboration object between the second user and one or more other users at the second entity; provide for display on the first computer system of the first user the log of communications regarding the collaboration between the first user and the second user on the first collaboration object, together with the log of communications regarding the first collaboration object between the first user and one or more other users at the first entity, and excluding from display on the first computer system the log of communications regarding the first collaboration object between the second user and one or more other users at the second entity; and provide for display on the second computer system of the second user the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

An aspect of the present disclosure relates to a communication system: one or more processing devices; a network interface; non-transitory memory that stores instructions that when executed by the one or more processing devices are configured to cause the communication system to perform operations comprising: detect a first user of a first entity accessing the communication system; access permissions associated with the first user; enable the first user to define a first collaboration object; enable the first user to invite a second entity to collaborate on the first collaboration object in accordance with the permissions associated with the first user; in response to receiving over a network via the network interface from a computer system of the first user an invite instruction for the second entity, the invite instructions regarding collaboration on the first collaboration object, transmit the invitation to collaborate on the first collaboration object to the second entity, the second entity associated with a second user; enable the second user to collaborate on the first collaboration object in accordance permissions associated with the second user; maintain a log of communications regarding the collaboration between the first user and the second user on the first collaboration object; maintain a log of communications regarding the first collaboration object between the first user and one or more other users at the first entity; maintain a log of communications regarding the first collaboration object between the second user and one or more other users at the second entity; enable the first computer system of the first user to display the log of communications regarding the collaboration between the first user and the second user on the first collaboration object, together with the log of communications regarding the first collaboration object between the first user and one or more other users at the first entity, and excluding from display on the first computer system the log of communications regarding the first collaboration object between the second user and one or more other users at the second entity; and enable the second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

An aspect of the present disclosure relates to a computer-implemented method, the method comprising: accessing permissions associated with a first user; enabling the first user to define a first collaboration object; enabling the first user to invite a second entity to collaborate on the first collaboration object in accordance with the permissions associated with the first user; in response to receiving over a network via the network interface from a computer system of the first user an invite instruction for the second entity, the invite instructions regarding collaboration on the first collaboration object, causing the invitation to collaborate on the first collaboration object to be transmitted to the second entity, the second entity associated with a second user; enabling the second user to collaborate on the first collaboration object with the first user; maintaining a log of communications regarding the collaboration between the first user and the second user on the first collaboration object; maintaining a log of communications regarding the first collaboration object between the first user and one or more other users at the first entity; enabling the first computer system of the first user to display the log of communications regarding the collaboration between the first user and the second user on the first collaboration object, together with the log of communications regarding the first collaboration object between the first user and one or more other users at the first entity; and enabling the second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

An aspect of the disclosure relates to a communication and collaboration system, comprising: one or more processing devices; a network interface; non-transitory memory that stores instructions that when executed by the one or more processing devices are configured to cause the communication and collaboration system to perform operations comprising: provide an interface that enables a first user at a first entity having a first permission to define a first collaboration object; provide an interface that enables the first user to assign one or more sets of users at the first entity to one or more first entity tasks associated with processing the first collaboration object; provide an interface that enables the first user to assign timing data corresponding to the one or more first entity tasks associated with processing the first collaboration object; provide an interface that enables the first user to invite a second entity to collaborate on the first collaboration object; in response to receiving over a network via the network interface from a first computer system of the first user an invite instruction for the second entity, the invite instruction regarding collaboration on the first collaboration object, transmit the invitation to collaborate on the first collaboration object to the second entity, the second entity; enable a second user at the second entity to assign one or more sets of users at the second entity to one or more second entity tasks associated with processing the first collaboration object; enable the assigned one or more sets of users at the first entity and the assigned one or more sets of users at the second entity to collaborate on the first collaboration object; generate a first communication log of communications regarding the collaboration on the first collaboration object, the first communication log comprising: communications between users in the assigned one or more sets of users at the first entity, communications between users in the assigned one or more sets of users at the second entity, and communications between users in the assigned one or more sets of users at the first entity and users in the assigned one or more sets of users at the second entity; cause a second communication log to be presented to users in the assigned one or more sets of users at the first entity, the second communication log comprising a subset of the first communication log, including communications between users in the assigned one or more sets of users at the first entity, and communications between users in the assigned one or more sets of users at the first entity and users in the assigned one or more sets of users at the second entity, wherein the presented second communication log visually distinguishes communications between users in the assigned one or more sets of users at the first entity from communications between users in the assigned one or more sets of users at the first entity and users in the assigned one or more sets of users at the second entity; cause a third communication log to be presented to users in the assigned one or more sets of users at the second entity, the third communication log comprising a subset of the first communication log, including communications between users in the assigned one or more sets of users at the second entity, and communications between users in the assigned one or more sets of users at the first entity and users in the assigned one or more sets of users at the second entity, wherein the presented third communication log visually distinguishes communications between users in the assigned one or more sets of users at the second entity from communications between users in the assigned one or more sets of users at the first entity and users in the assigned one or more sets of users at the second entity; track progress on the one or more first entity tasks associated with processing the first collaboration object; track progress on the one or more second entity tasks associated with processing the first collaboration object; provide an interface that enables users in the assigned one or more sets of users at the first entity at access to some or all of the tracked progress on the one or more first entity tasks associated with processing the first collaboration object and on the one or more second entity tasks associated with processing the first collaboration object; provide an interface that enables users in the assigned one or more sets of users at the second entity at access to some or all of the tracked progress on the one or more first entity tasks associated with processing the first collaboration object and on the one or more second entity tasks associated with processing the first collaboration object.

An aspect of the disclosure relates to a communication and collaboration system, comprising: one or more processing devices; a network interface communication system: one or more processing devices; a network interface; non-transitory memory that stores instructions that when executed by the one or more processing devices are configured to cause the communication system to perform operations comprising: detect a first user of a first entity accessing the communication system; access permissions associated with the first user; enable the first user to define a first collaboration object; enable the first user to invite a second entity to collaborate on the first collaboration object in accordance with the permissions associated with the first user; in response to receiving over a network via the network interface from the first user an invite instruction for the second entity, the invite instruction regarding collaboration on the first collaboration object, transmit the invitation to collaborate on the first collaboration object to the second entity, the second entity associated with a second user; provide an interface that enables the second user to collaborate on the first collaboration object in accordance permissions associated with the second user; maintain a log of communications regarding the collaboration between the first user and the second user on the first collaboration object; maintain a log of communications regarding the first collaboration object between the first user and one or more other users at the first entity; maintain a log of communications regarding the first collaboration object between the second user and one or more other users at the second entity; enable a first computer system of the first user to display the log of communications regarding the collaboration between the first user and the second user on the first collaboration object, together with the log of communications regarding the first collaboration object between the first user and one or more other users at the first entity, and excluding from display on the first computer system the log of communications regarding the first collaboration object between the second user and one or more other users at the second entity; and enable a second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

An aspect of the disclosure relates to a communication and collaboration system, comprising: one or more processing devices; a network interface computer-implemented method, the method comprising: providing an interface that enables a first user at a first entity to define a first collaboration object; providing an interface that enables the first user to assign one or more sets of users at the first entity to one or more first entity tasks associated with processing the first collaboration object; providing an interface that enables the first user to assign timing data corresponding to the one or more first entity tasks associated with processing the first collaboration object; enabling the first user to invite a second entity to collaborate on the first collaboration object; in response to receiving over a network via a network interface from the first user an invite instruction for the second entity, the invite instruction regarding collaboration on the first collaboration object, causing the invitation to collaborate on the first collaboration object to be transmitted to the second entity, the second entity associated with a second user; enabling the second user to collaborate on the first collaboration object with the first user; maintaining a log of communications regarding the collaboration between the first user and the second user on the first collaboration object; maintaining a log of communications regarding the first collaboration object between the first user and one or more other users at the first entity; enabling a first computer system of the first user to display the log of communications regarding the collaboration between the first user and the second user on the first collaboration object, together with the log of communications regarding the first collaboration object between the first user and one or more other users at the first entity; and enabling a second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

An aspect of the present disclosure relates to a communication and collaboration system, comprising: one or more processing devices; a network interface; non-transitory memory that stores instructions that when executed by the one or more processing devices are configured to cause the communication and collaboration system to perform operations comprising: provide a user interface for display on a first user device that enables a first user at a first entity having a first permission to define a first collaboration object comprising a hierarchical definition, the first user device associated with a first user of a first entity; receive a hierarchical definition of the first collaboration object from the first user device, the hierarchical definition identifying at least a second collaboration object and a third collaboration object; receive, via the network interface, a first image of the first collaboration object, receive a second image of the second collaboration object, and receive a third image of the third collaboration object; receive, via the network interface, a first attribute of the first collaboration object, receive a second attribute of the second collaboration object, and receive a third attribute of the third collaboration object; generate a hierarchical representation of the first collaboration object; cause the hierarchical representation of the first collaboration object to be rendered on the first user device, the hierarchical representation of the first collaboration object comprising the first image of the first collaboration object positioned at a first level of the hierarchical representation, the second image of the second collaboration object at a second level of the hierarchical representation, and the third image of the third collaboration object at a third level of the hierarchical representation; cause the second attribute to be rendered on the first user device in association with the second image and cause the third attribute to be rendered on the first user device in association with the third image; cause a value calculated using the second attribute and the third attribute to be rendered on the first user device in association with the first image; enable an authorized second user of a second entity to access the first collaboration object, including the first image of the first collaboration object via a second user device; cause the first image of the first collaboration object to be rendered via the second user device in association with an annotation tool; receive a first graphical annotation to the first image of the first collaboration object from the second user device; automatically assign an identifier to the first graphical annotation to the first image; and cause the identifier assigned to the first graphical annotation to the first image to be rendered in association with the first graphical annotation to the first image.

Optionally, the operations further comprise: establish a virtual private network to communicate with a first computer system of the first entity; use a secure transfer tunnel to encrypt communications to the first computer system of the first entity; and store communications from the first computer system using file encryption in a cloud-based data store. Optionally, the hierarchical representation of the first collaboration object comprises a tree structure. Optionally, the operations further comprise: cause the hierarchical representation of the first collaboration object to be rendered in a list, wherein the second collaboration object is indented in a first direction relative to the first collaboration object, and the third collaboration object is indented in the first direction relative to the second collaboration object. Optionally, the operations further comprise: receive a ratio definition indicating how many of the third collaboration objects are associated with the second collaboration object; and wherein the value calculated using the second attribute and the third attribute is calculated using the ratio definition. Optionally, the operations further comprise: receive from the second user device a first text associated with the first graphical annotation to the first image of the first collaboration object; store the first text received from the second user device in association with the first graphical annotation and in association with an identifier of the second user; and cause the first image of the first collaboration object to be rendered together with the first graphical annotation and the first text, wherein the first text is rendered in association with the identifier of the second user. Optionally, the operations further comprise: maintain a library of collaboration objects in a data store, the library of collaboration objects comprising the second collaboration object; and enable the second collaboration object to be used as part of a fourth collaboration object. Optionally, the operations further comprise: provide a second user interface for display on the first user device, the second user interface comprising: a first menu that enables a user to specify a page orientation for a first document; a second menu that enables a user to specify a number of product images that are to be displayed by the first document; a dynamic menu that includes field number quantities, where the field number quantities are based at least in part on a specified number of product images that are to be displayed by the first document; a field menu providing a set of selectable fields that enables a user to specify what data fields are to be displayed in association with respective product images; receive via the first menu, a first page orientation specification for the first document, receive via the second menu a first specification of a number of product images that are to be displayed by the first document, receive, via the dynamic menu a specified field quantity, receive via the field menu a specification of fields that are to be displayed in association with respective product images; and cause the first document to be rendered in real time in accordance with the first page specification, the first specification of the number of product images that are to be displayed by the first document, the specified field quantity, and the specified fields.

An aspect of the present disclosure relates to a computer system: one or more processing devices; a network interface; non-transitory memory that stores instructions that when executed by the one or more processing devices are configured to cause the computer system to perform operations comprising: provide a user interface for display on a first user device that enables a first user at a first entity having a first permission to define a first collaboration object comprising a hierarchical definition, the first user device associated with a first user of a first entity; receive a hierarchical definition of the first collaboration object from the first user device, the hierarchical definition identifying at least a second collaboration object at a lower hierarchical level than the first collaboration object; receive, via the network interface, a first image of the first collaboration object and receive a second image of the second collaboration object; receive, via the network interface, a first attribute of the first collaboration object and receive a second attribute of the second collaboration object; generate a hierarchical representation of the first collaboration object; cause the hierarchical representation of the first collaboration object to be rendered on the first user device, the hierarchical representation of the first collaboration object comprising the first image of the first collaboration object positioned at a first level of the hierarchical representation and the second image of the second collaboration object at a second level of the hierarchical representation; cause the second attribute to be rendered on the first user device in association with the second image; enable an authorized second user of a second entity to access the first collaboration object, including the first image of the first collaboration object via a second user device; cause the first image of the first collaboration object to be rendered via the second user device in association with an annotation tool; receive a first graphical annotation to the first image of the first collaboration object from the second user device; automatically assign an identifier to the first graphical annotation to the first image; and cause the identifier assigned to the first graphical annotation to the first image to be rendered in association with the first graphical annotation to the first image.

Optionally, the operations further comprise: establish a virtual private network to communicate with a first computer system of the first entity; use a secure transfer tunnel to encrypt communications to the first computer system of the first entity; and store communications from the first computer system using file encryption in a cloud-based data store. Optionally, the hierarchical representation of the first collaboration object comprises a tree structure. Optionally, the operations further comprise: cause the hierarchical representation of the first collaboration object to be rendered in a list, wherein the second collaboration object is indented in a first direction relative to the first collaboration object. Optionally, the hierarchical representation of the first collaboration object comprises a tree structure. Optionally, the operations further comprise: receive a ratio definition indicating how many of the second collaboration objects are associated with the first collaboration object; and cause a value calculated using the second attribute and the ratio definition to be rendered on the first user device in association with the first image. Optionally, the operations further comprise: receive from the second user device a first text associated with the first graphical annotation to the first image of the first collaboration object; store the first text received from the second user device in association with the first graphical annotation and in association with an identifier of the second user; cause the first image of the first collaboration object to be rendered together with the first graphical annotation and the first text, wherein the first text is rendered in association with the identifier of the second user. Optionally, the operations further comprise: maintain a library of collaboration objects in a data store, the library of collaboration objects comprising the second collaboration object; and enable the second collaboration object to be used as part of a fourth collaboration object. Optionally, the operations further comprise: provide a second user interface for display on the first user device, the second user interface comprising: a first menu that enables a user to specify a page orientation for a first document; a second menu that enables a user to specify a number of product images that are to be displayed by the first document; a dynamic menu that includes field number quantities, where the field number quantities are based at least in part on a specified number of product images that are to be displayed by the first document; a field menu that enables a user to specify what data fields are to be displayed in association with respective product images; receive via the first menu, a first page orientation specification for the first document, receive via the second menu a first specification of a number of product images that are to be displayed by the first document, receive, via the dynamic menu a specified field quantity, receive via the field menu a specification of fields that are to be displayed in association with respective product images; and cause the first document to be rendered in real time in accordance with the first page specification, the first specification of the number of product images that are to be displayed by the first document, the specified field quantity, and the specified fields.

An aspect of the present disclosure relates to a computer implemented method, the method comprising: providing, by a computer system, a user interface for display on a first user device that enables a first user at a first entity having a first permission to define a first collaboration object comprising a hierarchical definition, the first user device associated with a first user of a first entity; receiving a hierarchical definition of the first collaboration object from the first user device, the hierarchical definition identifying at least a second collaboration object at a lower hierarchical level than the first collaboration object; receiving a first image of the first collaboration object and receive a second image of the second collaboration object; receiving a first attribute of the first collaboration object and receive a second attribute of the second collaboration object; generating a hierarchical representation of the first collaboration object; causing the hierarchical representation of the first collaboration object to be rendered on the first user device, the hierarchical representation of the first collaboration object comprising the first image of the first collaboration object positioned at a first level of the hierarchical representation and the second image of the second collaboration object at a second level of the hierarchical representation; causing the second attribute to be rendered on the first user device in association with the second image; enabling an authorized second user to access the first collaboration object, including the first image of the first collaboration object via a second user device; causing the first image of the first collaboration object to be rendered via the second user device in association with an annotation tool; receiving a first graphical annotation to the first image of the first collaboration object from the second user device; and causing the graphical annotation to the first image to be rendered on the second user device.

Optionally, the method further comprises: establishing a virtual private network to communicate with a first computer system of the first entity; using a secure transfer tunnel to encrypt communications to the first computer system of the first entity; and storing communications from the first computer system using file encryption in a cloud-based data store. Optionally, the hierarchical representation of the first collaboration object comprises a tree structure. Optionally, the method further comprises: causing the hierarchical representation of the first collaboration object to be rendered in a list, wherein the second collaboration object is indented in a first direction relative to the first collaboration object. Optionally, the method further comprises: receiving a ratio definition indicating how many of the second collaboration objects are associated with the first collaboration object; and causing a value calculated using the second attribute and the ratio definition to be rendered on the first user device in association with the first image. Optionally, the method further comprises: receiving from the second user device a first text associated with the first graphical annotation to the first image of the first collaboration object; storing the first text received from the second user device in association with the first graphical annotation and in association with an identifier of the second user; and causing the first image of the first collaboration object to be rendered together with the first graphical annotation and the first text, wherein the first text is rendered in association with the identifier of the second user. Optionally, the method further comprises: maintaining a library of collaboration objects in a data store, the library of collaboration objects comprising the second collaboration object; and enabling the second collaboration object to be used as part of a fourth collaboration object. Optionally, the method further comprises: providing a second user interface for display on the first user device, the second user interface comprising: a first menu that enables a user to specify a page orientation for a first document; a second menu that enables a user to specify a number of product images that are to be displayed by the first document; a dynamic menu that includes field number quantities, where the field number quantities are based at least in part on a specified number of product images that are to be displayed by the first document; a field menu that enables a user to specify what data fields are to be displayed in association with respective product images; receiving via the first menu, a first page orientation specification for the first document, receive via the second menu a first specification of a number of product images that are to be displayed by the first document, receive, via the dynamic menu a specified field quantity, receive via the field menu a specification of fields that are to be displayed in association with respective product images; and causing the first document to be rendered in real time in accordance with the first page specification, the first specification of the number of product images that are to be displayed by the first document, the specified field quantity, and the specified fields.

BRIEF DESCRIPTION OF THE DRAWINGS

FIG. 1I illustrates an example transaction collaboration process.

FIG. 1M illustrates example user interfaces rendered based on a virtual page.

FIGS. 1O-1P illustrate example communication architectures.

FIGS. 1Q-1U illustrate example user interfaces.

FIGS. 1V-1AA illustrate example collaboration permission configurations.

FIG. 1BB illustrates an example user interface.

FIGS. 1CC-1FF illustrate example collaboration permission configurations.

FIG. 1GG Illustrates a representation of an example data syndication architecture within a multi-entity multi-hierarchy system.

FIGS. 1HH-1MM illustrate example user interfaces.

FIG. 1NN illustrates an example multi-layer service architecture.

FIGS. 2A-2L illustrate example user interfaces.

FIGS. 3A1-3L illustrate additional example user interfaces.

FIGS. 4A1-4M illustrate additional example user interfaces.

FIGS. 4O-4V illustrate additional example user interfaces.

FIGS. 5A-5K illustrate additional example user interfaces.

FIGS. 7A-7F illustrate additional example user interfaces.

FIGS. 7H-7O illustrate additional example user interfaces.

FIGS. 7Q-7S illustrate additional example user interfaces.

FIGS. 12A-12B illustrates user Interfaces representing relationships between collaboration objects.

DETAILED DESCRIPTION

Figure 1A:
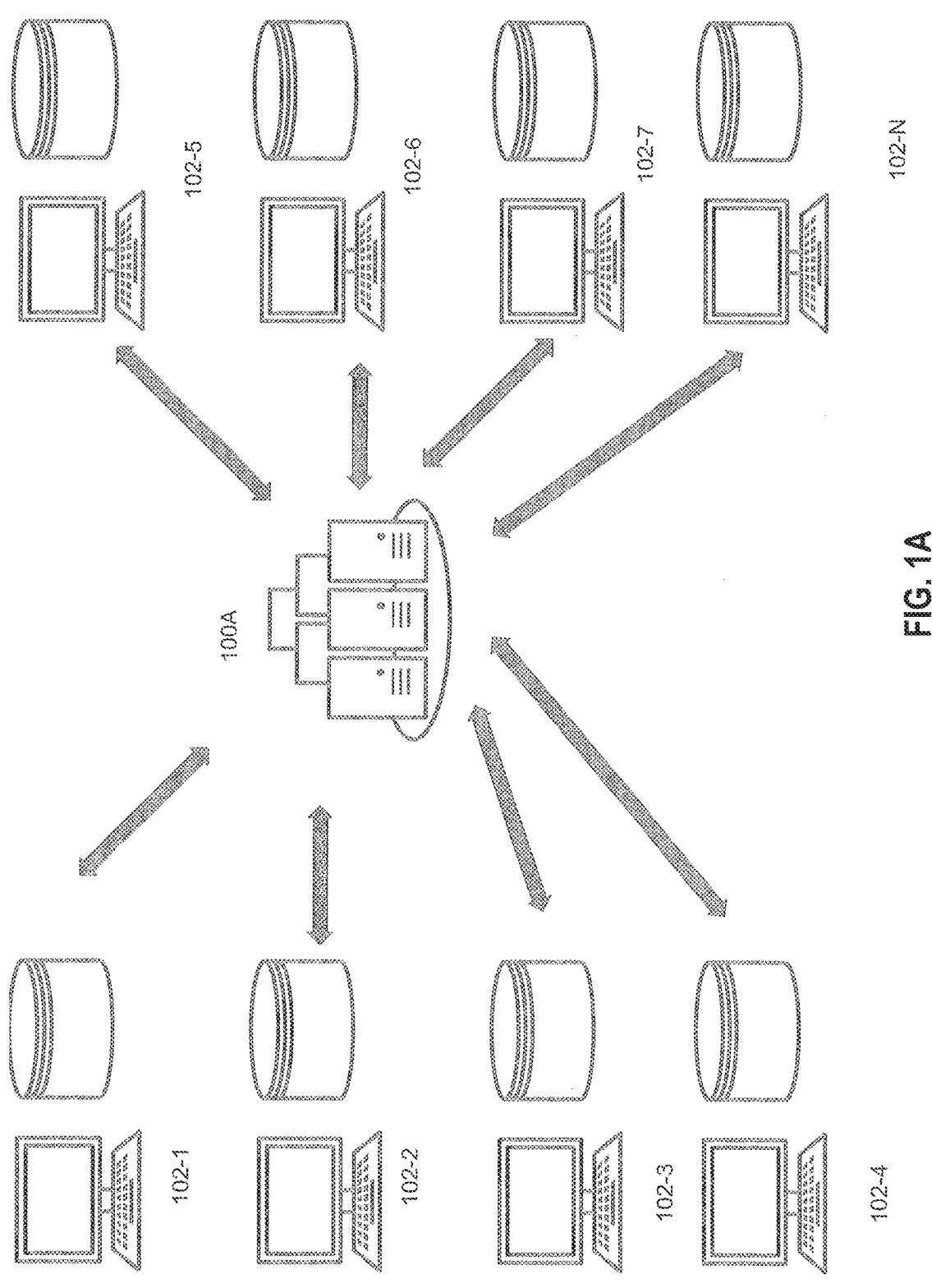
FIG. 1A illustrates an example distributed communication and collaboration architecture.

Methods and systems are described for secure communication over a network among multiple systems enabling secure inter-entity and intra-entity collaboration over the network.

As will be described, technologies are provided that enable threaded communication to be associated with an object and that enable such threaded communications to be selectively provided to users in accordance with respective permissions, in a display-efficient and organized manner. Such display of communications may reduce errors with respect to conducting shared transactions related to such object.

By way of illustration, systems may be associated with respective entities. For example, the systems may include a first set of systems associated with an entity, such as an acquirer of products (e.g., a retailer). The systems may include a second set of systems associated with another entity, such as a product provider (e.g., a manufacturer, distributor, etc.). It is understood that an entity may be both an acquirer of products and a provider of products. The systems may include a third set of systems associated with a communications/collaboration service provider.

The transmitted data may be secured by establishing a virtual private network (VPN) which establishes an encrypted transmission path between the communication/collaboration service provider system and that of the first set of systems and the second set of systems. The systems may communicate with each other using Secure Sockets Layer (SSL), a secure transfer tunnel, which may be used to encrypt data in transit between the systems. Optionally, some or all of the communicated information may be stored using file encryption. Optionally, respective encryption keys may be stored physically separate from the data being encrypted (e.g., on different physical servers) to provide added security.

Optionally, the communication/collaboration system may comprise a secure, cloud based system of co-located and/or geographically distributed server systems.

As discussed in greater detail herein, the communication/collaboration system may enable sensitive data to be siloed, so that only authorized users may access the sensitive data while still enabling users at different entities with different levels of authorization to collaborate. A hierarchy of users or user types may be defined, where those lower on the hierarchy have relatively less access to sensitive data than those higher on the hierarchy. In addition, the hierarchy of users or user types may be defined to indicate which users or types of users may edit which types of data.

The disclosed communication/collaboration system enables communications to be associated with an object, such as a project. Thus, by accessing a project-related user interface, communications related to the project may be viewed together. As will be discussed elsewhere herein, a control may be provided which enables the user to specify whether only communications within a chat window are to be displayed, whether only communications with an external entity are to be displayed, or whether both internal communications and communications with external entities are to be displayed, thereby making efficient use of screen real estate by filtering the data presented to a user to the data of interest.

As discussed in greater detail herein, the disclosed communication/collaboration system further enables a user to generate a dynamic document that includes one or more editable fields, and one or more fields that display data automatically generated by one or more formulas associated with one or more fields (e.g., one or more editable fields). Changes to the document made by a user of a first entity may be selectively transmitted to a user of a second entity. Optionally, a communication (e.g., a chat entry, text message, audio communication, video communication, still image, emoji entry, and/or other communication-type) may be generated and displayed that provides a summary of the change to the document. Optionally, the chat entry may be displayed at the same time as the document. For example, if the document is a submission from a product provider offering to sell items to a retailer, the submission may be made available to a retailer. As will be discussed elsewhere herein, the submission may include price per unit, number of items in a unit, shipping volume, weight, materials, and/or other information. If the retailer requests or makes a change to a product material specified by the product provider (e.g., a change of a basket from plastic to bamboo), a chat entry may be generated the reflects the change (e.g., "Jane has requested that the basket material be changed from plastic to bamboo") and displayed on a user terminal of the retailer and on a user terminal of the product provider in a chat pane at the same time as the changed document is displayed. Certain other data entered by a user at a first entity, such as desired profit margin, may be inhibited from being provided to a user at a second entity, and indeed, may be inhibited from being provided with users without the appropriate permissions at the first entity.

Optionally, changes to a given object may only be made by the entity that created the object, and the other entities collaborating on the object may only request, but not make, a change. For example, optionally, if an acquirer requests a product, only the supplier can change product information belonging to supply side (e.g., materials, weight, etc.), while only the acquirer may be permitted to specify or make changes to an acquisition price.

By way of further example, if an acquirer announces a purchase program or issues a request for quote (RFQ) for a product, the acquirer may specify desired product specification. A supplier may then respond by submitting a supplier product, wherein only the supplier is permitted to change properties of the supplier product.

As discussed in greater detail herein, the communication/ collaboration system enables communications between users to be restricted so that a given user at a given entity may only be permitted to contact certain designated users at other entities and may further restrict communications to those designated users to only certain designated subjects/ object-types. For example, as will be discussed in greater detail herein, a user (e.g., a buyer) at a retailer may be limited, via the system, to communicate only with certain product providers, and only with certain designated users at such product providers, and only regarding designated product categories (e.g., outdoor furniture). By way of further example, a given user at a product provider may only be permitted to communicate with certain retailers regarding certain product categories.

By way of yet further example, a given user at a product provider may only be permitted to communicate with a given user at a retailer if the retailer user invited the product provider to submit a bid for a given retailer program. For example, a retailer program may provide a description (e.g., a high level and/or a low level description), a trend board (e.g., a presentation of images of one or more products indicating current product trends), a colorway (e.g., a range of combinations of colors in which a design or product type is available), a target price, and/or a quantity of product the retailer is seeking to acquire. The retailer program may have been specified by a retailer user with a specified level of rights. For example, a hierarchy of user levels may be specified with different user levels having different rights. For example, a relatively high level manager may be authorized to add product suppliers to an approved provider list, may be authorized to specify a retailer program/project, may be authorized to access confidential information of a highest level of confidentiality, and may be authorized to approve purchases up to a first threshold level. A level down manager may be authorized to specify a retailer program/project, may be authorized to access confidential information of a second level of confidentiality (lower than the first level of confidentiality), and may be authorized to approve purchases up to a second threshold level (which is lower than the first threshold). A still lower level buyer may be authorized to access confidential information of a third level of confidentiality (lower than the second level of confidentiality), may be authorized to select product providers from the approved product provider list and submit invitations to the selected product providers to submit bids to the retailer to supply products for a specified retailer program.

A user interface may be provided that enables a given user (e.g., a manager) to specify a project goal by units (e.g., purchase 100 units) and/or by price (e.g., purchase $10,000 of units). The goal may be assigned to a department and on a sub-department level and/or on a user level. For example, 20% of the goal may be assigned to a first department, 45% of the goal may be assigned to a second department, and 35% of the goal may be assigned to a third department. Sub-sub-goals may be assigned to users within a sub-department. Progress towards the respective sub-goals may be tracked and aggregated in real time. The progress towards the subgoals and the aggregated progress towards the overall goal may be reported (e.g., via text and/or graph) in real time to the appropriate user (e.g., manager).

Further, a given entity may act as both a seller and a buyer of items. For example, a furniture manufacturer may purchase materials to make the furniture (e.g., wood, nails, screws, brackets, etc.), and may then sell the furniture to a retailer. A given user at an entity may be restricted to only buying or only selling items, or may perform both buying and selling of items, based on the permissions assigned to the user. Thus, a user with appropriate permissions may, via a single sign-in to the system, access both seller user interfaces and data, and buyer user interfaces and data. When the user is acting in a buyer function, the user may be permitted to communicate with a first set of entities (e.g., product providers), and corresponding sets of users associated with the first set of entities. When the user is acting in a seller function, the user may be permitted to communicate with a second set of entities (e.g., retailers), and corresponding sets of users associated with the second set of entities.

Unique graphical user interfaces are described that enable a user to flexibly control what data is presented. Further, graphical user interfaces are described that enable fast paced communication and inter-entity and intra-entity collaboration. Further, user interfaces are described that organize communications around objects (e.g., projects, product offers, purchase programs, etc.), to create a better sense of organization, auditability, and insight of and into artifacts. In addition, chat interfaces are described that include not just user-to-user messages, but that also include events detected by the system, such as bids, price changes, field updates, and/or the like. Thus, user interfaces are described that solve problems with prior graphical user interfaces devices in the computerized product-related transaction area, improving speed, accuracy and usability as compared to conventional user interfaces.

Advantageously, in order to speed processing, reduce processing loads, and reduce memory utilization, a given virtual page may be associated with a given object (e.g., a project or transaction). The virtual page may include different modules with a variety of sensitive and confidential data and/or communications that are not to be shared with unauthorized users. Further, a virtual page may include certain data that is not of interest to certain entities or to certain users at certain entities. When multiple users are collaborating on the same object, each time new data and/or data types are to be displayed to users, the communication/ collaboration system may optionally determine which entity a given user is associated with, which user(s) at a given collaborating entity the given user is collaborating with, the permissions associated with a given user, and/or the job function of a given user. The communication/collaboration system may use some or all the foregoing information to determine what data and/or communications are to be shown to a given collaborating user. The communication/collaboration system may then determine which modules of the virtual page are to be displayed to a given user. The modules may then be rendered with the corresponding modules and module data (which may already have been present in the virtual page) via a terminal display of a given user. Thus, different users within the same entity may see different versions of the virtual page, with different data. Further, users at different entities may see different versions of the virtual page, with different data. Thus, the foregoing process may advantageously use the same virtual page in rendering the different pages for the different users. As noted above, this technique reduces processor and memory utilization, as the system does not generate, de novo, a new page with data separately accessed for each user.

A virtual page may be used as part of a workflow. A workflow may be associated with several virtual pages. A first user, at a first entity at a given state of a collaboration workflow being performed in collaboration with a second entity, may be presented with the same virtual modules (but different data) as a second user (with the same permission level as the first user) at the first entity at the given state of the collaboration workflow being performed in collaboration with a third entity. Thus, advantageously, users at a given permission level at a given entity will utilize the same workflow even when working with different entities, so that the workflow is agnostic as to which entity is being collaborated with.

Certain aspects will now be discussed with reference to the figures.

The communication/collaboration system optionally enables a centralized workflow between different entities that enables the different entities (e.g., organizations) to collaborate on an object across a network. For example, a given entity may be an acquirer (e.g., a buyer) and/or a supplier (e.g., a seller) of items. With reference to FIG. 1A an example communication/collaboration system 100A manages communications and data transfers between a plurality of entity systems 102-1 . . . 102-n, such as between entities on the acquisition side and entities on the supply side. The entity systems 102 may include standalone computers (e.g., desktop, laptop, tablet, smart phone, or other computer device), a centralized computer system, and/or a cloud computing system.

A given entity system 102 may include a data store hosting an enterprise database/warehouse/repository. The enterprise database may optionally store data such as item or service data (e.g., product data) and/or order data. By way of example, the product or service data may include specifications and attributes of the products and services offered by an entity, such as dimensions, weight, color, configuration, cost, and/or the like. The order data may include data such as buying information (e.g., buying program data), inventory data of items, quantity of items needed, shipping location, buying terms, and/or the like. As discussed elsewhere herein, the communication between the different entities may be via a secure communication channel, where data is encrypted. Further, data stored by the communication/collaboration system 100A may be encrypted and/or otherwise secured.

The communication/collaboration system 100A is configured to accommodate differing informational access and differing artifact ownership within a given workflow depending on the organization and organization user accessing the given information and/or artifact.

The communication/collaboration system 100A is optionally a web based and/or app based SaaS platform that connects entities, such as retailers and suppliers. Unlike conventional platforms, the disclosed platform is a shared system, built for collaboration and the shared workflows and needs of item acquirers (e.g., retailers or other buyers) and suppliers (e.g., manufacturers). For example, a retailer may wish to order products from a supplier, where the ordered products will need to be manufactured for the retailer in accordance with the order. As a shared software platform, the communication/collaboration system 100A bridges the gap that conventionally exists between systems at suppliers and retailers. The disclosed communication/collaboration system 100A increases speed of deploying products (e.g., new products) to market by decreasing the friction in information transfer between organizations and their systems by removing or decreasing the human error in reconciling informational differences instance by instance. The communication/collaboration system 100A may optionally be configured to be the final platform accessed by "suppliers" (e.g., companies offering items to be resold) as information flows out of their company via actions of salespersons, and may optionally be configured to be the first platform accessed by "retailers" (e.g., companies purchasing items) as they encounter information on products and orders. As noted above, a given entity may be both a supplier of items and an acquirer of items.

An item supplier can publish items and/or services via the communication/collaboration system 100A to one or more other entities (e.g., item acquirers). Optionally, the supplier may specify which entities can view the published items and/or services, or the published items and/or services may be made accessible to all users of the communication/ collaboration system 100A. Conversely, acquirers can publish acquisition plans and selectively invite certain suppliers (e.g., within or outside of the acquirer's current supply network), review item/service offers, communicate with suppliers, iteratively negotiate specifications, attributes, pricing of items and services, other transaction terms, and generate purchase orders. Advantageously, the use of a shared communication/collaboration system 100A by an acquirer and supplier will reduce the need for duplicative, error prone, arduous data entry by each party.

Thus, for example, a given entity/organization may comprise various units (e.g., business units, such as subsidiaries, divisions, groups, departments, or the like), where a given user may be associated with an organization unit. An organization may have a complex hierarchical structure, with many layers of units. The communication/collaboration system 100A may enable connections to be defined to link units within an organization to enable users within an organization to collaborate on an object. In addition, the communication/collaboration system 100A may enable connections to be defined to link units across organizations to enable a user at a unit of one organization to collaborate with users at one or more other linked-to organizations. A given connection may have an upstream side (e.g., where the user on the upstream side performs an item acquisition workflow) and a downstream side (e.g., where the user on the downstream side performs an item supply workflow).

FIG. 1A-2 illustrates an example implementation of the communication/collaboration system 100A. The system 100A may optionally be a cloud-based system including a hosted computing environment that includes a collection of physical computing resources that may be remotely accessible and may be rapidly provisioned as needed. Further, the system 100A may include a hosted storage environment that includes a collection of physical data storage devices that may be remotely accessible and may be rapidly provisioned as needed (sometimes referred to as "cloud" storage). The example communication/collaboration system 100A includes an authentication module, a front end module 104B, backend processing module 106B, a communication and collaboration module 108B, an integration module 110B, a tracking module 112B, and a data store 114B (which may include cloud storage).

The data store 114B may host one or more databases. A given database may be a relational database (e.g., an SQL database) or a non-relational database (a nonSQL database, such as NoSQL). For example, a relational database may advantageously use the same uniform language (e.g., DDL) for different user roles (developer, user, administrator), may use a standardized language for different relational database management systems, may use an advanced and non-structural querying language, and may comply with ACID principles (atomicity, consistency, isolation, durability), thus ensuring stability, security, and predictability both of the entire database and each transaction. A nonSQL database may be used rather than an SQL database as it better scales out horizontally across distributed systems and so can handle a large number of transactions (e.g., millions of transactions at a time). Further, a nonSQL database may be schema-free and so better utilized with unstructured and semi-structured data. Thus the selection of the database technology may be based on the particular use scenario (e.g., the need for stability and uniformity offered by SQL databases v. the need to process large amounts of unstructured and semi-structured data as provided by a nonSQL database).

Optionally, a cloud-based object database (e.g., to store images, audio and videos) may be used. Optionally, text messages may be stored in a specialized text database that is document-oriented. Optionally, a graph database (rather than a database organized as a table with rows and columns) may be used to store hierarchy data, where the graph database provides index-free adjacency, where a given element in the database contains a direct link to its adjacent element and index lookups are not required.

The communication/collaboration system 100A may provide interfaces to and utilize one or more microservices from one or more remote systems to thereby provide additional features and/or enhance system performance. For example, an intercom microservice may be used for customer communication and technical support. An email automation service may be used to manage emails. An event-driven, serverless computing platform may be used to manipulate images. An error tracking service may be used to track and report bugs. A cloud based automated load and performance testing service may be used to monitor system performance.

The data store 114B may store data published by various entities using the system 100A, data accessed from respective enterprise databases of the systems 102, communications between entities, purchase orders, and/or other data discussed herein. The data store 114B may store an identifier associated with the creator/provider of a given item of data. The identifier may include identification information on the user's unit and organization, and may include creation and/or editing timestamps.

The data store 114B may optionally host a connections database storing information on connections between organizations, organization units, and organization/unit users, and data communicated and/or stored relating to such connections.

The data store may provide data in response to user or system queries. Optionally, an interface may be provided (e.g., via the front end module 104B) that enables queries to be submitted with respect to analytics. For example, a user can submit a query as to what is the most popular color (e.g., in general, for a specific item-type, or for a specific model of an item, for a specific SKU, etc.), what is the best-selling item in a given category (e.g., what is the best-selling desk chair), how many of a given item have been sold (e.g., in general, by a specific entity, to a specific entity, etc.), and/or the like. The response may be generated using data from the data store 114B and/or from data accessed from the enterprise databases of the entity systems 102.

The authentication module 102B may be used to determine a user access and permissions based on user login information (e.g., UserID, password, and/or biometric data). Based on a user's access authorization and permissions, a user may be granted access to certain enterprise data within the entity to which the user belongs, and the user may also be granted access to certain enterprise data shared by other entities that have connections to the user's own entity. For example, certain users may be permitted to view certain data and not other data, may be permitted to access certain user interfaces and not other user interfaces, may be permitted to communicate with certain users at certain entities and not other users at a given entity and not other entities, and/or may be permitted to conduct certain transactions and not other transactions. By way of further example, certain data in the connection database referenced above may be accessed by users on the acquisition side of a given connection, certain data in the connection database referenced above may be accessed by users on the supply side of the given connection, and certain data may be accessible to users on both sides of the given connection.

By way of yet further illustrative example, based on the specified permissions and access, a given user may be permitted to only conduct purchases and not sales, sales and not purchases, or both purchases and sales of certain items/services. The permissions may be based on a user's position in a hierarchy of users (e.g., a hierarchy of users defined by an organization's administrator). By way of example, a user associated with an organization unit may be granted access and permission to enterprise data and workflows of the units below the user's unit in the hierarchy, but not necessarily to enterprise data and workflows of the units above the user's unit in the hierarchy.

The front end module 104B (which may include a web server) may generate and provide for display or reproduction on user systems user interfaces configured to display data, receive data from the user or user system, download data, and/or upload data. Data may include text, graphic, still image, video, and/or audio data. Optionally, the user interfaces may include sounds that are triggered by a corresponding event. For example, each time a transaction of a specified type is generated (e.g., a final purchase order), a corresponding sound and/or animation may be generated. The sounds may include non-verbal sounds (e.g., beeps, horn honking, a tune, etc.) and/or words providing information and/or positive feedback to the user (e.g., "Purchase order completed. Great job!"). The animation may likewise provide positive feedback to the user (e.g., an animation or video of fireworks, a waving flag, a tooting horn, etc.).

Optionally, a threshold needs to be reached in order for certain sounds/animations/videos/emojis to be rendered to the user. For example, the user may need to have finalized a threshold number of purchase orders in order for a corresponding sound/graphic to be generated and provided to the user. By way of further example, a purchase order may need to be for a threshold dollar amount and/or quantity of product in order for a corresponding sound/graphic to be generated and provided to the user.

The sounds, animations, and thresholds may be different for different entities and may be different depending on the user function. For example, an entity may be able to custom-specify sounds, animations, and thresholds for a given event or transaction type. By way of further example, different sounds/animations/videos/emojis may be used for a user at a supplier entity and for a user at an acquirer entity even though both users are negotiating the same transaction (e.g., the same purchase order). Further, different sounds/animations/videos/emojis may be provided based on the user level in a hierarchy at the user's entity. For example, a salesperson may be provided with different sounds/animations/videos/emojis than a supervisor of the salesperson for a given transaction.

The front end module 104B optionally determines the screen resolution of a target device (e.g., by querying the target device regarding the height and width layout in pixels). The front end module 104B may then dynamically format the user interfaces accordingly. For example, different user interfaces may be used for phones, tablets, laptop, and desktop displays, to enable information to be appropriately presented for easy viewing while reducing navigation through multiple layers of user interfaces. Optionally, the front end module 104B may utilize a flexible layout that enables a given user interface to dynamically scale to different screen sizes, densities, and/or aspect ratios. By way of illustration, a given user interface layout may be defined using density and scale independent pixels (dp) instead of using absolute pixels. User interface elements may be placed and sized relative to other user interface elements. Elements may be dynamically sized based at least in part on their content.

The backend processing system 106B is configured to perform computations, data processing, filtering, query servicing, business intelligence, analytics, graph generation, diagram generation, dashboard generation, and report generation. For example, the backend processing system 106B may be configured to process and analyze vast amounts of data being published by acquirers and suppliers of products and/or services to identify trends. Examples of trends which may be identified include which products are or are becoming popular (e.g., becoming increasingly offered or purchased over a specified time frame), and which products are unpopular or becoming unpopular (e.g., trending downwards with respect to offers and/or purchases over a specified time frame). Such trend information may be reported to a user (e.g., at an entity using the system 100A) textually, via a graph, and/or otherwise.

Optionally, the backend processing system 106B includes an artificial intelligence module. The artificial intelligence module may include a machine learning engine, such as a neural network, that identifies such trends and/or that identifies anomalies in the offer and/or purchases of products/services. In addition or instead, statistical predictive algorithms may be used to predict trends.

For example, optionally a deep, convolutional, neural network model trained using historical data (e.g., data published by supplier entities and/or acquirer entities, data acquired from enterprise databases of the entities, data obtained from purchase orders, sales data from remote databases, etc.) to identify trends with respect to the popularity of products and product types may be used. The deep neural network may include an input layer, an output layer, and one or more levels of hidden layers between the input and output layers. The deep neural network may be configured as a feed forward network. Optionally, the deep neural network may be used to analyze, optionally in real time, data published by product suppliers, product acquirers, and other data sources. In addition, the deep neural network may be used to analyze transaction data (e.g., data included in a purchase order).

The convolutional deep neural network may be configured with a shared-weights architecture and with translation invariance characteristics. The hidden layers may be configured as convolutional layers, pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

The trend spotting data may be stored in data store 114B. Advantageously, the neural network, configured to derive trend data from complicated or imprecise data, can be used to extract patterns and detect trends that are too complex to be identified by humans or conventional computer techniques.

Thus, the backend processing system 106B may be configured to determine trends, generate forecasts (e.g., in the purchase or sales of a product or product-type), perform prescriptive analytics, identify value drivers that make a given product more desirable (e.g., increases sales and/or enables an increase in prices without reducing sales), identify key segments correlations, identify anomalies, compare and rank sales performs of various items (e.g., where an item is associated with a corresponding SKU (Stock Keeping Unit)), and perform a what-if analysis. By way of example, the backend processing system 106B may use determined trends to recommend to a supplier what products to offer in the future, and may recommend to an acquirer what products to acquire (e.g., for resale) in the future.

The communication and collaboration module 108B enables inter-entity and intra-entity communication, such as chat, messaging, video, audio, and/or email communication (e.g., between established connections). As will be discussed elsewhere, the communications may be threaded, and communications associated with a given object (e.g., a given transaction) may be presented together in an organized fashion. Thus, for example, a user from one business unit of an entity (e.g., a subsidiary, division, group, or department of the entity) can communicate in real time via messaging/chat/video conferencing/audio with one or more users of the same business unit or with members of other business units which have connections to the user's business unit.

The integration module 110B can connect to the existing system infrastructure of a given entity via an application programming interface (API), using XML, JSON, EDI, and/or other data exchange format. The integration module 110B can perform data sharing, exchanging, and/or synchronization with other systems. In addition, the integration module may perform a data validation process, such as to determine which data item is most current (e.g., which SKU for a given product is most current and should be used). The integration module 110B may identify data conflicts, generate a warning message and cause the warning message to be displayed when such a conflict is detected, and inhibit the overwriting of data when such a conflict is detected until the module 110B receives a user or other instruction enabling the overwrite to be performed. The synchronization of data from an enterprise database or other data store of an entity system 102 with the data store 114B may be performed periodically and/or in response to a detected event (e.g., the generation of a final purchase order or other agreement for a transaction between two entities).

Optionally, in response to detecting a given entity publishing information on a new product or an offer to supply a product, the integration module 110B can broadcast in batch mode some or all of the published information on the new product or the offer to user interfaces (e.g., communication interfaces, dashboards, etc.) displayed by systems 102 of other entities. Such broadcast may be filtered so that it is only available to entities specified by the given entity, only available to those with which the given entity has conducted a transaction with via the system 100A within a specified time period, and/or only available to those entities that have opted-in to receive such broadcast from the given entity. This approach reduces network bandwidth usage and memory usage by inhibiting the broadcast of data to certain destinations while still ensuring that the data reaches the appropriate destinations in a timely manner. Further, the batch broadcast may be performed in response to detecting or predicting that the system 100A communications interface is otherwise at low utilization to thereby avoid overburdening the communication interface.

The communication/collaboration system 100A may be configured to accommodate the differing leverage between entities (e.g., retailers and suppliers). For example, the communication/collaboration system 100A is optionally configured to provide workflows, features, and functions that operate in one-to-many relationships with the retailer (acquisition side company) being "one" and the suppliers (supply side companies) being "many". This enables acquisition side companies to communicate buying needs, specifications, and/or timelines to many supply side companies with the same or similar degree of effort as communicating with just one other company. Under the same or similar relationship, data from the many supply side companies flows many to the one acquisition side company. As such, acquisition side companies are enabled to improve acquisition decisions through comparison of similar offerings from many supply side companies (e.g., using a central repository of data). Further, the communication/collaboration system 100A is optionally configured to provide workflows, features, and functions that operate in one-to-many relationships with the supply side company being "one" and the acquisition side companies (e.g., retailers) being "many".

The communication/collaboration system 100A may also be configured to provide workflows, features, and functions that operate in many-to-many relationships, enabling multiple supply side companies to interact with multiple acquisition side companies, and enabling multiple acquisition side companies to interact with multiple supply side companies.

Thus, for example, a supply side company may use the same communication/collaboration system 100A and interfaces to provide offers and process sales with multiple acquisition side companies. A given user at an entity may access data and user interfaces via a user device (e.g., a desktop computer, laptop computer, tablet computer, phone, smart television, virtual or augmented reality system, or other computing device). A given user device may be equipped with a processor, memory, a network interface, a display (e.g., a touch display), a microphone, a speaker, a point device (e.g., a mouse, touchpad, stylus), a printing device, and/or other interfaces. The user device may communicate with the communication/collaboration system described herein via a respective network interface.

The tracking module 112B may optionally be deployed in the system 100A to provide additional services, such as logistics (e.g., when is a given order scheduled to ship, what orders have shipped, when is a given order expected to arrive, what is the origination location for a shipment, what is the destination location for a shipment, etc.), invoicing services, billing services, or the like. Such services may be provided using data accessed from the data store 114B and/or from the entity systems.

Figure 1B:
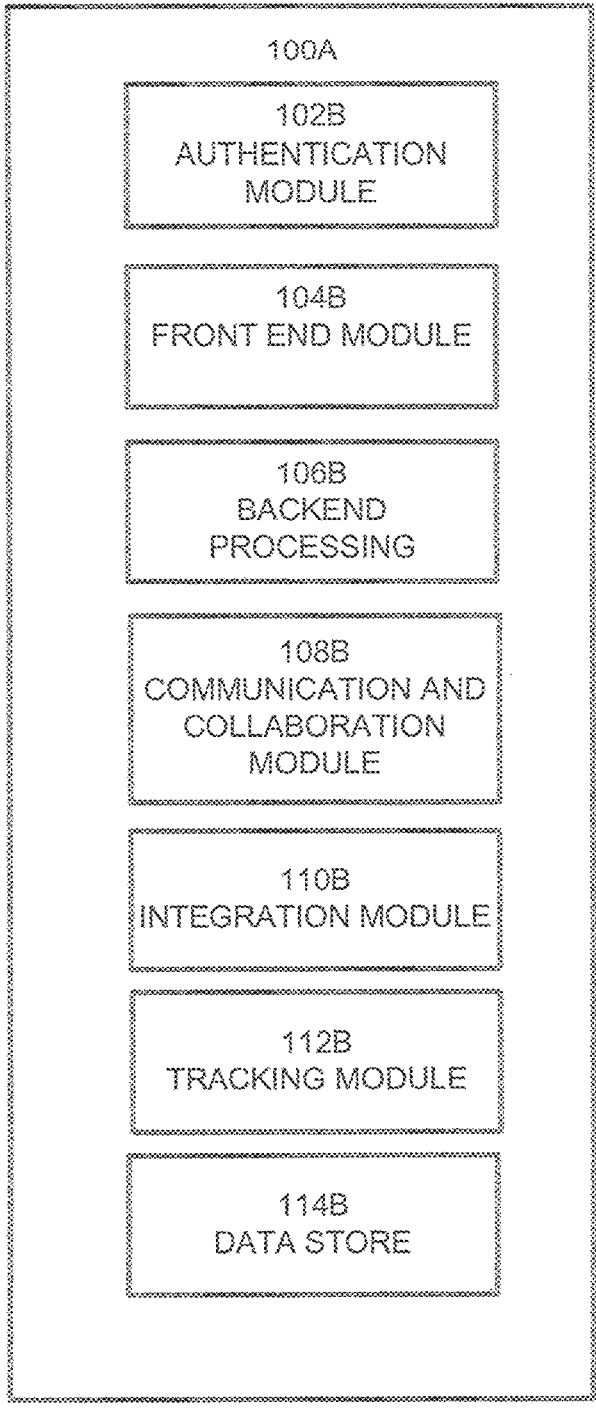
FIG. 1B illustrates an example architecture of a communication/collaboration system.
Figure 1C:
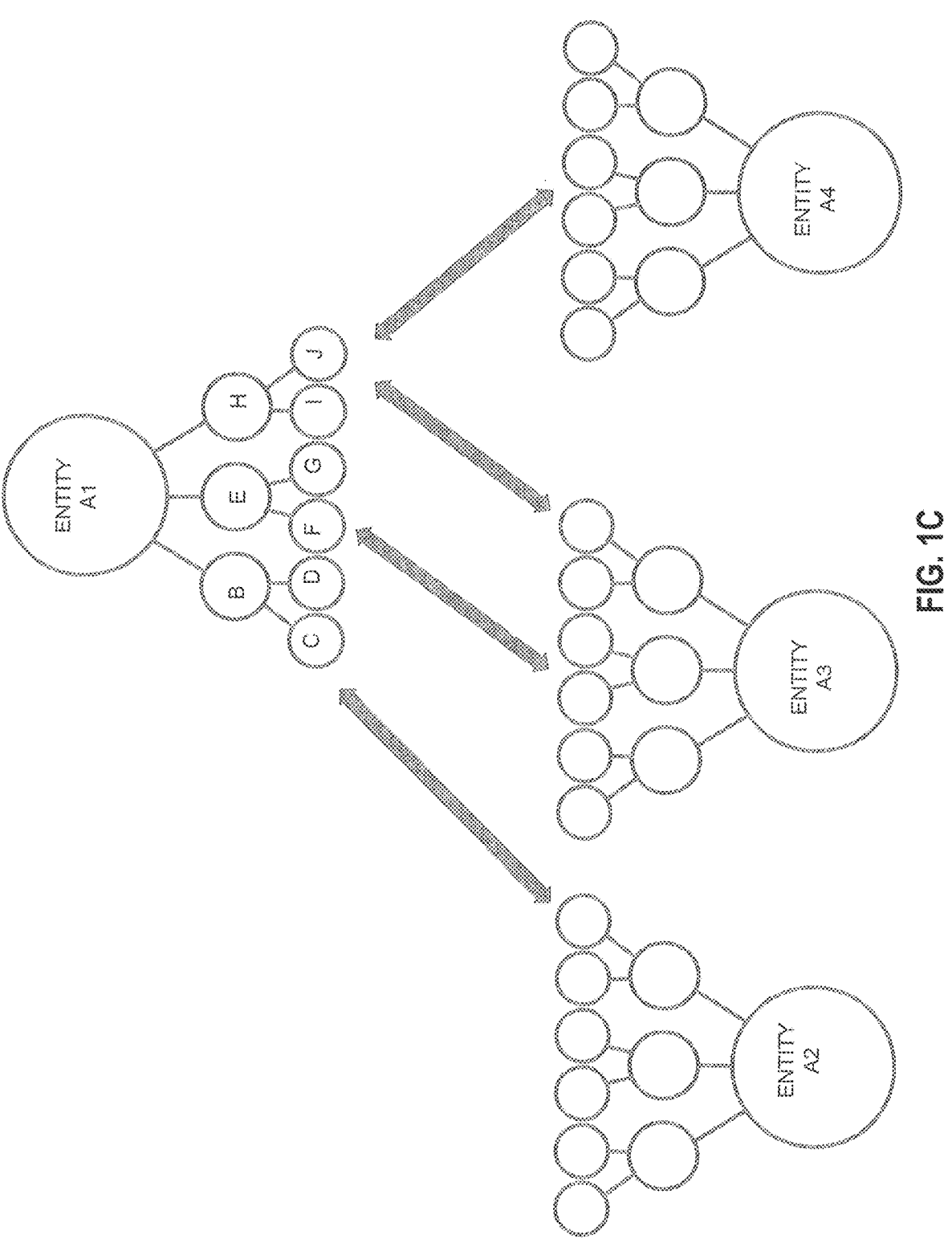
FIG. 1C illustrates an example communication hierarchy.
Figure 1D:
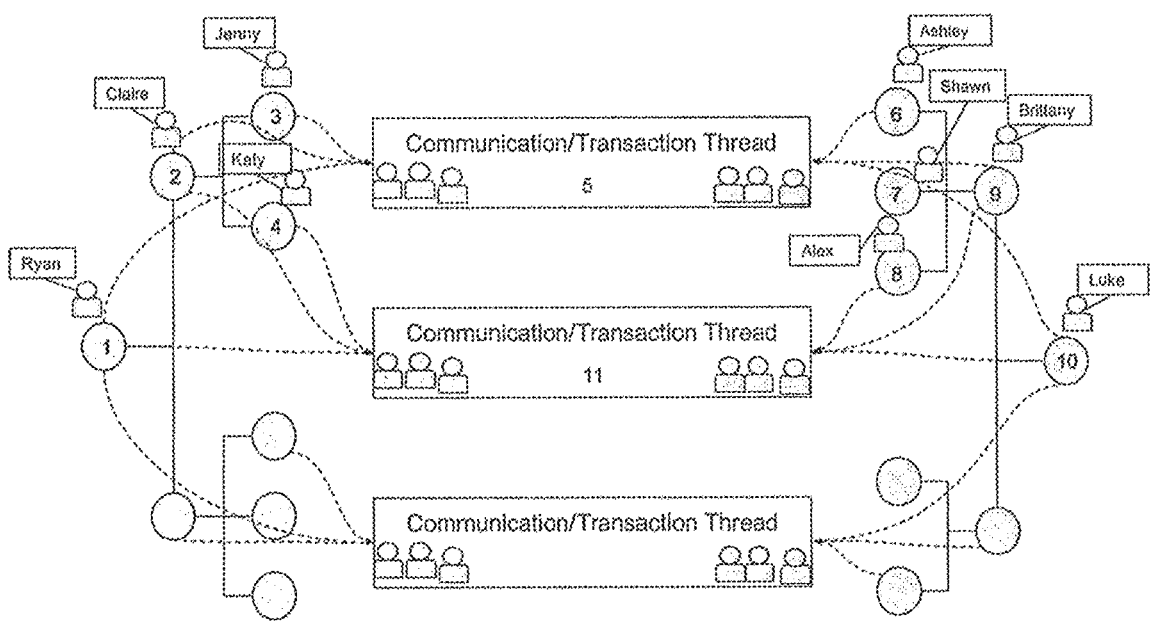
FIGS. 1D and 1E illustrate example communication/transaction threads and permissions.
Figure 1F:
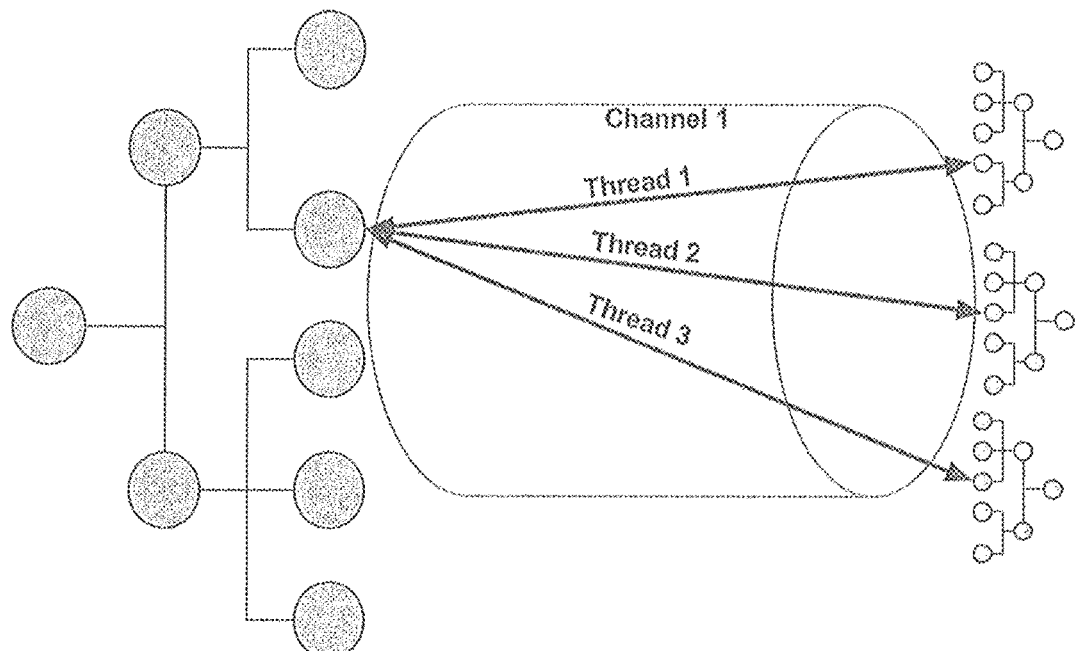
FIG. 1F illustrates an example one-to-many communication scenario.
Figure 1G:
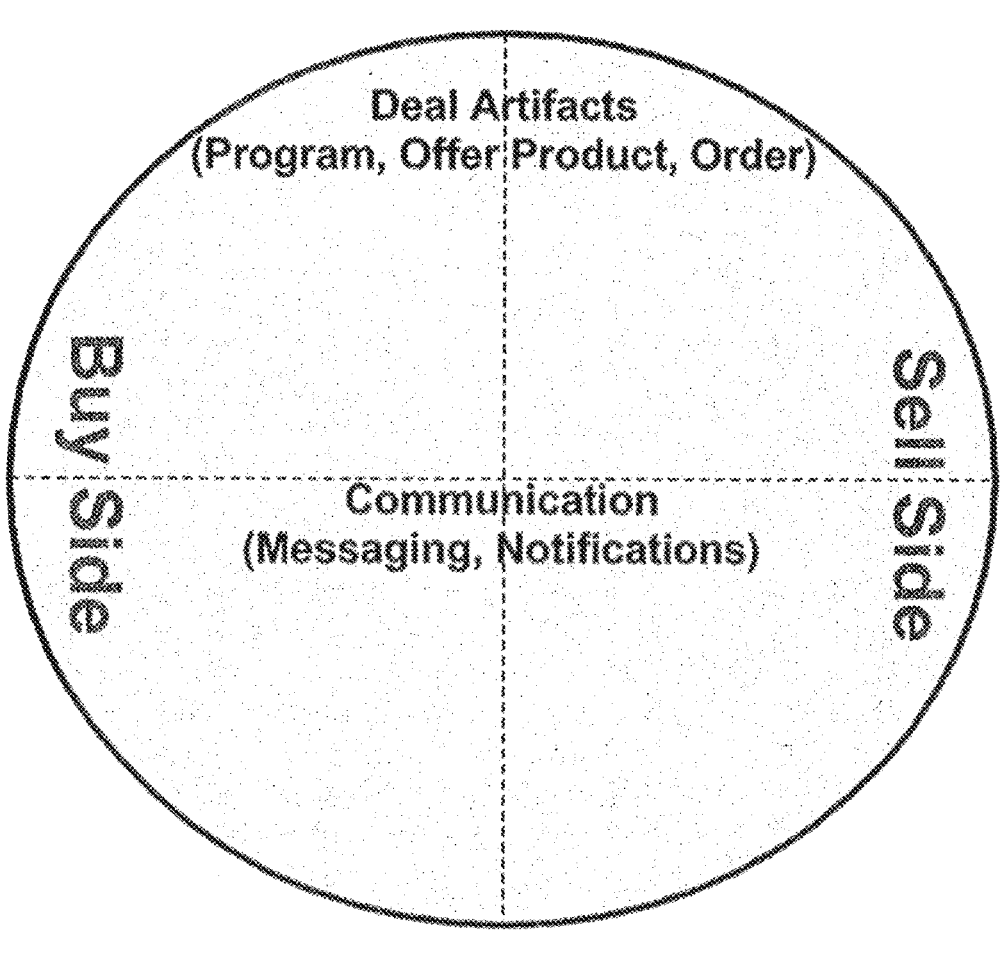
FIG. 1G illustrates an example thread cross section.
Figure 1H:
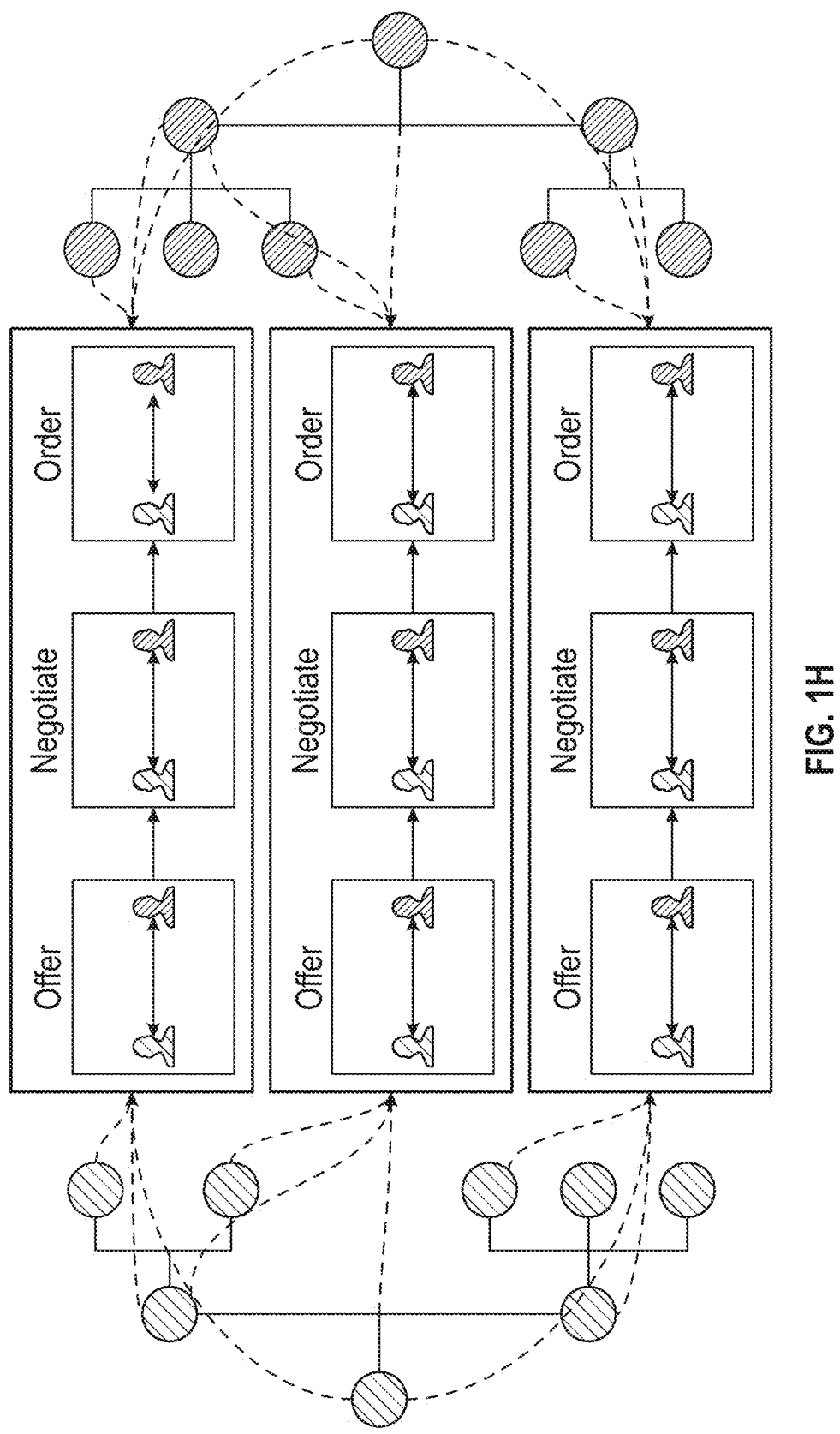
FIG. 1H illustrates multiple communication threads and multiple channels.
Figure 11:
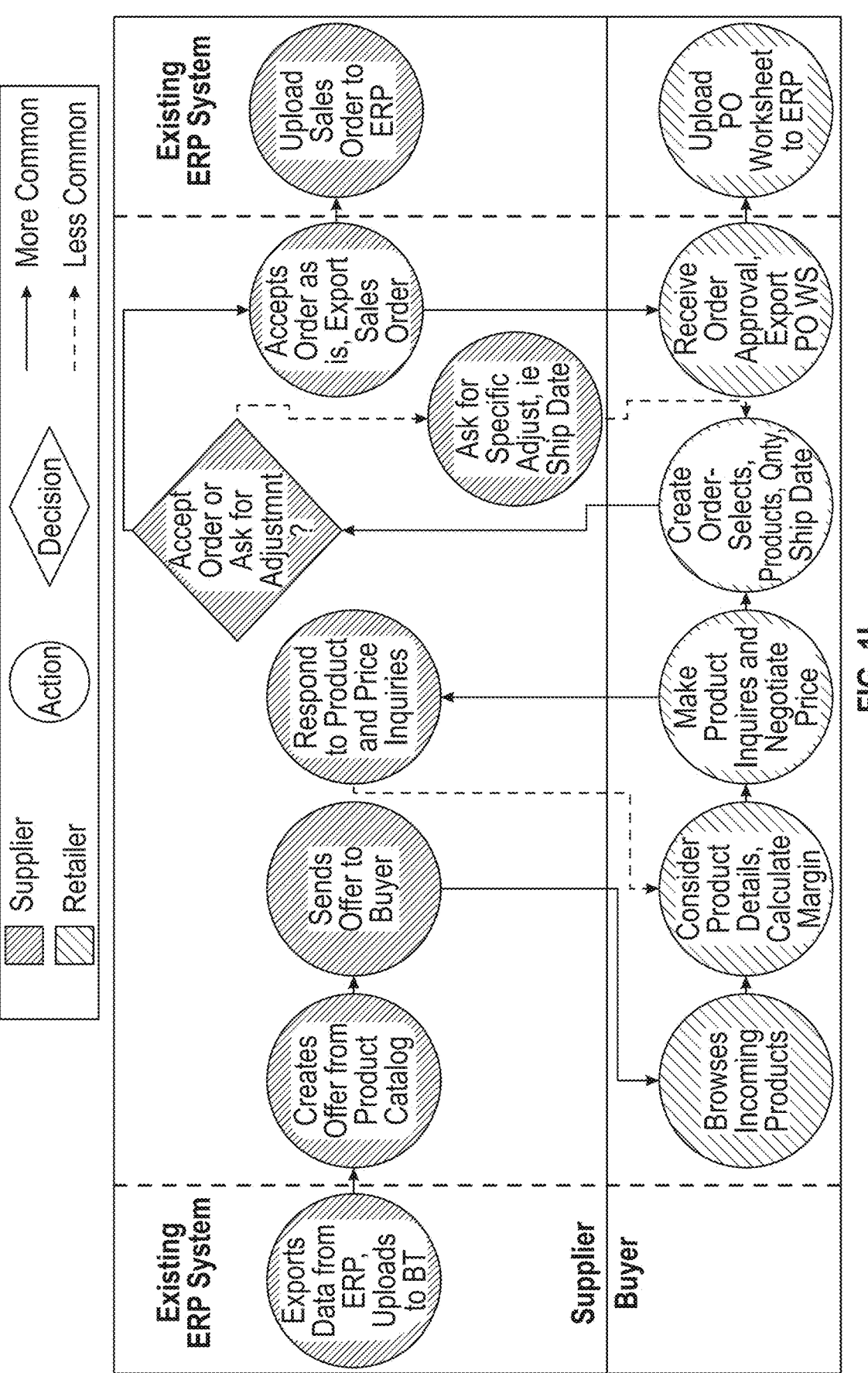
FIGS. 11A-11B illustrate example hierarchical associations between collaboration objects.
Figure 1J:
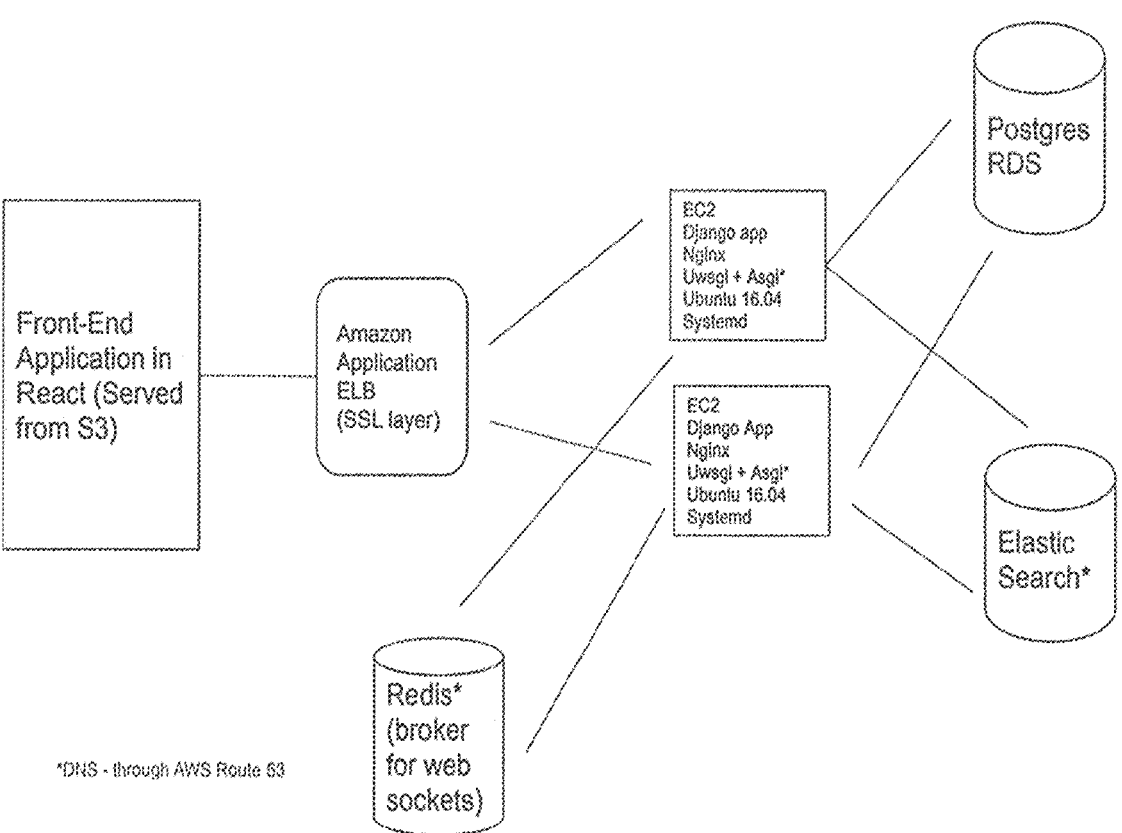
FIG. 1J illustrates aspects of an example communication/collaboration system.
Figure 1L:
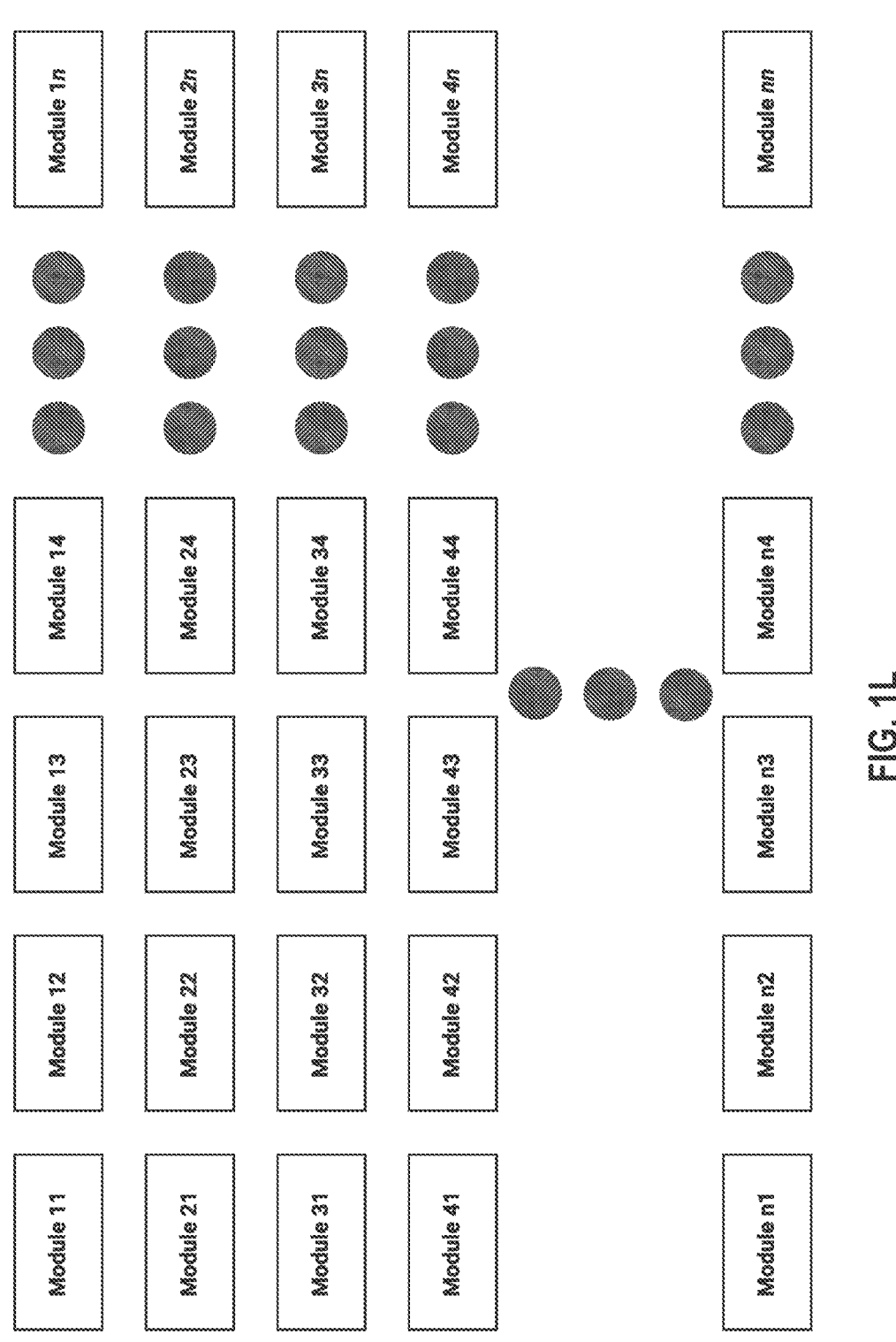
FIG. 1L illustrates an example virtual page.
Figure 10:
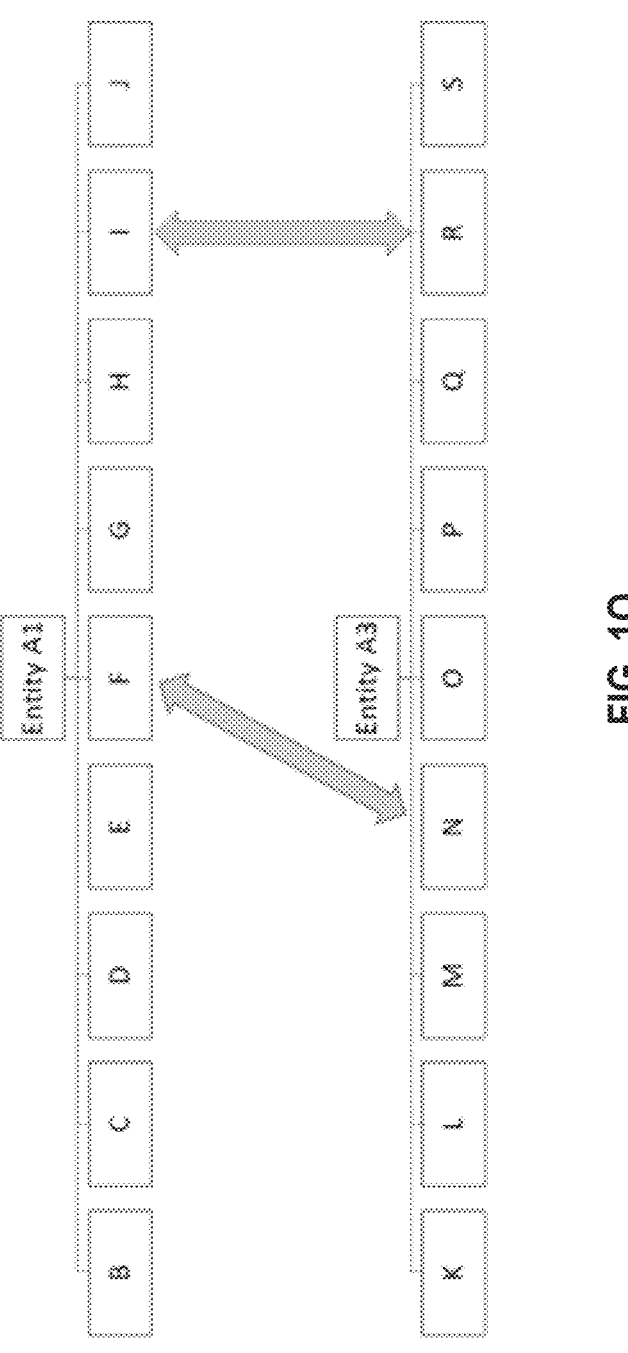
FIGS. 10A-10D illustrate example architectures.
Figure 1P:
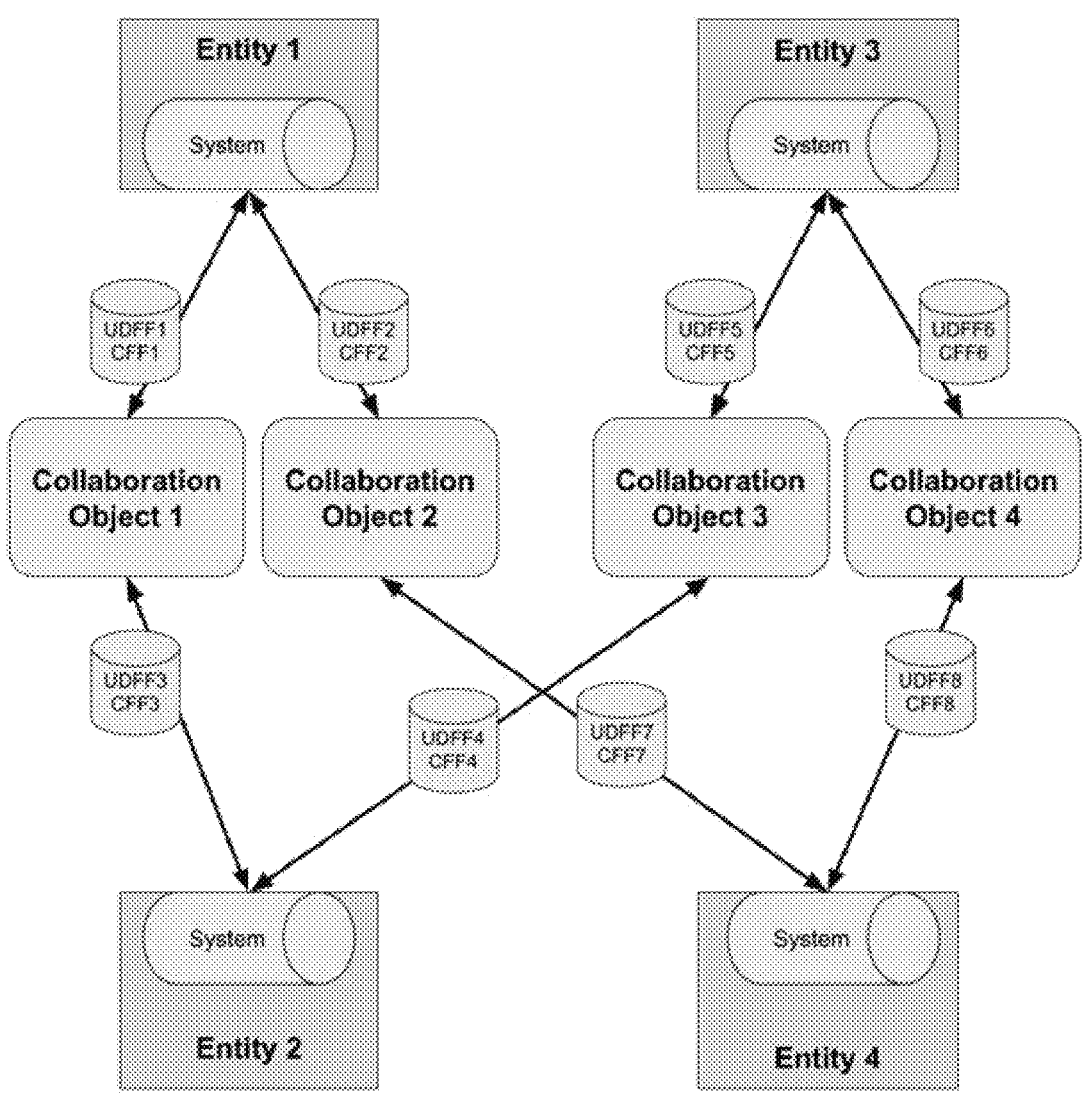
Figure 1Q:
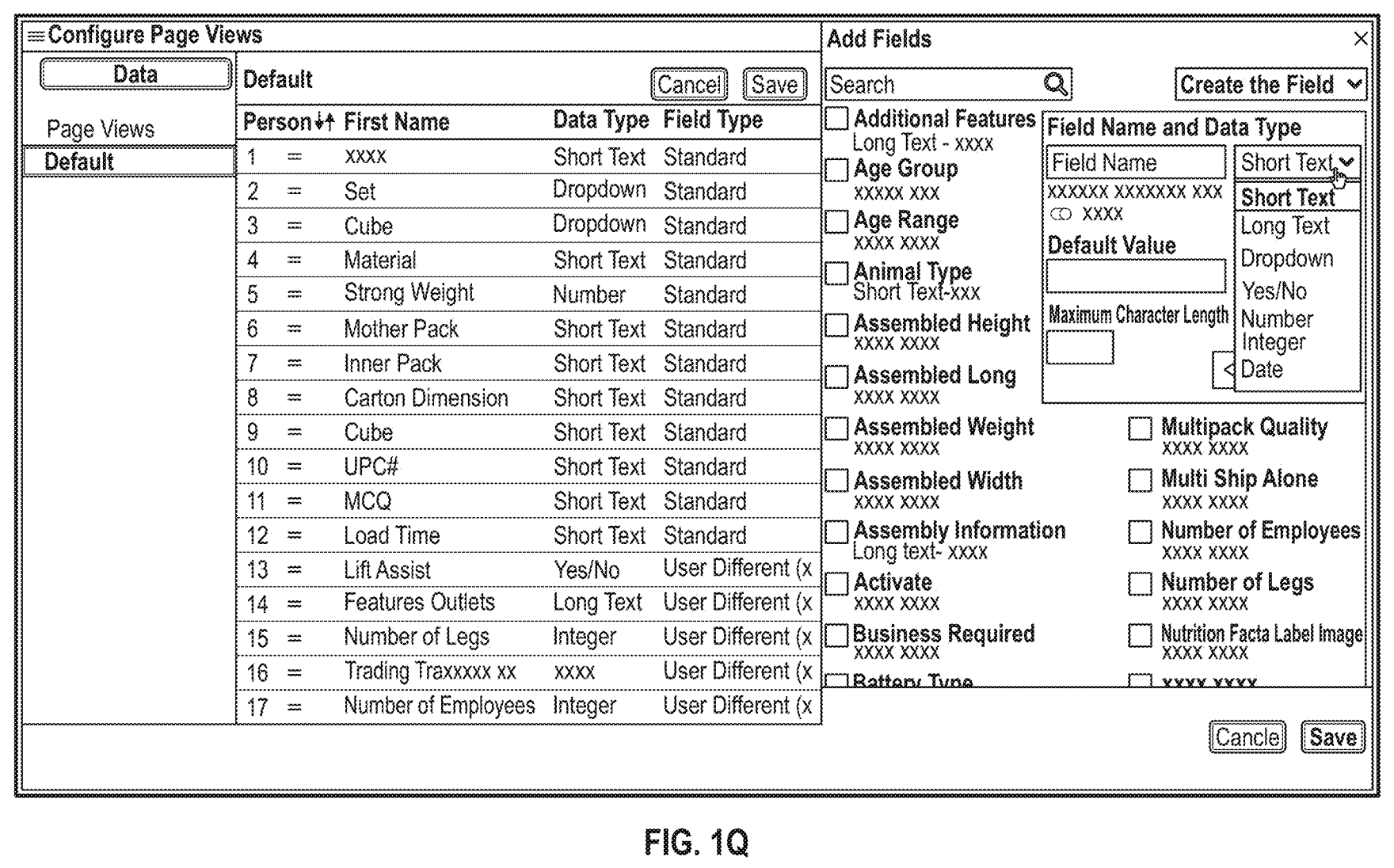
Figure 1S:
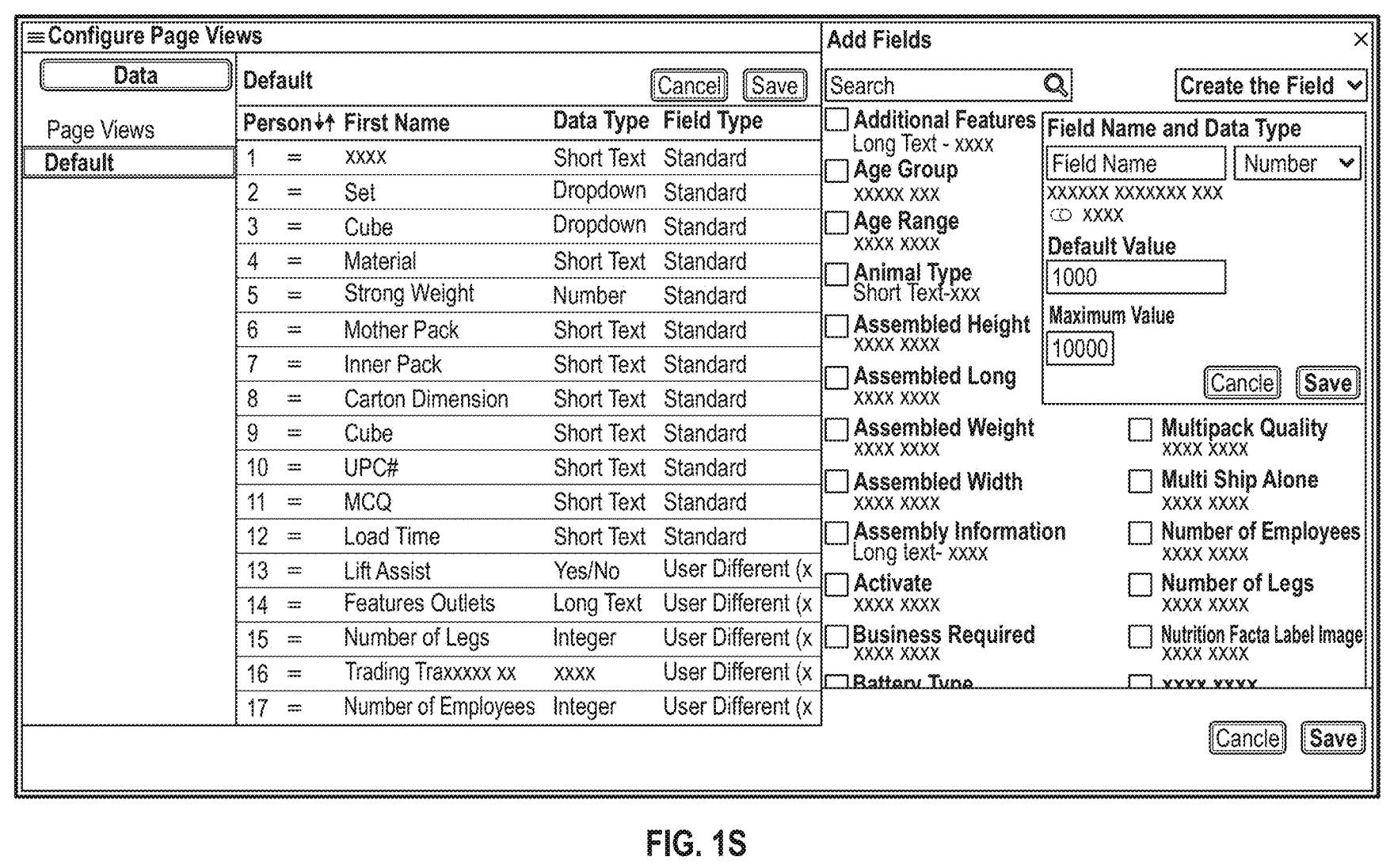
Figure 1T:
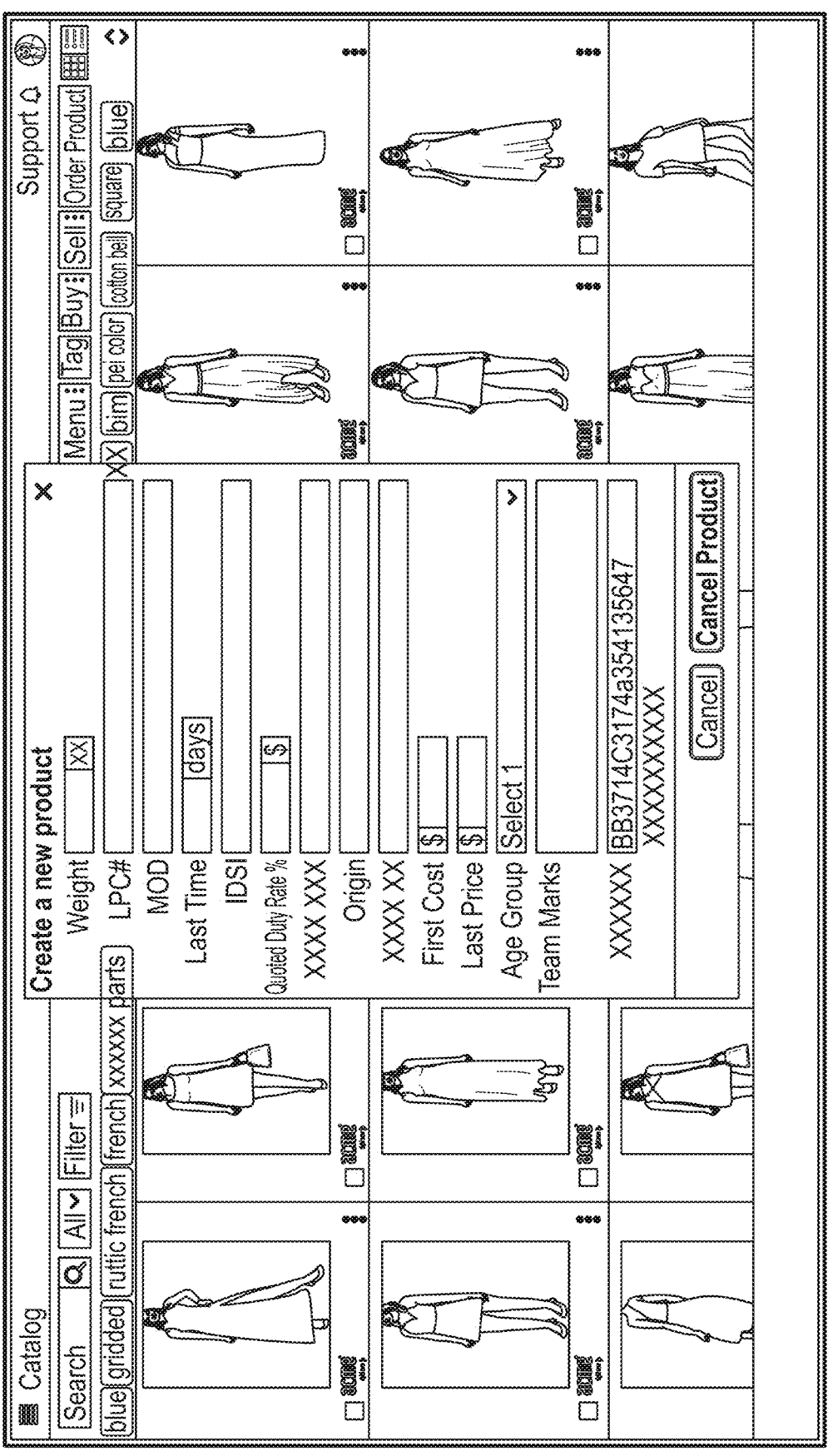
Figure 1U:
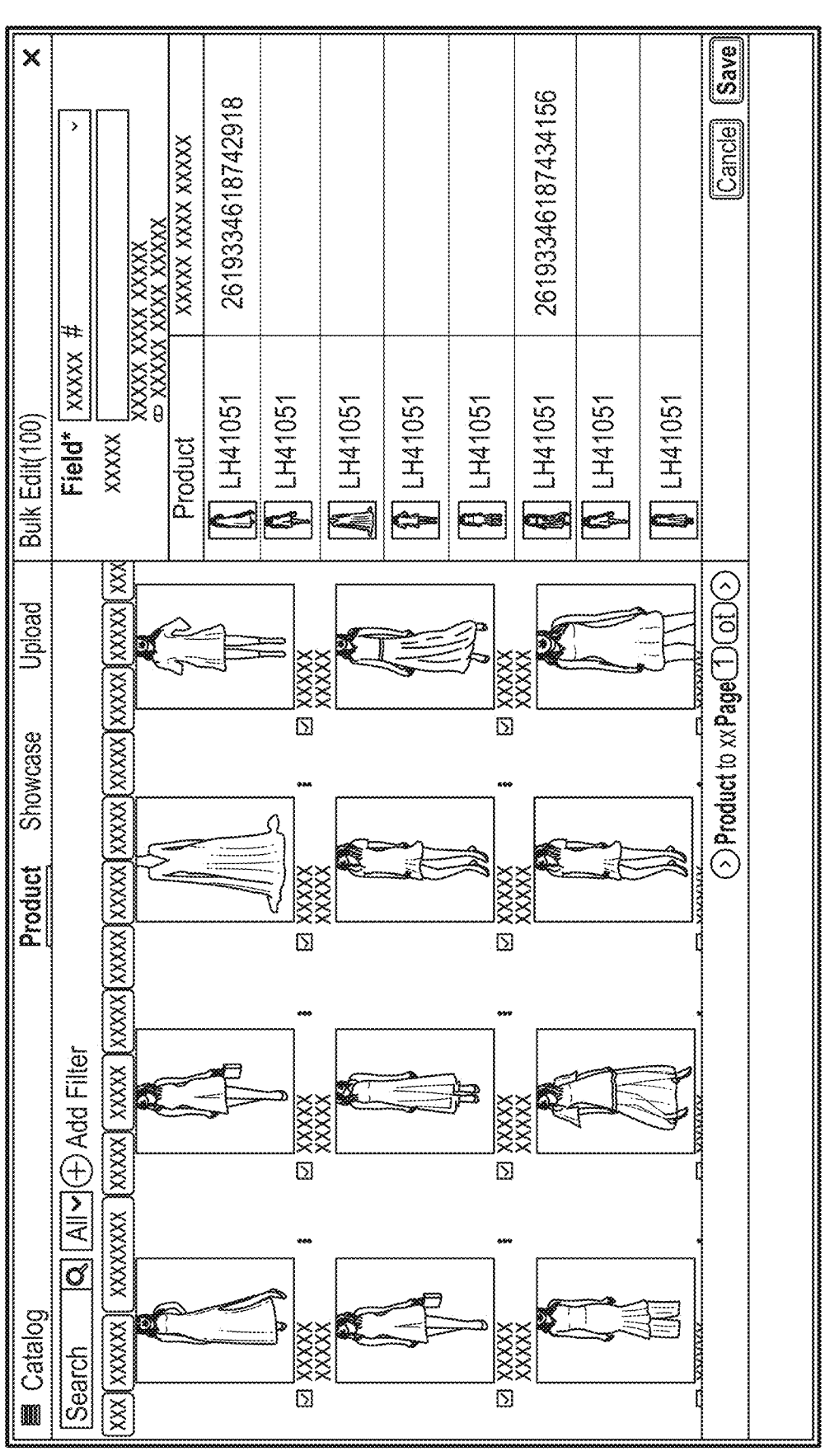
Figure 1V:
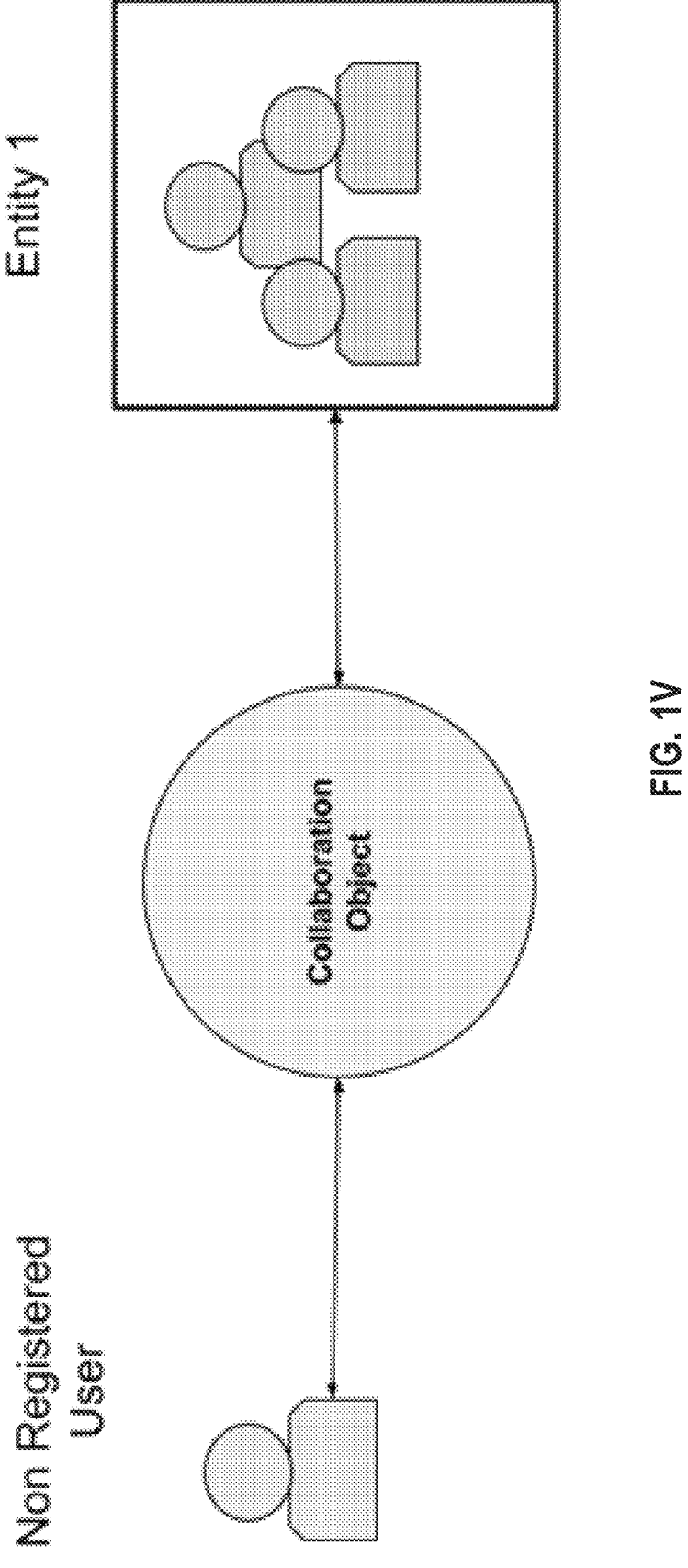
Figure 1W:
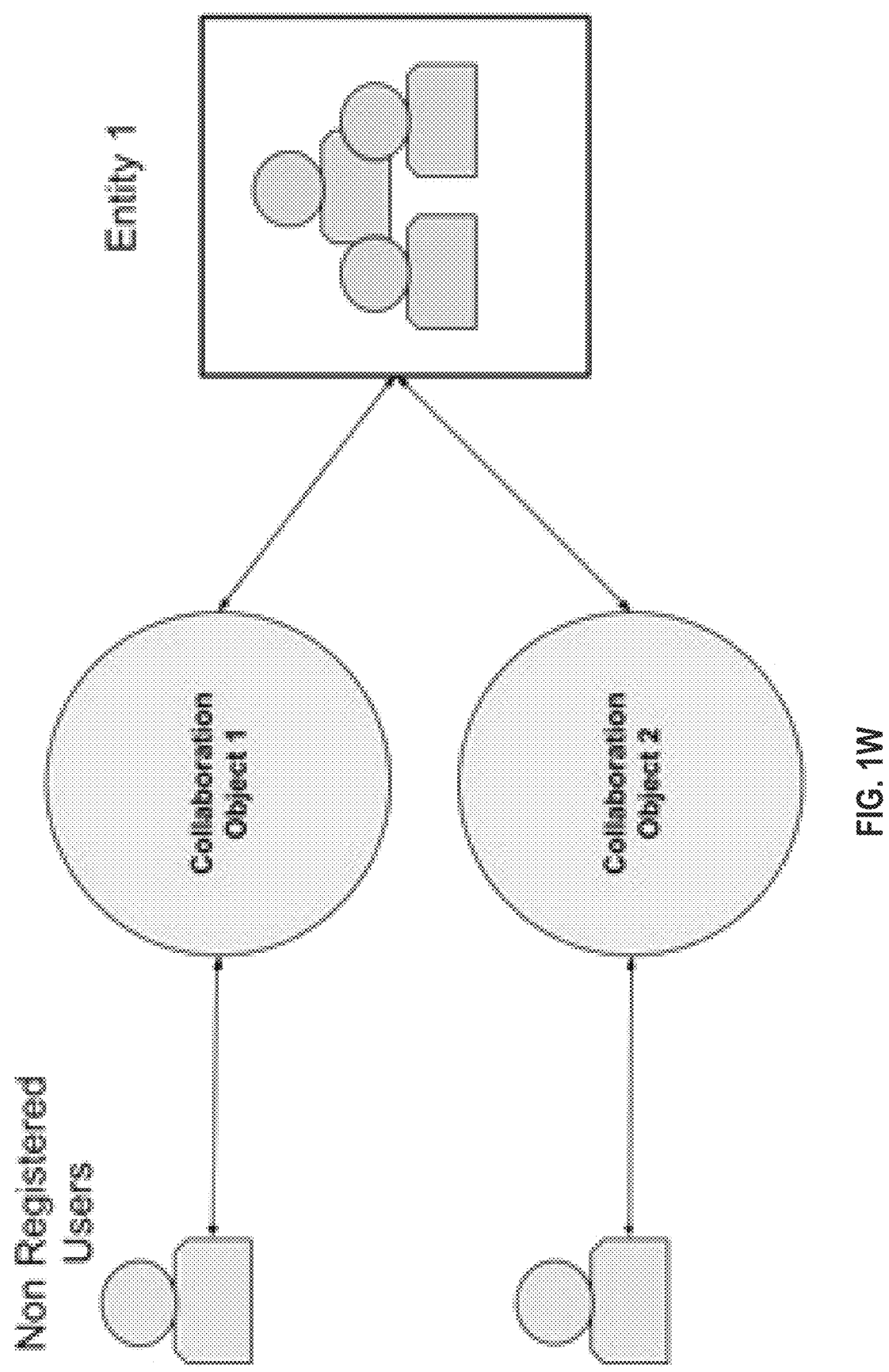
Figure 1X:
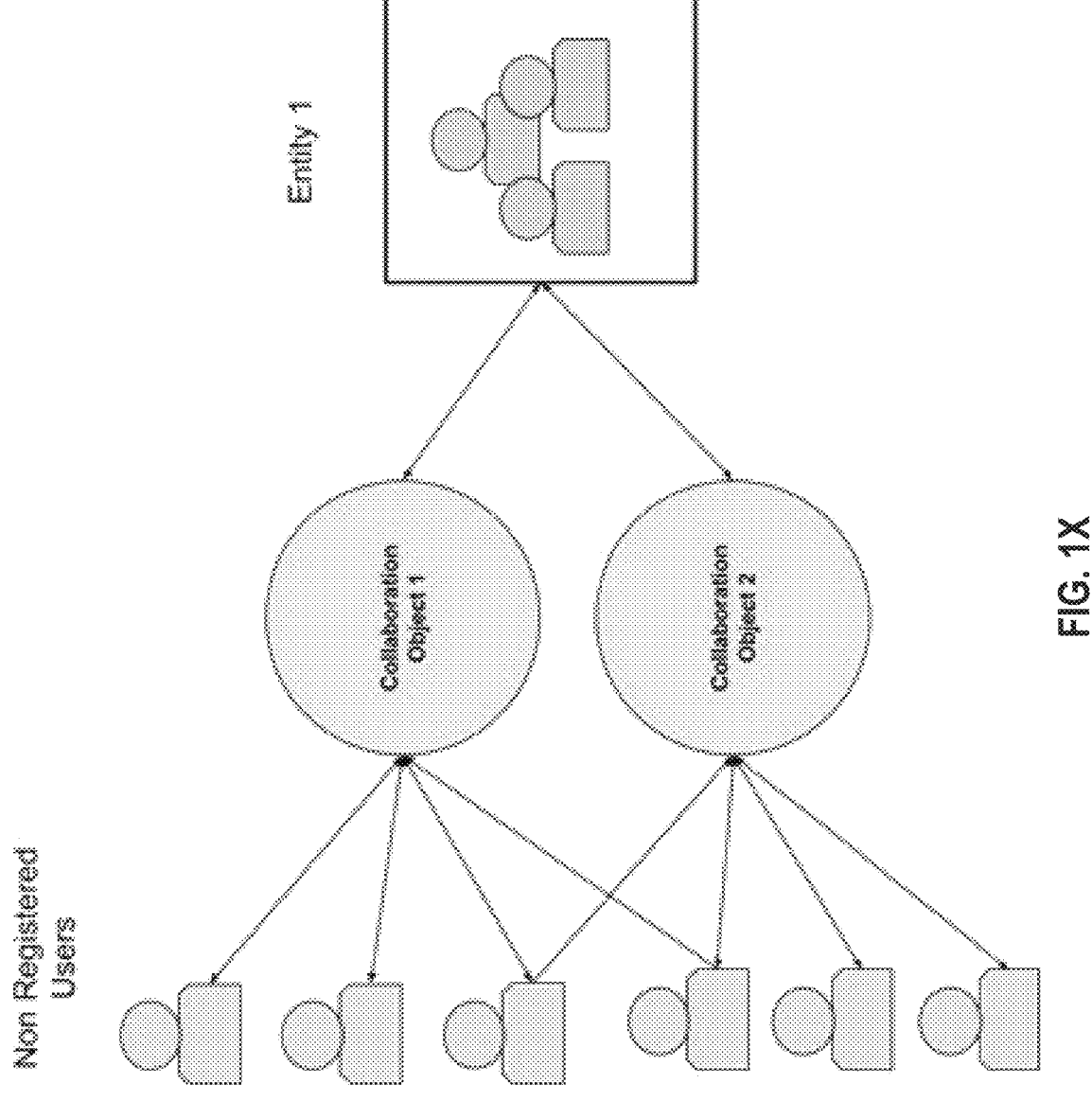
Figure 1Y:
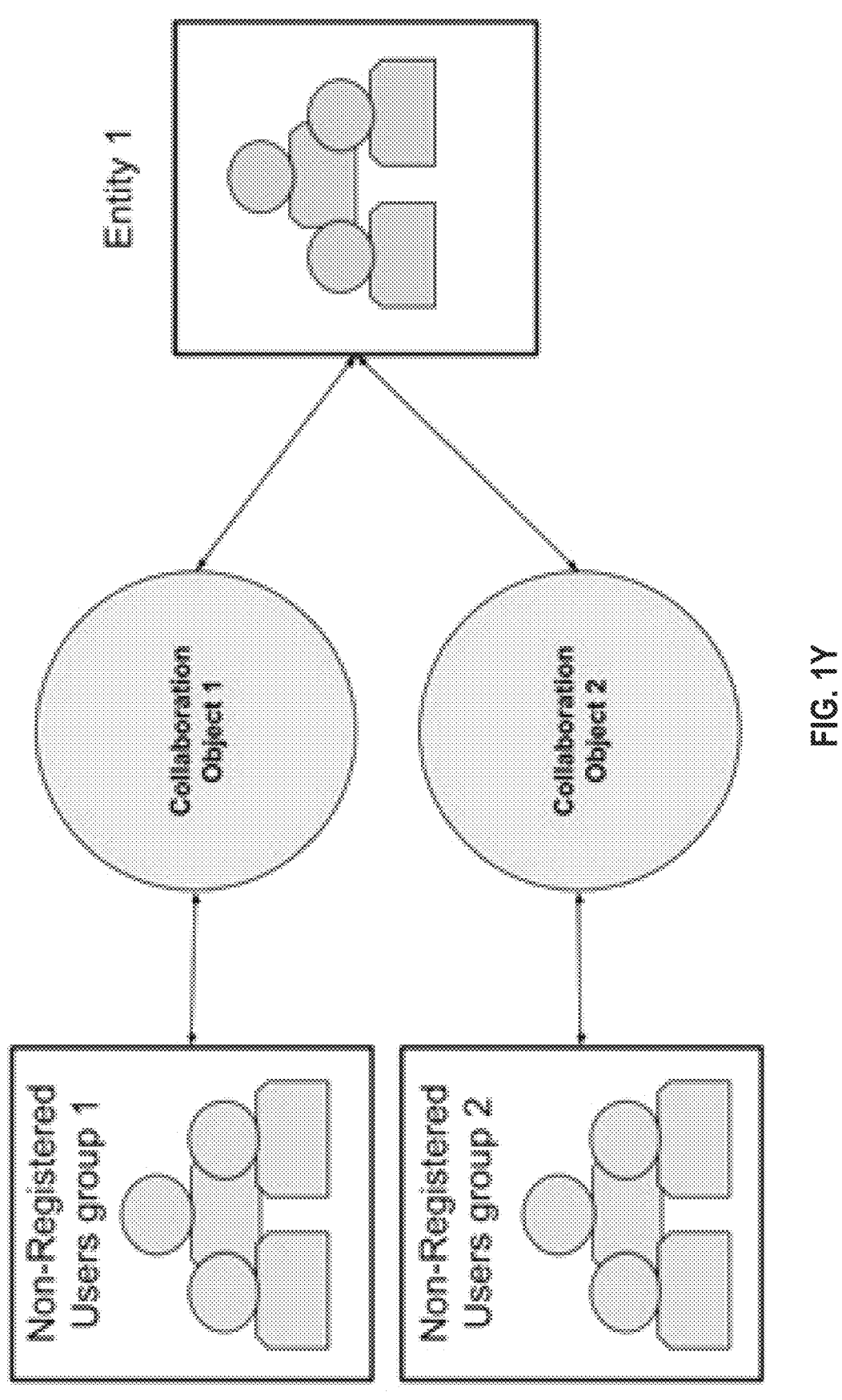
Figure 1Z:
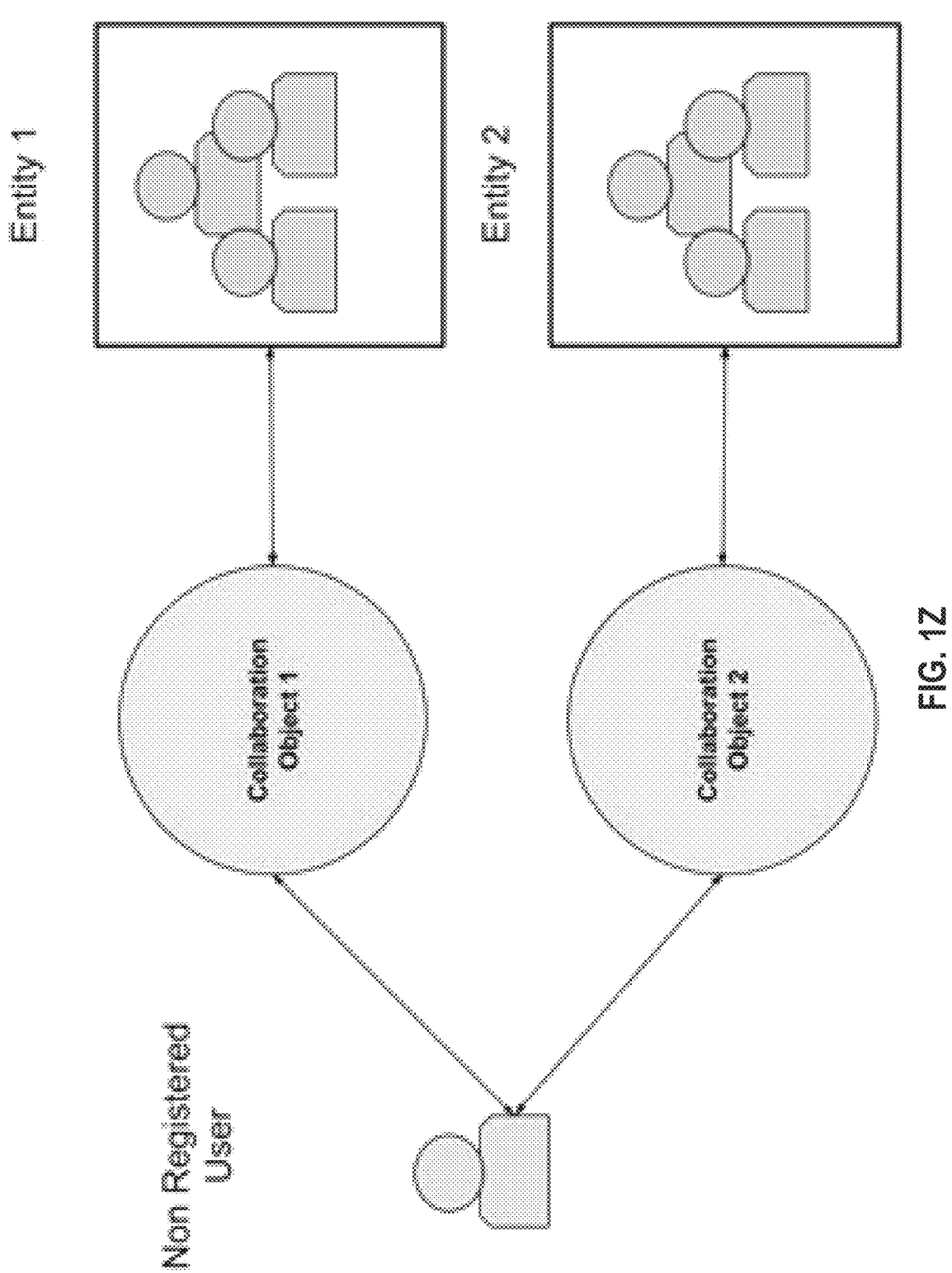
Figure 1A:
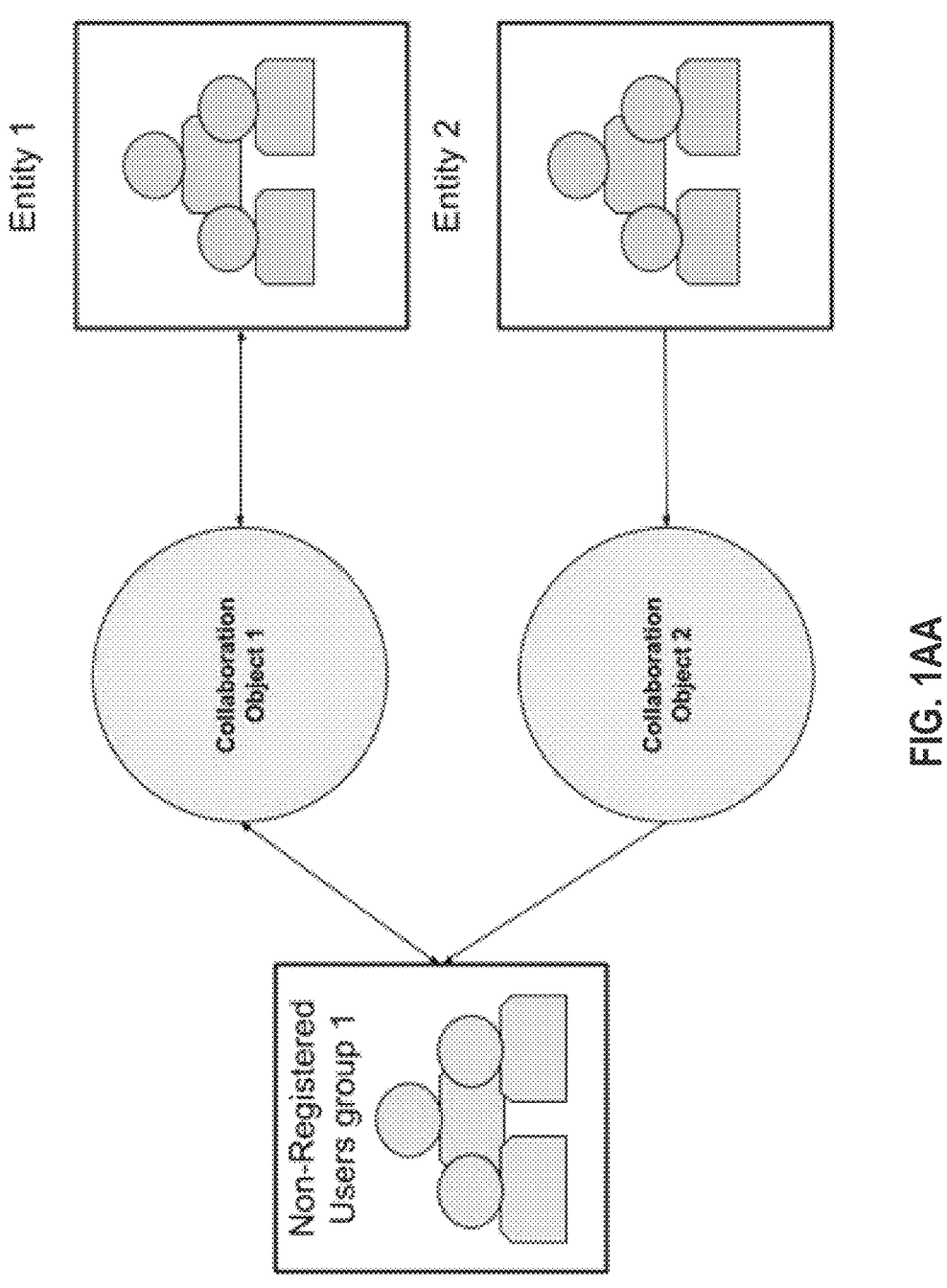
Figure 1B:
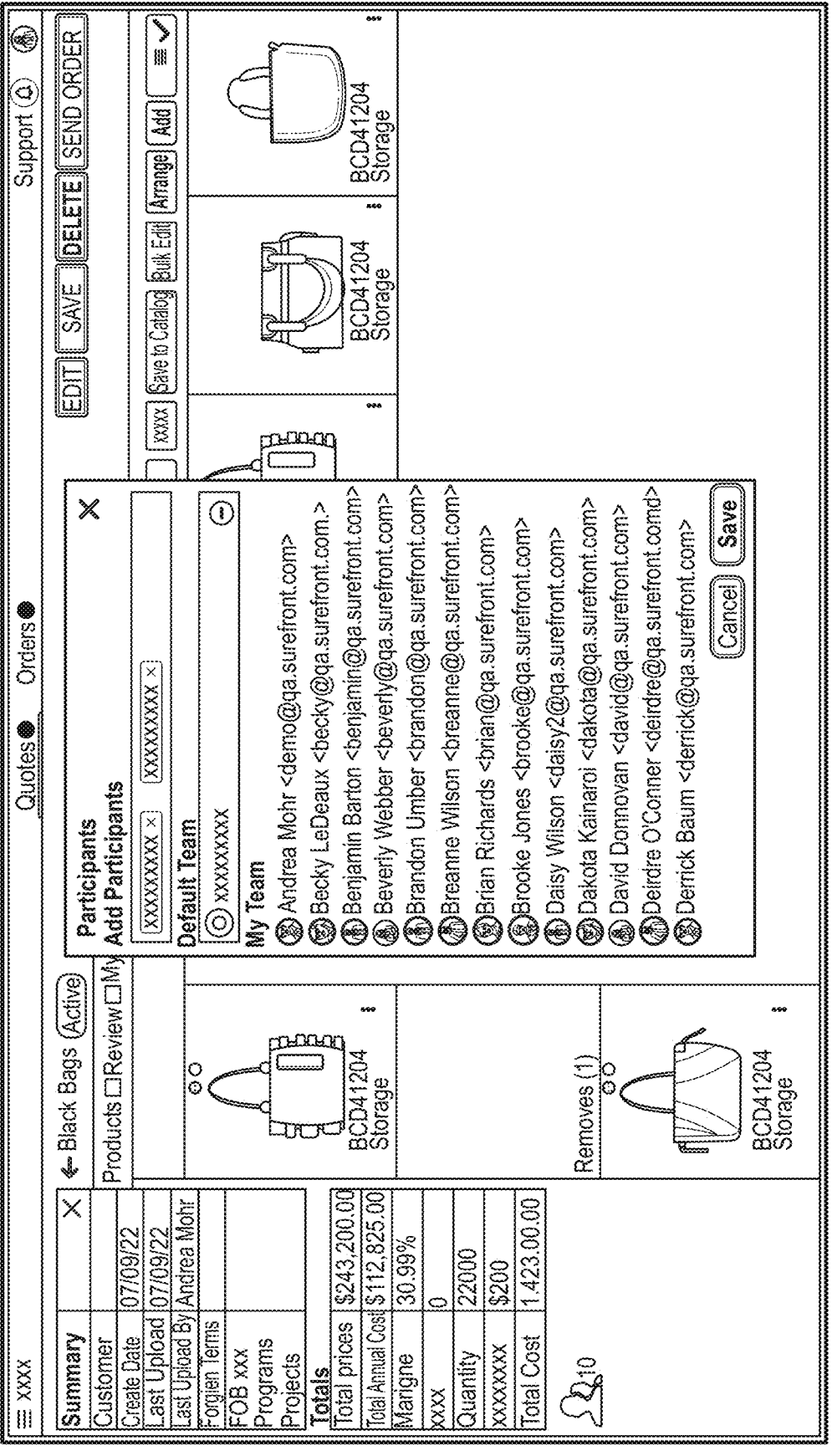
Figure 1C:
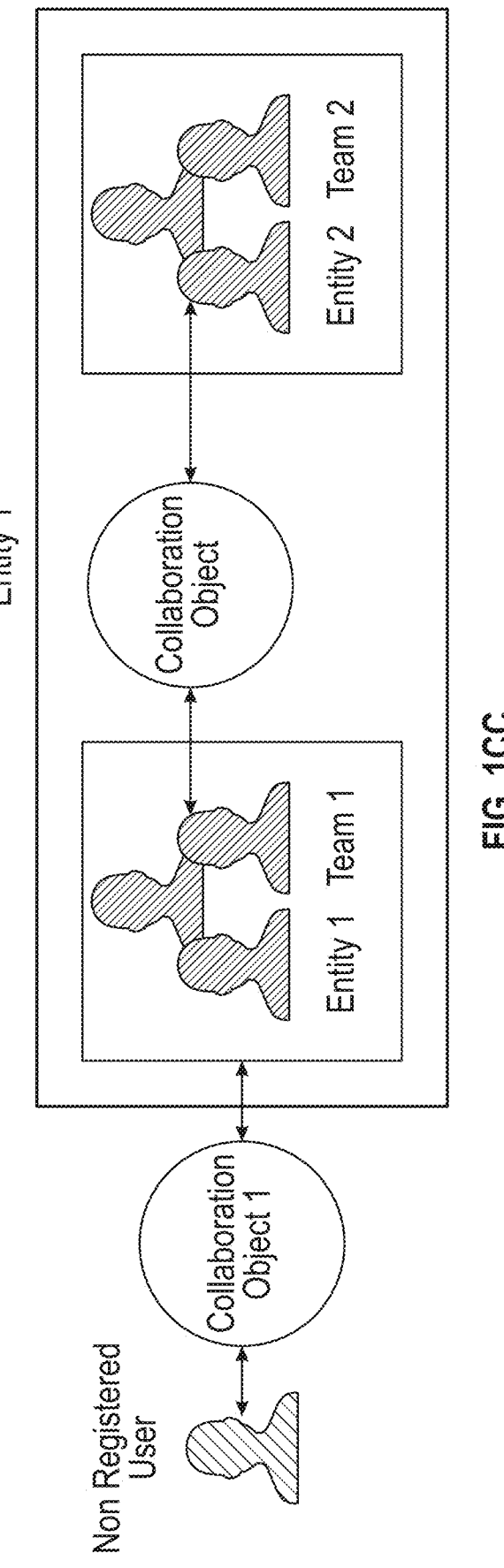
Figure 1D:
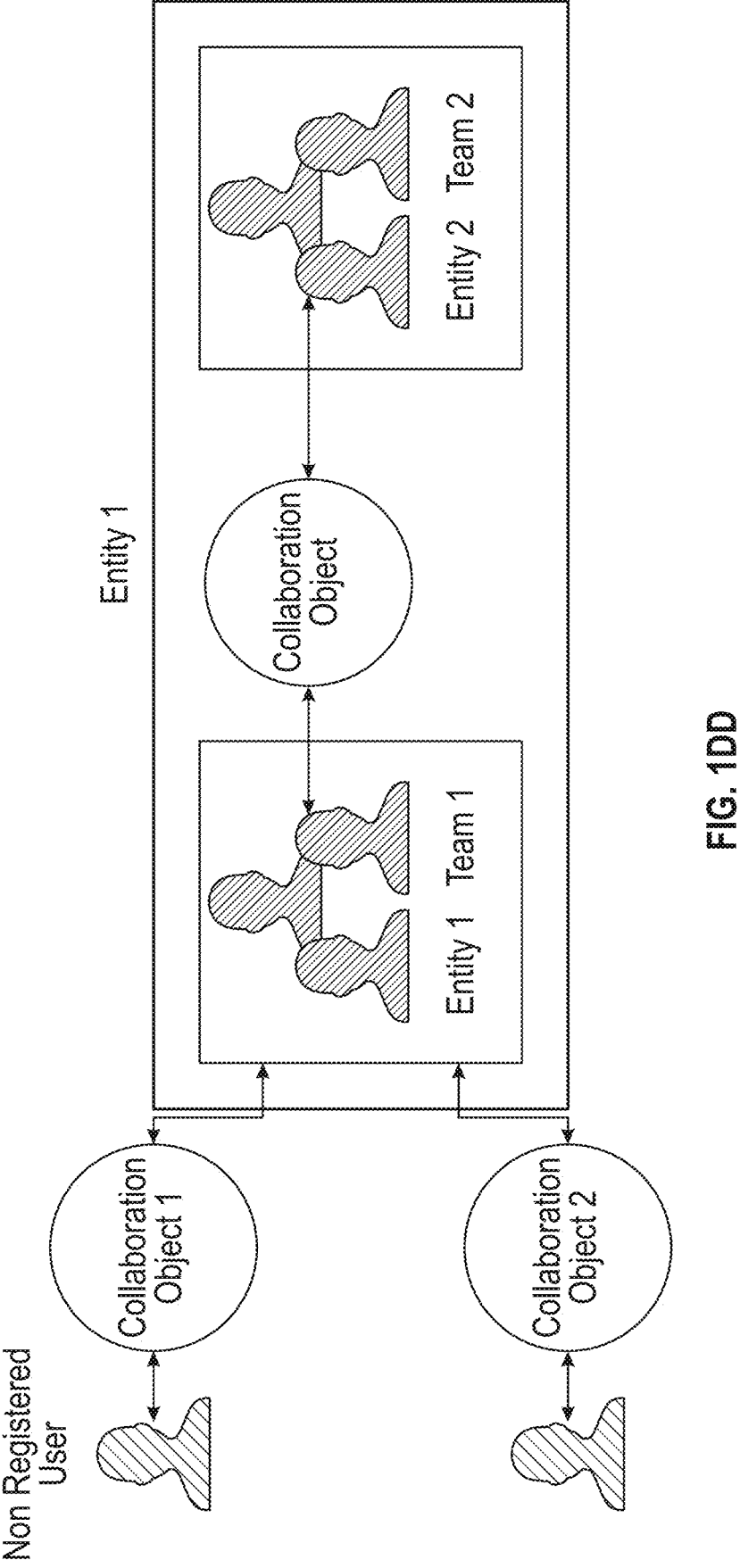
Figure 1E:
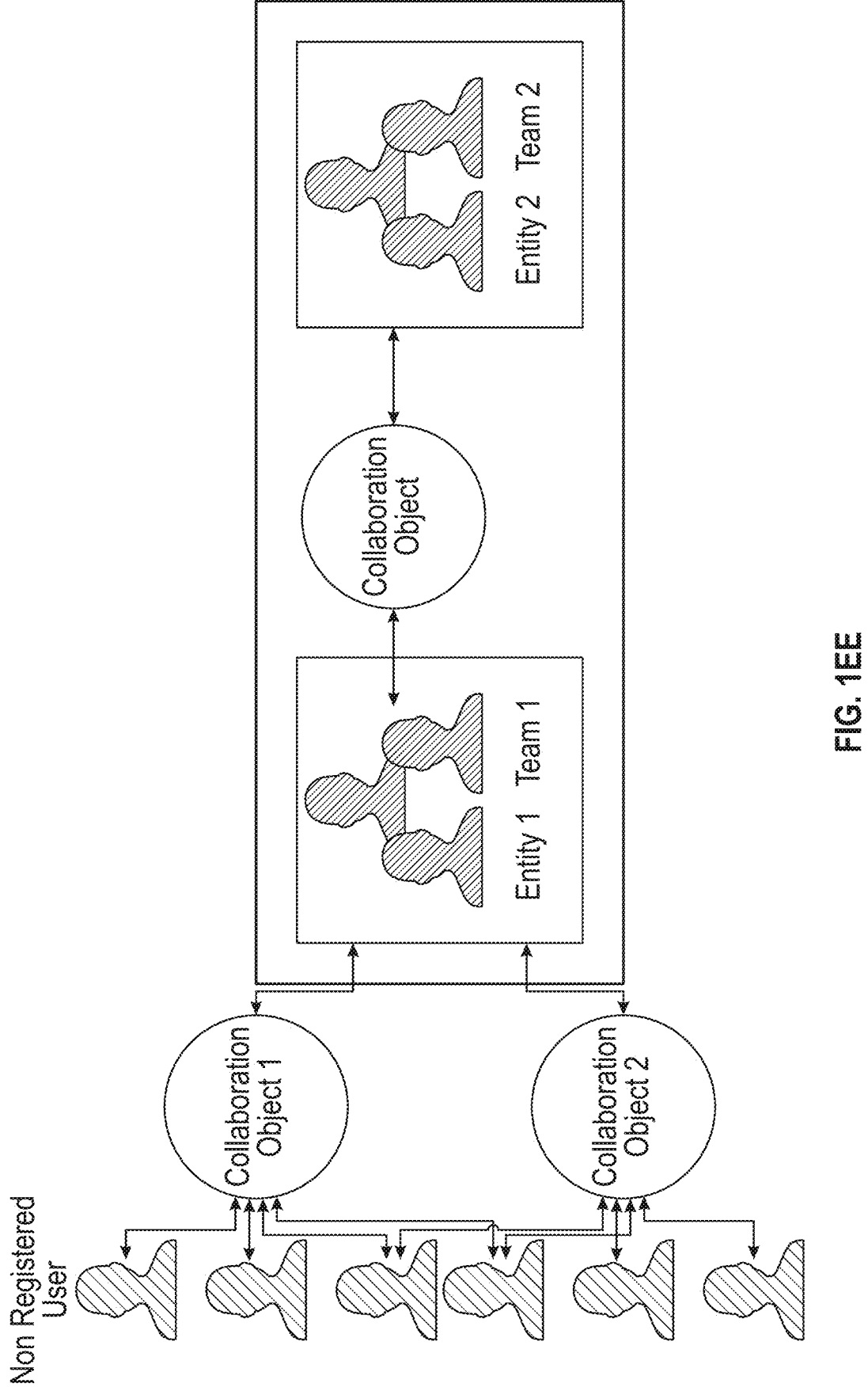
Figure 1F:
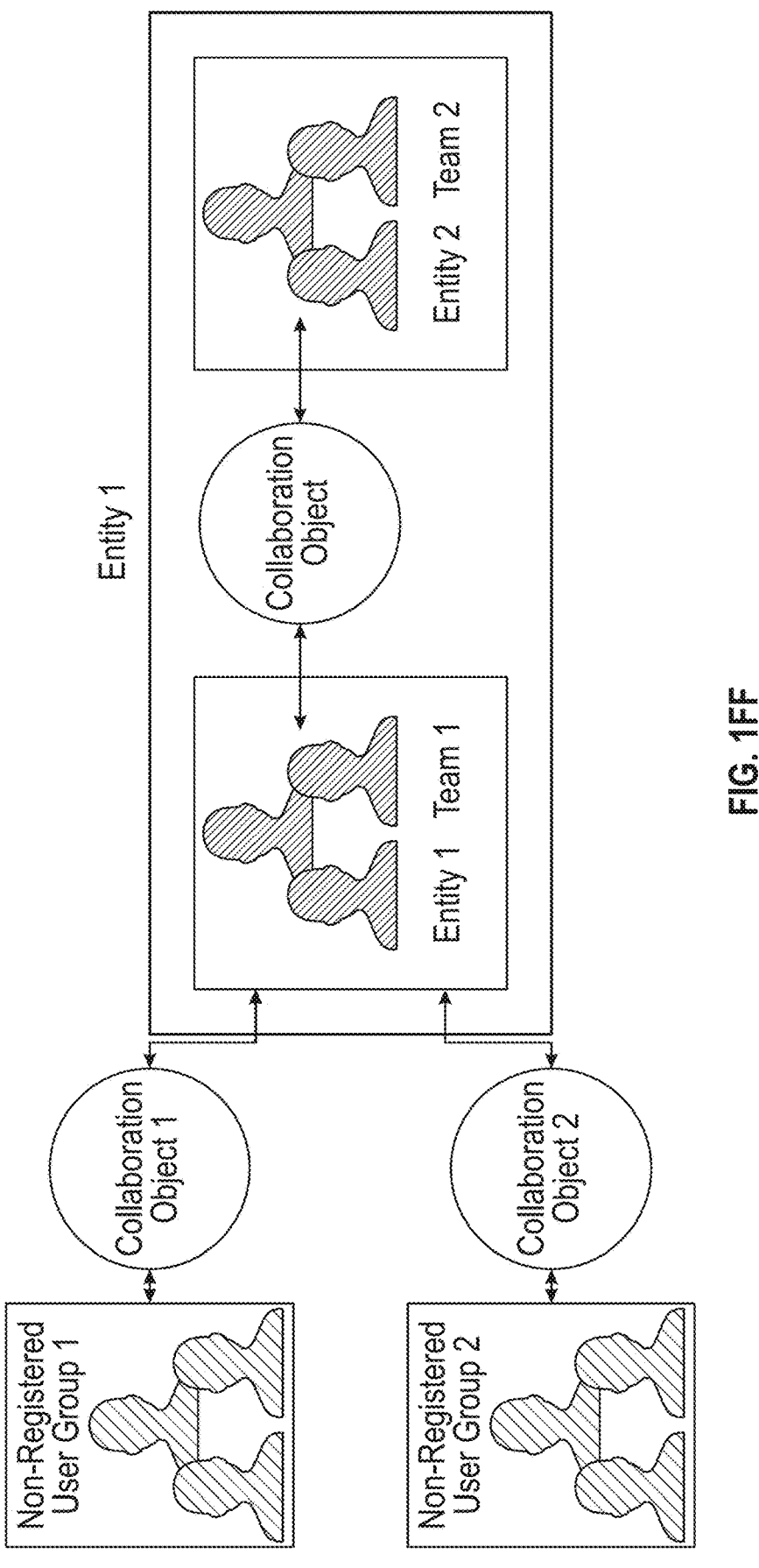
Figure 1G:
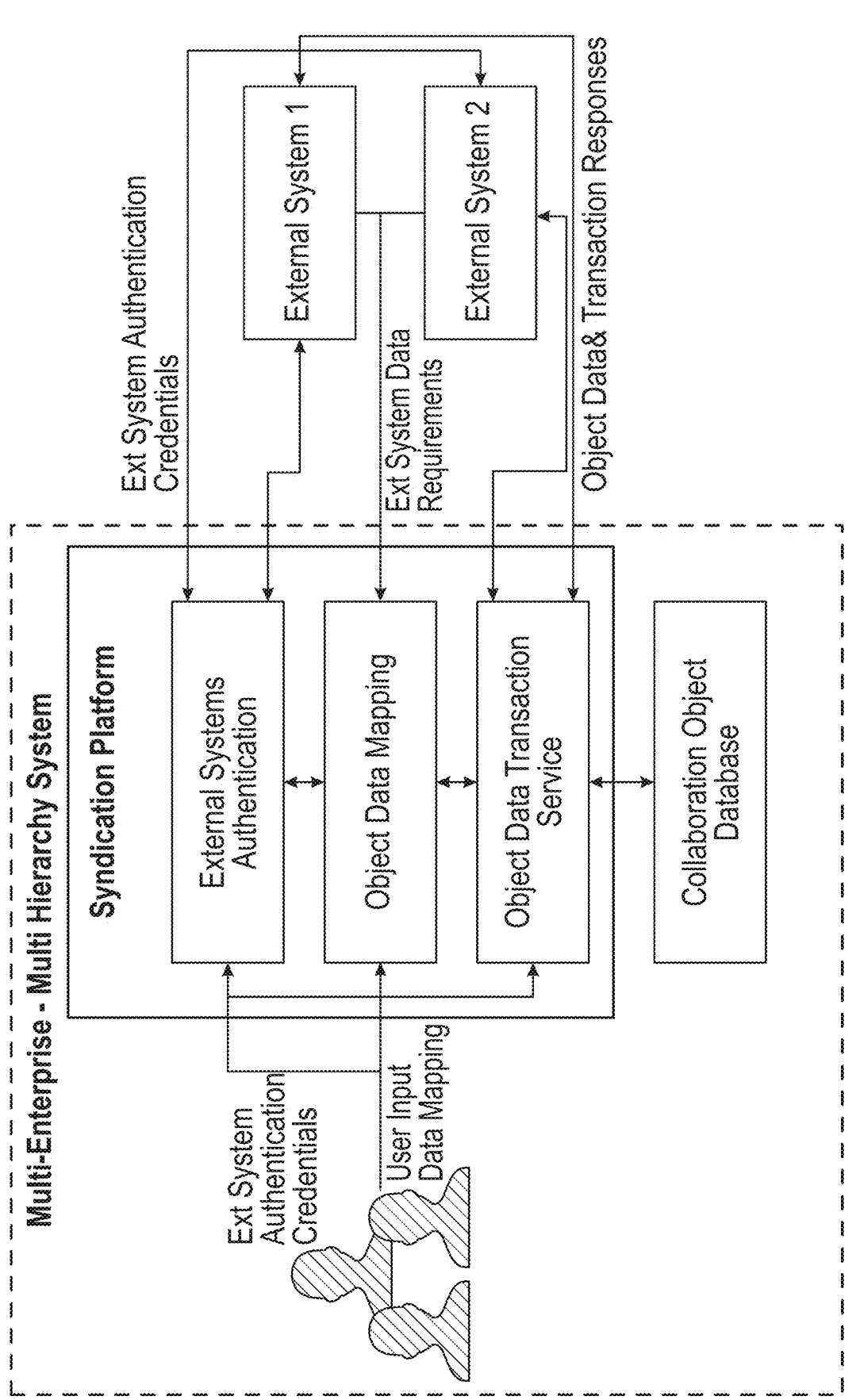
Figure 1H:
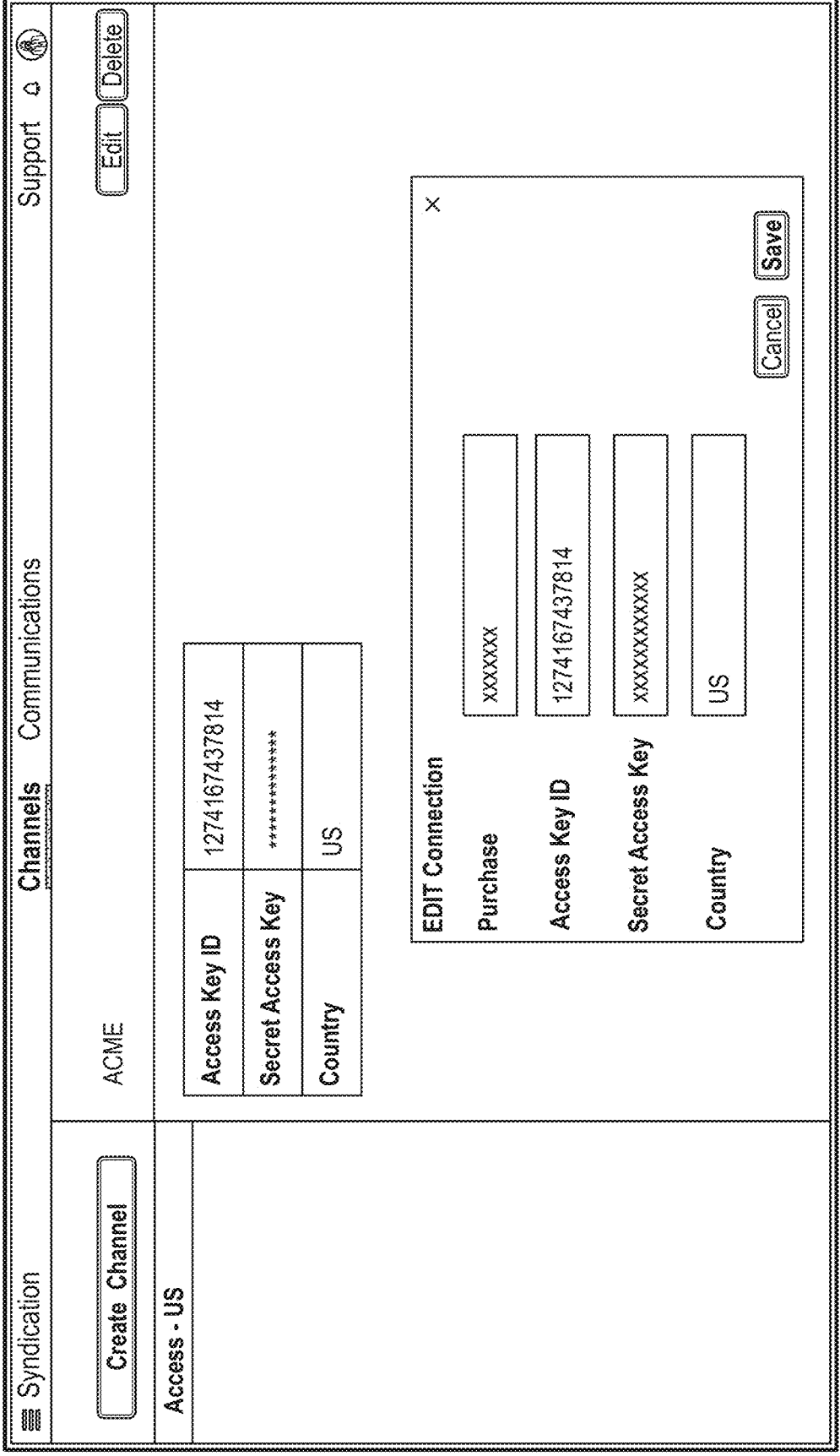

As illustrated in FIGS. 1C, 1D, 1E, as a platform configured to be utilized by many different entities, the communication/collaboration system enables users to set up their account and rules by incorporating their organizational hierarchy as conditionally accessible nodes into the communication/collaboration system. The hierarchy and associated permissions and access rights may be specified by an authorized user via a user interface. Permissions and access rights may be assigned to a role, rather than a particular user. For example, a given position on the hierarchy may be assigned certain permissions and access rights. A user may then be assigned to the given position and will inherit those permissions and access rights. If the user then is no longer in the given position (e.g., the user quits), and a new user is assigned to the given position, the new user will inherit the position permissions and access rights and the old user will lose those permissions and access rights.

For example, with reference to FIG. 1C, a given organization may have multiple levels of hierarchy. The hierarchy of entities A1, A2, A3 or A4 in FIG. 1C may be any hierarchical structure (e.g. a hierarchical structure that fits a business structure). The hierarchy may represent an organization chart or a hierarchical structure derived from the organization chart. The hierarchy may represent a hierarchical structure not related to the organizational chart such as a hierarchy representing a supply chain, for example, a hierarchy of a customer list, or a hierarchy of a supplier list by way of illustrative example. A given hierarchy level may correspond to a given authority (e.g., management) level. A given branch of the hierarchy may correspond to a department, business unit, or the like. For example, roles B, C, and D (to which respective users are assigned) may be members of a first department (where role B is a supervisor role with respect to roles C and D), roles E, F, G may be members of a second department (where role E is a supervisor role with respect to roles F and G), and roles H, I, J may be members of a second department (where role H is a supervisor role with respect to roles I and J). Users assigned to a supervisor role may be provided with access to all of the data and communications of each of their subordinates but not of the subordinates of other supervisors on the same hierarchy level. Further, users assigned to roles on a lower hierarchy level may not be able to access all the data and communications of users assigned to roles on a relatively higher hierarchy level. As illustrated, a given user (e.g., assigned to roles C, D, F, G, I, or J) of an entity may be permitted to communicate with one or more users of one more other entities and not other entities or other users.

Thus, a complex yet flexible hierarchy may be implemented that provides data security to safeguard valuable data (e.g., confidential pricing data, purchase data, corporate data, etc.) to ensure that only a user (e.g., an employee) with the proper hierarchy level and/or permissions may access the data. For example, a user assigned to a high level role (node) in the hierarchy has more access privileges to data and communications than users assigned to a lower level role (node) in the hierarchy. Thus, higher level roles in the hierarchy may be permitted access to the data and communications of users assigned lower level roles in the hierarchy, but not vice versa. For example, referring to entity A1 in FIG. 1C, users assigned to Role B in the illustrated hierarchy may access all data and communications of users assigned to Roles C and D, but users assigned to Roles C and D may not access data and communications of users assigned to Role B.

Referring to FIG. 1D, a given node contains information, artifacts, and communications (e.g., organized as communication/transaction threads) that are conditionally accessible by users. Within an entity, access to a given node is set by an authorized entity administrator and is subject to a hierarchical inheritance scheme determined by the nodes comprising the organizational hierarchy as similarly discussed above. By way of illustrative example, across internal organizations, a buy side company administrator may designate which nodes a given sell side company can access, and authorized sell side company administrators may then designate which users within the sell side company can access those nodes.

After organizational hierarchies are established, buy side companies have been connected to multiple sell side companies via a given node, and users for both companies have been assigned access, users generate information, artifacts, and communication within that node that are contained within (associated with) that node. The communication/collaboration system enables a given user's permission to access a given node to be removed (e.g., by an administrator or manager) and enables granting, to new users, access to the system. The communication/collaboration system further enables granting to new or existing users access to all or select items of information, artifacts, and/or communications generated by users (e.g., generated during the entire existence of the node or a select time frame thereof). For example, as discussed above, access and permissions may optionally be assigned on a role-basis, wherein if a user's role changes the user's access and permissions may likewise change.

By way of illustration and with reference to FIG. 1D, Ryan, Claire and Ryan, Claire, Katy, Alex, Brittany, and Luke are granted access to communication/transaction threads 5 and 11.

With reference to the table illustrated in FIG. 1E:
Ryan is granted access to node 1,
Ryan and Claire are granted access to node 2,
Ryan, Claire and Jenny are granted access to node 3,
Ryan, Claire and Katy are granted access to node 4, and so on.

With reference to FIG. 1F, links are illustrated in the context of an organization acting in a buy function and an organization acting in a sell function. The communication/collaboration system may optionally be configured so that the one-to-many/many-to-one type relationship in the connection of multiple sell side companies to a node of a given buy side company enables users of the buy side company to access information, artifacts, and/or communications generated by many sell side companies that are connected to the given node (sometimes referred to herein as a "Channel"), while sell side company users are only provided access to information, artifacts, and communications generated by their own users or buy side users (sometimes referred to herein as a "Threads") and not those of other sell side companies.

Users of the communication/collaboration system may collaborate with each other on collaboration objects, such as products, request for quotation (RFQ), quotes, purchase orders, shipments, invoices and payments, and other business objects. Collaboration objects may correspond to elements of business workflows between entities.

The communication/collaboration system may be object oriented in that the system is configured to streamline workflows around common collaboration objects. Advantageously, optionally the system is contextual, in that both data and communications specific to a collaboration object may be stored together and presented side by side via the same user interface, so users can view the details and history of the communications, and a given attribute of collaboration objects. Hence, communications regarding a collaboration object may be associated with and/or presented with the data of the same collaboration object in an object-oriented fashion. This is in contrast to conventional approaches where data and communications are stored and presented via separate systems, via separate user interfaces, in a traditional IT infrastructure. For example, conventionally data may be stored in such business applications as ERP (enterprise resource planning), CRM (customer relationship management), PLM (product lifecycle management) systems, while communications are separately stored in emails (e.g., OUTLOOK, GMAIL, etc.), chat messages (e.g., MICROSOFT TEAM, SLACK, GOOGLE CHAT, etc.), video conferencing (e.g., ZOOM, MICROSOFT TEAM, etc.). Conventionally, to sort out the relevant communications related to a collaboration object, a user has to manually search through and read many email threads and chat messages, taking an inordinate amount of user time and computer resources.

Referring to FIG. 1O, a conventional group-based communication system typically has a flat communication architecture rather than the complex, multilevel hierarchical communication architecture disclosed herein (see, e.g., FIG. 1C). In contrast to the complex, multilevel hierarchical communication architecture illustrated in FIG. 1C, entities A1 and A3 do not have hierarchical layers and instead have flat organizations with a single level as would be found in a group-based communication system, where nodes F and I of entity A1 are connected to nodes N and R of entity A3. However, it should be understood that the present system enables different levels of hierarchy to be defined, including a single level, so that the disclosed system is backward compatible with group-based communication systems, although conventional group-based communication systems are not upwardly compatible with multilevel hierarchical communication architectures.

Further, disadvantageously, collaboration objects are not built in the architecture of a conventional group-based communication system (e.g., MICROSOFT TEAMS, SLACK, etc.). Because collaboration objects are not built in the architecture of a conventional group-based, collaboration objects may need to be added to the conventional group-based communication system via attachments or complex, failure prone integrations to third party applications such as an ERP system. For example, a collaboration object, such as a purchase order, may be attached to a chat message in a group-based communication system, such as SLACK. In another example, a purchase order may be pulled from a business application, such as Microsoft DYNAMICS, into a group-based communication system, such as MICROSOFT TEAMS, via integration. On the surface, it may appear that both data (e.g., a purchase order) and communications (chat messages) are associated in the group-based communication system, just as a purchase order may be attached to an email communication.

Practically, however, it is very difficult for a user of a group-based communication system to search and identify all data and communications of a collaboration object, such as a purchase order, which may exist in dozens if not hundreds of email threads or chat message threads across many channels and on multiple platforms. A typical user may be able to subscribe to no more than 100 channels in a chat message system, but the same user may have to work on hundreds or thousands of collaboration objects such as products, quotes, purchase orders, and/or other objects in his/her job function. The disclosed object-oriented communication/collaboration system naturally contextually ties communications to the collaboration object providing much better functionality and greater ease of use and deeper visibility than conventional group-based communication systems.

Further, by utilizing a hierarchical communication architecture, a user can opt to view a log at a high level of the hierarchy, which will have relatively few members and communications, and may then navigate to a desired lower level-hierarchy to view corresponding communications and collaboration objects, rather having to view all communications and objects at the same time.

With reference to FIG. 1G, an example thread cross section is illustrated. In this example, the information contained within a given thread is comprised of object(s) and communication(s), generated by buy side company users and sell side company users. The communication in a thread is organized by object (e.g., program, product(s), purchase order(s), and/or the like) to provide useful context for the communication.

With reference to FIG. 1H, within a given Channel and Thread are functions to support or enable a buy/sell process (e.g., a buy/sell process for retail purchasing and wholesale selling). These functions may include some or all of the following: programmatic buying planning, request for proposal like specification sharing, offering of goods, negotiation and customization of goods for the buyers, ordering, and/or the like. Access to such functions for a specific channel or thread may be governed by the hierarchical permissions of the organizations as discussed elsewhere herein.

With reference to FIG. 1I, the communication/collaboration system optionally integrates functions and features that enable a retail buying/wholesale selling process and that enables access to tools and related information, artifacts, and communications to be governed by hierarchical structures of multiple organizations so as to accommodate the needs and sensitivity of each organization.

With further reference to FIG. 1I, in this example, the supplier may export data (e.g., product data, catalog data, etc.) from its ERP system and upload the data to the communication/collaboration system. the communication/collaboration system may store the uploaded data in the communication/collaboration system data store. Using interfaces provided by the communication/collaboration system and the uploaded catalog data, a supplier user with the appropriate permissions and access rights may generate an offer and transmit the offer to a buyer (e.g., a retailer) via the communication/collaboration system. The offer may include an offer identifier, a product identifier, a product description, product attributes, product pricing, product delivery times, and/or other information, as discussed elsewhere herein.

Many suppliers may be similarly generating offers and transmitting the offers to the buyer via the communication/collaboration system. A buyer user (with the appropriate permissions and access rights), may browse through the offers and view the offer details via an interface provided by the communication/collaboration system (discussed in greater detail elsewhere herein). The interface may also be configured with formulas enabling the buyer user to calculate such data as estimated landed cost, margin, estimated retail price, and/or other data. The buyer user may then communicate (e.g., via text message, photograph, video, form field changes, or otherwise) questions or desired changes (e.g., change in color, configuration, price, etc.) via the communication/collaboration system as part of a negotiation process with respect to the offer. The supplier receives the buyer communication and may accept the changes, refuse the changes, or propose different changes (e.g., compromise changes). The negotiation process may be repeated one or more times. The buyer may then generate an order via a corresponding user interface provided via the communication/collaboration system which may specify products, quantity, ship date, case pack/cube dimensions, unit price, total price, etc. The order may be transmitted via the communication/collaboration system to the supplier who may accept the order or request changes to one or items in the order (e.g., change in ship date, quantity, etc.). If the supplier accepts the order, the sales order is exported and transmitted to the buyer and uploaded to the supplier's ERP system. The buyer receives the order, approves the order, and exports a corresponding purchase order to the buyer ERP system.

With reference to FIG. 1J, an example communication/collaboration system architecture is illustrated with example components. As similarly discussed with reference to FIG. 1B, the example communication/collaboration system architecture may include a front-end application (optionally implemented using a user interface library for building web applications out of components, such as REACT, and served from a cloud system). An SSL layer may be provided to enable secure communications between the front end and a cloud-based web computing service (e.g., EC2) which may be used to provide the backend processing (see, e.g., FIG. 1B). Optionally, the cloud computing service may provide resizable computing capacity. A database, cache and/or message broker/web sockets broker (e.g., REDIS) may also interface with the cloud-based web computing service. A search engine (e.g., ELASTICSEARCH) may be provided that is deployed via the cloud-based web computing service. For example, the search engine may be a distributed, multitenant, full-text search engine with an HTTP web interface and schema-free JSON documents. The search engine may be configured to process query and return search results, such as those discussed elsewhere herein. A relational database (e.g., POSTGRES RDS) may also be provided that is deployed via the cloud-based web computing service. As discussed above, optionally in addition or instead, a non-relational database (e.g., NoSQL) may be used.

As discussed above, different users at different hierarchies of a given organization may be assigned different permissions and access rights. Further, when users at different organizations are collaborating on an object (e.g., a transaction process involving the supply and acquisition of a product), a first user at a first organization may be permitted to view a first set of data related to the object that a second user at a second organization is not permitted to view, the second user at the second organization may be permitted to view a second set of data related to the object that the first user at the first organization is not permitted to view, and both the first user and the second user may be permitted to view a third set of data related to the object. However, not all of the first set or the third set of data may be of interest to the first user throughout the entire transaction process. Similarly, not all of the second set of data and third set of data may be of interest to the second user throughout the entire transaction process. Further, still different sets of object-related data may need to be presented to other users at the first organization and the second organization based on their respective hierarchy levels and associated permissions and access rights. Thus, using conventional techniques, the process of determining what data to present to who during a transaction, and then rendering user interfaces with such data, is burdensome with respect to processor and memory utilization.

Thus, as noted above, in order to address the foregoing challenges, a given virtual page may be generated (and maintained in memory) that is associated with a given object (e.g., a project or transaction). With reference to FIG. 1L, the virtual page may include different modules (Module 11 . . . Module nn) used to present different types of data. For example, a first module may be used to present the seller margin on a product that is the subject of a transaction process, a second module may be used to present the buyer margin on the product, and a third module may present a freight on board (FOB) location. By way of further example, a given module may be used to present inter-entity communications between a first entity and a second entity related to a collaboration, another module may be used to present intra-entity communications between users at the first entity, and another module may be used to present intra-entity communications between users at the second entity. The data presented by one module (e.g., intra-entity communications between users at the first entity) may be confidential and not intended to be viewed by a user of the second entity, while other data (e.g., inter-entity communications between the first entity and the second entity related to the collaboration) may be shown to both the first and second entities. Similarly, intra-entity communications between users at the second entity may be confidential and not intended to be viewed by a user of the first entity. Still further, the data presented by a given module may not be of particular interest during certain steps of the transaction process.

When multiple users are collaborating on the same object, each time new data and/or data types are to be displayed to users, the communication/collaboration system may optionally determine which entity a given user is associated with, which user(s) at a given collaborating entity the given user is collaborating with, the permissions associated with a given user, the job function of a given user, and/or the current position of the transaction process (e.g., offer generation, negotiation, purchase order generation, etc.). The communication/collaboration system may use some or all the foregoing information to determine what data is to be shown to a given collaborating user. The communication/collaboration system may then determine which modules of the virtual page are to be displayed to a given user. The modules may then be rendered with the corresponding modules and module data (which may already have been present in the virtual page) via a terminal display of a given user.

An example rendering process will now be described with reference to FIG. 1K. At block 202A a user 'A' accesses the communication/collaboration system (e.g., by logging in). The process determines which entity (e.g., organization 'A') user 'A' is a member of. At block 204A, user 'A's' function is determined. For example, the function (e.g., sales agent, purchasing agent, sales supervisor, purchasing supervisor, etc.) may be determined by the position of user 'A' in the organization hierarchy. The function may be determined from a user function database stored in the data store of the communication/collaboration system. Using the identified function of user 'A', at block 206A a determination is made as to the permissions and access rights granted to user 'A'. For example, the permissions and access rights granted to user 'A' may be retrieved from the data store of the communication/collaboration system. Similarly, at block 208A, a user 'B' accesses the communication/collaboration system (e.g., by logging in). The process determines which entity (e.g., organization 'B') user 'B' is a member of. At block 210A, user 'B's' function is determined. For example, the function (e.g., sales agent, purchasing agent, sales supervisor, purchasing supervisor, etc.) may be determined by the position of user 'B' in the hierarchy of organization 'B'. Using the identified function of user 'B' at block 212A, a determination is made as to the permissions and access rights granted to user 'B'.

At block 213A, the process determines the current position/state of the transaction process (e.g., offer generation, negotiation, purchase order generation, etc.). At block 214A a generated virtual page is accessed from memory. As discussed above, the accessed virtual page may include a plurality of modules displaying different sets or types of data. At block 216A, using the determined permissions and access rights of user 'A' and the determined transaction process position, one or more modules are selected from the virtual page for user 'A' (e.g., those modules that present data that user 'A' is authorized to view and that are relevant to the current transaction process position). Similarly, at block 218A, using the determined permissions and access rights of user 'B' and the determined transaction process position, one or more modules are selected from the virtual page for user 'B'. At block 220A the user interface is rendered for user 'A' using the modules selected for user 'A'. Similarly, at block 222A, the user interface is rendered for user 'B' using the modules selected for user 'B'.

Referring to FIG. 1M, four different user interfaces are rendered using modules selected from the virtual page illustrated in FIG. 1L. User interface 1M(a) with modules 11, 22, 31, and 32 may be rendered via the terminal display of user 'A'. User interface 1M(b) with modules 11, 22, 41, and 44 may be rendered via the terminal display of user 'B'. User interface 1M(c) with modules 11, 12, 22, 23, 31, and 32 may be rendered via the terminal display of a supervisor of user 'A'. User interface 1M(d) with modules 11, 22, 41,

42, 43 and 44 may be rendered via the terminal display of a supervisor of user 'B'. Thus, while there is a certain number of module overlaps for each user in this example, the users of one organization are present with modules not visible to users of another organization, and the supervisors are presented with all of the modules displayed to their subordinates and are also presented with additional modules.

Thus, different users within the same entity may see different subsets of the virtual page, with different data. Further, users at different entities may see different subsets of the virtual page, with different data. Thus, the foregoing process may advantageously use the same virtual page in rendering the different pages for the different users.

As similarly discussed elsewhere herein, optionally, the communication/collaboration system is oriented to providing solutions on an organizational level (e.g., retailer-type entities and supplier-type entities). The platform is configured to address the differences in how these different types of organizations structure themselves and enables explicit definitions of their relationships to each other. Once these relationships are defined within the platform, users from different companies (or other organization-types) may be granted access to interact with one another through these defined relationships (e.g., using Channels and Threads).

As discussed elsewhere herein, there may be multiple types of users within an organization, where different types of users may be assigned different responsibilities, levels of authority, and/or permissions. By way of illustrative example, a retailer may have users with the following titles/roles: retailer administrators, department managers, and category buyers, supplier companies have supplier administrators, sales managers, sales representatives, and/or the like. Examples of differences in their permissions and workflows are discussed herein. Example workflows correlating with different user roles are discussed herein.

In general and with reference to example user interfaces, the user interface navigation pattern provided by the platform may comprise a user choosing a specific workflow to which the user has been granted access (e.g., via a collapsible left navigation bar illustrated in relevant user interface), the states of the workflow may then optionally be distinguished (e.g., as tabs across the header of the user interfaces within the workflow), and the remaining screen area may be comprised of objects, information, functions, and/or communication that are utilized in the selected workflow as selected from a virtual page as described above (see example navigation user interface illustrated in FIG. 2A).

Figure 1K:
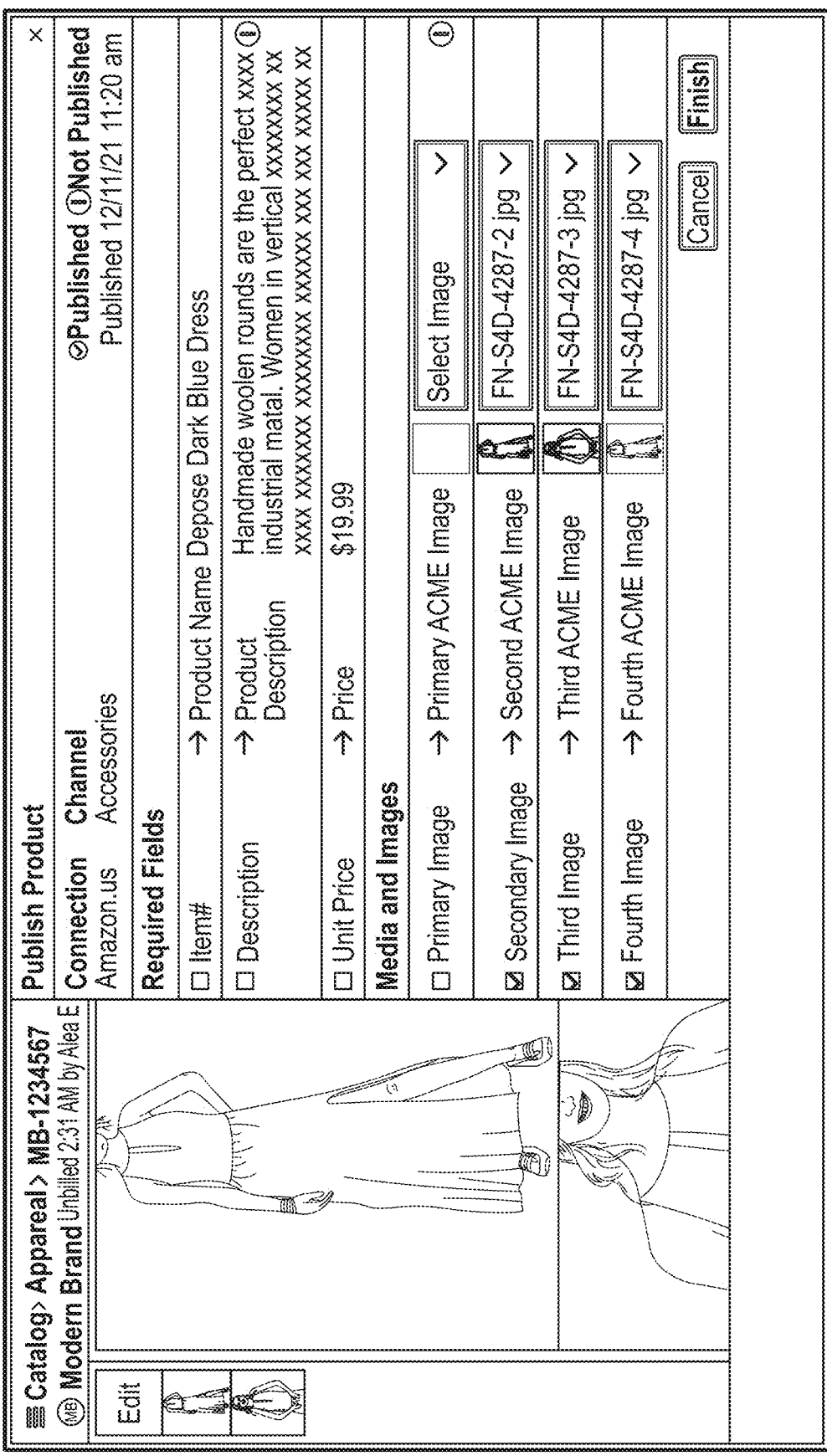
FIG. 1K illustrates an example rendering process using a virtual page.
Figure 1N:
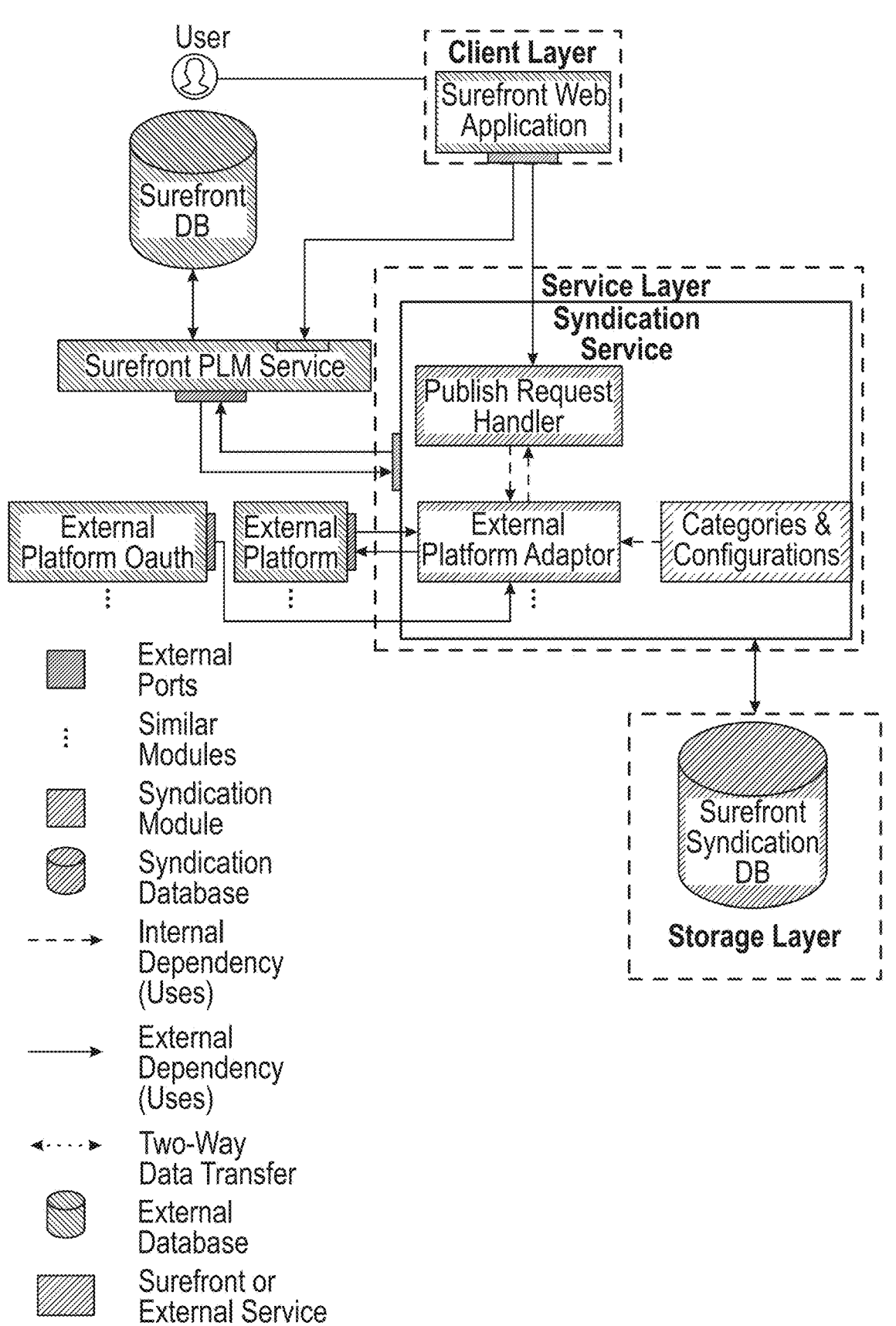
FIG. 1N illustrates an example communication process.

Referring to FIG. 1N, an example communication collaboration process is described that may be executed using the communication/collaboration system. At block 202N, entities (e.g., retailer, suppliers, etc.) are enabled, via respective user interfaces, to define internal hierarchies of personnel and/or functions (e.g., company president, group vice president, manager of product acquisition and program definition, purchasing agent, etc.). A given user at the entity may be assigned to a given hierarchy position, where optionally multiple users may be assigned to the same hierarchy position (e.g., purchasing agents for home furnishings). The hierarchies may be saved in the communication/collaboration system data store and/or in respective entity enterprise data stores.

At block 204N, the entities are enabled to define certain permissions for a given hierarchy position and/or a user at a given position. The permissions may include communication permissions. For example, the permissions may indicate what other entities a given user/functional position is permitted to communicate with, regarding what types of objects (e.g., product type purchases/sales) a given user/functional position is permitted to communicate about, what types of communications a user is permitted to communicate (e.g., makes sales offers, making purchase order, etc.), and/or the like. In addition or instead, the permissions may indicate what data or data-types a given user is permitted to access. For example, a manager may be granted access to communications and/or purchase data for all of the manager's subordinates, while a subordinate may only be able to view the communications she is engaged with. By way of further example, certain types of data (e.g., profitability data for a department) may only be provided to those above a specified hierarchy level.

At block 206N, a user of a given entity (user 'A' of entity 'A' in this example) accesses the system (e.g., logs in to the system using appropriate credentials, such as UserID, password, biometrics, and/or the like). At block 208N, using an identification of the user obtained from the user's credentials, the user's position in her entity's organization is optionally determined from the defined hierarchy assignments. At block 210N, the user's communication permissions are determined (e.g., based on the user's hierarchy position or via communication permissions stored in association with a user record). At block 212N, the user is enabled to generate a collaboration object (e.g., using the user interfaces described herein). As discussed elsewhere herein, a collaboration object may be a project, a product offer, a purchase program, a document, a transaction, and/or the like.

At block 214N, the user is enabled to generate a collaboration invitation with respect to the collaboration object. The user may be limited to issuing the invitation to those entities that the user's communication permissions permit. Optionally, a listing of potential invitees is presented from which the user may select, where the listing is filtered to those entities the user is permitted to communicate with regarding the collaboration object.

At block 216N, acceptances to the invitation are received from one or more of the invited entities. Optionally, an invitation is associated with an expiration date specified by the inviting entity, wherein if the entity has not accepted the invitation prior to the expiration date, the invitation is disabled so that the invitee is inhibited from collaborating on the collaboration object.

At block 218N, the user and one or more other users at the entities that accepted the invitation are enabled to collaborate on the collaboration object (e.g., using the interfaces described herein). For example, users may exchange data, images, propose delivery times, collaboratively agree on product characteristics, packaging, shipping, and/or the like. Optionally, the collaboration is performed on a one-to-many basis, where the user that issued the invitation is separately collaborating with each entity, but the invited entities are not collaborating with each other. For example, if the collaboration object is a transaction for the acquisition of a product, the user that issued the invitation may receive separate proposals/offers from respective invitees, may evaluate such proposals/offers, and may negotiate separately with the entities that submitted the proposals/offers. By way of example, the offers may be presented via an offer inbox that may be organized by data or grouped based on whether the offers have been reviewed, not reviewed, responded to, and/or using other grouping categorizations.

At block 220N, logs of communications between the user and the invited entities regarding the collaboration object may be generated and maintained (an inter-entity communication log). The communications may include text communications (e.g., via an instant message communication, email, or otherwise), images, videos, audio, documents, and/or the like. The communications may include questions, instructions, comments, offers, and/or counteroffers related to the collaboration object as discussed elsewhere herein.

At block 222N, logs of communications between the user and other users within the user's entity regarding the collaboration object may be generated and maintained (an intra-entity communication log). The communications may include text communications (e.g., via an instant message communication, email, or otherwise), images, videos, audio, documents, and/or the like. The communications may include questions, instructions, comments, and/or the like.

At block 224N, communication logs may be presented via respective systems to users at the various entities participating in the collaboration. The displayed logs may be filtered so that a given viewing user accessing the communication/collaboration system is only presented with collaboration communications the user is entitled or has permissions to view. For example, a given user at an invited entity may be presented with the communications between the given user and the entity that issued the invitation regarding the collaboration object, as well as communications between given user and other users at the given user's entity. However, the displayed communications may exclude communications between users at the entity that issued the invitation and may further exclude communications between the entity that issued the invitation and other invited entities.

At block 226N, data associated with the collaboration object may be filtered and displayed to a given user in accordance with associated access permissions. For example, as similarly discussed above, a user at a given entity may be permitted to view certain data (e.g., the margin for a given product) and not other data (e.g., the total profitability of sales for the company as a whole). By way of further example, a user at one entity may be prevented from accessing and viewing data from an enterprise database of another entity.

Certain example user interfaces, including graphical user interfaces, will now be described. The user interfaces may be provided by the communication/collaboration system as web pages from a cloud system (e.g., for display via a user web browser) and/or the user interfaces may be provided via a dedicated application hosted on a user or other device. The data displayed via the user interface may have been entered by a user and/or may have been accessed from or using the communication/collaboration system or other system. For example, the user interfaces may be populated from data accessed from the communication/collaboration system data store or administrator or other authorized user, a supplier system data store or supplier authorized user, or an acquirer system data store or acquirer user, as appropriate.

With reference to FIG. 2A, the left side of the example user interface includes a name and image of the current retailer user, the name of the retailer, a control that enables navigation to a dashboard, and a hierarchy tree of departments/categories, including departments/categories (e.g., products for the "Home"), and sub-departments/sub-categories (e.g., storage, furniture, etc.). The illustrated user interface further includes information on one or more buying programs, including the name/description of the program (e.g., "Holiday 2018"), the milestone dates associated with the program (e.g., offer due date, commitment due date, start to ship date, in-store date, and/or the like). The milestones and milestone date are optionally graphically depicted (e.g., using a line with milestones and milestone dates proportionally indicated). Optionally, the user interface includes one or more media file attachments (e.g., image files of patterns, trend boards, pantones, program slide deck, etc.) to share with suppliers. Optionally, a control may be provided for each attachment indicating whether the attachment is public or private. Such public/private designation may be utilized in determining who may access the attachment. For example, a private document may only be shared by buyer personnel, and a public document may be shared with suppliers. One or more program suppliers may be listed, including a supplier name. A control may be provided that enables the user to invite additional suppliers to bid on the program. In response to activation of such invite control, the invitation may be transmitted to the corresponding supplier.

Figure 2B:
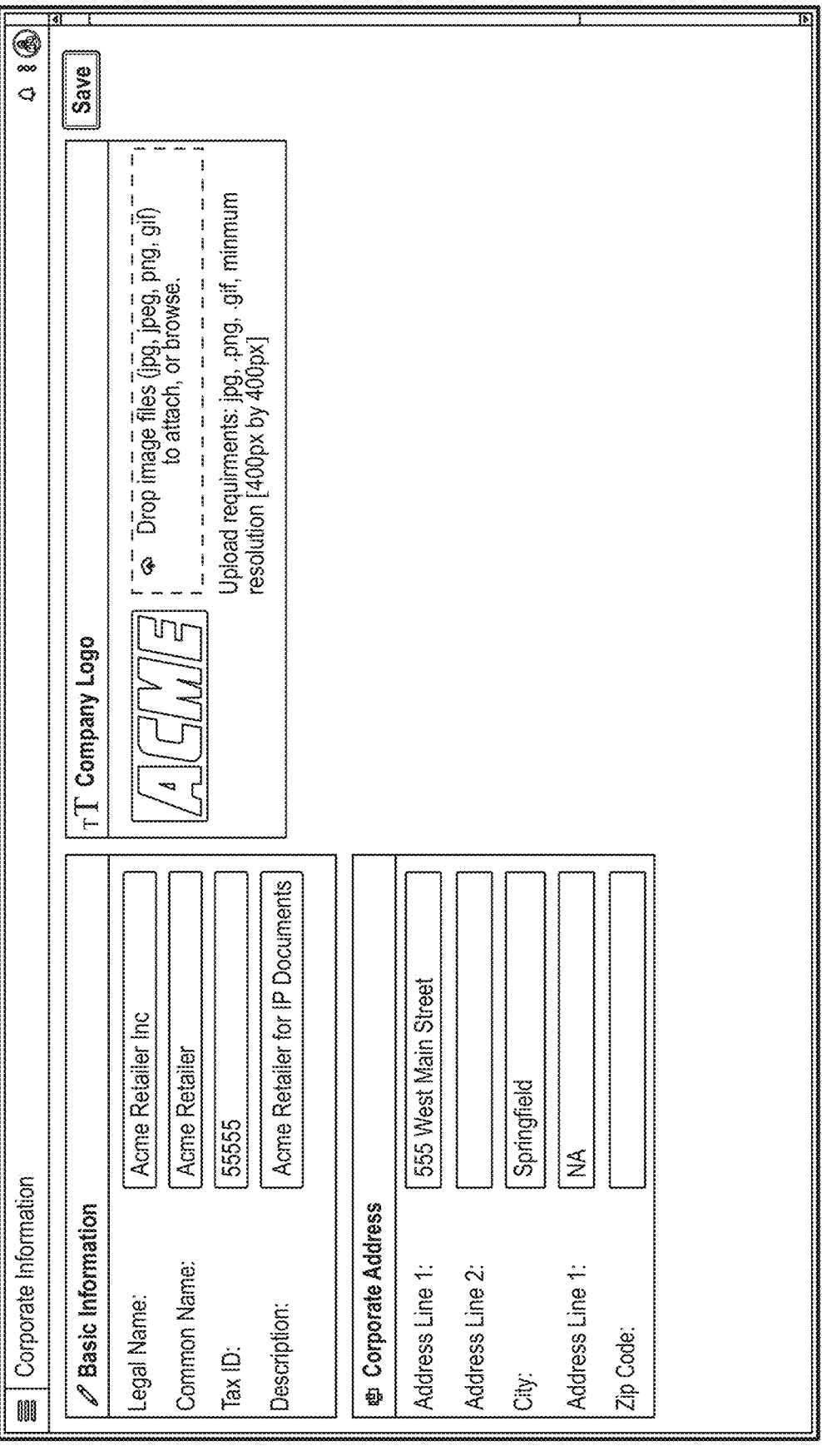

With reference to FIG. 2B, an example retailer administrator user interface is illustrated. The illustrated user interface may be utilized by a user (e.g., an administrator) to input/edit information about the retail company (e.g., identifying information such as legal name, trade name (DBA), federal tax identification number, address, logo, textual description, and/or other information) via corresponding fields. The logo (or other graphic/image file) may be dragged and dropped onto the user interface to upload the logo to the communications system. Activation of a save control enables the entered data to be saved on the communications system. The user interface and/or communication/collaboration system may incorporate error checking for expected data types and compliance with rules (e.g., checks for empty fields, checks that the correct file type is being uploaded for the logo, checks that the logo image meets minimum and/or maximum resolution requirements, etc.).

FIGS. 2C and 2D illustrate example "Department and Categories" user interfaces. Optionally, only users with administration/management authority are granted editing permissions with respect to these user interfaces. The illustrated user interfaces may be utilized by a user (e.g., an administrator) to define the organizational structure/hierarchy of the company (e.g., composed of parts such as "Departments" and "Categories"), assign users within the company to a department or category, provide access to one or more parts of the organization, and to grant supplier companies access to interact with the retail company and its users (e.g., specified users) via one or more parts of the company.

With reference to FIGS. 2C and 2D, the user interfaces may include an expandable/collapsible tree representation of the organizational structure (see the example left panel). Users may utilize the tree to select, view and edit different parts of the organization and to alter the structure of organization.

A user interface may access and display, in a user access area, a list of users who have access to the part of the organization selected in the previously described organizational structure user interface. Optionally, the user interface textually and/or graphically draws distinction between users who are assigned directly to that part of the organization versus users who have inherited access to that part of the organization because of assigned permissions to a parent branch of the organizational hierarchy (e.g., furniture buyers vs. all managers). The user access area interface may also be optionally utilized by users to add additional users to the selected part of the organization.

Another section of the user interface may be configured based on whether the user selected a Department or Category via the organizational structure user interface. If a Department is selected then this section of the user interface may display a table element containing information on order requirements, order product requirements, and/or order product component requirements, including both those that are assigned to and those inherited by that department. In addition, a user interface may be provided that enables the user to add or edit requirements assigned to the selected department. Optionally, the user interface accesses and provides for display (e.g., via respective tabs) both buyer order requirements and supplier order requirements. If a Category was selected via the organizational structure user interface, then this section of the user interface displays (optionally all) supplier companies that have access to interact with this part of the organization via sending and receiving workflow related objects and communications. This section also provides the function and controls that enable the user to add, edit, or restrict suppliers that can interact with the selected Category (e.g., using edit controls). Thus, the system enables integration with multiple entities and corresponding systems. Requested and accessed data may be specific to the requesting entity (rather than standardized across entities). Thus, a given entity can specify what information may be pulled from or pushed to specified systems.

Example controls that may be provided may include edit controls, connect supplier controls, add manager controls, add new department controls, add new category controls, and/or the like.

Figure 2E:
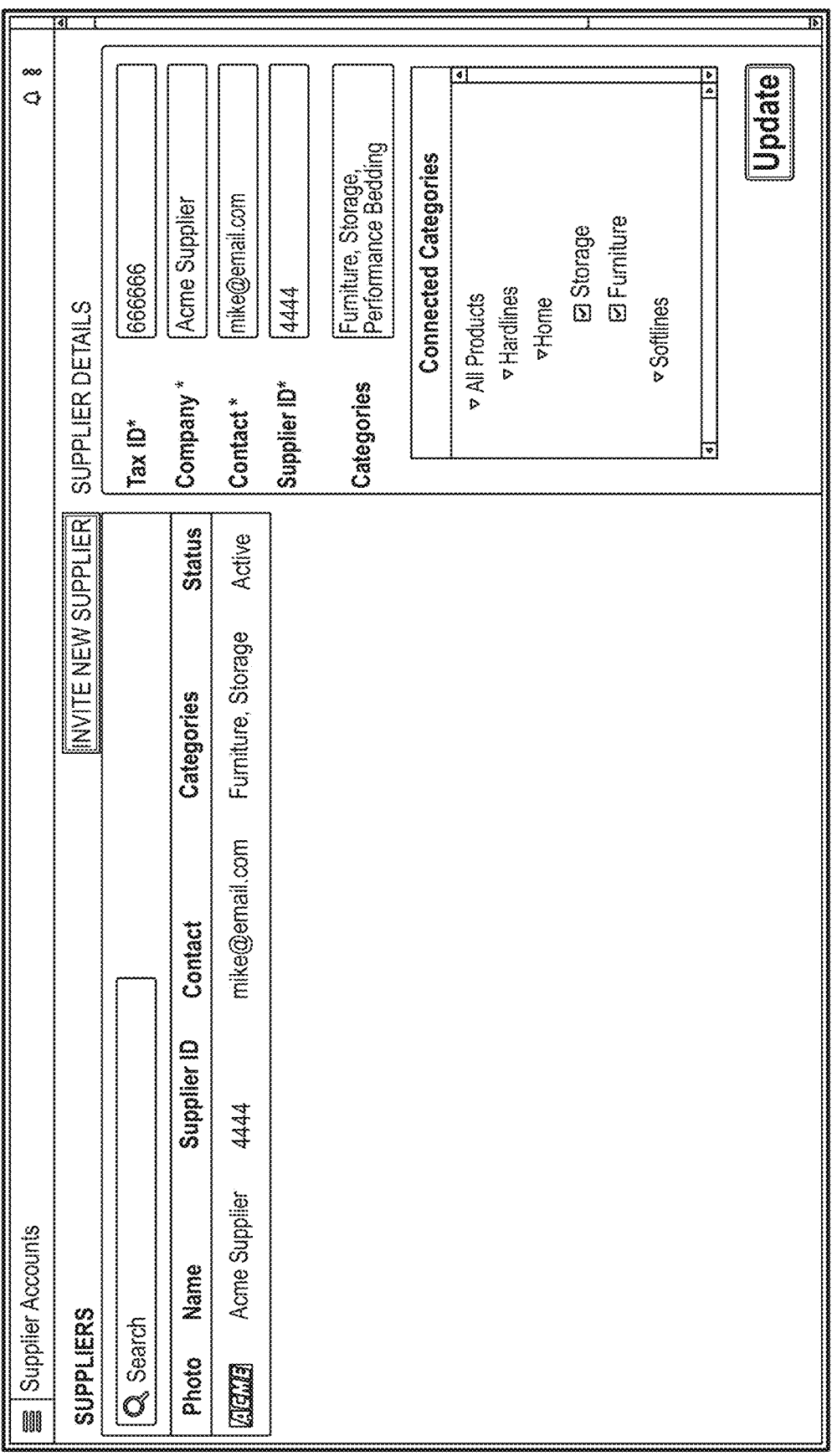
Figure 2F:
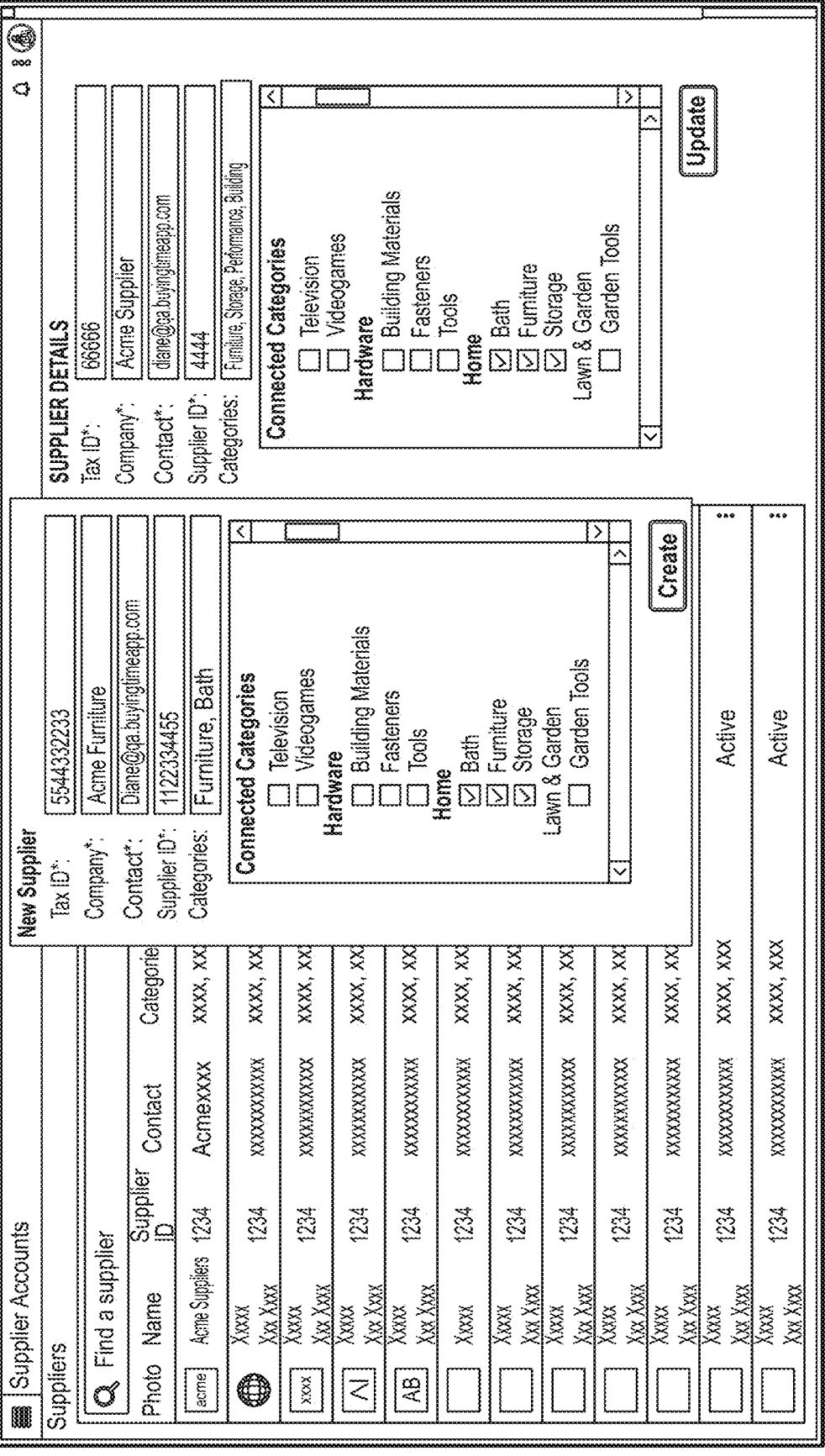

FIGS. 2E and 2F illustrate a supplier accounts user interface. For example, the "Supplier Accounts" user interface may be accessed by a retailer administrator to view, add, and edit supplier company permissions to access and interact with parts of the retailer company organization. The "Supplier Accounts" user interface may enable Channels and Threads relationships to be defined and displayed.

In the example user interface illustrated in FIG. 2E, distinct sections with distinct functionality are graphically defined. In this example, the section on the left/middle portion of the user interface displays a table comprised of suppliers that have a defined relationship (Connection) with the retailer company on the communication/collaboration systems, optionally including the supplier name, logo, retailer unique supplier identification strings, contact information (e.g., email address, sms address, phone number, etc.), categories the supplier has been granted access to interact with (e.g., to submit offers on), and status information (e.g., active, inactive, etc.). The user may select individual suppliers in this table.

The right portion of the example user interface illustrated in FIG. 2E illustrates supplier details and is comprised of a form that both displays the information about the supplier selected via the table (e.g., Supplier Tax ID, company name, supplier contact, supplier ID, connected categories) and enables the user to alter the selected supplier's access to parts of the retailer organization ("Categories"). For example, a checkbox may be provided in association with a given category or sub-category, and the user may check the box to provide access to the respective category or sub-category, or uncheck the box to deny access to the respective category or sub-category. Optionally, the categories and sub-categories are displayed using a hierarchical tree. This section thus may display "Threads" that have been created between the retailer company and the selected supplier company.

A search user interface may be provided configured to receive a search query to find a supplier record. In response to receive a textual search query, the system may query a database of supplier records, identify matching supplier records, and provide those records for display, optionally in ranked order according to relevance or closeness of match.

FIG. 2F illustrates an example modal window user interface that is accessed via the supplier accounts user interface illustrated in FIG. 2E that is utilized to establish initial connection/relationship/"Threads" between the retailer and a given supplier company. A user may enter a supplier tax ID and supplier ID, and supplier companies are matched for this initial connection using federal tax id as a primary key and retailer ID as a single use "password" to verify authenticity. Email for one or more primary contacts of the supplier company is also collected so that suppliers that have not already created a supplier company on the platform have people in their organization contacted and notified via email. The modal user interface may display supplier tax ID, company name, supplier contact, supplier ID, and connected categories.

FIG. 2G illustrates an example "User Accounts" user interface which may be utilized by a user (e.g., retailer administrators) to create new users and to edit existing user information and permissions within their retail company. When creating a new user information is collected such as name, email address, user type, employee ID, title, assignment (e.g., to products, categories, or other portions of the retail company), access to parts of the retailer organization, and/or status.

In the illustrated example user interface, graphically distinct sections are provided. The left/middle section is comprised of a table of users and related information such as name, photo/image, email address, assignment, title, status, and/or additional information. The users listed in this table are selected by the retailer administrator user. This section of the screen also has a function to collect information on retailer employees that are being newly created in the platform. The right section of the user interface is comprised of a user details form that enables a user to view and edit information and permissions about the user selected via the user table. This section includes information such as name, email address, user type, employee ID, employee permissions to parts of the retailer organization (assigned departments and categories, optionally displayed as a hierarchical tree), and managing department. For example, with respect to assignments of departments and categories, check boxes may be provided enabling a user to select or unselect departments and categories for which the user is a manager. Optionally, selection of a department or category, will also assign the user as manager to any sub-departments or sub-categories.

Certain example supplier-side user interfaces will now be described.

Figure 2H:
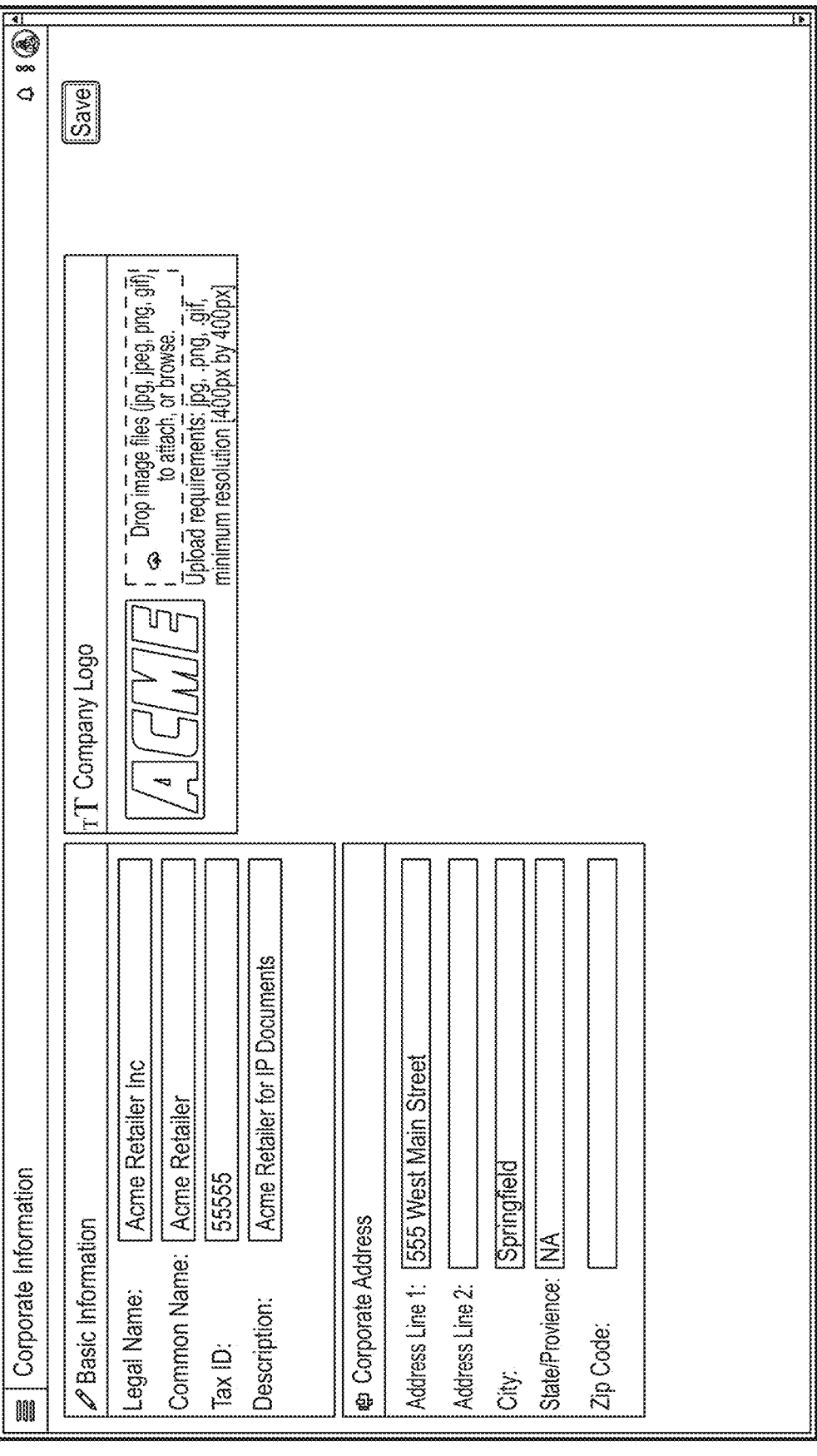

With reference to FIG. 2H, an example supplier administrator user interface is illustrated that enables a user (e.g., a supplier administrator) to input/edit information about the user's supplier company (e.g., identifying information such as legal name, trade name (DBA), federal tax identification number, address, logo, textual description, and/or other information). The supplier logo may be dragged and dropped onto the user interface to upload the logo to the communications system. Activation of a save control enables the entered data to be saved on the communications system. The user interface and/or communication/collaboration system may incorporate error checking for expected data types and compliance with rules (e.g., checks for empty fields, checks that the correct file type is being uploaded for the logo, checks that the logo image meets minimum and/or maximum resolution requirements, etc.).

Figure 2I:
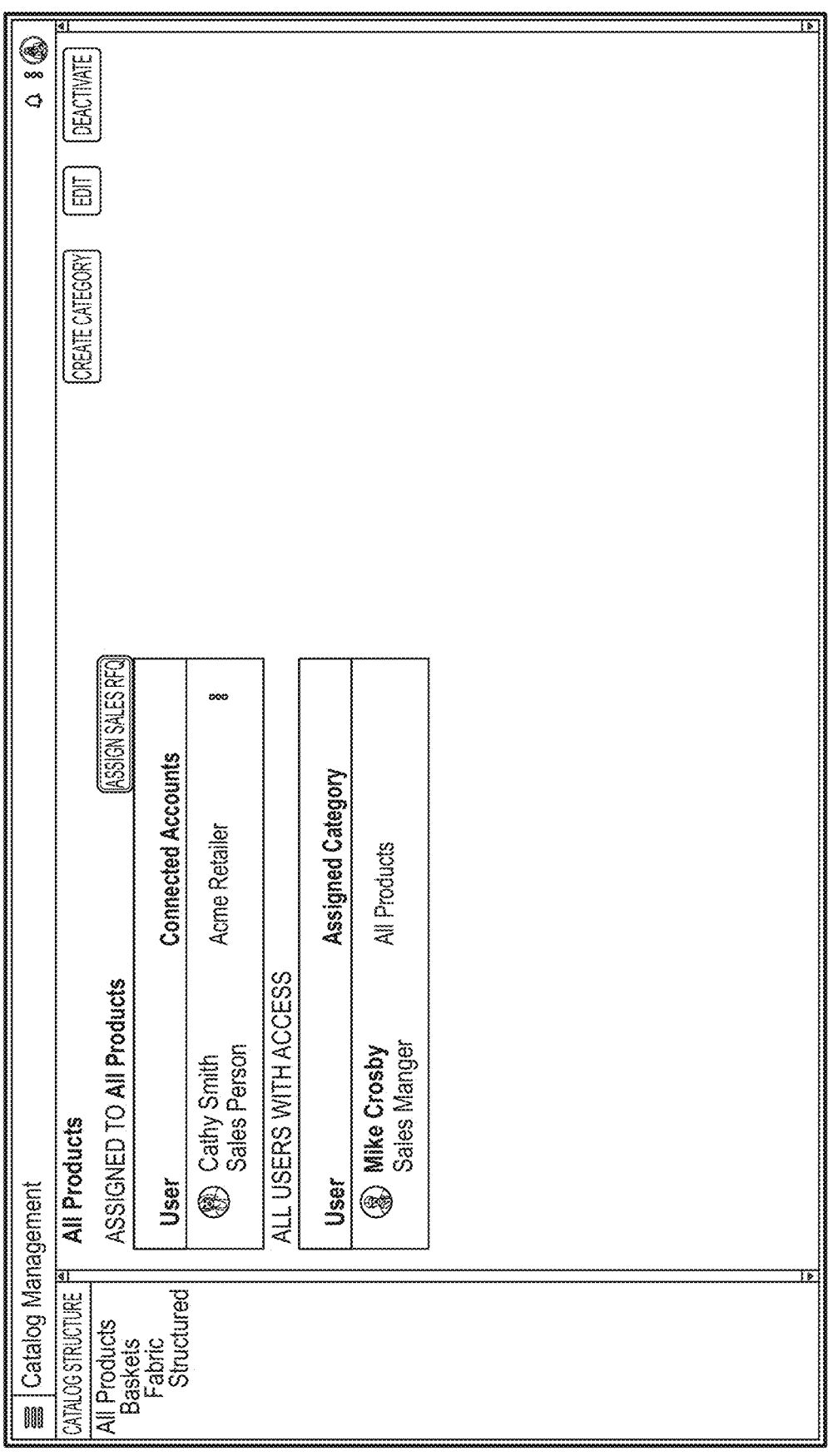

With reference to FIG. 2I, an example catalog management user interface is illustrated that enables a user (e.g., a supplier administrator) to organize the supplier's electronic product catalog and assign supplier users permissions to part or all of the catalog. The product catalog functions as a file path folder system where the equivalents of folders are called "Product Categories" and the analog to files are "Products." A given product is assigned by a user (individually or in batch mode) to a product category.

In the illustrated example catalog management user interface, distinct sections are graphically defined. In this example, the leftmost section ("Catalog Structure") is a container comprised of a selectable, expandable and collapsible tree element that represents the structure of product categories within the product catalog. The Catalog Structure user interface enables a user to select a product category, and once selected, an edit user interface enables the user to edit product categories and to create new "nested" children product categories. A product catalog section of the user interface lists users (e.g., including a user photograph, name, title, connected accounts) that have access to the selected product category. The illustrated tables optionally visually and/or textually distinguish users who are assigned to the selected product category from users who have inherited permissions to the selected product category from an assignment to a parent of the selected product category. User access can be granted or altered in this section as well.

Figure 2J:
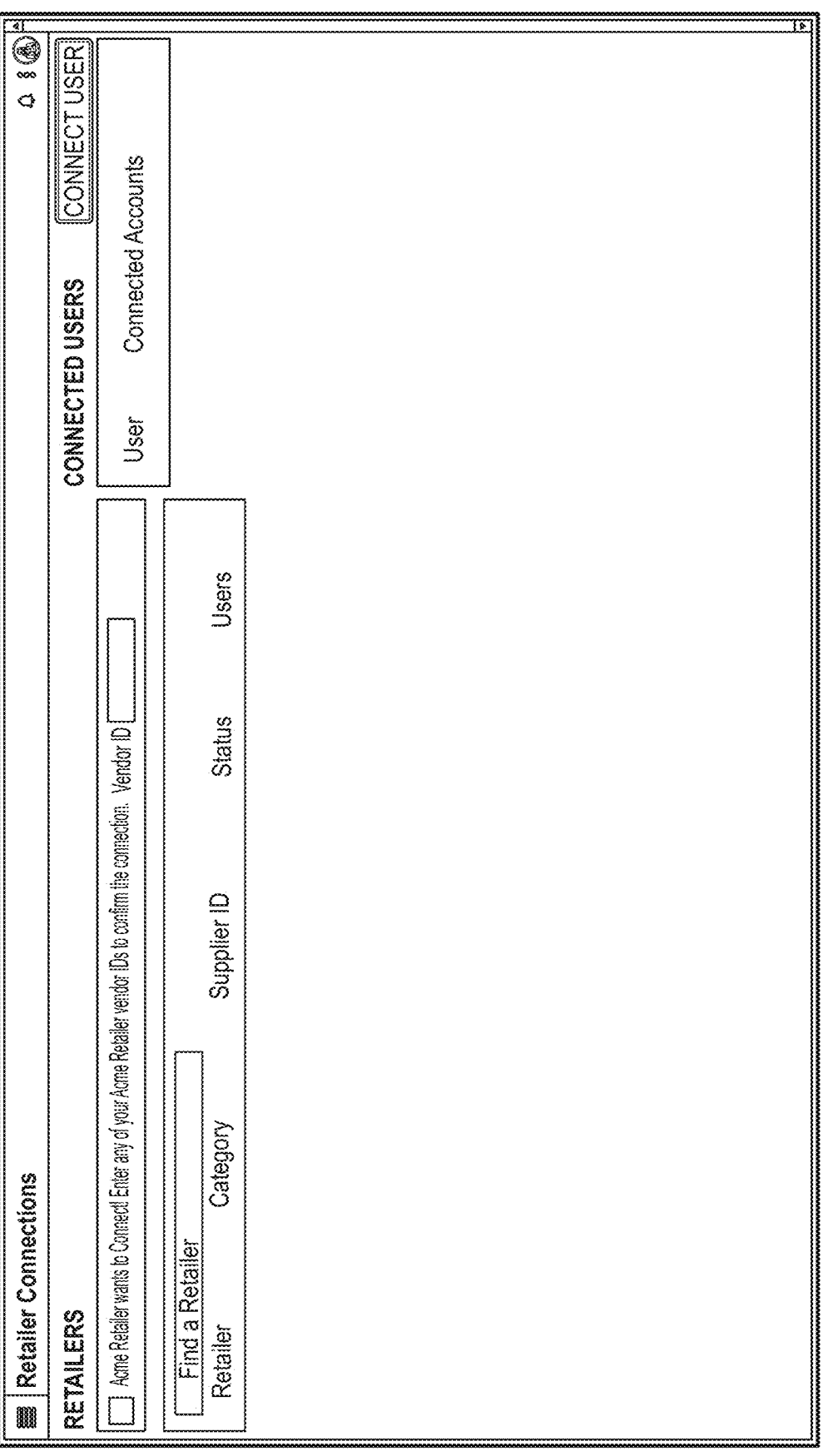

FIG. 2J illustrates an example retailer connections user interface. In this example, the user interface indicates that a retailer sent an invitation to the supplier indicating that the retailer wants to connect to the supplier. The displayed invitation includes a prompt to enter an identifier (a vendor ID provided by the retailer) to confirm the connection, and a field is provided to receive the connection. A connect control is provided, which when activated causes acceptance of the invitation to be transmitted to the communication/collaboration system, and from the communication/collaboration system to the retailer. A search user interface may be provided configured to receive a search query to find a retailer record. In response to receive a textual search query, the system may query a database of retailer records, identify matching retailer records, and provide those records for display, optionally in ranked order according to relevance or closeness of match.

A user (e.g., a supplier administrator) may utilize the "Retailer Connections" user interface to verify connections with retail companies who have granted that supplier company access to one or more of their Categories (Threads), and to manage user permissions on which users from the supplier company have access to the Categories (Threads) from the connected retailers.

FIG. 2K illustrates an example retailer connections user interface, optionally with graphically/textually distinct sections. In this example, a retailers section provides a table of retailer companies with associated information (e.g., logo, company name, category, supplier ID, status, and/or other information). The user interface enables a user to select a table entry. In response, in a connected users section, the user interface accesses and displays a table of users within the supplier company who have permission to access the selected category. The example table contains information about a given user (e.g., name, title, picture, list on connected accounts, and/or other information). Edit controls may be provided that enables a user to be added or deleted.

Figure 2L:
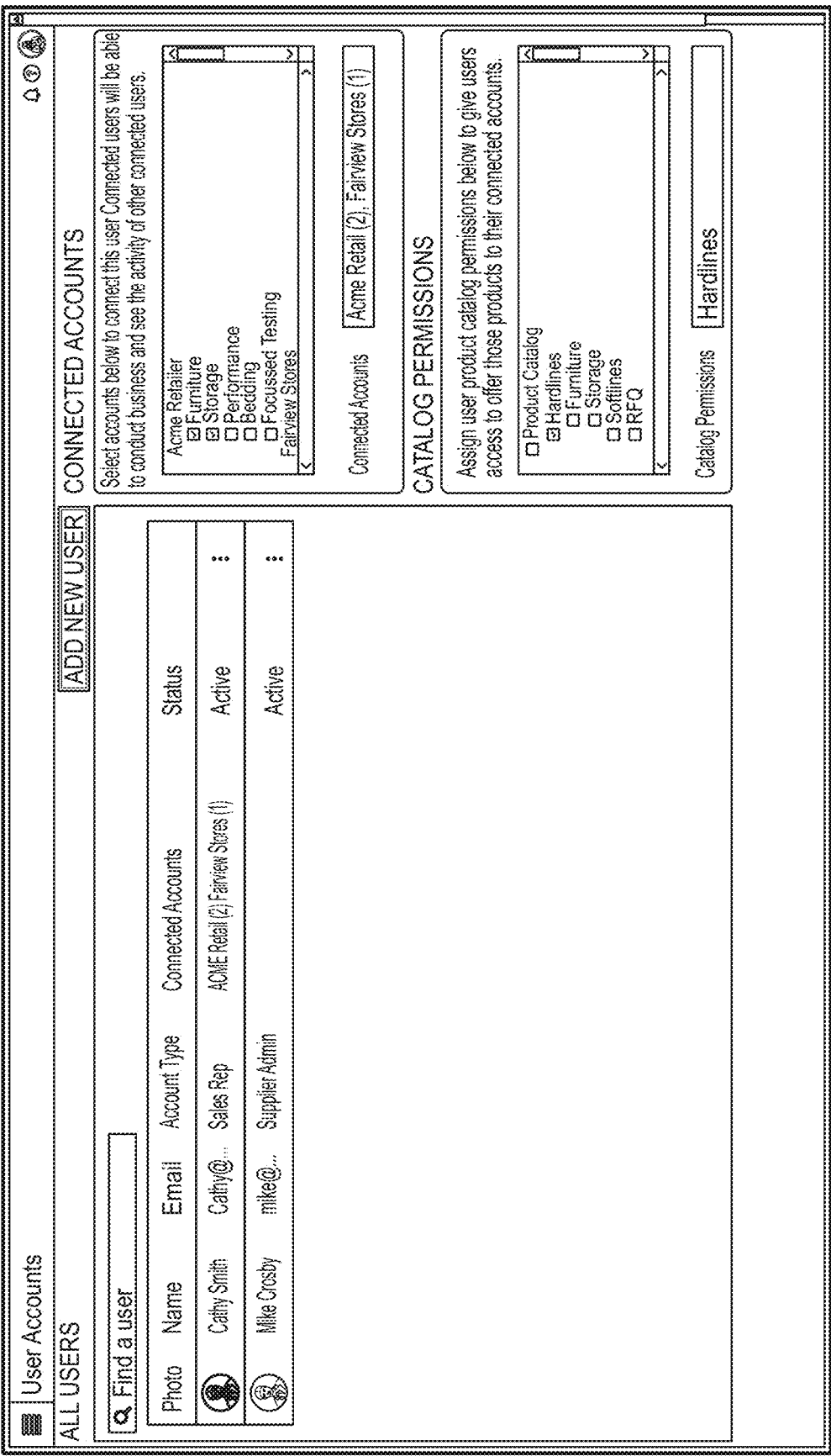

FIG. 2L illustrates an example "User Accounts" user interface which may be utilized by a user (e.g., a supplier administrator) to add new users and edit existing user information and permissions within the supplier company. The user interface may also enable the supplier administrator to interact with connected retail company categories via threads. In response to activating an add new user control, an interface may be provided via which new user data may be received and stored (e.g., name, email address, user type, employee ID, title, access to parts of the supplier's catalog (Product Categories), and access granted to interact with retailer categories the supplier is connected with via threads.

In the example illustrated in FIG. 2L, graphically/textually distinct sections are provided. The left/middle section ("All users") is comprised of a table of users and their related information such as name, photo/image, email address, status, title, connected accounts and/or other information. A user (e.g., a supplier administrator) may select users listed in this table. The right section of the user interface is comprised of a connected accounts interface and a catalog permissions user interface which respectively display for the selected user the access permissions to access the retailer categories (threads) and the product catalog (product categories). The check boxes are provided in association with respective hierarchical parent-child structures via which the supplier user may add or delete permissions for the selected user (e.g., add or delete retailer categories/sub-categories and/or catalog categories/sub-categories). A deactivated products tab is provided, which when activated, causes a list of no-longer available products, that had previously been available via the catalog, to be accessed and presented.

Example user interfaces related to the suppler catalog workflow will now be described.

With reference to FIG. 3A1, an example supplier product catalog user interface is illustrated. In the illustrated user interface, images of products are provided in association with a product identifier and a product category. A product category filter user interface is provided via which the user can select one or more categories to view. A search field is provided via which a user may enter a search query (e.g., a product name, a product identifier, product characteristics, product category, values from the product fields such as description, price, material, color, size, quantity in a set, etc.), and in response a search engine will locate matching products which will be provided for display to the user. Optionally, the search results will be in rank order based on the relevance or closeness of a given match.

Some or all of the supplier users may be granted access to the illustrated user interface. Optionally, only a designated subset of supplier users (e.g., supplier administrators and/or sales managers) are provided the ability to edit the product organization (e.g., by changing, for a given product, the product category to which it is assigned).

Multiple views of the product catalog may be generated and displayed, such as the example views illustrated in FIGS. 3A1 and 3A2. FIG. 3A1 provides a representation of the product catalog with product images as the primary indicators of products, which is referred to herein as a "Product Card" representation of a product. This product card changes appearance in response to detecting that the user is focusing on the product card (e.g., hovering over the card with a mouse, trackpad, stylus; selecting/clicking on the card, staring at the card, etc.). Upon detecting the user focus on the product card, the user interface accesses and displays additional information on the product details are revealed.

In another view, illustrated in FIG. 3A2, a table representation of the product catalog may be provided, where images are relatively smaller than in the product cards and more information about the products (e.g., textual description, category, sales rank, dimensions, materials, colors, weight, and/or other information), is constantly visible in the table format. Checkboxes may be provided via which a user can select products by clicking the checkbox on the product card or product row. A toggle control may be provided that enables a user to toggle between the image view of FIG. 3A1 and the table view of FIG. 3A2 (e.g., via clicking the grid and table icons).

Figure 3B:
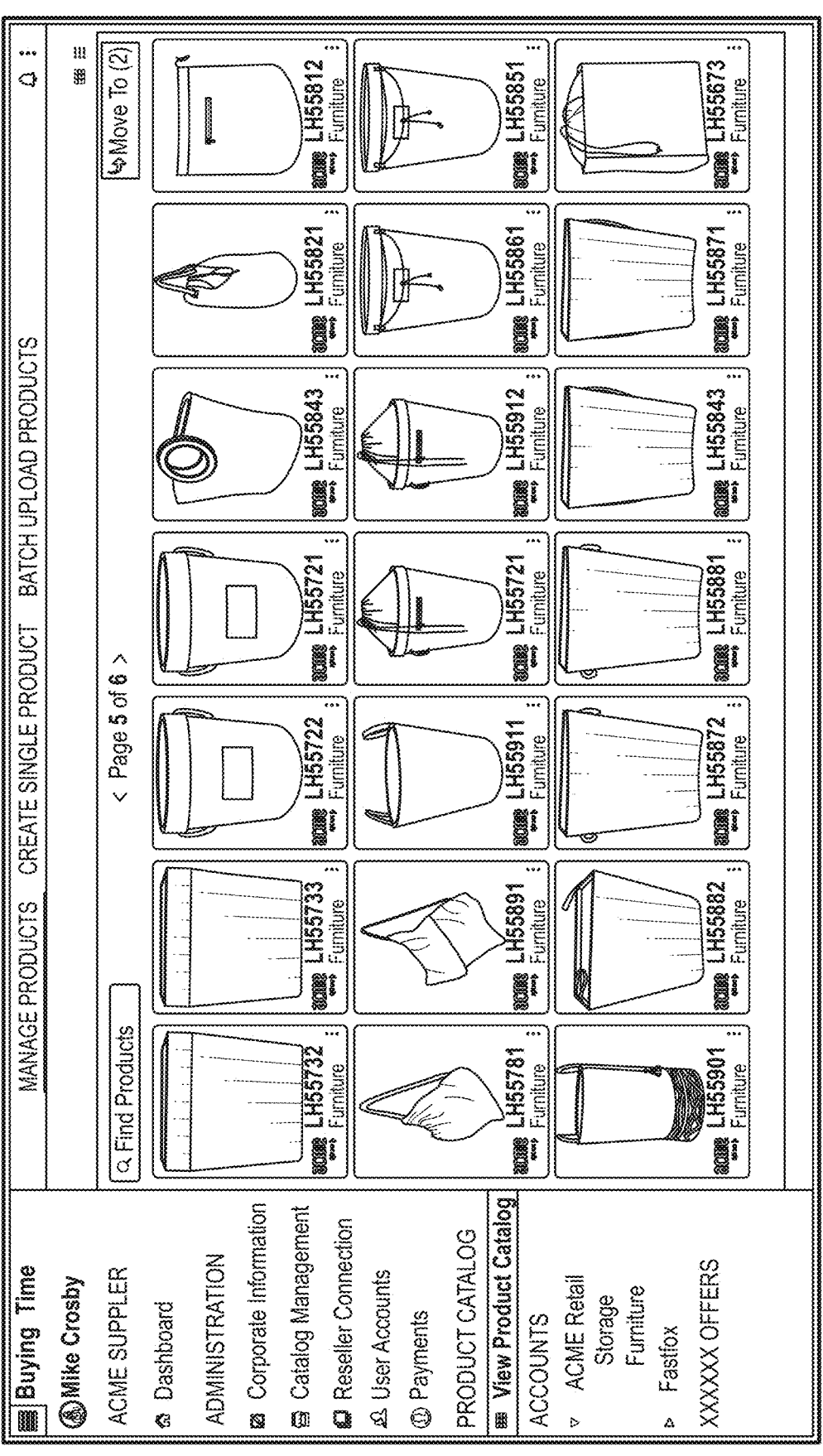

FIG. 3B illustrates the catalog user interface of FIG. 3A1, with a navigation toolbar exposed on the left side. The navigation pattern within the application may include a user selecting a part of the application corresponding to distinct workflow objects, and functions provided via the navigation toolbar. The workflow steps may then be displayed across the top center portion of the user interface and the corresponding objects and functions in the main area of the screen.

The "Product Details" catalog user interface may act as a centralized source of information about a given product. For example, users may navigate to the "Product Details" user interface to view some or all of the product information. Certain users (e.g., supplier administrators and sales managers) may be provided with edit control so that they have the ability to edit the product's information.

Figure 3D:
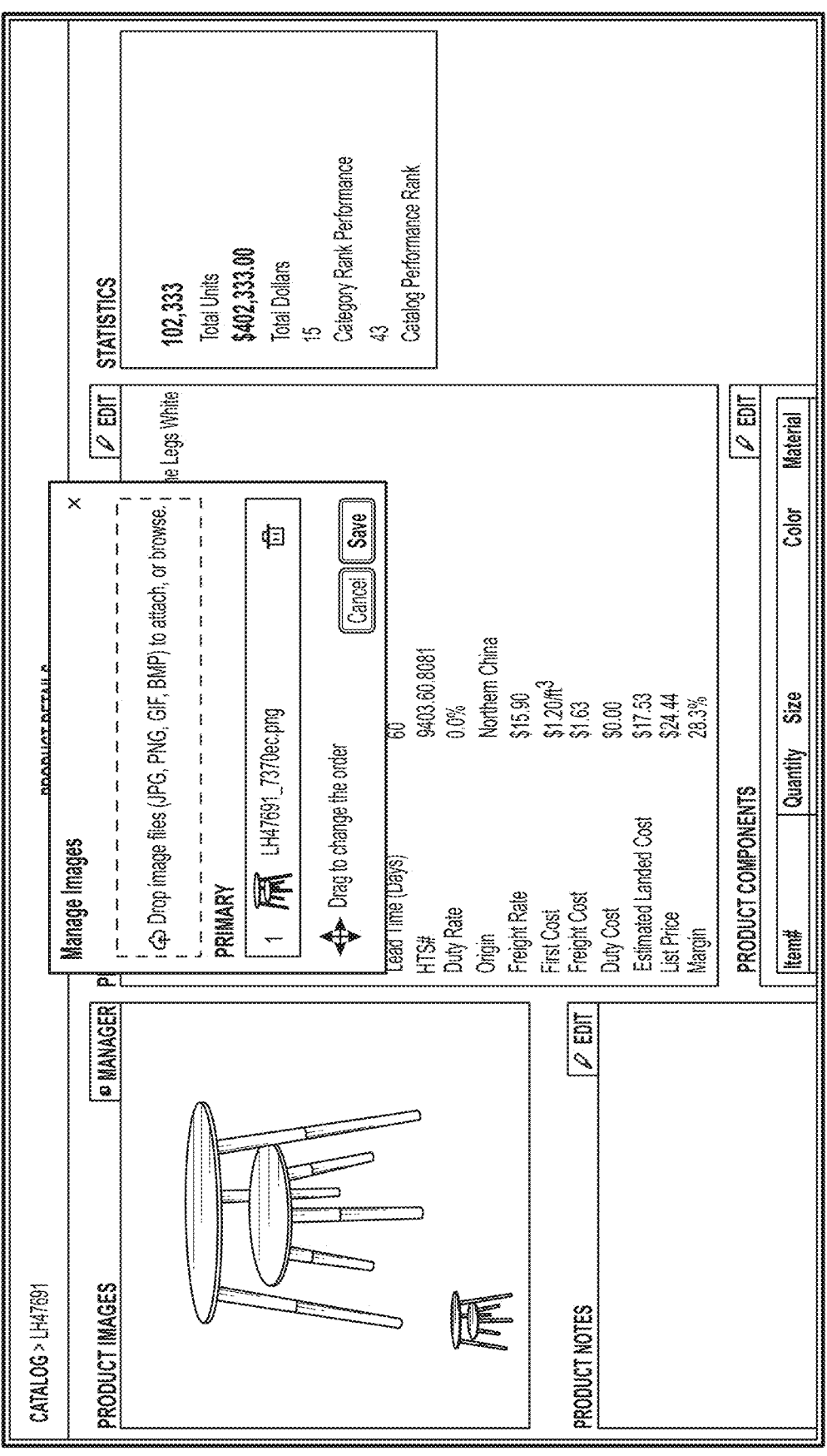
Figure 3E:
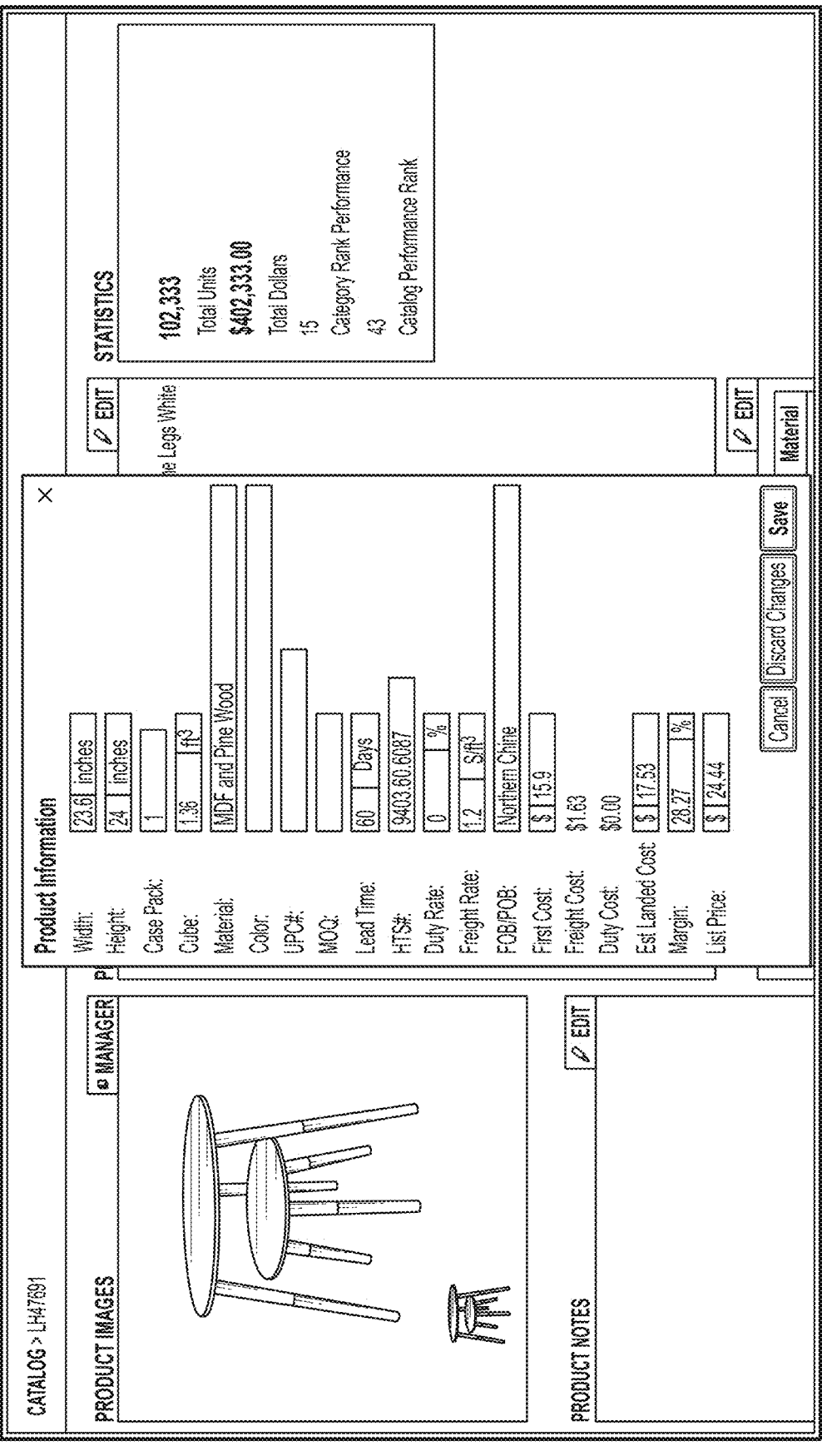

Details page with multiple distinct sections. A product image section (in this example, the leftmost third of the user interface) displays images and product notes, and contains controls enabling the upload of new product images (see, e.g., FIG. 3D), manage or delete existing images, and add notes about a product. A product information section (in this example, in the center of the user interface), are panels displaying core product information such as size, material, color, pricing, MOQ, lead time, product components, origin, freight rate, freight cost, duty, estimated landed cost, margin, and/or other information. A product components table may provide item numbers, quantity, size, color, material, and/or other information for each separate component that makes up the product. A designated subset of supplier users (e.g., supplier administrators and/or sales managers) are provided the ability to launch forms/modals enabling the users to edit the product details (e.g., dimensions, case pack, volume/cube size, material, color, UPC, MOQ, lead time, HTS, duty rate, freight rate, FOB/POE, first cost, freight cost, duty cost, list price) and calculate pricing, such as estimated landing cost (see, e.g., FIG. 3E) and edit product components (see, e.g., FIG. 3F1).

FIG. 3F2 illustrates an example user interface that accesses and displays the order and sales history of a selected product. The user interface may, for example, display the identifies of organizations purchasing the selected product, the corresponding price(s), the date/time of the purchases, and the quantities of product included in each purchase. A link may be provided, which when activated, navigates the user interface to the order document.

Figure 3G:
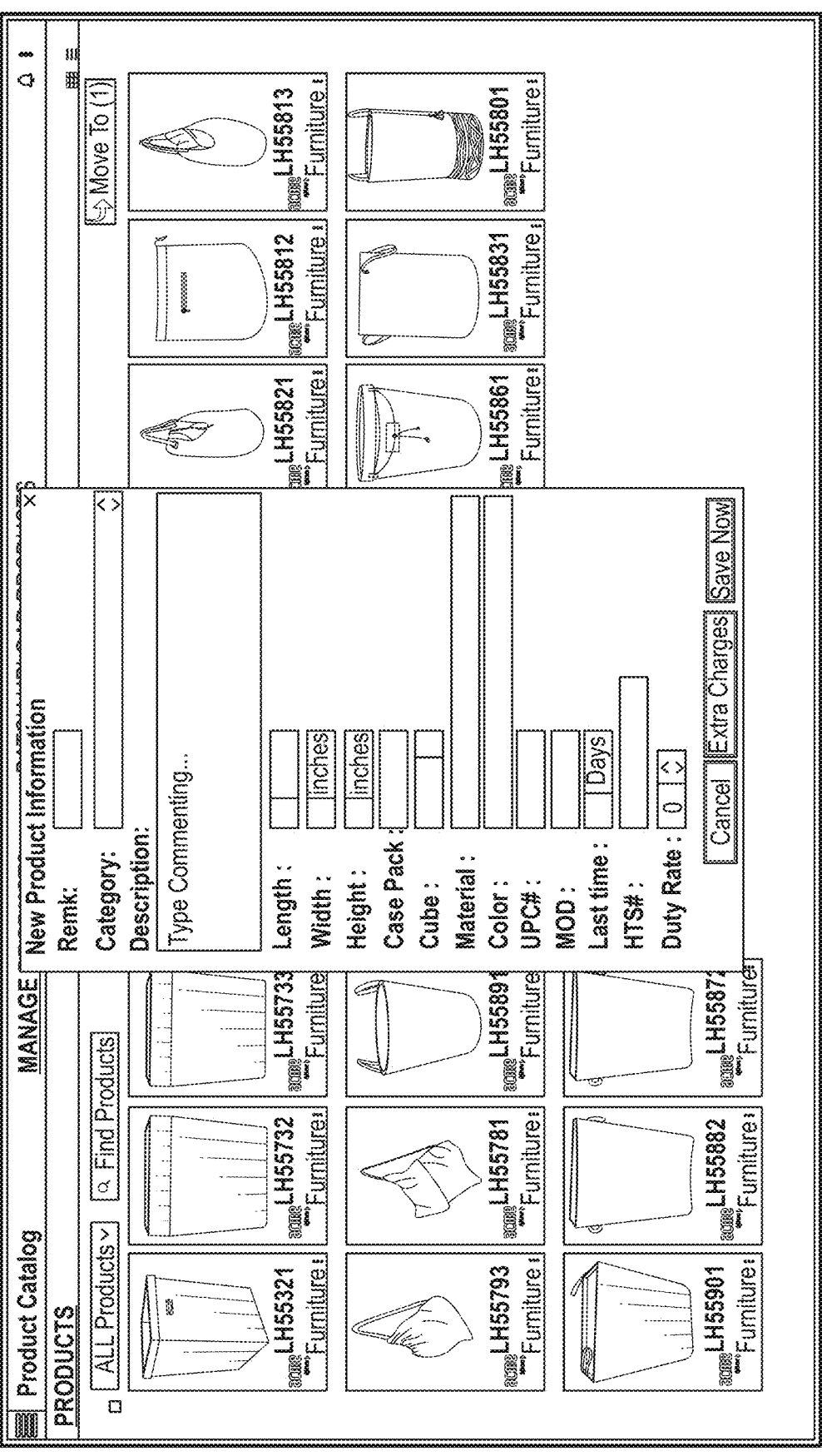
Figure 3I:
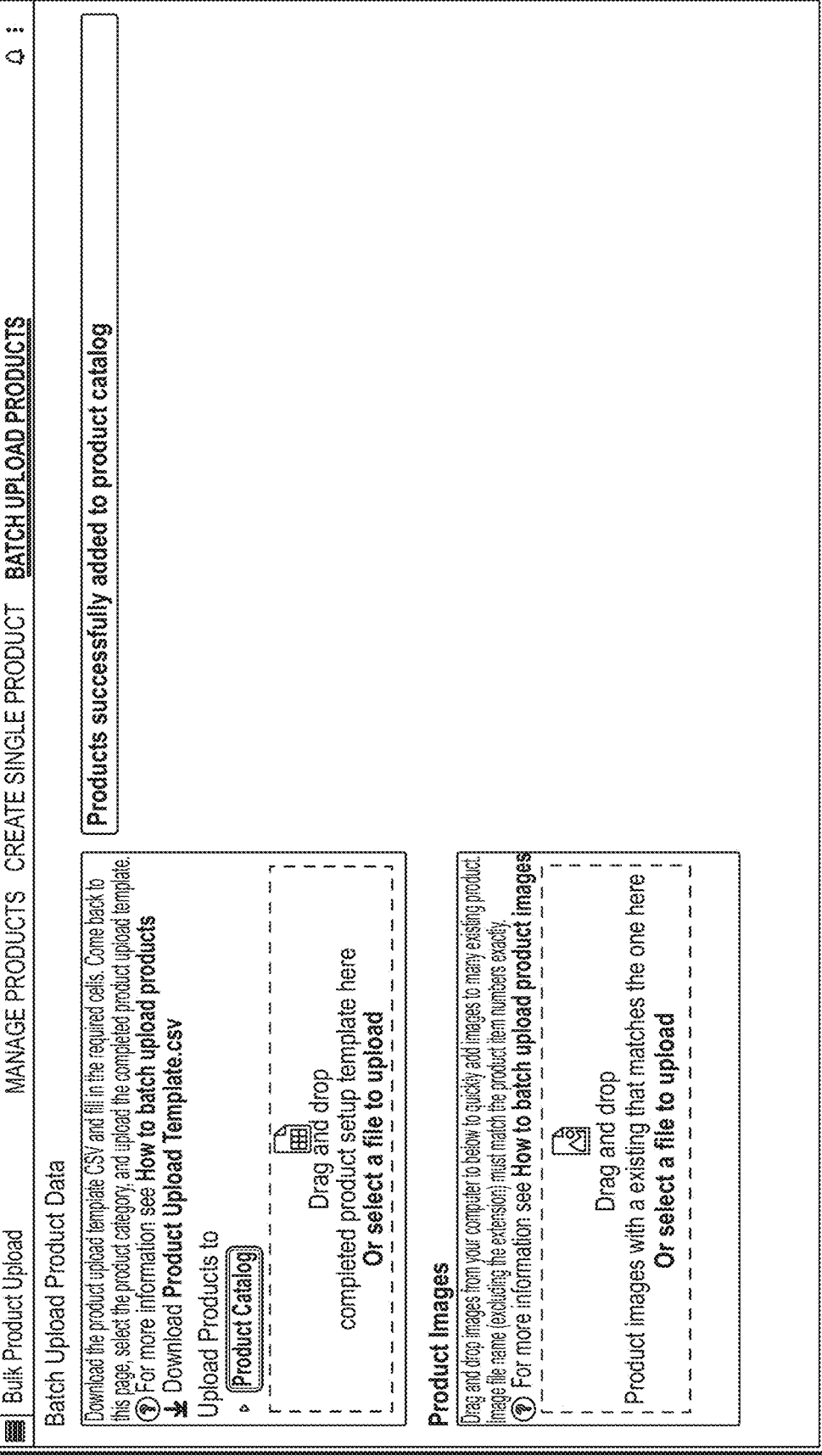

A designated subset of supplier users (e.g., supplier administrators and/or sales managers) are provided the ability to access a create single product form (see, e.g., FIG. 3G) from the catalog page to define individual products in the product catalog by entering in the corresponding detailed product information (e.g., item number, product category it will be assigned to, size, description, color, material, pricing, other detail information discussed herein, and/or other information). The platform checks new products to ensure item number uniqueness within supplier product catalogs and identifies an error if it is not unique. Optionally, the platform automatically generates the unique item identifier.

FIGS. 3C2 and 3C3 illustrate user interfaces that enable a user to tag products included in the catalog with relevant text. The tags will then be stored in association with a corresponding product record. When a user wants to find certain products, the user can enter a text query into a search field or select a search term from a menu of search terms. The system may then search product records to locate products whose associated tags match the search query. The system may then present the search results, optionally including the product names, product images, and/or other product related data. In particular, the user interface illustrated in FIG. 3C2 enables a user to create new tag values, search for matching tags, assign tags, or remove existing tag values for a given product or set of products. Referring to the user interface illustrated in FIG. 3C3, a search field and sort control are provided. Example search results are illustrated. The search results may include the associated tags. A category menu is provided which enables the user to limit the search to a selected category. Each listed search result entry includes a selection field. A control is provided that enables the user to have the system filter the displayed search results to the selected products, thereby enabling more entries to be listed at the same time and enabling the exclusion of products that are not of interest.

FIG. 3H illustrates a "Bulk Product Upload" user interface. Optionally, only a designated subset of supplier users (e.g., supplier administrators and/or sales managers) are provided the ability to access the "Bulk Product Upload" user interface. These users may utilize the "Bulk Product Upload" user interface to upload product data for several products at a time into the supplier company's product catalog by uploading data files (e.g., CSV formatted files) and image files (e.g., png, jpeg, and/or other image file formats). The system optionally error checks for file type and format and optionally checks for duplicate images and product data (as illustrated in FIG. 3H).

The example "Bulk Product Upload" user interface is comprised of distinct sections. The left section is comprised of instructions on how to upload product data and images, an interface to download a template of an acceptable data format, the user selection of which product category to upload the products to and drag and drop/launch system browser areas from which the system accepts files. The right section of the user interface provides system feedback, where users are given feedback on the outcome of their data/image uploads, including the ability to overwrite product information for products with duplicate item numbers to those existing in the catalog (see, e.g., FIG. 3H), information on errors on why data could not be accepted, and information on successful data upload (see, e.g., FIG. 3I).

Figure 3J:
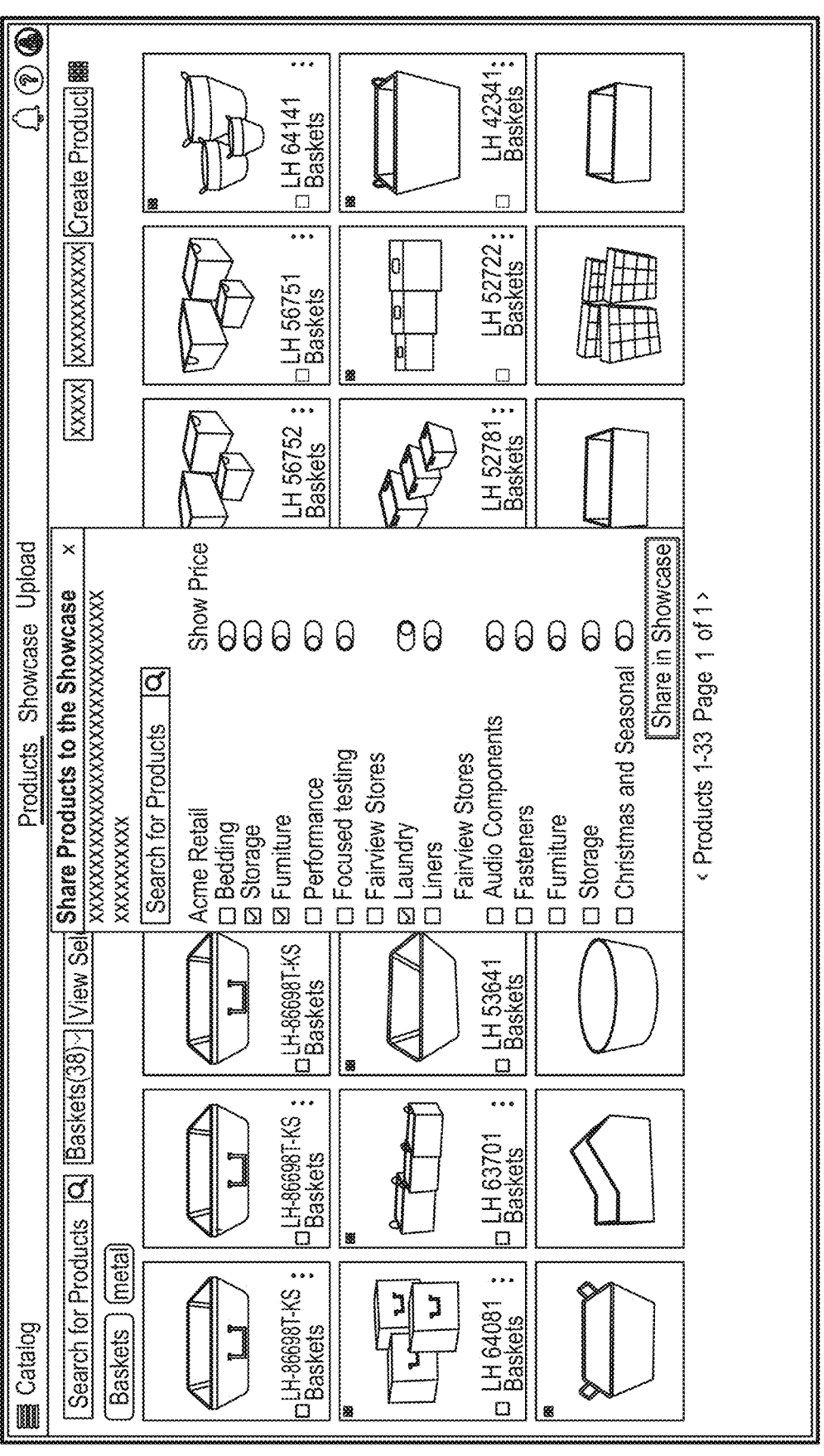
Figure 3K:
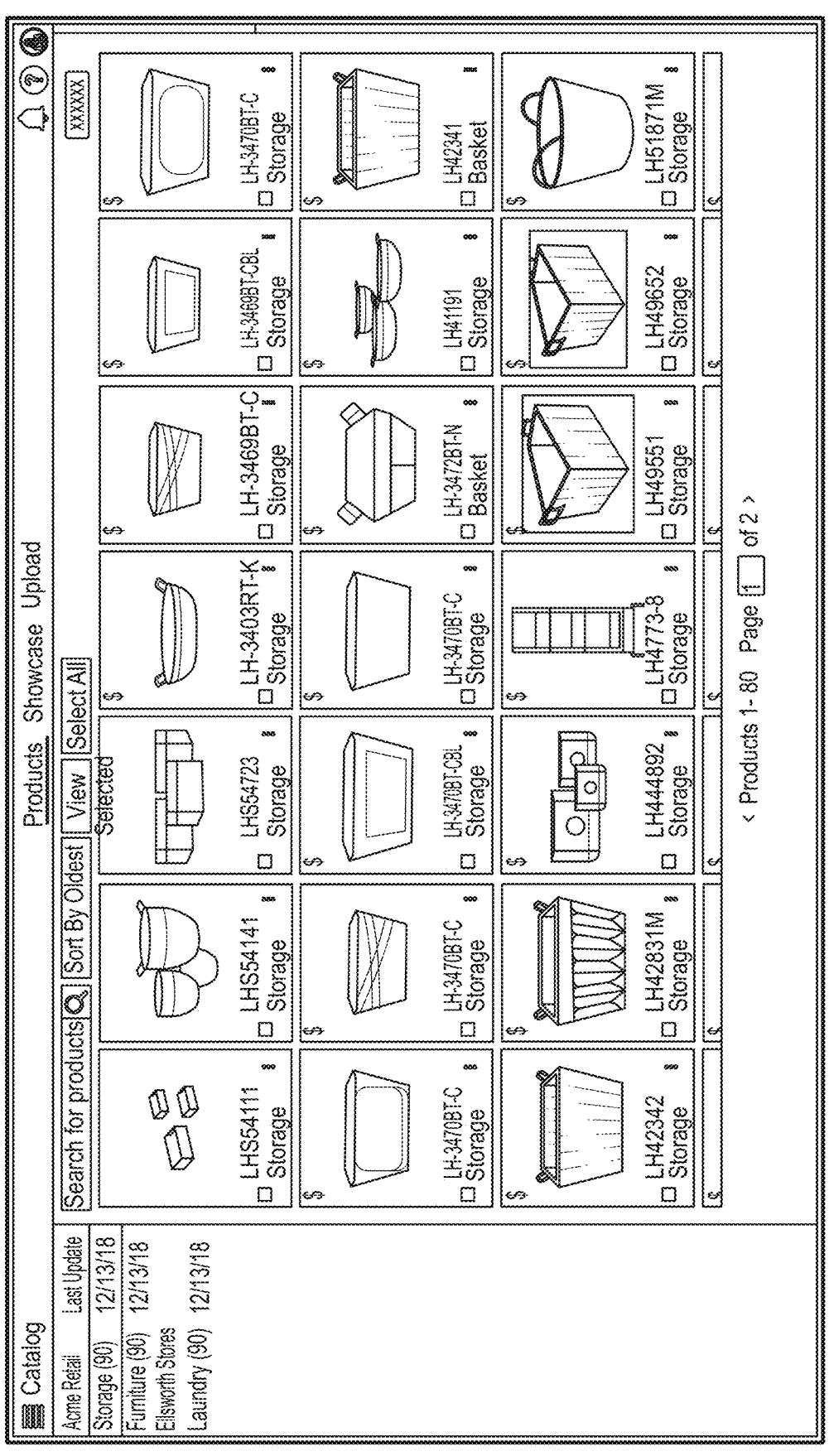
Figure 3L:
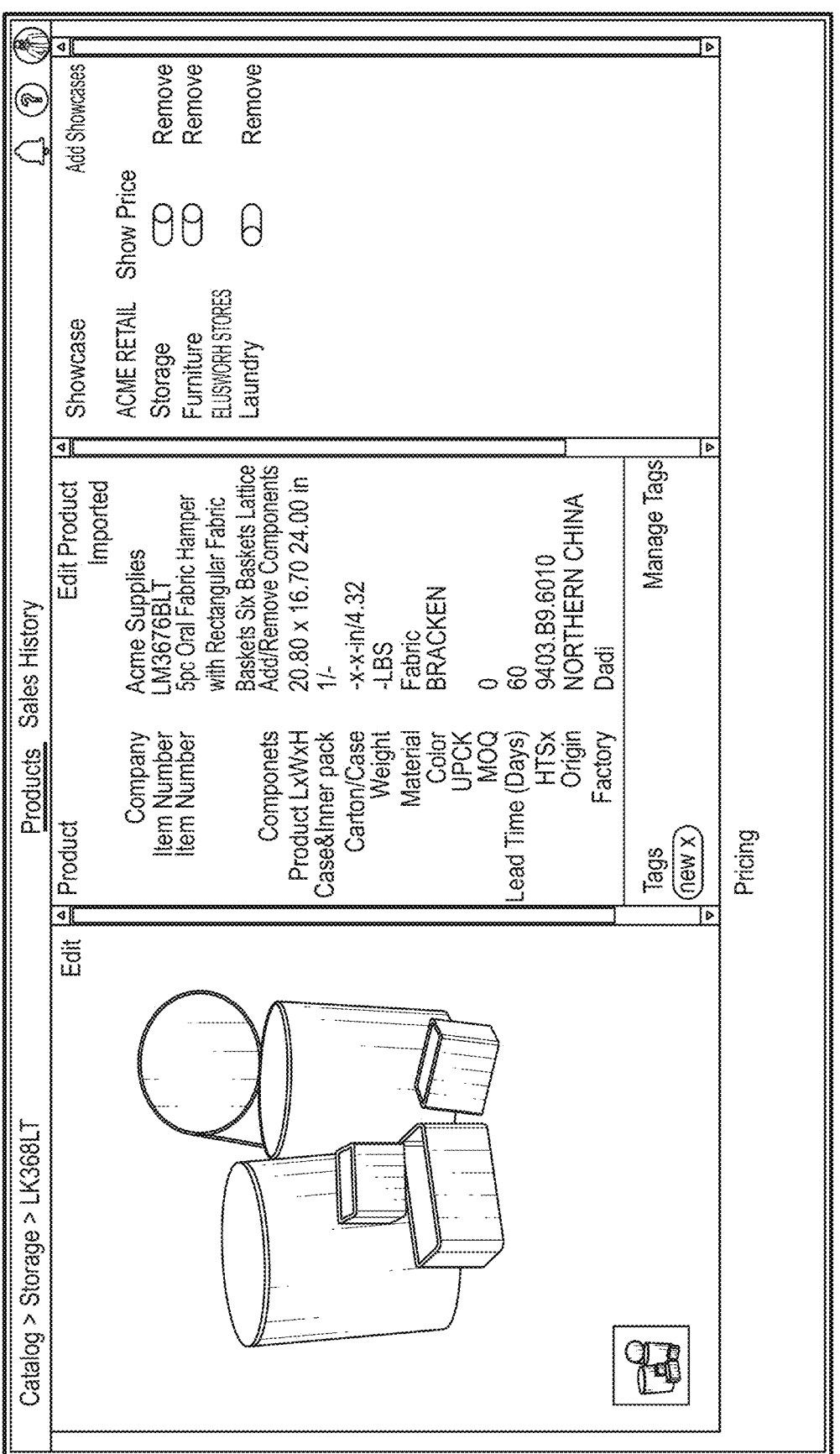

Referring to FIGS. 3J, 3K 3L example user interfaces are illustrated that enable a user (e.g., a supplier user) to broadcast product announcements or other data to multiple potential acquirers at the same time to thereby showcase and enhance the visibility of such products and stimulate the interest of potential acquirers. For example, the showcased product may be a new product, a product with a price reduction, a product undergoing a closeout, or the like.

With reference to FIG. 3J, a catalog page is illustrated with an overlying form enabling the user to select which products are to be added to the showcase. In addition, for each product/product-type a control may be provided which enables the user to specify with the associated price is to be included in the showcase presented to potential acquirers. A search field is provided that enables the user to enter a search term to search for potential acquirers to invite to view the showcase.

Referring to FIG. 3K, the user interface includes a left panel displaying different showcases of products segmented by listed potential acquirer. The user can select a listed potential acquirer and the right panel will display all the showcased products shared to the selected potential acquirer.

Referring to FIG. 3L, the user interface includes a left panel displaying one or more images of a showcased product. A middle panel includes a table of product details, such as item number, description, case pack, cube, lead time, color, material, size, HTS (Harmonized Tariff Schedule), MOQ (Minimum Order Quantity), product components, lead time, pricing, tags, and/or the like. The right panel indicates which showcases for which potential acquirers the product has been included in. Controls are provided enabling the user to share or hide pricing, and enabling the user to remove the product from a selected potential acquirer's showcase.

Certain example user interfaces relevant to the buyer workflow will now be described. Optionally, only a designated subset of supplier users (e.g., buyers and/or department managers) is provided access to user interfaces for creating, editing, and/or inviting suppliers to "Programs." The term "Program" as used herein (unless the context indicates otherwise) refers to how certain buyer personnel (e.g., buyers and department managers) organize their budgets, set goals for what types of products and how many products to buy, keep track of supplier offers, and the orders they create. Programs can be assigned to any set of Departments and Categories, and can be queried from any set of the Departments and Categories to which they are assigned. This enables users to draw insight regarding the Programs.

Figure 4B:
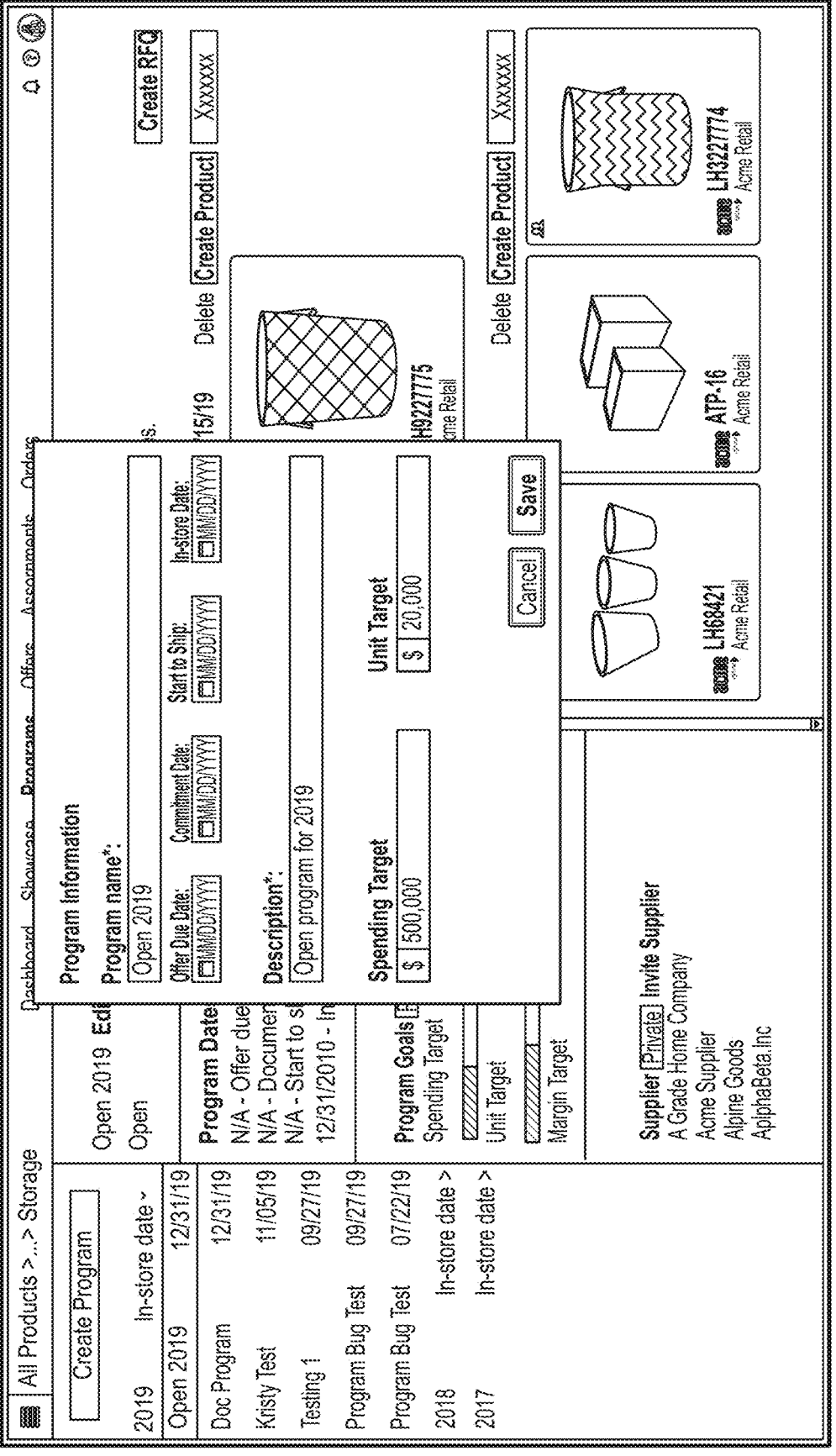
Figure 4C:
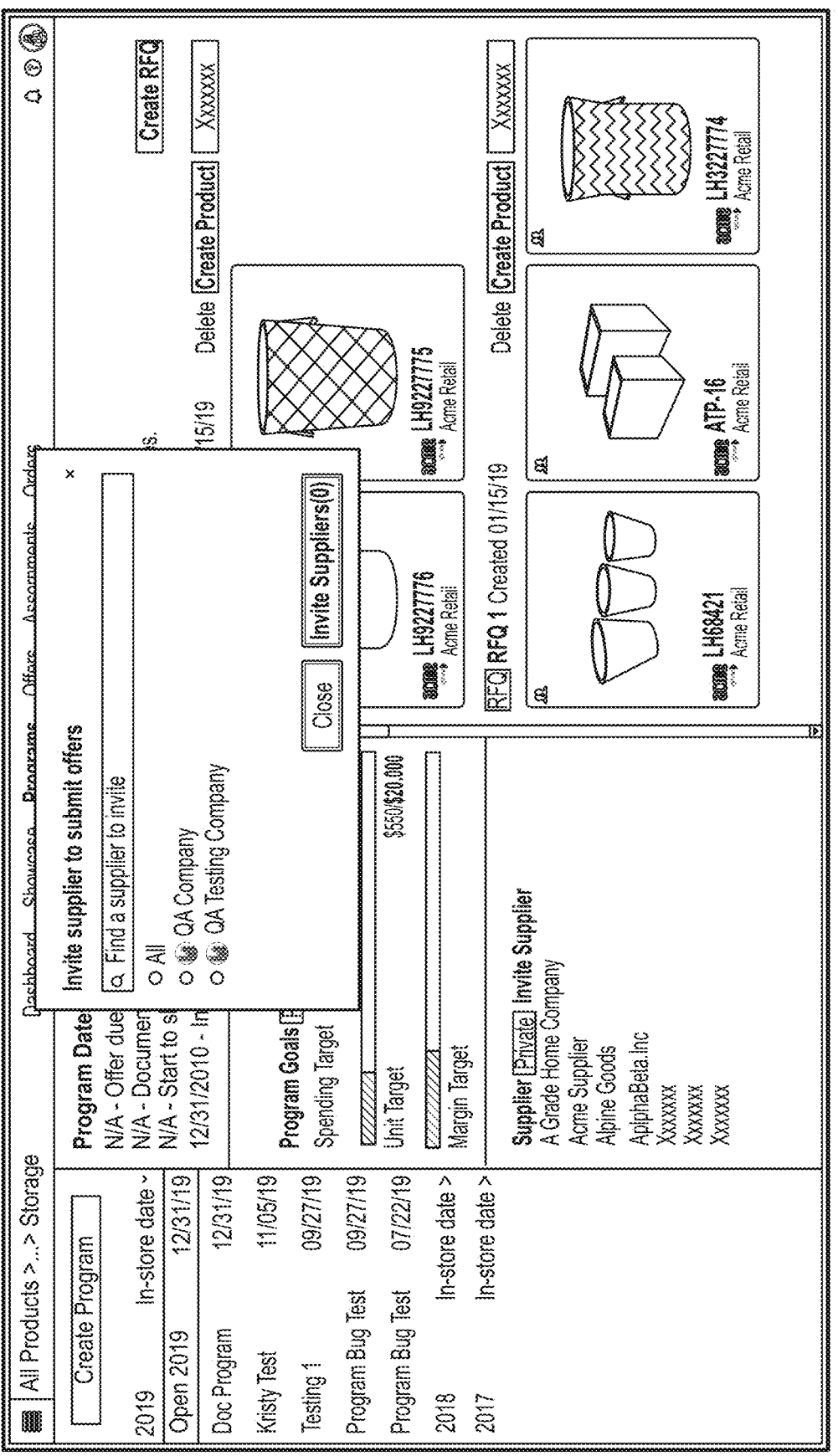

Examples retailer programs user interfaces are illustrated in FIGS. 4A1-A2. With reference to FIG. 4A1, the example user interface enables an acquirer (e.g., a retailer) to create, edit, and invite suppliers to one or more Programs. The example user interface includes a left panel that lists each program assigned to a given product category, optionally organized by date. The user may select one of the listed programs in order to view and optionally edit the program details. The middle panel displays and enables the user to edit the program details (e.g., using the form illustrated in FIG. 4B). For example, the panel may include program description fields and program relevant dates (e.g., offer due date, commitment due date, start to ship date, in-store date, etc.). A user interface is provided (e.g., a Private control) via which the user can upload, alter, and delete files (e.g., image, video, pdf, word processing, and/or other files) to be shared with other authorized users at the acquirer who have been granted access to the category (but not with suppliers). Optionally a user interface is provided (e.g., a Public control) that enables such files to be shared with an entire channel of suppliers that have been granted access to the program. For example, a list of suppliers may be provided. The listed suppliers can be invited, via an invite control, to the program (e.g., using the example invitation to submit offers form illustrated in FIG. 4C). A program progress section may include text and/or graphed data indicating the progress made towards one or more goals (e.g., spending target goals, unit target goals, margin underruns or overruns, etc.). A right-hand panel provides a table of suppliers who have been granted access to the program. The set of suppliers with access to the program may be restricted to those suppliers (or a subset thereof) that have been granted access to the corresponding Category (via a Thread). The supplier information provided in the table may include the supplier's name and logo, and associated supplier products. As will be described the user can request a supplier included in the table to provide a quote (RFQ).

With reference to FIG. 4A2, another example user interface is illustrated that enables an acquirer (e.g., a retailer) to create, edit, and invite suppliers to one or more "Programs. The example retailer programs user interface is comprised of distinct sections. A left side container, organized by date, lists each program assigned to the corresponding category. In response to the user selecting a program from the list, program details may be displayed and the details may be edited. The middle section of the example user interface is where the program information is displayed, created, or altered (e.g., using the form illustrated in FIG. 4B). The displayed and editable fields may include, by way of example, a description of the program and dates relevant to the program (e.g., Offer due date, Commitment due date, Start to ship date, In-Store date, and/or other dates). The dates may be listed graphically using a timeline. Also provided in this middle section is an area via which a user can upload, alter, and delete files (e.g., image files, pdfs, and/or other files). The user can specify whether the files are to be shared only with other retail members who have access to this category and therefore this program (by keeping the file "Private" via a private/public control) or are to be shared with an entire "Channel" of suppliers who have been granted access to this program (by choosing to make the file "Public" via a private/public control). A third section of the example user interface is comprised of a table of supplier companies who have been granted access to this program. Included in this table is information about the supplier (e.g., name and logo of the company). The set of suppliers with access to this program may be restricted to those suppliers (or a subset thereof) that have been granted access to the corresponding Category (via a Thread). This section also provides an interface via which access may be granted to suppliers for this program from the set of suppliers with access to the Category (e.g., using the example invitation to submit offers form illustrated in FIG. 4C).

Figure 4D:
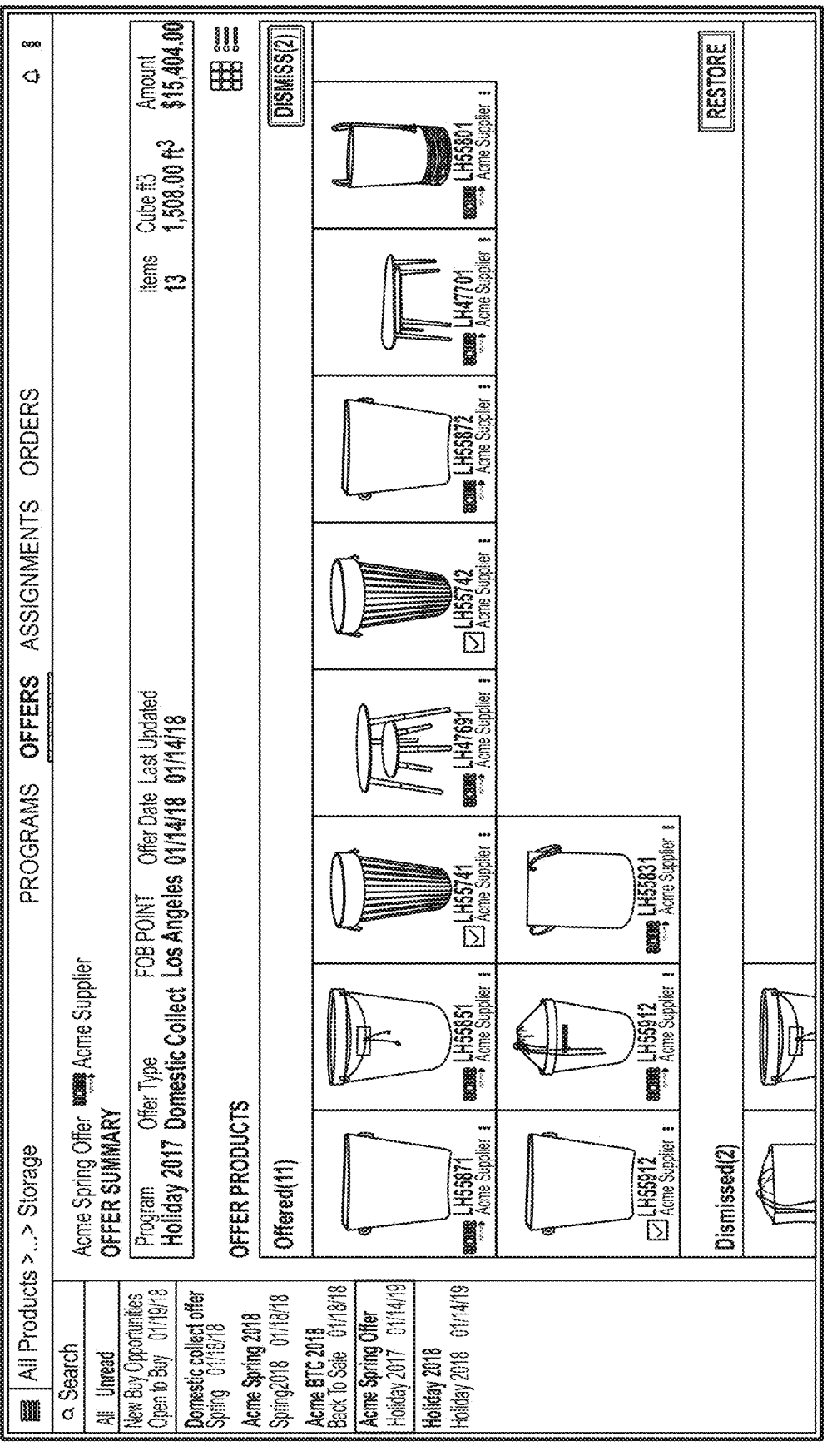

FIG. 4D illustrates an example "Offers" user interface. The "Offers" user interface may be utilized by retail users as an "inbox" of incoming "Offers" for "Offer Products" sent by supplier users. The offers (including updated offers) may be sorted according to date/time received, with the most recent offers (or most recent unread offers) displayed at the top of the inbox. This enables retail users to quickly access and review recently received and recently updated offers, and begin to triage which Offer Products they want to consider further and which offer products they no longer want to consider purchasing. In the illustrated example, the retail user can toggle between viewing an offer via a product card layout (FIG. 4D) or via a table layout (FIG. 4E) with smaller images but more details (e.g., description, origin, case pack, cube dimensions, unit price, total cube, total amount, etc.) about the Offer Products.

In the example user interfaces there are distinct sections. The left hand element is a container of received offers that functions as an inbox in that it indicates new and unseen/unread activity, in this example, via sorting and bolding of text (or other visual highlighting). The majority of the example user interface displays the offer information corresponding to the offer object selected via the left hand section. In both the product card and table example layouts, this section includes an offer summary with data fields such as Program, Offer type, FOB Point, Offer date, Updated Date, Items, Cube, and Amount. Underneath the offer summary section is a collection of Offer Products, laid out in product card layout or table layout (e.g., with information including the product image, the product item number, Notification Badge, Origin, Case Pack, Unit Price, Cube, Quantity, Total cube, and/or amount). In both example representations, Offer Products that have been "Dismissed"

(where the user has indicated via the user interface that the user is not interested in purchasing the Offer Product) are visually and/or textually distinguished from the other Offer Products. In this example, buyers may dismiss or restore products by selecting them (e.g., via checkbox as illustrated in FIG. 4D or via vertical ellipses as illustrated in FIG. 4E), and selecting a dismiss control or restore control as desired.

Figure 4F:
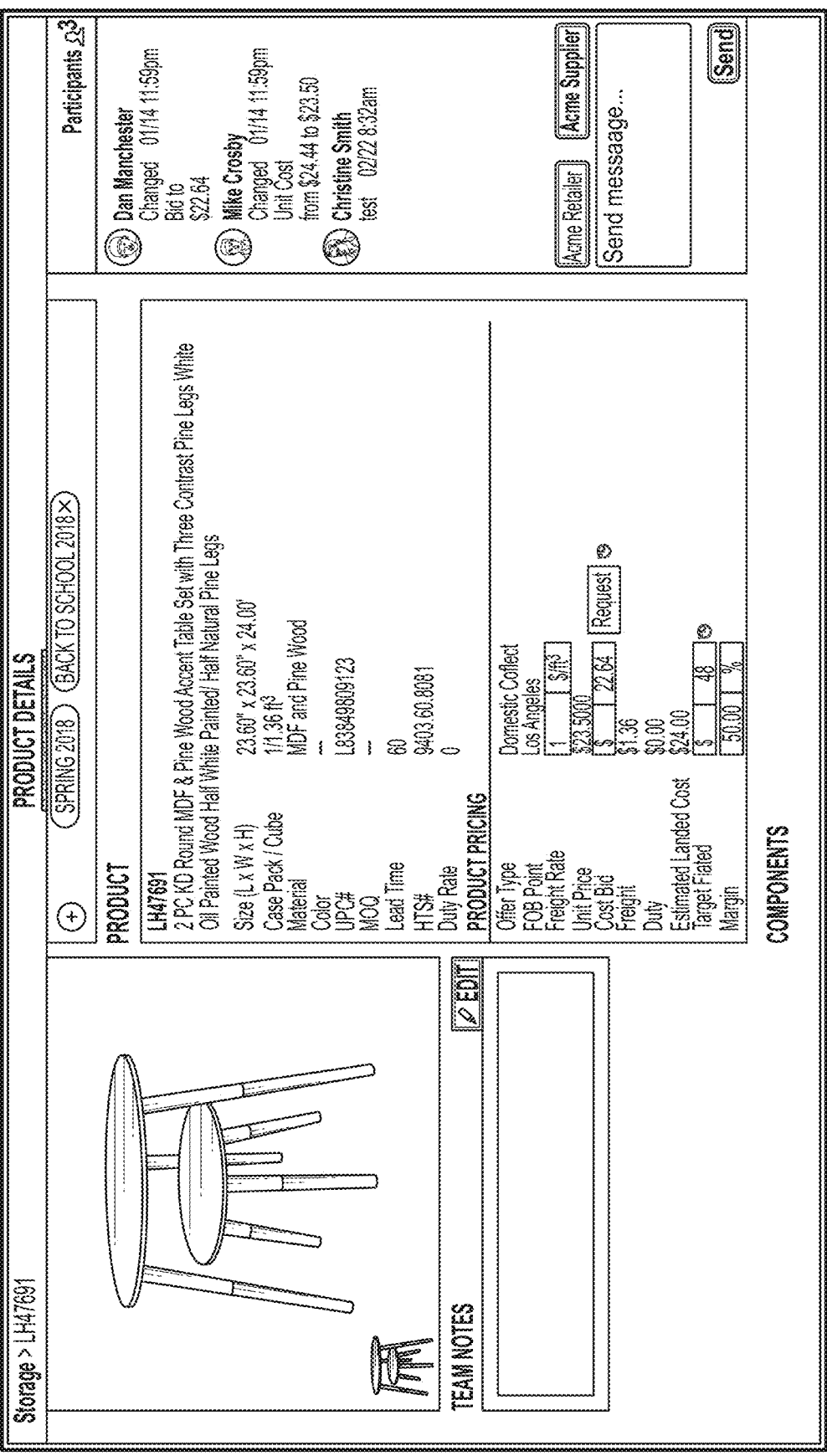

FIG. 4F illustrates an example "Offer Product Details" user interface that enables a retail user to review product information in depth, request any changes or customizations, and/or negotiate price/terms of an Offer Product. This user interface is configured to enable high-touch, fast paced, communication, collaboration, and negotiation. This user interface layout reflects an intentional design choice to organize communications around objects, "Object First Communication", in this instance communication specifically tied to an Offer Product object, to create a better sense of organization, auditability, and insight around the critical artifacts involved in the workflow.

In the illustrated example, the Offer Product Details user interface is comprised of distinct sections. The left section of the user interface includes an area to present one or more images of the Offer Product, while the lower panel in the left is utilized by retail users to enter private team notes on individual offer products. The middle section in this example is comprised of a table containing product details (e.g., Item number, description, case pack, cube, lead time, color, material, size, HTS, MOQ, Product components, other detail information discussed here, and/or other information). This example section includes pricing tools enabling the retail user to quickly calculate and determine such useful information as Estimated Landed Cost, Margin, Retail, and what maximum cost the buyer needs to purchase the product to achieve a target margin. At the top of this middle section of the user interface an interface is provided enabling a retail user to add this Offer Product to a Program (see, e.g., FIG. 4G), so that it may be considered and compared with other products from the same or different suppliers from which the retail user will make their final purchasing decision. For example, a drop-down menu of programs may be accessed, with checkboxes associated with respective listed programs. A user can select, via the checkbox, which programs the Offer Product is to be added to. This example section also includes elements in the table that show a change log/revision history for every field that has changed in value.

Figure 4G:
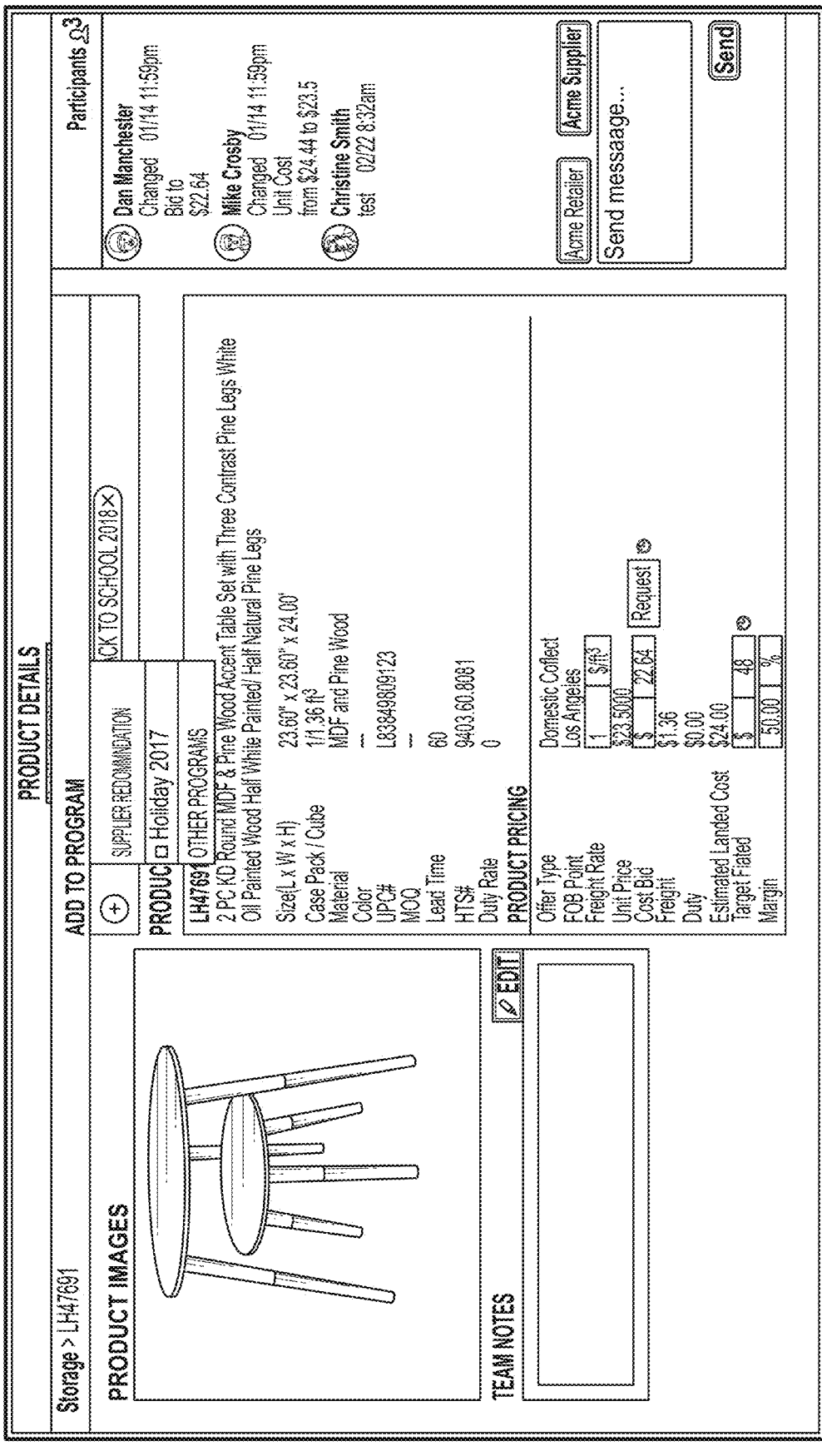

The right most section of the user interface illustrated in FIGS. 4F, 4G, is comprised of chat function and event log. In this section, users can message either all users (including those users of both the retailer/buyer and of the supplier) and that have access to this Offer Product, or limit the communication to all users within their own company that have access to this Offer Product. In this example, an interface is provided via which the user can specify which group she wants to message by toggling the company controls ("Acme Supplier" and "Acme Retailer" in the illustrated example) adjacent to the chat input box. In addition to messages, events detected by the system, such as a cost bid, a price change, field updates, and/or the like, are inserted into and displayed by the chat history creating a fluid timeline of communication about and updates to the Offer Product.

Figure 4H:
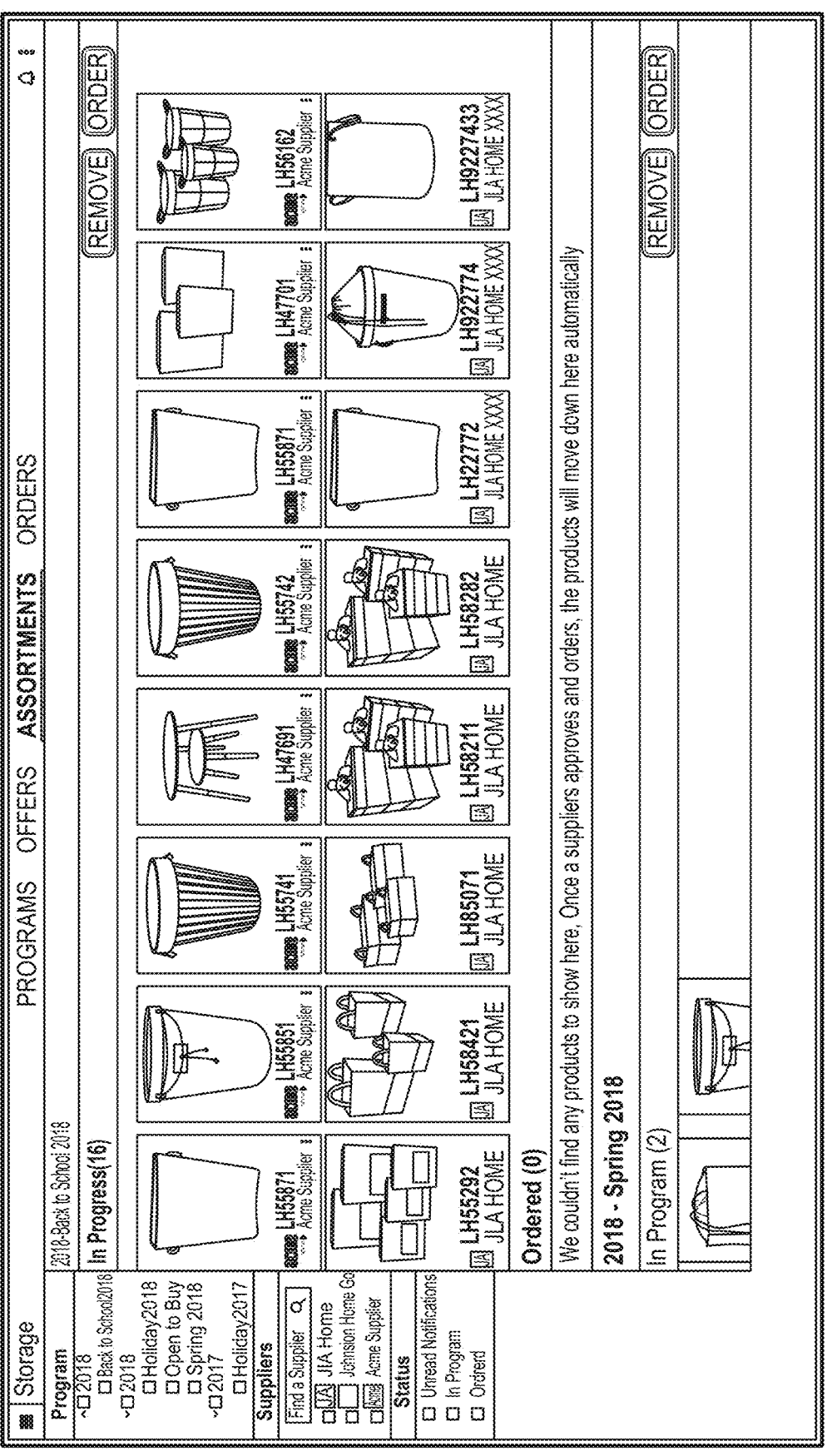

FIG. 4H illustrates an example Assortments user interface which displays to retail users the sets of products they have added to Programs from one or more offers from one or more suppliers. This interface enables retail users to make their final decisions on which products they want to purchase, from which suppliers, and in what quantities for their designated Programs.

In this example, the user interface is comprised of distinct sections. The leftmost section is a container of filters (e.g., program filters, supplier filters, status filters), that scope the objects on the right section of the user interface across one or more parameters such as Supplier, Program, Product Status, and/or the like. Thus, for example, the user can use the filters to specify which products are to be displayed in the right section by selecting desired programs, suppliers, and/or status. The filters may be organized as parent-child trees (e.g., programs for 2018 may be listed under a 2018 heading, and programs for 2019 may be listed under a 2019 heading). The right (and in this example) larger section of the user interface is comprised of one or more containers corresponding to one or more Programs, that contain offer products that retail users added to that program and or purchased for that program. Each program section may include respective remove product and order product controls. Offer product cards include information (e.g., supplier company name and/or logo) that distinguish products from different suppliers. The card layout serves as a visualization tool for the retail users to stage their assortment. Retail users can select one or more products via the checkboxes on the product cards and remove the products from the Program (by activating a remove control) or place the products on an order or on orders (by activating an order control).

Figure 4J:
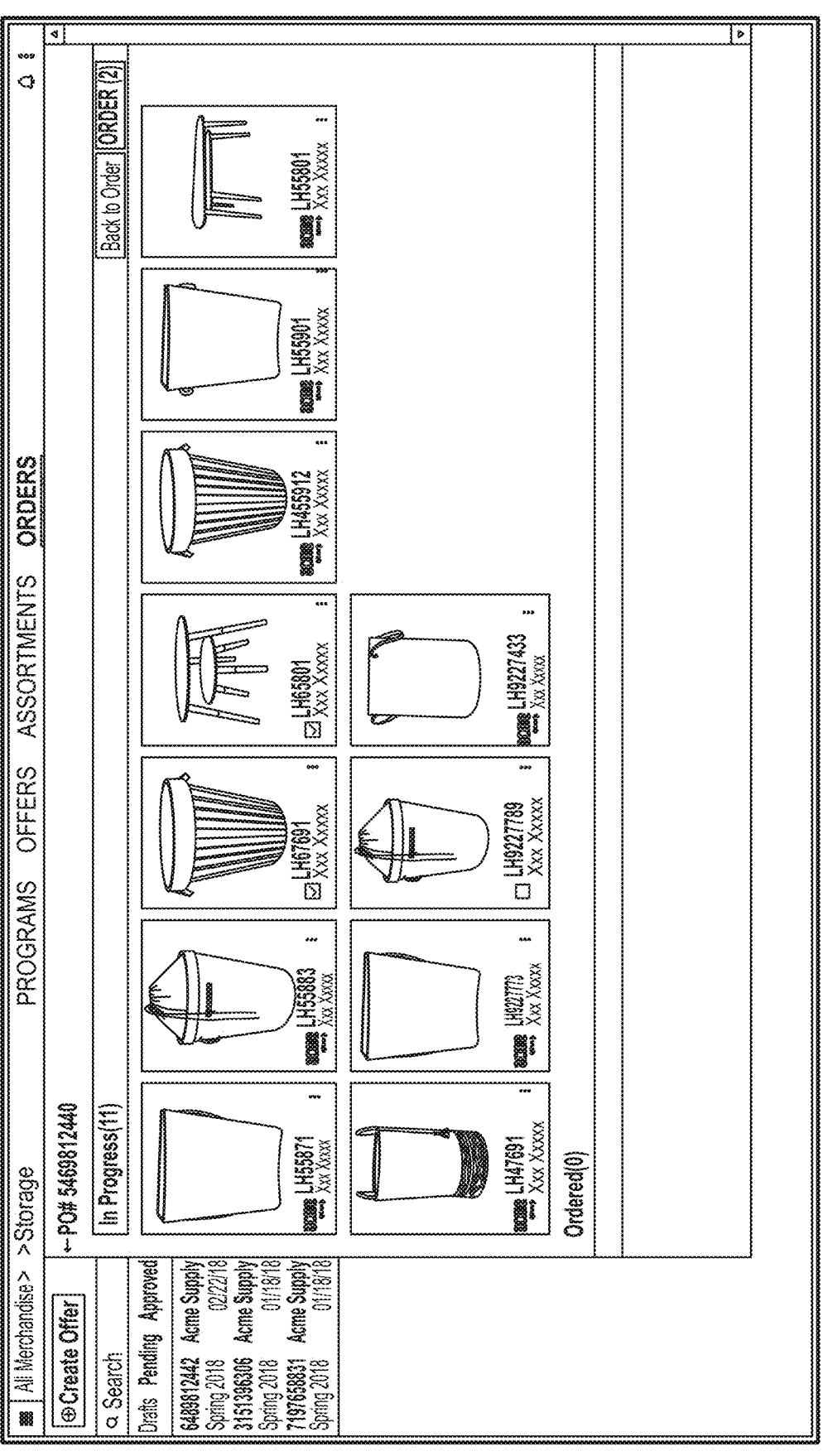

FIG. 4I illustrates an example order creation form, including program, supplier, order type, FOB (Freight on Board) point, destination, ship window start, ship window end, receipt date, payment terms, pre-ticket, and/or special instruction fields. To create an Order, retail users fill in the information in the form with available values which may be filtered based on the user's previous selections. Once the fields in the form have been completed the user is navigated to the "Add Products to Order" user interface, an example of which is illustrated in FIG. 4J.

The Add Products to Order user interface displays a set of products filtered to match the values that the retail user entered for certain fields (e.g., "Supplier") in the create order form illustrated in FIG. 4I. The Add Products to Order user interface enables the user to select which products the user wants to add to the order. In this example, the user interface includes distinct sections. A container of orders on the left side of the user interface (That functions similarly to the container of Offers illustrated in FIGS. 4D, 4E. The user can select to view draft orders, pending orders, or approved orders (e.g., via respective tabs). An order search field is provided via which a user can enter an order search query, and a search engine will return and display matching orders (e.g., in ranked order based at least in part on relevance or closeness of match). When an order is selected via the order container, the container on the right side of the user interface accesses and displays objects, information, and functions related to that order. In this example those objects are a set of products filtered by the user's input when creating the order, that the user can select from (e.g., by clicking corresponding checkboxes) to add to the order. An order control may be enhanced to show the number of items added to the order.

FIG. 4K illustrates an example draft order user interface. Once the retail user adds products to the order they become "cloned instances" of the Offer Products, called "Order Products." This allows for the same Offer Product to be ordered many times, potentially in different ways due a change in terms such as price or FOB Point. Retail users may utilize the "Draft Order" user interface to finalize information needed to transmit the order to the supplier. The Draft Order user interface may include fields such as Quantity, Unit Cost, Retail Cost, IMU, Case Pack/Cube, Margin, Total Cube, Total Cost, and/or Total Retail Cost fields. The retail user may review information presented via the various fields and finalize the order.

The retailer may also finalize any information needed to execute a purchase order that may not have been necessary to provide at an earlier stage in the process. For example, the retailer may add a retailer specific item number to each product and/or a short description to print on the tag/label of a product. Such types of information may not have been needed to make a decision as to which products to purchase from which suppliers, or to negotiate a product purchase, but may be required by the retailer to execute an order. Such information may be referred to as Order Requirements, Order Product Requirements, and Order Product Component Requirements. These requirements are available via the user interface illustrated in FIG. 4K to complete in the table of order products and via a form launched by the "Edit" order button.

The example draft order user interface includes distinct sections. A container of orders on the left side of the user interface (that functions similarly to the container of Offers in FIGS. 4D and 4E). The user can select to view draft orders, pending orders, or approved orders (e.g., via respective tabs). An order search field is provided via which a user can enter an order search query, and a search engine will return and display matching orders (e.g., in ranked order based at least in part on relevance or closeness of match). The right section of the example user interface which contains information, objects and functions related to the order selected via the order container section. For example, the right section may include objects such as a table of Order Products and Order Product Components, with details about each such as Quantity, Unit Cost, Retail Cost, IMU, Case Pack/Cube, Margin, Total Cube, Total Cost, and/or Total Retail Cost, and a summary of the order (e.g., including program name, expected receipt, ship window, FOB point, number of units, cube, cost PC MU, retail cost, relevant dates (e.g., net payment period, order created date, last updated date), retailer requirement, logistics (e.g., order type, FOB point, destination), and/or totals (e.g., units, cost, estimated landing cost, total cube)). Functions provided via the user interface may include: calculation tools to calculate Estimated Landed Cost, Margin, Total Cost, Total Retail, and/or Total Cube, user ability to add more products, edit the order details, delete the order, and send the order to the supplier.

FIG. 4L illustrates an example pending order user interface. Once the retail user has transmitted the order to the supplier, the order becomes viewable by the supplier and the order changes status from being a "Draft" Order to a "Pending" Order. At this point much of the user interface is optionally the same as the Draft Order user interface (see, e.g., FIG. 4K), with many of the same fields displayed to the buyer and with the same or similar functionality available. Optionally, the Pending Order user interface omits a delete order control. The example Pending Order user interface includes a Chat/Messaging user interface and functionality. The Chat/Messaging user interface enables users to message all other users who have access to this order (e.g., including retailer users and supplier users) or only all other users from their company who have access to this order. As similarly discussed with respect to the chat panel on the offer product user interface, this chat panel accesses and displays a revision log of changes to the order. Optionally, only retailer users are provided the sole ability and discretion to edit/alter information about the order.

Figure 4M:
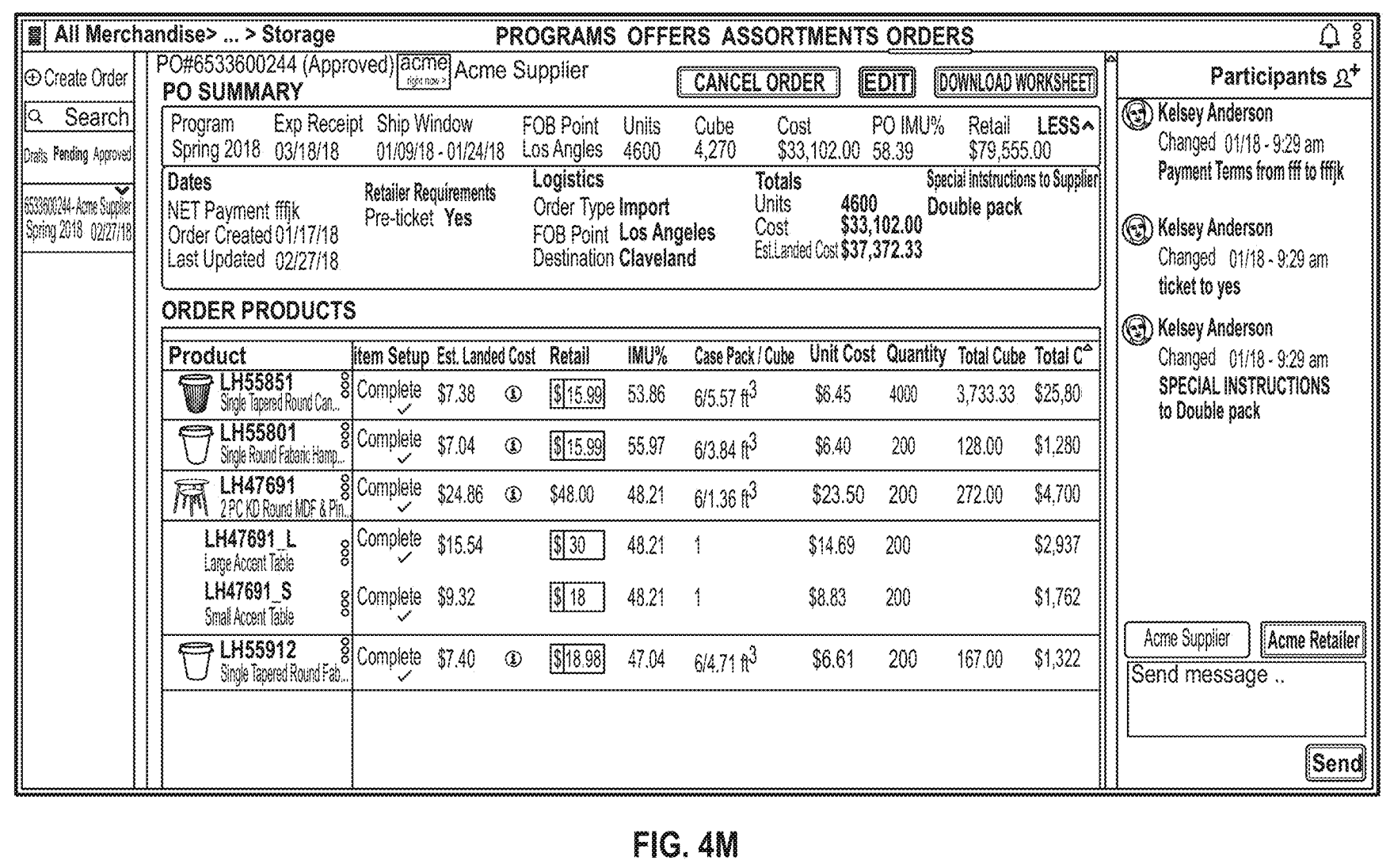

FIG. 4M illustrates an example approved order user interface-retailer view. After a retail user sends an order to a supplier, the supplier users receive the order and may review the order details and request any desired changes, such as changing the ship window. Once the supplier is in agreement with the terms of the order, the supplier approves the order, allowing the buyer to export the order via one or more formats such as to a CSV or Excel file in their preferred format, or as a JSON file to transmit to another system. In response to detecting any editing of the fields/terms of the order that would affect the supplier (e.g., changing the ship date or quantity of a product ordered), the system changes the order status back to "Pending". The system may then require the supplier to re-approve the order before the retail user is enabled to export the order from the platform.

Figure 4N:
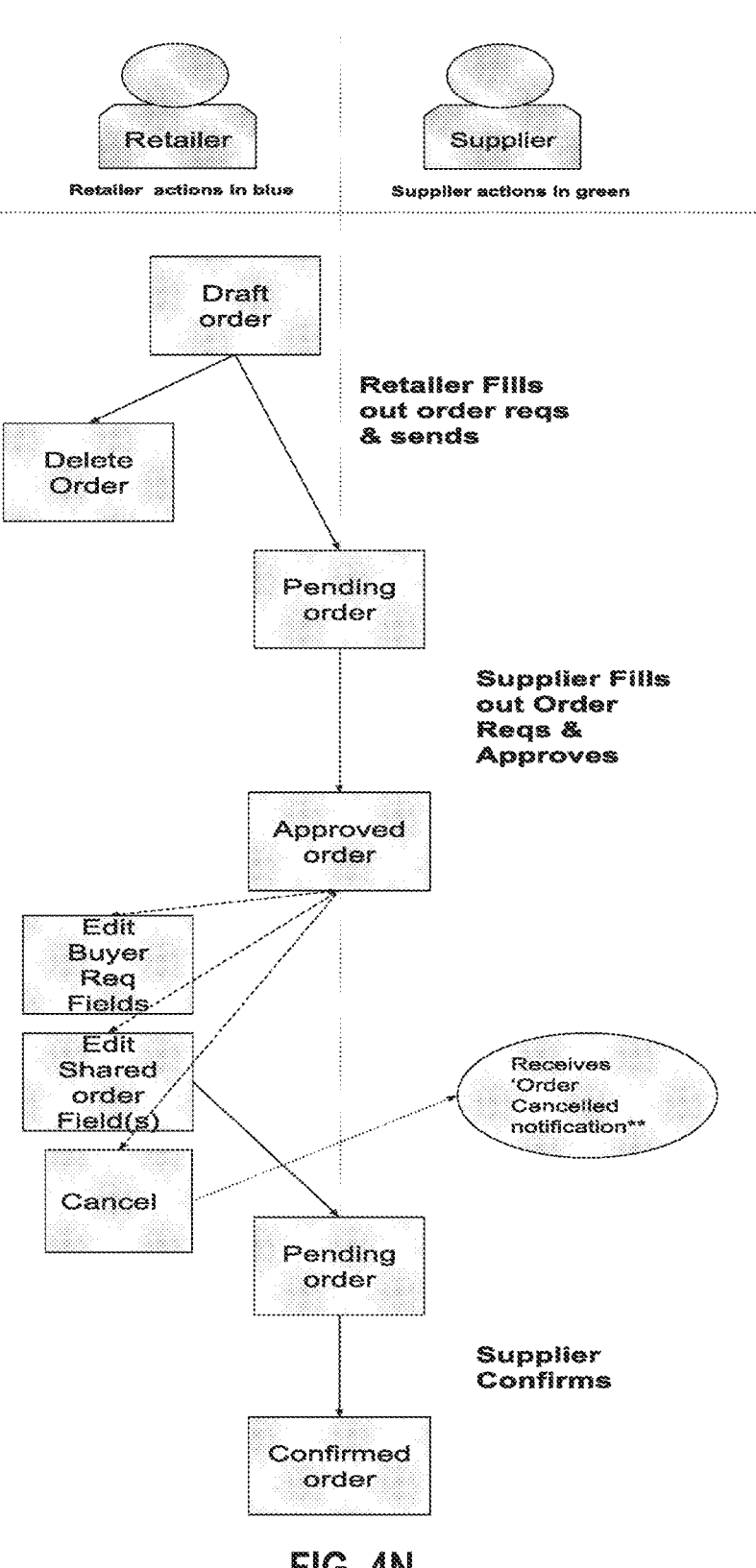
FIG. 4N illustrates an example process.
Figure 40:
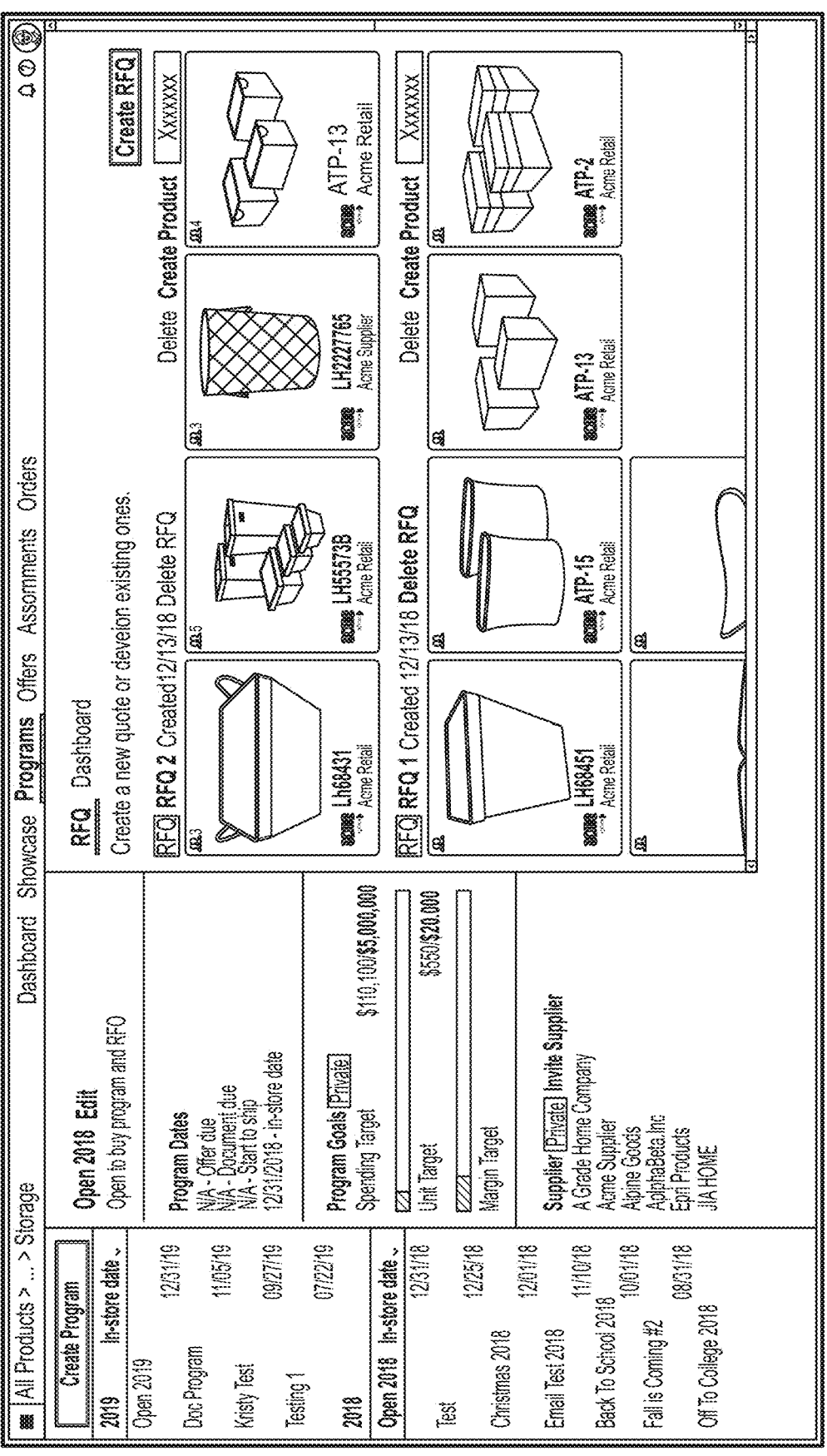

FIG. 4N illustrates an example order process. The retailer drafts the order (including order details). The retailer may cancel the order or transmit the order to the supplier. If the retailer transmits the order to the retailer, the order status is changed from draft to pending. The supplier may fill out additional needed order details and approve the order. The approved order may be transmitted back to the retailer. In response to detecting that the retailer has activated an order cancel control, the system transmits an order cancellation notification to the supplier. In response to detecting that the retailer has edited buyer required fields or shared order fields, the status of the order may be changed to pending, and transmitted to the supplier for approval or rejection. If the supplier approves the order with the changes, the status of the order is changed to confirmed.

FIGS. 4O, 4P, 4Q1 illustrates example user interfaces usable in a workflow that enables an acquirer (e.g., a retailer) to create one or more requests for quotes (RFQs), setup RFQs for specific products, and invite suppliers to respond to RFQs and RFQs for specific products. The user interfaces enable a user at the acquirer to specify details of products for which a quote is to be requested. The user may add additional information via a note interface, select suppliers to whom the product RFQs are to be transmitted to, and review received responses to the RFQs.

With reference to FIG. 4O, as similarly discussed with respect to FIG. 4A1, the example user interface enables an acquirer (e.g., a retailer) to create, edit, and invite suppliers to one or more Programs. The example user interface includes a left panel that lists programs assigned to a given product category, optionally organized by date. The user may select one of the listed programs in order to view and optionally edit the program details. The middle panel displays and enables the user to edit the program details (e.g., using the form illustrated in FIG. 4B). For example, the panel may include program description fields and program relevant dates (e.g., offer due date, commitment due date, start to ship date, in-store date, etc.). A user interface is provided (e.g., a Private control) via which the user can upload, alter, and delete files (e.g., image, video, pdf, word processing, and/or other files) to be shared with other authorized users at the acquirer who have been granted access to the category (but not with suppliers). Optionally a user interface is provided (e.g., a Public control) that enables such files to be shared with an entire channel of suppliers that have been granted access to the program. For example, a list of suppliers may be provided that can be invited, via an invite control, to the program (e.g., using the example invitation to submit offers form illustrated in FIG. 4C). A program progress section may include text and/or graphed data depicting the progress made towards one or more goals (e.g., spending target goals, unit target goals, margin underruns or overruns, etc.). A right-hand panel provides a table of suppliers who have been granted access to the Program. The set of suppliers with access to the Program may be restricted to those suppliers (or a subset thereof) that have been granted access to the corresponding Category (via a Thread). The supplier information provided in the table may include the supplier's name and logo, and associated supplier products. As will be described the user can request a supplier included in the table to provide a quote (RFQ).

Figure 4P:
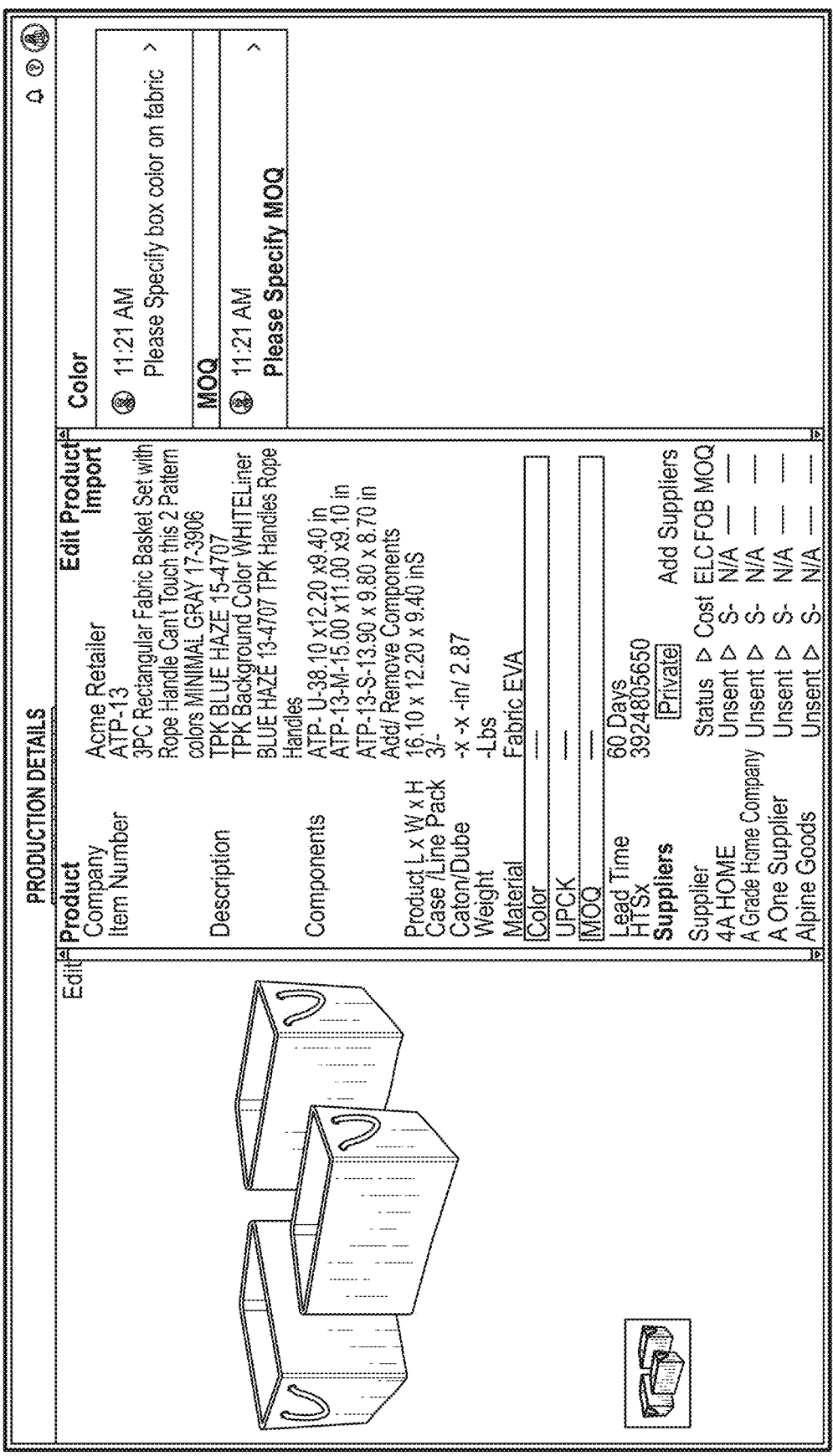

With reference to FIG. 4P, an example RFQ product details page is illustrated. In this example, the left pane includes one or more product images of the product for which the RFQ is being generated. The acquirer users can add to or remove images. The middle panel displays product details (e.g., supplier name, item number, description, components, dimensions, case data, carton/cube dimensions, weight, materials, color, UPC code, MOQ, lead time, and/or HTS number). In addition, the middle pane lists the suppliers that have been requested to provide a quote for the product with corresponding quote terms such as price/cost, minimum order quantity, FOB point, MOQ, and/or the like. Optionally, the status of a given quote request is reported (e.g., unsent, sent, response received, and/or the like). The right pane includes a notes/communication section via which the user can add additional comments, information, instructions or questions regarding the product.

Figure 4Q:
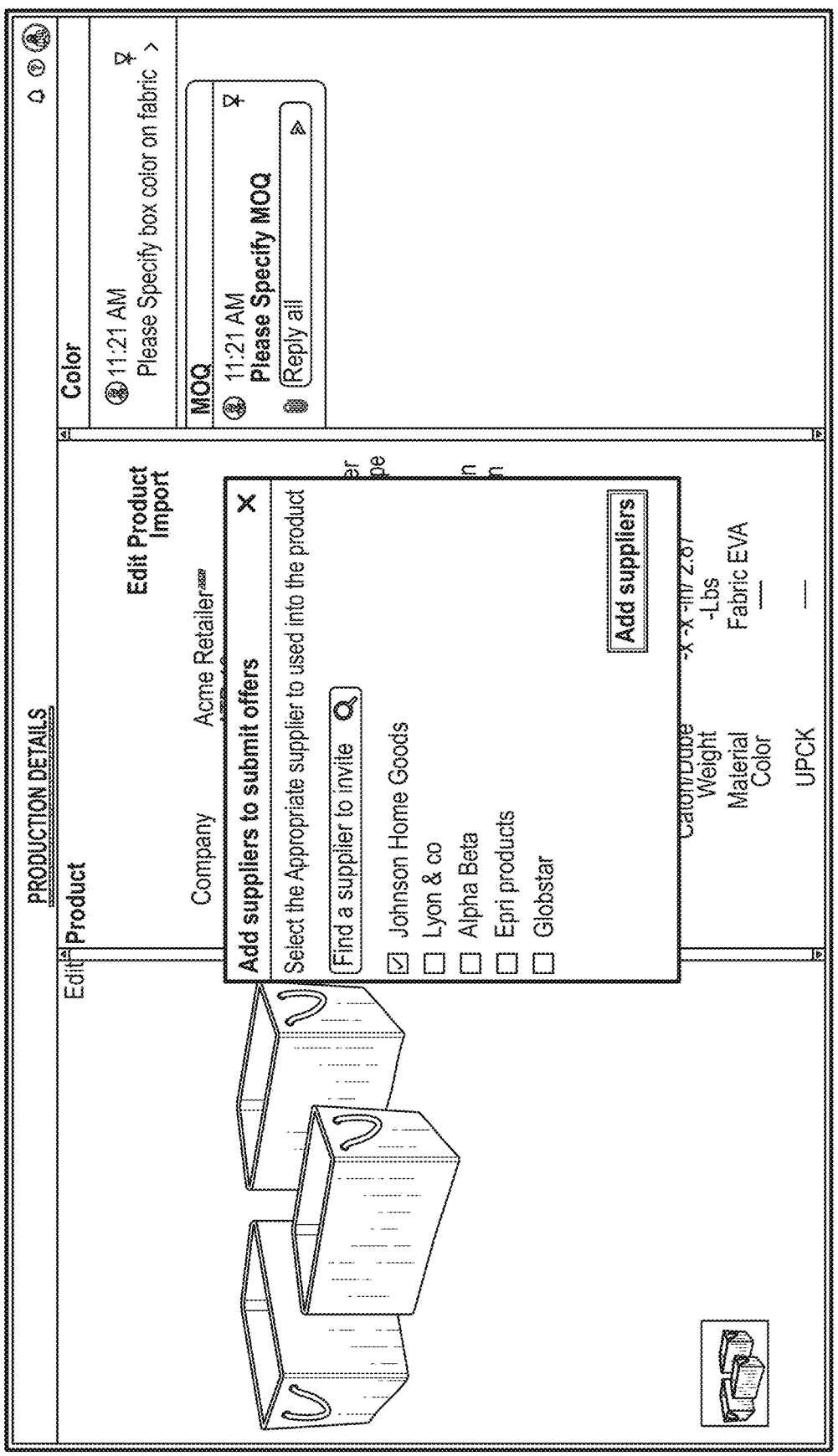

With reference to FIG. 4Q, an example invite user interface is illustrated. A list of potential suppliers is provided. A user can select one or more of the potential suppliers to whom an invite to respond to the specific RFQ will be transmitted.

With reference to FIGS. 4R1, 4R2, 4R3, example offers received user interfaces are illustrated. The user interfaces may be intended to be used by an acquirer user to view and manage offers. In this example, the left pane lists offers received in response to an RFQ and RFQ for which offers have not yet been received. The list may include the program name associated with a given offer, and an associated data and/or time. The middle pane may include images of the products being offered displayed in association with the corresponding supplier name and product identifier. The right pane may include a communication section via which the user can view and provide alternate terms, comments, information, instructions or questions regarding the RFQ or product from or to an identifier supplier. Thus, the user interface may be utilized to negotiate the terms of a corresponding RFQ. With reference to FIG. 4R3, an example acquirer's view of an offers received user interface in table format is illustrated.

The "offers" user interfaces illustrated in FIGS. 4R2, 4R3 may be utilized by a user at the acquirer as an inbox of incoming "offers" for products which are sent by supplier users. The illustrated user interfaces enables a user to review recently received and recently updated offers and begin to triage which offered products the user wants to consider further (e.g., by selecting a like control) and which offer products they no longer want to consider to buy (e.g., by activating a delete control). A control is provided that enables the user to toggle between a user interface displaying offers via a product card layout (FIG. 4R2) and the table layout (FIG. 4R3) providing smaller images but more product details. Thus, the user interfaces can be configured to format and provide data so as to provide the most relevant details (e.g., larger images, more text description) needed at a given time.

In this example, a left-hand pane lists received offers, and indicates new and unviewed activity/offers (e.g., via sorting items so that the unviewed items are on top and/or via bolding of text). The user can select a given offer in the left hand pane, and the corresponding offer information is accessed and displayed in the middle pane. The offer information may be in the form of an offer summary, including some or all of the following fields: program name, offer type, FOB point, offer date, offer updated date, items, case pack, quantity, cube, amount, and/or the like. Underneath the offer summary section, a set of offer products may be displayed, laid out in product card or table layout with information. The information may include some or all the following information: the product image, the product item number, notification badge, origin, case pack, unit price, cube, quantity, total cube, and amount. In both representations, offer products that have been "Dismissed" (e.g., via a corresponding control to indicate that the offer products will not be further considered with respect to the RFQ), are distinguished from the other offer products. In the example illustrated in FIG. 4R2, the user can select an item via a corresponding checkbox, and then dismiss or restore the selected product. In the example illustrated in FIG. 4R3, the user can select an item via corresponding vertical ellipses.

With reference to FIG. 4S, the example offers user interface may be used to negotiate an order and place an order. For example, the acquirer user may change values as a counteroffer to a supplier (e.g., cost bid, quantity, etc.) and/or via a communication via the right hand pane.

Figure 4T:
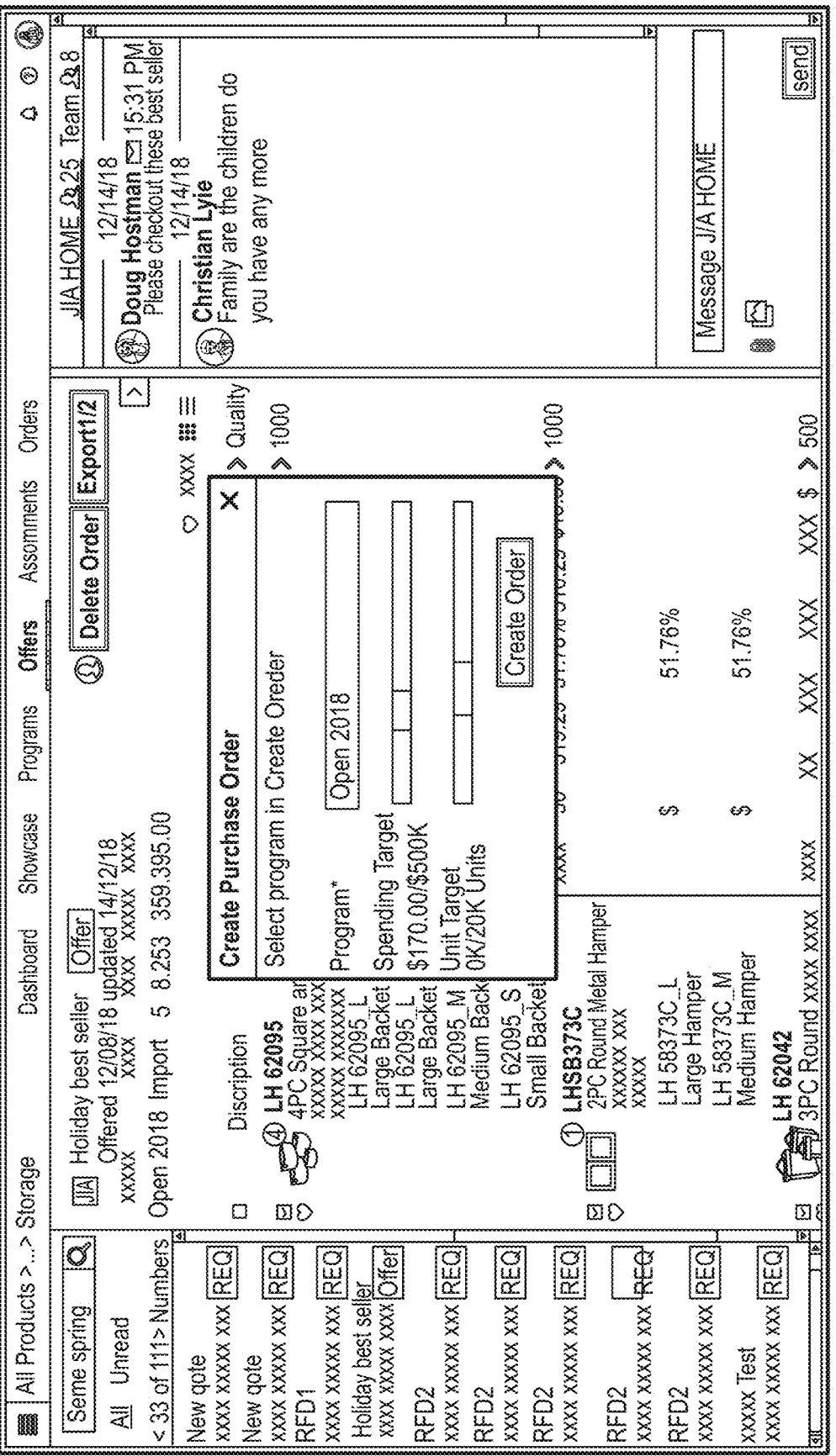

With reference to FIG. 4T, the user may place an order with one of the suppliers. When the user initiates the order operation, a pop-up user interface is presented via which the user can specify which program the order is for. In addition, the spending target and unit target calculations may be re-executed based on the order and presented to the user.

Figure 4U:
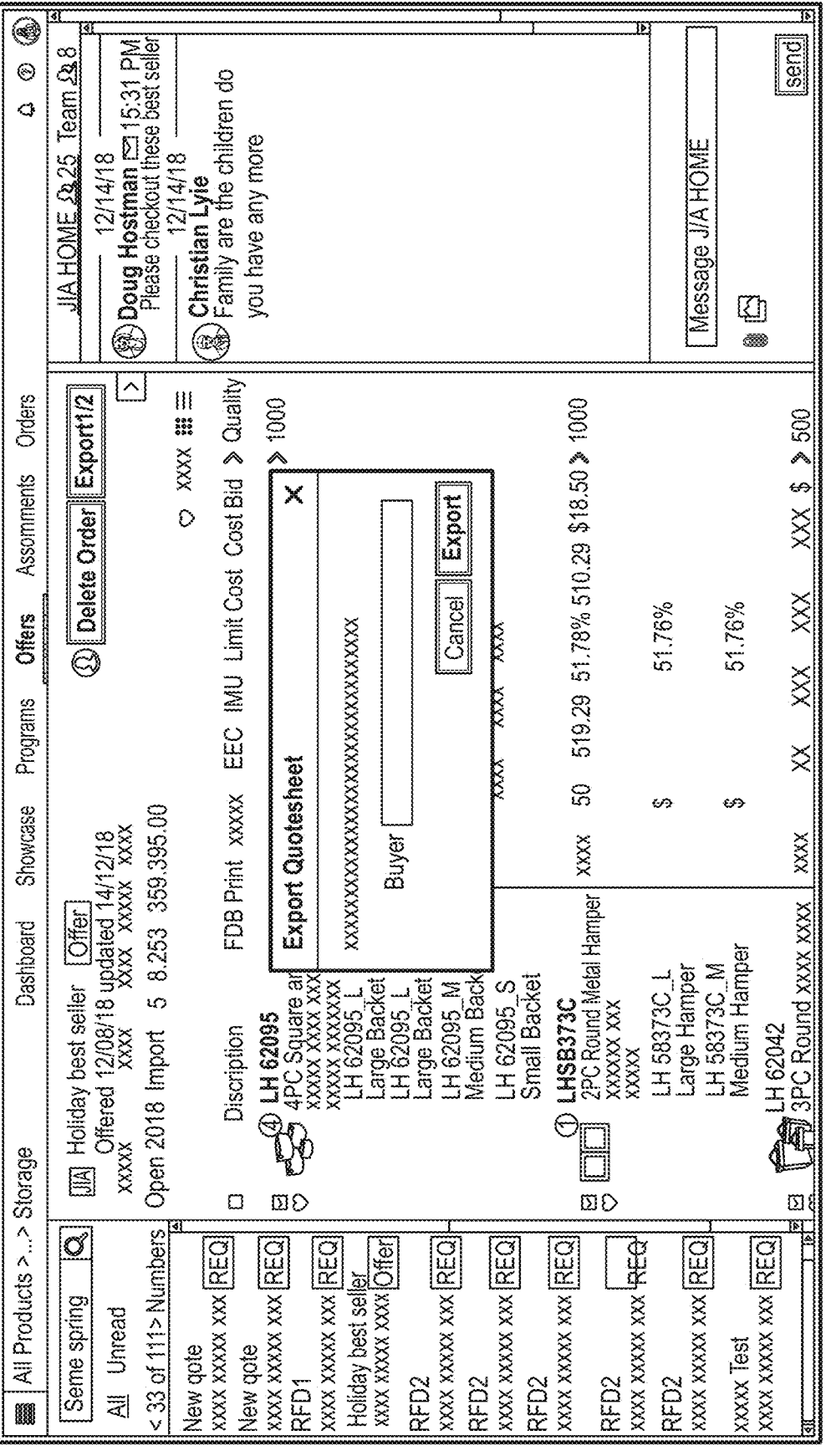

With reference to FIG. 4U, the example user interface enables the user to export quote sheet data for a specified buyer.

With reference to FIG. 4V, an example Offer Product Details user interface is illustrated. A pane includes one or more images of the product (e.g., from different perspectives). Another pane provides textual product data (e.g., dimensions, case pack, volume/cube size, material, color, UPC, MOQ, lead time, HTS, duty rate, freight rate, FOB/POE, freight cost, duty cost, offer type, etc.). Another pane may display the negotiation history for the product order. For example, the history may be presented in column format including the negotiation event (e.g., original quoted price, counter offer, supplier counter offer, purchaser requested price), price, margin (as a percentage and/or dollar amount), event date, and/or the like. A calculation pane may be provided. Fields are provided via which the user can enter certain data to be used in the calculations (e.g., freight rate, target retail price, margin, etc.). Functions provided via the user interface may include calculation tools to calculate estimated landed cost, margin, retail price, and the cost the product needs to be purchased at so as to achieve the target margin. A field is provided via which the user may request and specify a different price. A communication pane is provided via which additional comments, information, instructions or questions regarding the product or offer may be communicated, and a log of such communications may be presented. For example, the communication pane may be used to message all users that have access to the product, or all users within the user's organization that have access to the product. A control may be provided that enables the user to specify which group the user wants to message (e.g., by toggling the organization buttons directly above the communication input pane). In addition to messages, events such as a cost bid, a price change, and field updates may be displayed in the chat history creating a fluid timeline of communication about and updates to the offer product.

A control may be provided that enables the user to add the offer product to a Program, thereby enabling the offer product to be considered and compared with other products from the same or different suppliers from which the buyer user will make a final purchasing decision.

Figure 5A:
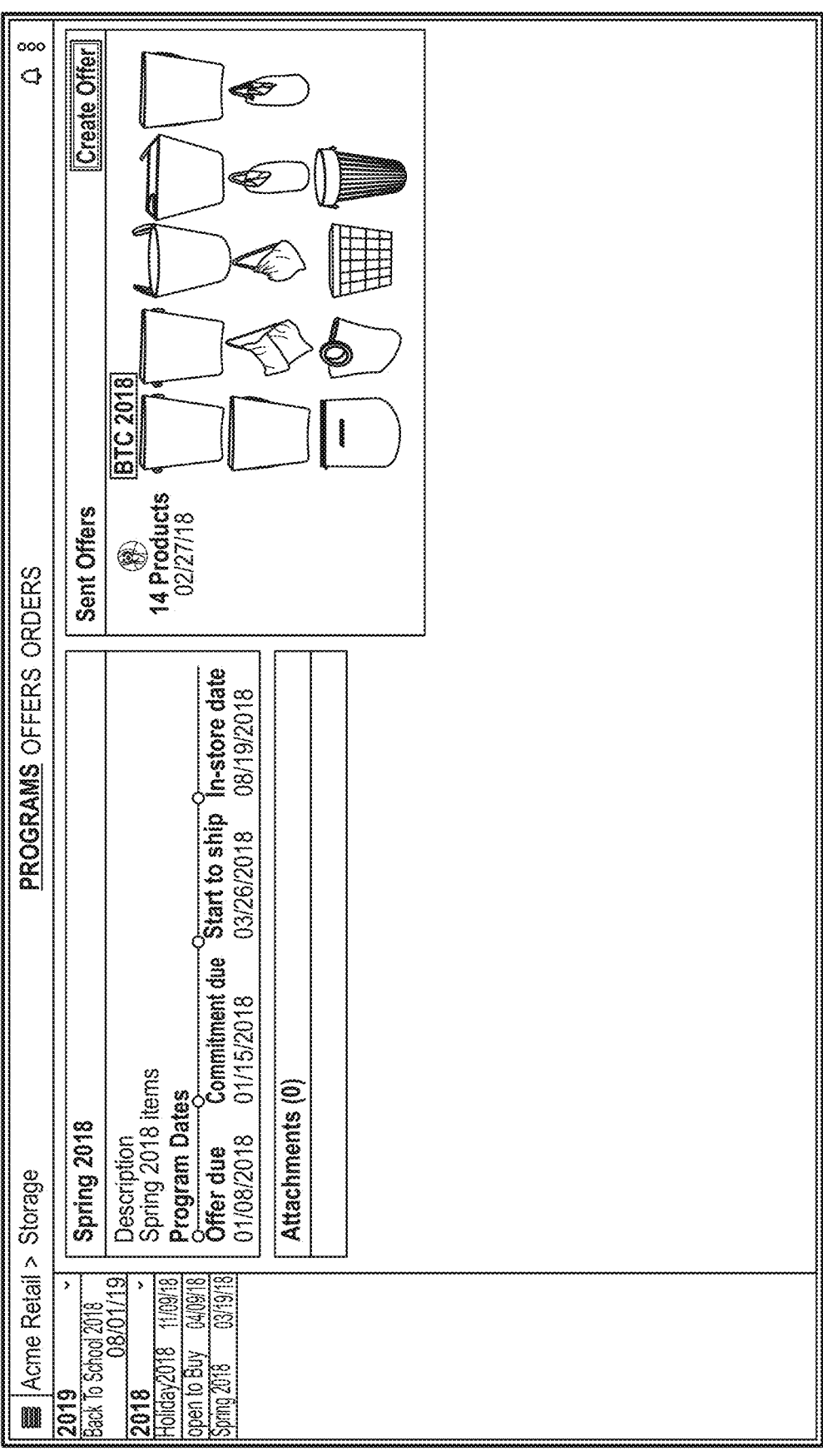

Certain example user interfaces related to seller/supplier workflow will now be described. FIG. 5A illustrates an example programs user interface-supplier view. The programs user interface will display to supplier users who have access to this retailer Category (Thread) all programs that the retail users have elected to share with the supplier. The supplier users may utilize the user interface to review information, such as dates related to the program and any files the retail user has shared to determine what products to offer and when to offer such products.

The programs user interface, in this representation, is comprised of distinct sections. A left side container, organized by date, with a list of programs assigned to that category. The user selects a program from the list to see the details of the program. The middle section of the user interface displays program information. Example data fields may include a description of the program, dates relevant to the program such as offer due date, commitment due date, start to ship date, and/or in-Store date (optionally listed graphically using a timeline), and any files shared by the retail user. A preview section of the user interface displays previews of offers made by users of the supplier company for this program (e.g., thumbnail images of the products on the offer, the name of the offer, a picture of the user who sent the offer, the date when the offer was sent, and/or other information).

Figure 5B:
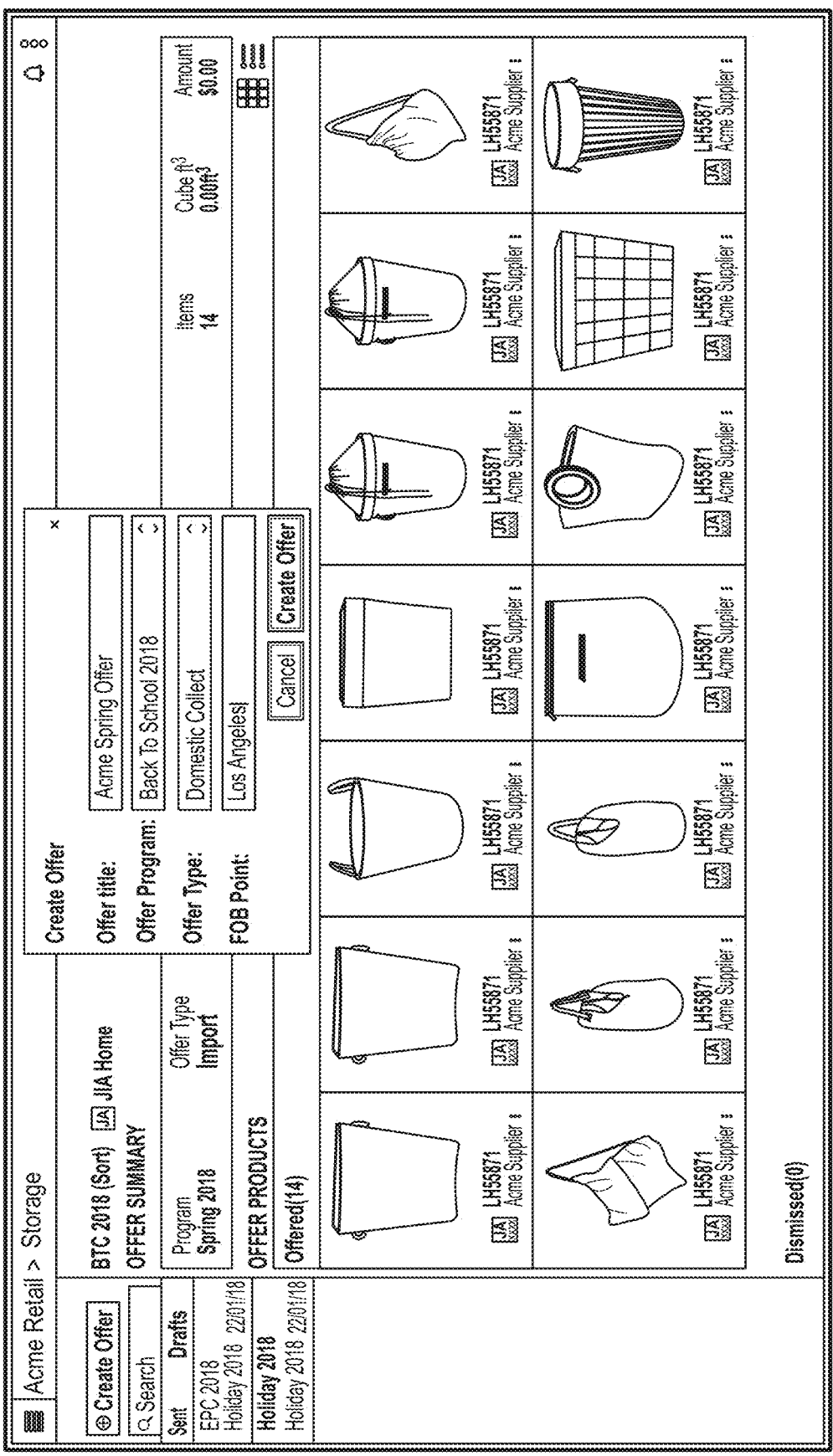

FIG. 5B illustrates an example create offer user interface which may be utilized by supplier users to create a new Offer. An Offer may include Offer Products, and may include values for certain fields (e.g., Title, Program, Offer Type, and if Offer Type is "Domestic", then FOB Point).

Figure 5C:
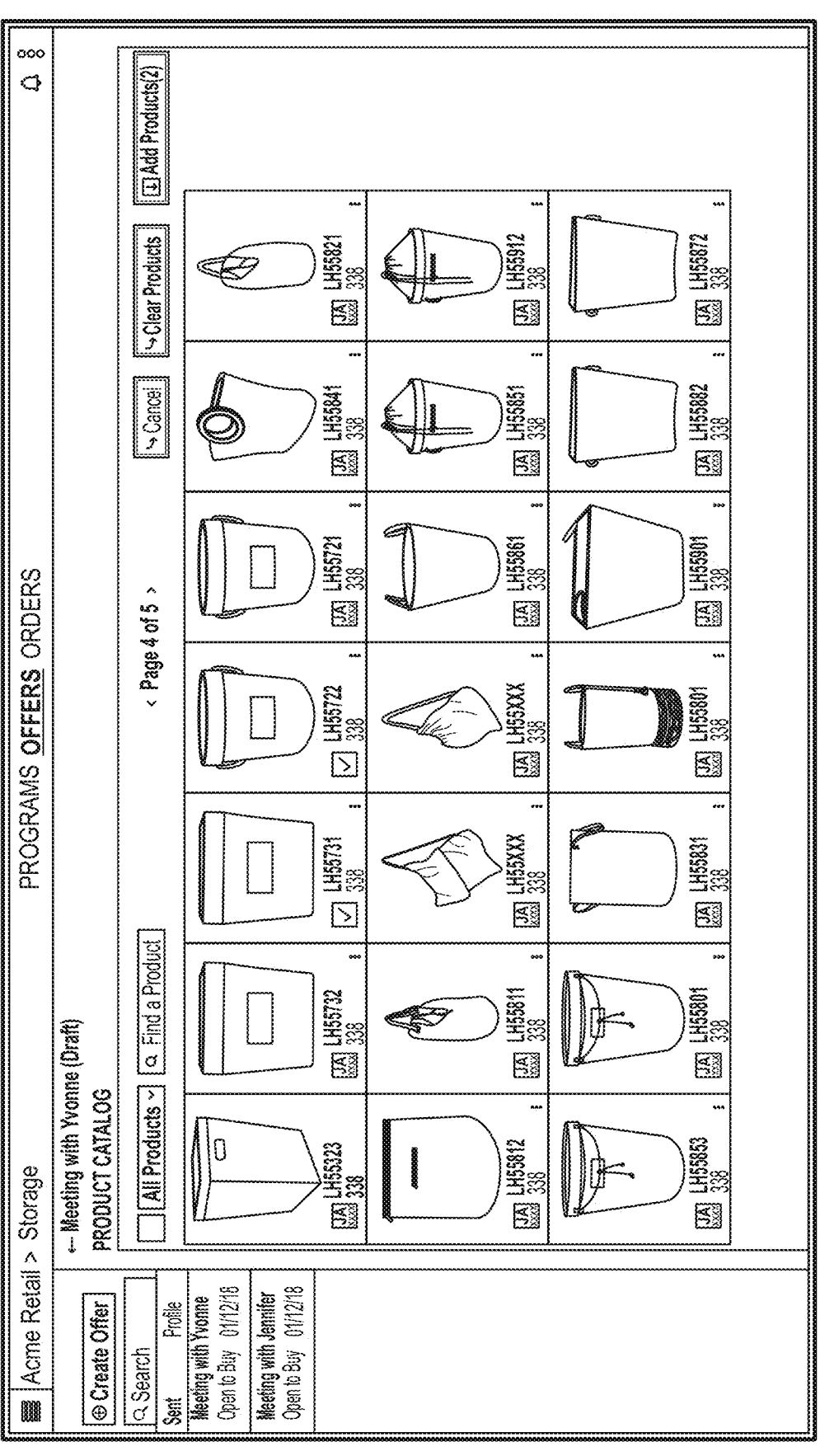

After completing the create offer form (FIG. 5B) the supplier user is navigated to the "Add Products to Offer" user interface (see, e.g., FIG. 5C). This user interface enables supplier users to select products from the subset of the product catalog to which they have permission to access. The supplier user may utilize browsing, filtering, and searching, to identify products to add to the offer and may select the desired products via the checkboxes on the product cards. In response to the user clicking on the "Add Products" control, a clone of each product selected may be generated and added to the Offer. Such a product may be referred to as an Offer Product. The Offer Product clones may be generated so that through the course of negotiations with any given customer the Offer Product can be altered and changed without affecting the original product in the catalog and without hindering the ability of the original product to be offered in its original form to another customer or at a different time.

This example Add Products to Offer user interface is comprised of distinct sections. The left hand element is a container of draft and sent offers that functions as an inbox in that it indicates new and unseen activity, in this instance, via sorting and bolding of text. The offers may be sorted according to date/time. A user may select Offers in this element, and in response, corresponding objects, information, and functions for the selected offer are accessed and displayed in a second section of the user interface. The second section of the user interface may display a product catalog-like element that displays the product card view of products the user has permission to access. The user can select/deselect and hover on these cards to expose more information about the product.

FIG. 5D illustrates an example draft offer user interface that enables supplier users to finalize offers before sending the offers to retailers. For example, the user interface may enable supplier users to make adjustments to data fields, such as pricing, quantity, and/or other Offer Product fields. Users can also edit details of an offer product by launching a form from the table.

The example draft offer user interface is comprised of distinct sections. The left hand element is a container of draft and sent offers that functions as an inbox in that it indicates new and unseen activity, in this instance, via sorting and bolding of text. The listed offers may be sorted according to date/time. In response to detecting a user selection of an offer in the inbox, the corresponding objects, information, and functions for the selected offer are accessed and displayed in a second section of the user interface. In this example, the right section of the user interface contains a table of offer products. The table accesses and displays product information such as item number, product image, origin, case pack, cube and provides calculation tools to help supplier users finalize price, freight rate, freight cost, duty cost, estimated landed cost, margin, cube, and/or total amount. This section also contains an offer summary element, optionally including calculations of total amount, total cube, number of SKUs, offer title, offer date, and/or updated date.

Figure 5E:
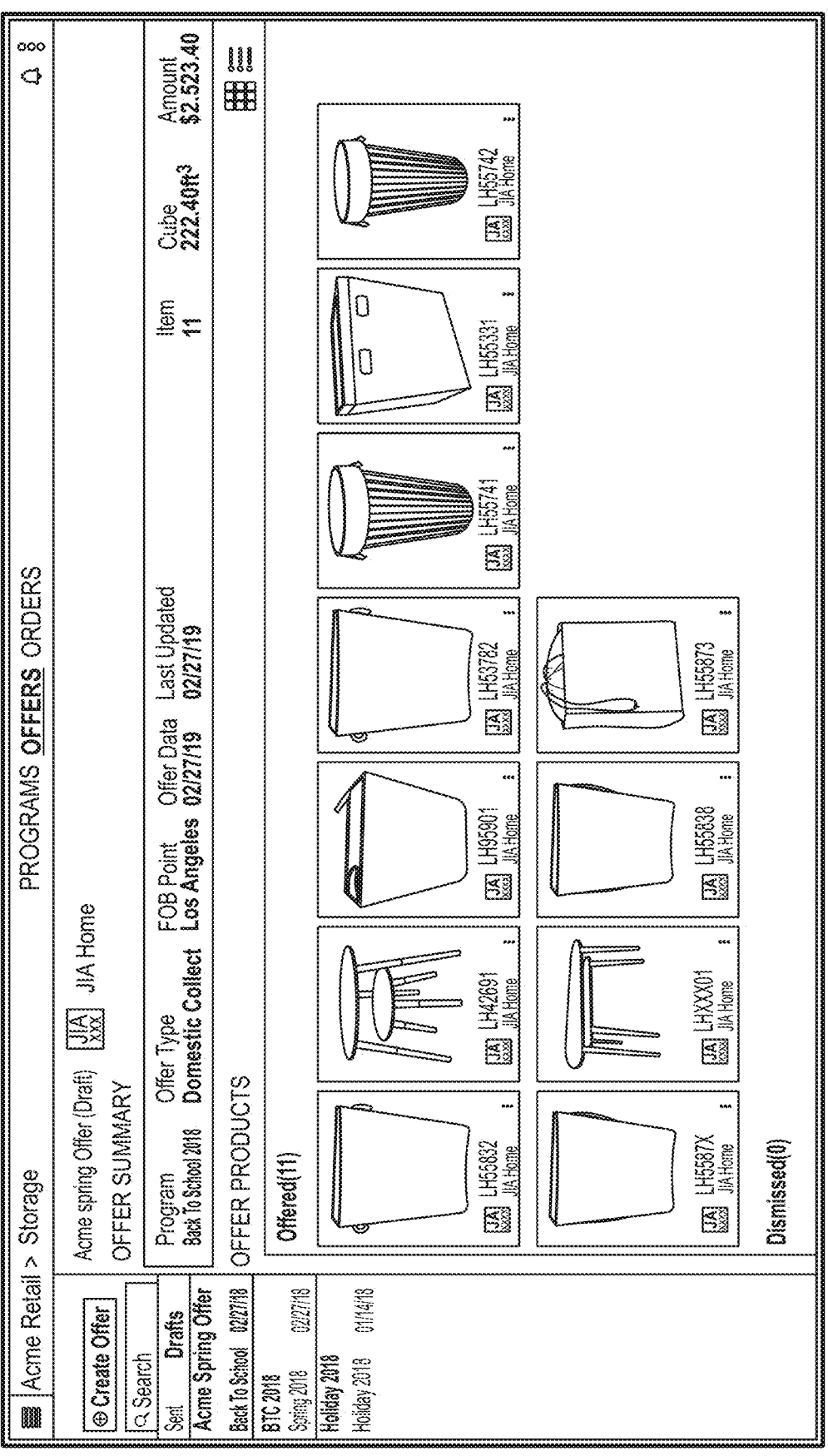

After a supplier user sends an offer, a sent offer product card view may be displayed to the supplier user (see, e.g., FIG. 5E) which serves as the launching point for communication and negotiation about individual offer products. FIG. 5F illustrates an example of the sent offers user interface that utilizes a table view to display additional information on the products (e.g., pricing, origin, duty, margin, and/or other information). Notification elements on both the product cards and in the rows of the product table may be provided that inform users that new activity has occurred on one or more Offer Products.

The user interfaces may include distinct sections. The left hand element is a container of draft and sent offers that functions as an inbox in that it indicates new and unseen activity, in this instance, via sorting and bolding of text. The activity may be sorted by date/time. The inbox element enables a user to select listed Offers, and in response, the corresponding objects, information, and functions for the selected offer are accessed and displayed in a second section of the user interface. The majority of the user interface in this example displays the offer information corresponding to the offer object selected in the first described section. In both the product card and table layouts, this section includes an offer summary (e.g., with fields such as Program, Offer type, FOB Point, Offer date, Updated Date, Items, Cube, and/or Amount). Underneath the offer summary section is a collection of Offer Products, laid out in product card or table layout with corresponding information (e.g., the product image, the product item number, Notification Badge, Origin, Case Pack, Unit Price, Cube, Quantity, Total cube, and/or amount). In both representations, Offer Products that have been "Dismissed" are textually and/or graphically distinguished from the other Offer Products.

Figure 5G:
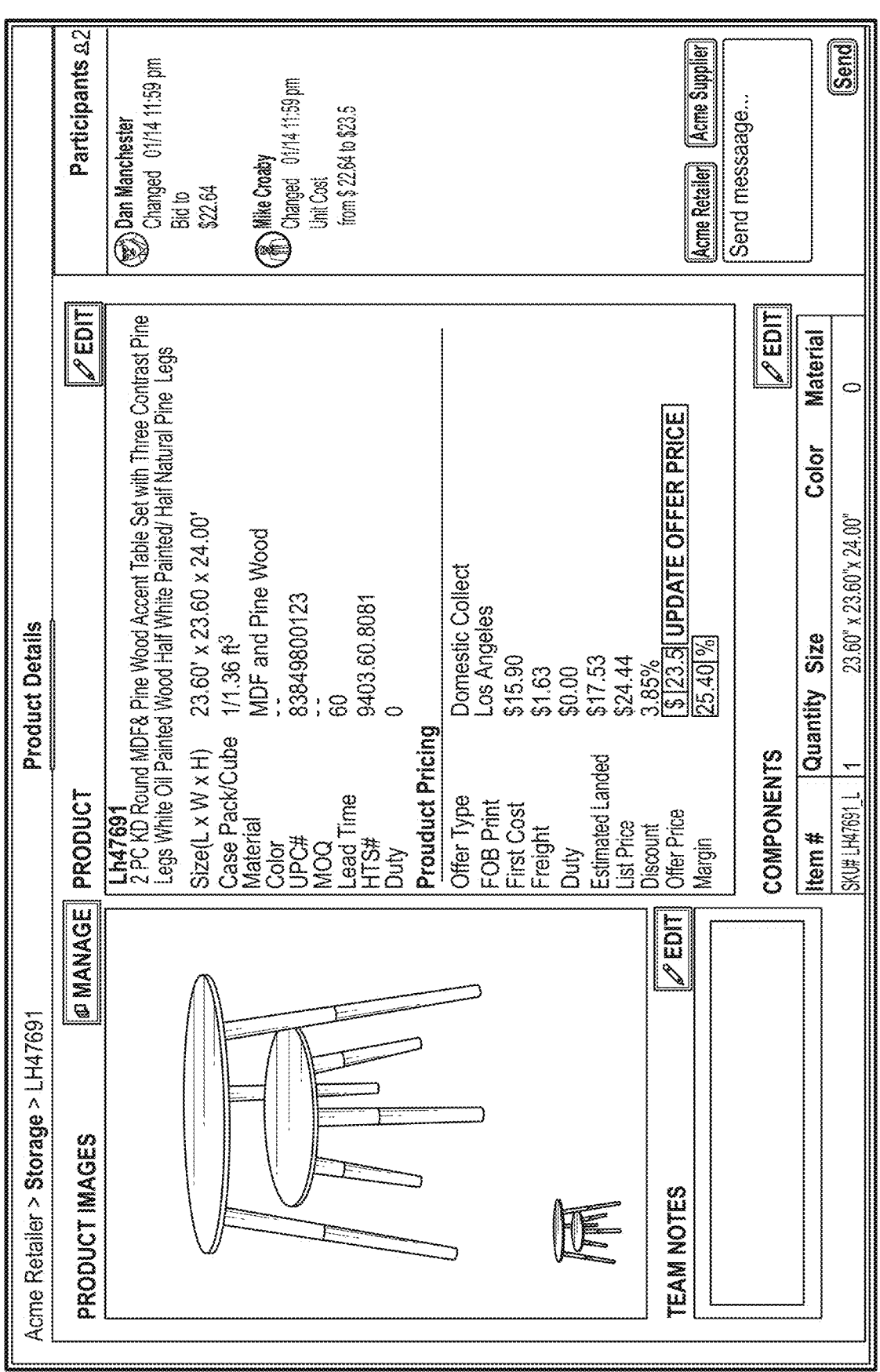

After sending offers, retail users and suppliers may communicate, collaborate, and negotiate deals utilizing an offer product details user interface. FIG. 5G illustrates an example offer product details user interface—supplier view. A subset of supplier users (those that are authorized) will see this representation of the Offer Product Details user interface, in this example, Supplier Administrator and Sales manager. Often, buyers will request changes in physical attributes and/or price. Those changes can be easily addressed by the supplier user by editing this information via the Offer Product Details user interface. Elements of this user interface, such as the middle product details panel as well as the messaging log, show the history of each change made to the product by the supplier. The supplier and retailer user may go back and forth in negotiation using this user interface until a retailer user ultimately decides to add this Offer Product to a Program or to dismiss it from consideration.

Figure 5H:
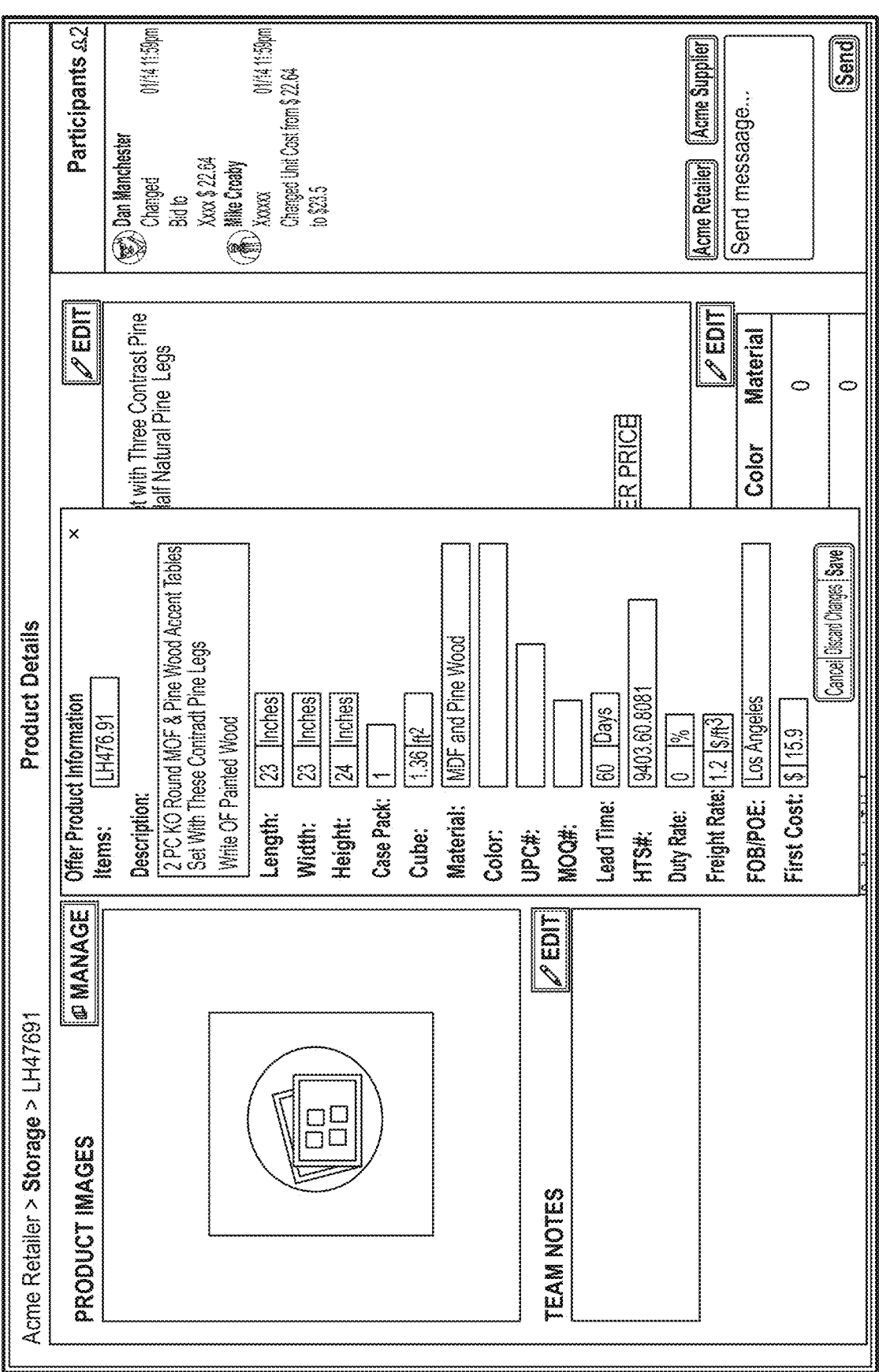

The illustrated example Offer Product Details user interface is comprised of distinct sections. The leftmost section contains a panel displaying images of the product and of product components (if any), while also affording a subset of supplier users the ability to manage/edit those images (e.g., using the user interface illustrated in FIG. 5H). This section of the user interface also contains a private notes interface via which supplier users may add notes on the offer product that will be only visible to users within their company who have access to this Offer Product (and not to the retailer users).

Figure 5I:
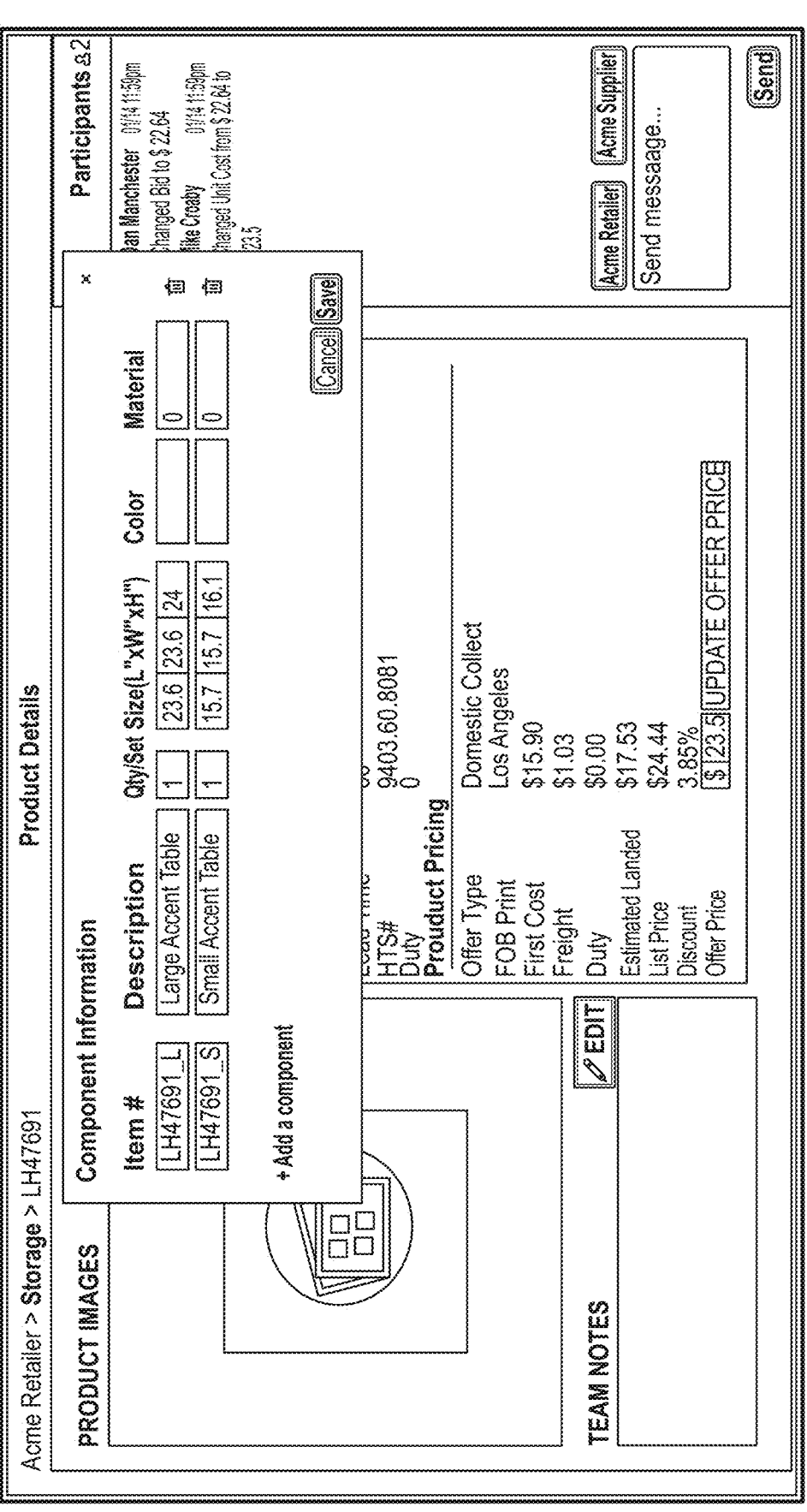

The middle section of the example user interface is primarily comprised of a table of the Offer product information (e.g., description, size, material, HTS, color, cube, case pack, and/or other information). This section of the user interface also contains calculation tools which may be utilized to aid the supplier user during negotiation. One subset of supplier users (in this example supplier administrators and sales managers) will be provided with access and may view the full pricing information including, for example, cost of the product, fright cost, and margin, while another subset of supplier users (in this example, sales reps) will instead see only a list price and discount percentage in the calculation tools. This portion of the user interface also contains a table of Offer Product Components—which are used for products that are sold as a set. This middle section of the user interface also has functions to launch forms to edit offer product information, including calculation tools (FIG. 5H) and edit Offer Product Component information (FIG. 5I). Optionally, the supplier users are provided the sole ability and discretion to edit/alter Offer Products and Offer Product Components. The rightmost section of the user interface is comprised of a chat/messaging panel that users utilize to communicate with every user that has access to this offer product as well as to only users within the user's same company with access to this Offer Product. This chat/messaging panel also includes a log of all the changes made to the Offer Product information.

FIG. 5I illustrates an example component edit user interface that enables a user to edit component information for an Offer Product.

After supplier users and retailer users finalize the product details and pricing, retailer users may send supplier users an Order with one or more Order Products contained on the order. Optionally, attributes of Order Products are locked at this stage so that no details may change once the supplier and retailer users have progressed to this step. Supplier users may review, via a pending order—supplier view user interface (FIG. 5J) the information contained on the order such as quantity of products ordered, terms, ship date, destination, and other information and decide whether or not they can fulfill this order as written. If they need to request an adjustment from the retailer users they may communicate with the retail users via the chat/messaging panel. Changes to the order are detected and displayed via the chat/messaging panel. Once acceptable to supplier users, a subset of supplier users (in this example, authorized users such as supplier administrators and sales managers) are enabled to approve the order.

The example Pending Order user interface illustrated in FIG. 5J is comprised of distinct sections. A container of orders on the left side of the user interface functions similarly to an email inbox and similarly to the container of offers described in FIGS. 5A, 5B. The middle section of the user interface contains information, objects and functions related to the order selected via the order container. The objects may include a table of Order Products and Order Product Components with details about each (e.g., Unit Price, Margin, Quantity, and/or other information) and a summary of the order. Functions provided may include calculation tools to calculate Estimated Landed Cost, Margin, Total Cost, and/or Total cube. Here the suppliers also have the ability to provide any information needed to execute a purchase order that may not have been necessary to the purchasing decision, such as providing UPC for new products. This type of information is collected via Order Requirements, Order Product Requirements, and Order Product Component Requirements, and any existing requirements will need to be completed by supplier users before they are enabled to approve an order. The rightmost section of the user interface is comprised of a chat/messaging panel where users can message all other users who have access to this Order or all other users from their own company who have access to this Order. This panel also displays a change history/revisions log of any changes to the order information.

After a supplier user has approved the order the retail user is enabled to export the order into an existing ERP (Enterprise Resource Planning) system to execute and transmit the approved order. Supplier users and retail users are still enabled to communicate with each other about the order via the chat/messaging panel, but any material changes to the information of the order (which optionally only retail users are enabled to make) will change the order status back to "Pending" and may require additional approval from the supplier user.

FIG. 5K illustrates an example Approved order user interface, comprised of distinct sections. A container of orders on the left side of the user interface functions similarly to an email inbox and similarly to the container of offers described above. The middle section of the user interface contains information, objects and functions related to the order selected via the order container section. The objects may include a table of Order Products and Order Product Components with details about each (e.g., Unit Price, Margin, Quantity, and/or other information) and a summary of the order. Functions available may include calculation tools to calculate Estimated Landed Cost, Margin, Total Cost, and/or Total cube. The rightmost section of the example user interface is comprised of a chat/messaging panel where users can message all other users who have access to this Order or all other users from their own company who have access to this Order. This panel also displays a change history/revisions log of any changes to the order information.

As discussed above a given entity may perform both acquisition functions (e.g., purchaser of items) and supplier functions (a seller of items). FIGS. 6A-6F illustrate example user interfaces that may be used by an entity that performs both acquisition and supplier functions. The user interfaces may be used as part of a workflow utilized buy different users in different business units (e.g., a business unit that performs acquisition functions and a business unit that performs supplier functions) within the same entity to pass information back and forth for specific functions available only to either set of users in either business unit.

For example, when an entity is in the process of supplying a product to a customer, the customer may have made related requests (e.g., regarding color, size, materials, configuration, packaging, etc.) that can affect how the product is manufactured. Such requests and other related information can be useful information for future product development and item procurement. A notes/comments section may be provided within a certain user interface that enables users at the entity to make notes on products. Such product notes may optionally be segmented in threads by using different fields as segmentors. Users at the entity can transfer such information to other users within the entity who have access to different business units (e.g., procurement/acquisition units). Users can also highlight (e.g., "Pin") such notes to call additional attention to individual notes.

Data in acquirer and supplier workflows may include multiple subsets of data and multiple subsets of communications. For example, there may be data that is private to users at a first business unit within a first entity. There may be data that is private to users at a second business unit within a second entity. There may be data that is shared by both users in the first business unit within the first entity, and users in the second business unit within the second entity. There may be communications that are private to users at the first business unit within the first entity. There may be communications that are private to users at the second business unit within the second entity. There may be communications that are shared by both users in the first business unit within the first entity, and users in the second business unit within the second entity.

Figure 6A:
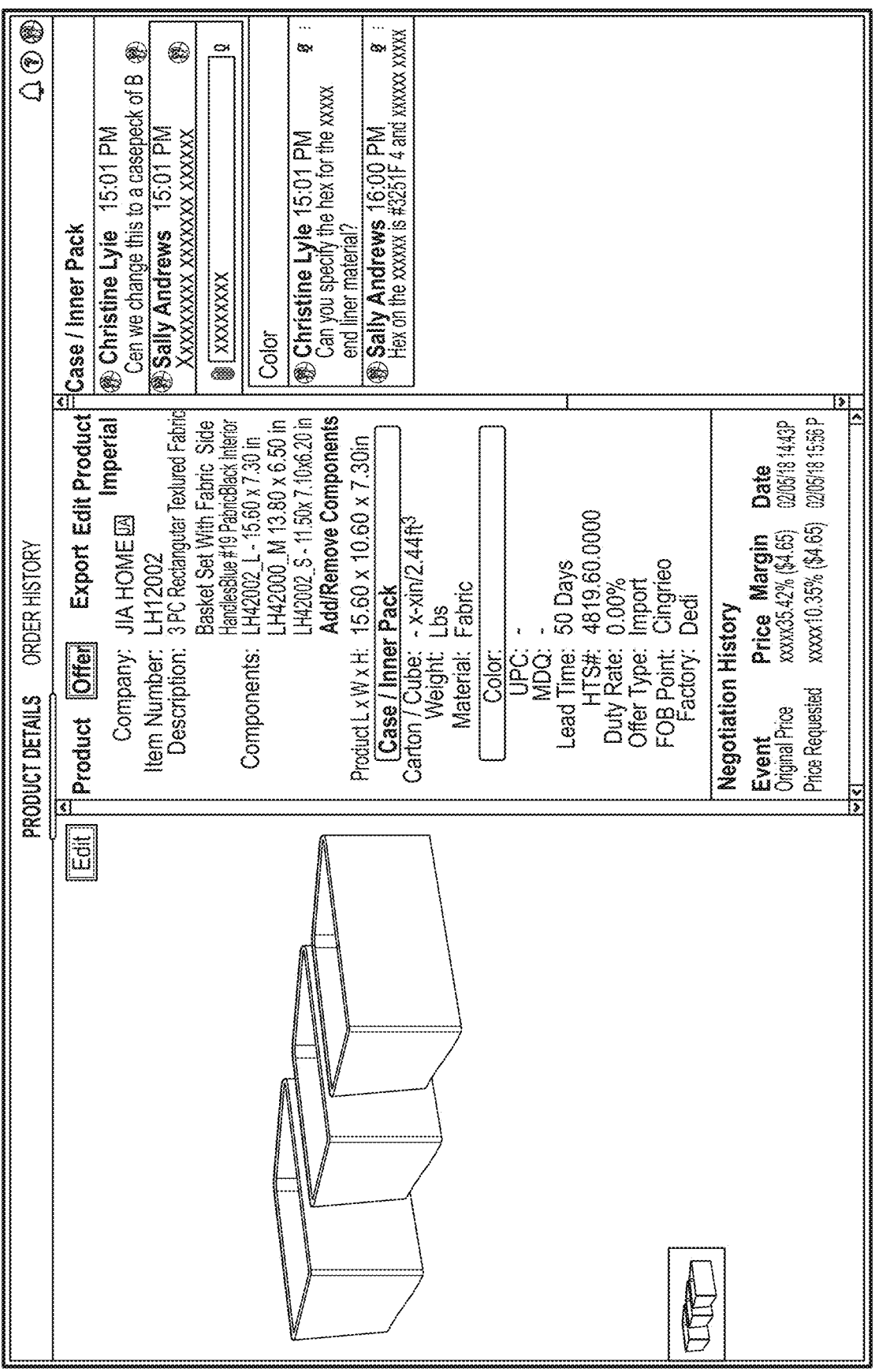
FIGS. 6A-6F illustrate additional example user interfaces.
Figure 6B:
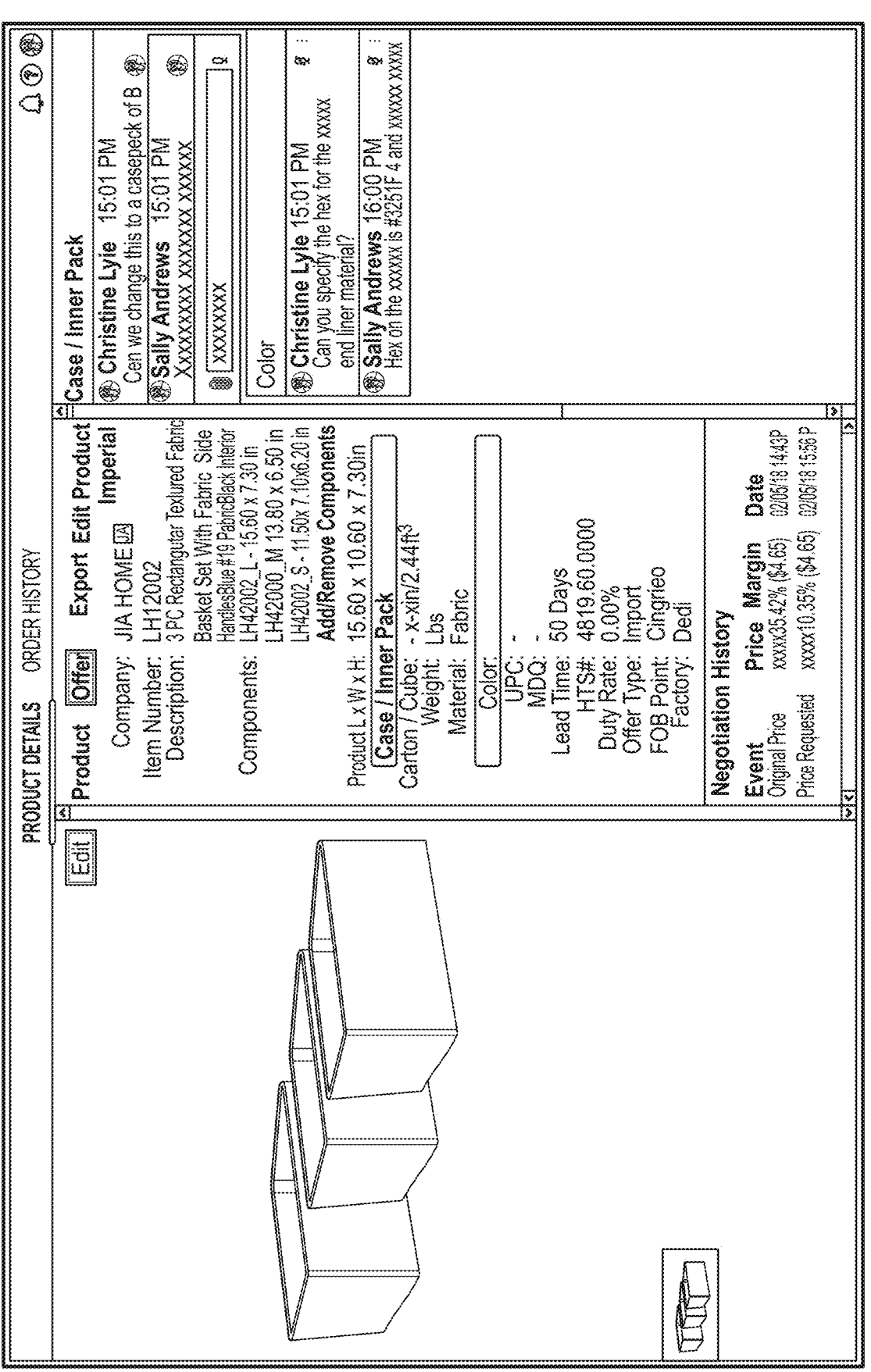

Referring now to FIGS. 6A, 6B, the illustrated user interfaces include a left pane wherein one or more images of the Offer Product are displayed. Supplier-side users may update the images that appear in this pane, add images to the pane, or delete images from the pane. The middle pane in this example includes a table containing product details such as item number, description, case pack, cube, lead time, color, material, size, HTS, MOQ, product components, and/or additional data. The middle pane may optionally also include pricing tools that enable the supplier user to quickly and accurately determine such data as estimated landed cost, margin, unit price, and what sales price for the product needed in order to achieve the desired target margin. A supplier-side user may edit/modify the product related data displayed in this section.

The right panel in this example includes a communication interface and event log via which users can message either all users that have access to this product, or all users within their own company that have access to this product. These messages (e.g., with questions regarding the product, regarding changes to the product, regarding packing the product for shipment, regarding cost impact of changes, and the like, answers to such questions, comments, etc.) are grouped into notes which are segmented into different threads using the fields of the product data as segmentors. For example, communications/notes may be analyzed and grouped as relating to product components, product dimensions, case/inner pack, carton/cube, weight, material, color UPC, MOQ, lead time, HTS, duty rate, offer type, FOB point, factory, etc. The user interface enables a user, via a control associated with a new message form, to selectively transmit a given note (or all notes) to just the user's team members (e.g., on the supply side) or to team members on both teams (e.g., supply side and procurement teams). Advantageously, such notes may also serve as a change log of changes to the product information, where a change is displayed in the corresponding changed field's note thread/category.

Figure 6C:
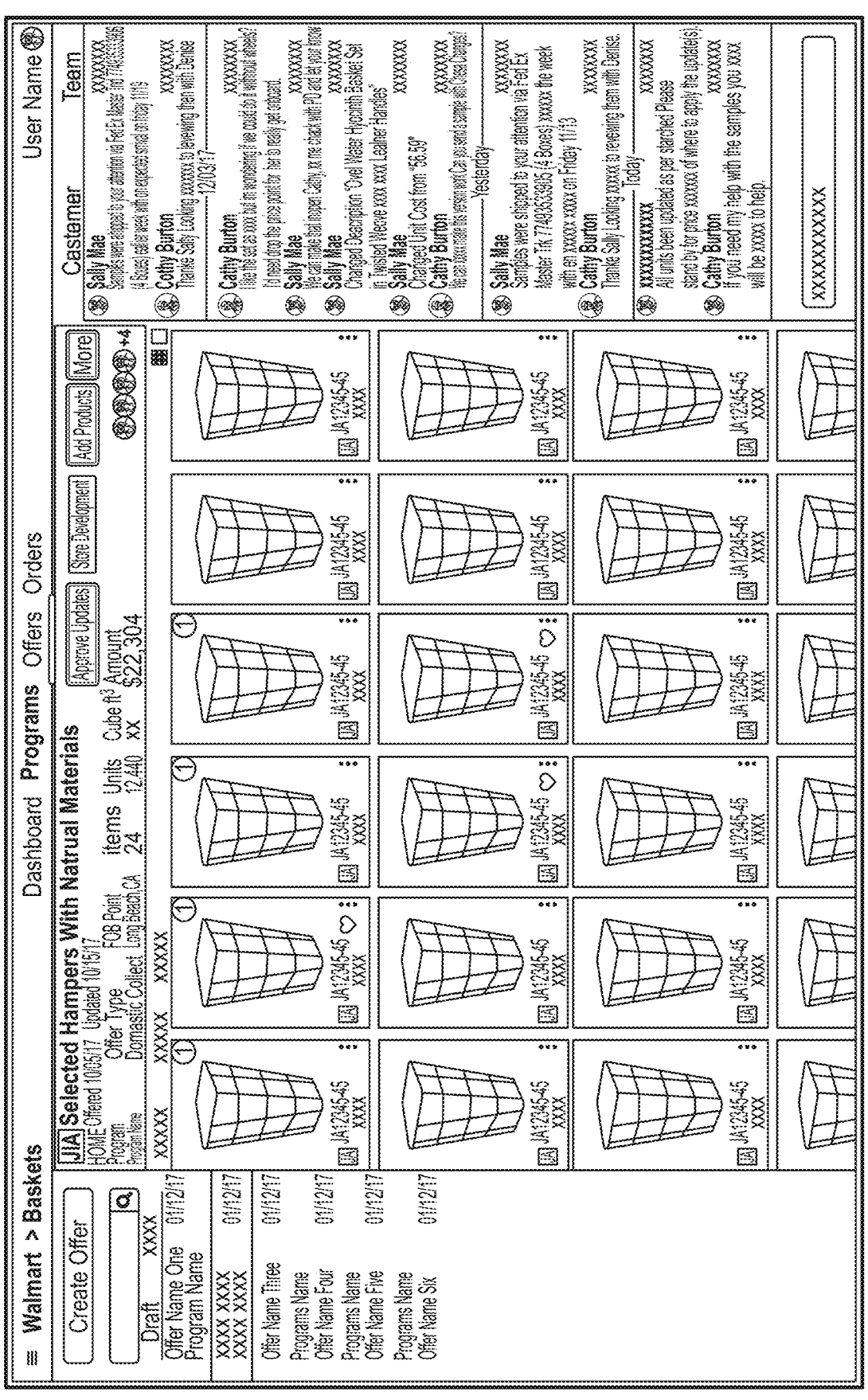
Figure 6D:
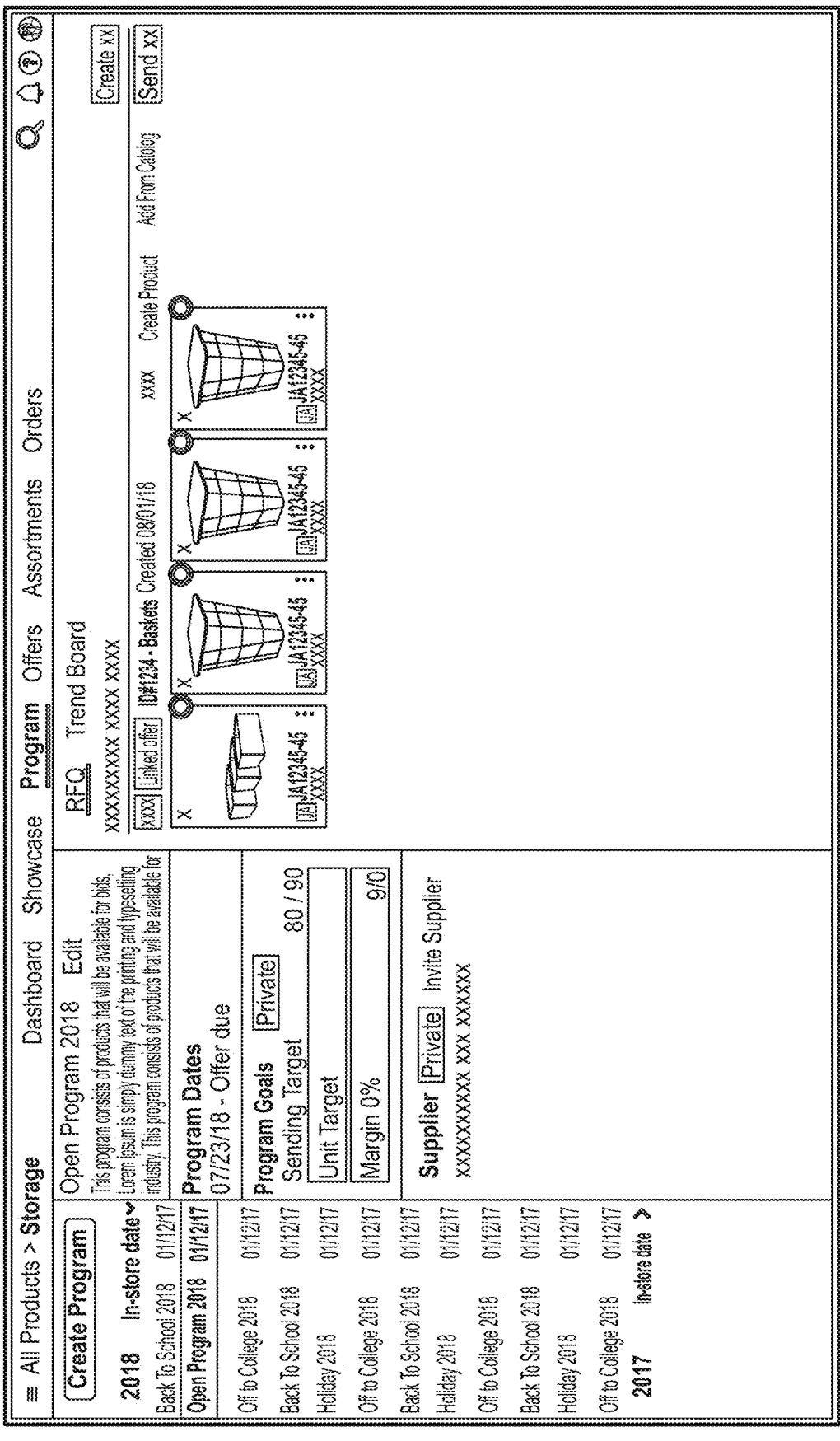

Referring to FIG. 6C, an example user interface is illustrated depicting an offer where a set of products has been selected by users on the supply side of an entity. The selected set product may be transmitted to an acquirer or to product development users within the entity to update the entity products. For example, a supply-side user selects which products are to be sent to one or more buying business unit(s) within the entity, calls out (e.g., via notes, pins, or messages) any specific information, then shares these products with one or more buying-side business units. The buying business units that receive these products can utilize them as part of a request for quote (RFQ), such as is illustrated in FIG. 6D, where the products can be easily quoted and sourced from multiple suppliers from different entities. Once the users in the acquisition-side business unit are satisfied with the updates to the products, they can select the products and send them back to the original supplier business unit within their entity for the supplier-side users to review and either accept or reject the products, using for example, the user interfaces illustrated in FIGS. 6E, 6F.

Figure 6E:
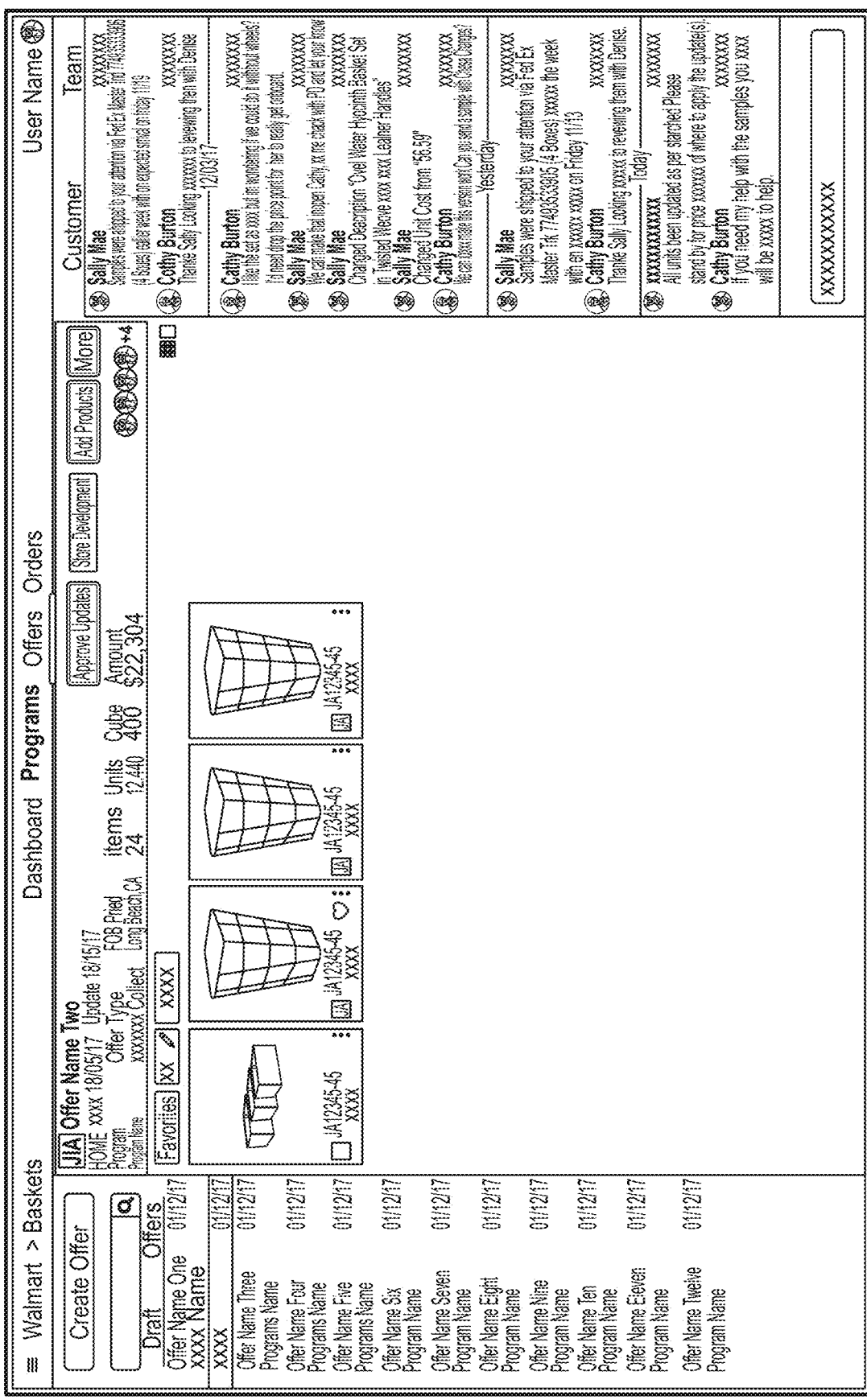

Referring to FIG. 6E, an example offer development review user interface is illustrated. The left pane includes a list of offers, including offer name, associated program name, and offer date. The middle pane depicts offer details of an offer selected by a user from the left pane. The offer details may include the offer name, associated program name, offer date, update date, offer type (e.g., domestic, imported, etc.), FOB point, number of items, number of units, cube size, total dollar amount, images of the offer product with associated product identifiers, and selection controls associated with the images that enable a user to select and/or like a given product. Controls are provided to approve product updates, start product development, and add products. A right pane enables the user to selectively communicate with the customer or the user's team.

Figure 6F:
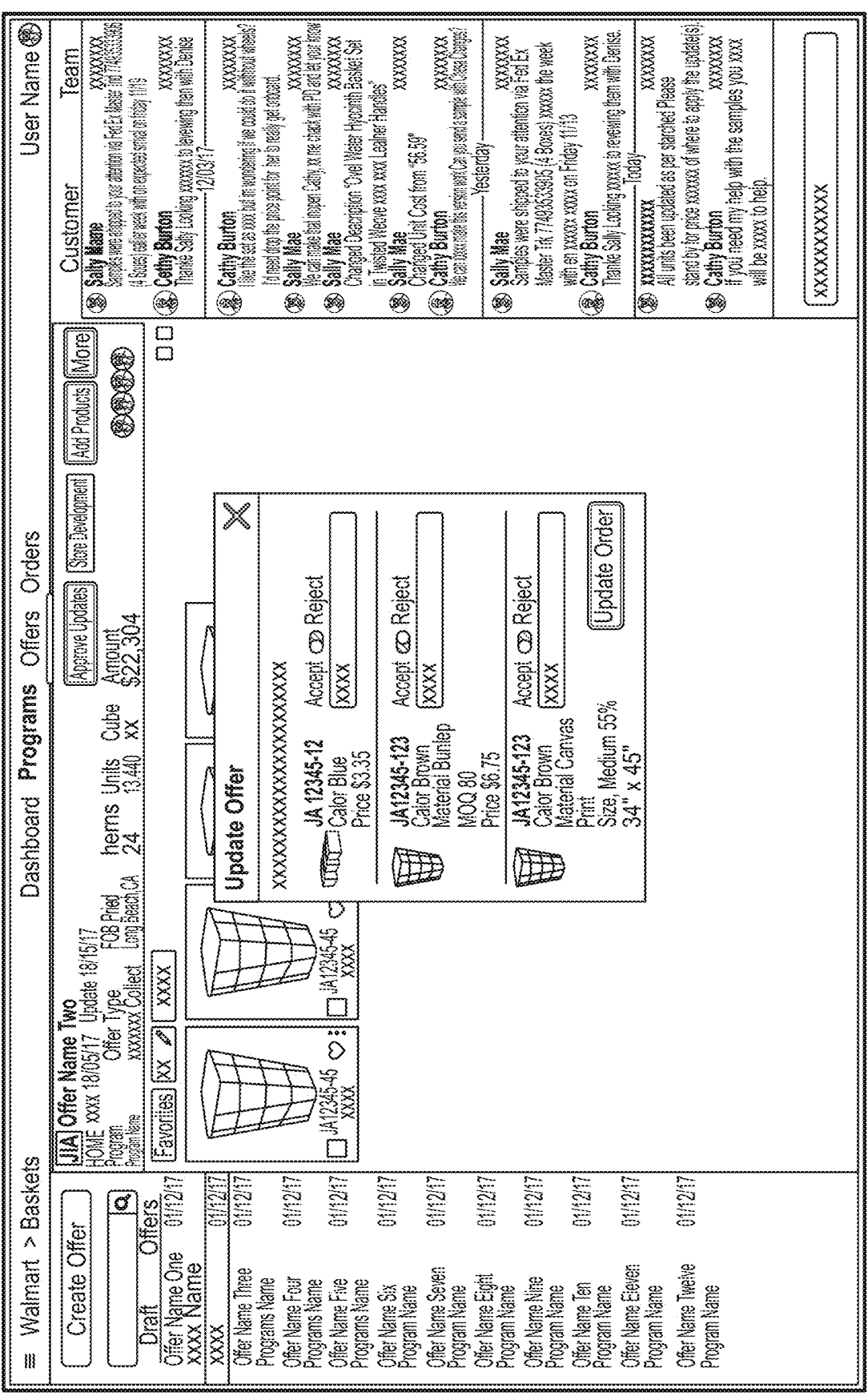

Referring to FIG. 6F, an example offer update user interface is presented via which the user may accept or reject changes to a given product via controls presented in association with product images and a list of changed product details. If the user activates a reject control, a reason field is dynamically generated and presented via which the user may enter a reason for rejection, which may then be transmitted to the product development team. An update control is provided via which the user can initiate an update to the offer.

Following are descriptions of example user interface and data fields:

| Duty Rate | Percentage of tax paid to import a product |
|---|---|
| Estimated Landed Cost | Total realized cost to either deliver or receive a product at a specified location under specified terms. First cost + Freight Cost + Duty Cost |

-continued

| Duty Rate | Percentage of tax paid to import a product |
|---|---|
| First Cost | The initial price a supplier or buyer pays for a product before factoring in Freight and duty costs |
| FOB Point | The point where products transfer ownership |
| Freight Cost | Cost of freight for a specified product |
| Freight Rate | Dollar per cubic foot paid to ship a product |
| HTS | US Harmonized Tariff Schedule Code denoting how much duty a product is subject to |
| In-store Date | Date when a product is expected to be on store shelves |
| Item | Product, good |
| Item Number | Unique identifier for a product in the system. Must be unique within a catalog of a single supplier company but not globally |
| Lead Time | The amount of time necessary to manufacture and ship a product, time until soonest availability |
| Margin | 1-cost of a product/price product is sold |
| MOQ | Minimum Order Quantity for which an item will be sold |
| Notification | An alert generated by the software platform |
| Notification Badge | An indicator than an object has had an alert/notification generated |
| Object First Communication | Pattern of organizing communication and artifacts such that the artifact or object is the independent variable the communication is organized by |
| Offer | A collection of products available for purchase, presented from supplier to buyer |
| Offer Due Date | Date when buyer wishes to have received all offers by for a given program |
| Offer Product | An object in the system that lives solely in the workflow between one supplier company and one retailer category |
| Offer Type | The terms of an offer shipment and pricing, (e.g., import or domestic) |
| Order | Object comprised of products to be purchased |
| Order Product Component Requirement | Information requirement necessary to complete a purchase order- associated with an order product component object |
| Order Product Requirement | Information requirement necessary to complete a purchase order-associated with an order product object |
| Order Requirement | Information requirement necessary to complete a purchase order-associated with an order object |
| Origin | Port closest to where a product is manufactured |
| Product | Good/item for purchase |
| Product Card | Image centric representation of a product, offer product, or order product |
| Product Catalog | Set of all products a supplier maintains in the system, organized by product categories |
| Product Category | Essentially folders/grouping of products within a product catalog |
| Product Component | An item that is being sold as part of a set |
| Program | An organizational tool buyers use to segment purchasing goals and purchases |
| Program Suppliers | A supplier company that has been granted access to a buyer's program |
| Restore | The action of changing a product status from dismissed to active |
| Retailer | A company type within the system, comprised of Departments and Categories |
| Retailer Admin | User type within the system- sets up company and users |
| Revision | A logged change on an object such as a product or order |
| Sales Manager | User type within the system, has full access to supplier product catalog |
| Sales Rep | User type within the system, has conditionally restricted access to supplier product catalog, and restricted access to some information such as product costs |
| Ship Window | Period of Time when transfer of products is expected |
| Size | physical dimensions of a product |
| SKU | Stock Keeping Unit, a unique item |
| Start to Ship Date | Date at the beginning of a ship window |
| Supplier | A company type within the system, comprised of products, product categories |
| Supplier Admin | User type within the system- sets up company and users |
| Supplier ID | A unique identifier for the relationship between one retailer and one supplier, unique to that retailer not necessarily globally |
| Thread | The connection between one supplier company and one retailer category |

-continued

| Duty Rate | Percentage of tax paid to import a product |
|---|---|
| Total Units | Sum number of items purchased |
| Unit Price | Price at which seller agrees to sell a product to a buyer |
| UPC | Universal Product Code |

As similarly discussed above, a shared software platform is provided that enables users at an entity to collaborate among internal teams within the same entity (sometimes referred to as intra-entity collaboration) and also to collaborate with external teams at different entities (sometimes referred to as multi-entity or inter-entity collaboration). For example, an entity may be a retailer or a supplier as discussed elsewhere herein. A given entity may have its own complex permissions hierarchy. Thus, when two or more entities are collaborating, multiple hierarchies of permissions may be implicated (sometimes referred to herein a multi-hierarchy). The workflow of various collaboration objects among internal teams (within the same entity) and external teams (across different entities) may include, for each involved entity, complex permission hierarchies (e.g., an Object-Oriented Multi-Entity Multi-Hierarchy Workflow). An entity team may comprise a collection of users who share one or more common permissions within a hierarchy of a given entity.

In order to further enhance such collaborations, systems and methods are provided to manage workflows within an entity and across entities using one or more networks and utilizing disparate systems. For example, a workflow may be composed of interrelated sequential and/or parallel tasks related to a collaboration object.

As described herein, techniques are provided that enable collaboration objects to be visualized. As similarly discussed elsewhere herein, a collaboration object may include a product, a product offer, a Request for Quote (RFQ), a quote, a Purchase Order (PO), a project, a purchase program, a document, a transaction, and/or the like. Optionally, a workflow may be created for each collaboration object. A given collaboration object may include one or more sub-collaboration objects. Interfaces may be provided that enable such tasks to be assigned a due date/time. Further, such tasks may be assigned to an individual user or to multiple users (e.g., a team or other set of users) in internal and/or external team(s).

A given workflow task, and the progress made on such task, may be tracked. The status of such a workflow task may be accordingly updated, and the updated task status may be made available/reported (optionally in real time) to one or more authorized users (e.g., via an interface provided by a dedicated application, a webpage hosted by a server and accessed by a user device browser, via an email, a short messaging service, and/or otherwise). Example task status types that may be tracked and reported (e.g., via user interfaces described herein) may include "To be completed", "In progress", "Completed", "Aborted/Canceled", "Delayed", "Approved", "Denied", "Dismissed", "New", "Draft", "Pending", "Confirmed", "Active", "Inactive", "Unsent", "Sent to [insert destination]", "Received from [insert source]", "Response received", and/or the like. In order to efficiently communicate a task status and make different types of status easily identifiable, each status type may optionally be displayed in different color (color coded), a different font, and/or using different artwork (e.g., a graphic logo).

To further facilitate multi-modal communications via system users regarding tasks, a user may record a specific note or comment (sometimes referred to collectively as a comment) regarding a specific task, and the user note/comment may be stored in association with the corresponding task record. The user comments (e.g., text, icon, video comments) may be displayed in association with a given display of a collaboration object workflow task description, a task status, and/or otherwise. Optionally, a comment assigned to a task may be shared with other users (e.g., within one or more teams within the same entity or at different entities) assigned to the task via one or more communication channels (e.g., via an interface provided by a dedicated application (an "app"), via an app pop-up alert, via a webpage hosted by a server and accessed by a user device browser, via an email, via a short/instant messaging service, and/or otherwise).

Further, other workflow task-related notifications may be provided via an interface provided by an app, via an app pop-up alert, via a webpage hosted by a server and accessed by a user device browser, via an email, via a short/instant messaging service, and/or otherwise. Such notifications may be provided to remind users when their tasks are due to be completed, to report task status, to report collaboration object modifications or proposed modifications, and/or to provide other information, alerts, or reminders.

Optionally, a user interface may be provided which enables an authorized user to define an algorithm that utilizes variables such as tasks, task statuses, and/or task assignees, for a given workflow. The algorithm may generate, using the variables, automated workflow and task updates and may transmit such updates to determined appropriate users and entities. For example, a scheduling algorithm may determine when to generate and transmit alerts to appropriate recipients (e.g., collaboration object workflow task assignees). For example, a scheduling algorithm may generate and send a reminder alert to task assignees a determined period of time before the task is scheduled to be completed. By way of further example, an algorithm may determine when to snooze a reminder (e.g., on the first and second reminder) and when to dismiss the reminder (e.g., on the third reminder).

By way of still further example, a reporting algorithm may generate a performance report that reports on the percentage of tasks that were performed by the corresponding assigned deadline over a specified time frame and/or since inception. By way of further example, the reporting algorithm may generate a performance report that reports on the percentage of workflow tasks (for workflows with more than a threshold number of tasks) that were performed by the assigned deadline over a specified period of time and/or since inception. By way of further example, a reporting algorithm may periodically (e.g., once a day, once a week, etc.) generate a performance report that reports on the percentage of workflow tasks that have been completed.

By way of yet further example, a critical path analysis algorithm may analyze the performance of collaboration object workflow tasks, identify critical tasks (which must be completed before one or more other tasks may be performed), determine if a critical task has not been completed by its associated deadline, and generate notifications to the team(s) assigned to the task and/or subsequent workflow tasks indicating that the critical task deadline, subsequent tasks, and/or workflow completion deadlines need to be postponed by a specified period. If, on the other hand, the critical path analysis algorithm determines that the critical tasks and/or other tasks have been completed on time, the critical path analysis algorithm may generate and transmit a notification to workflow task assignees indicating that the workflow collaboration object will be completed on time.

Optionally, an artificial intelligence engine may be utilized that, based on variables (e.g., tasks, task statuses, and/or task assignees), for a given workflow, may generate automated updates and may transmit such updates to determined appropriate users and entities. The artificial intelligence engine may automate workflow task planning vs. progress checks, generate activity reminders for team members, and/or provide document tracking. The artificial intelligence engine may perform workflow object collaboration analysis to identify potential risks to workflow tasks becoming accomplished according to schedule and may generate corresponding notifications to the appropriate users. The artificial intelligence engine may include a neural network. The neural network may be trained to identify when a given task status poses a risk to the completion of a workflow task. The neural network may comprise an input layer, an output layer, and one or more levels of hidden layers between the input and output layers, wherein the neural network is configured as a feed forward network.

For example, the artificial intelligence engine may factor in past collaboration object workflow task assignee performance (e.g., determine who tends to perform tasks early (and how early) or on time, and who tends to perform tasks late (and how late), critical path(s) (dependencies of related tasks in a local workflow and global workflows), task conflicts between collaboration workflow tasks managed by the system and other user tasks (not managed by the system) on users' calendars, and generate user conflict notifications when a conflict is detected. The artificial intelligence engine may perform task prioritization (e.g., generate user task assignment recommendation to ensure that relatively more important or critical path tasks are performed prior to less important or non-critical tasks.

Certain example user interfaces will now be described with respect to inter-entity and intra-entity collaboration object workflows.

Certain interfaces enable an object-oriented, multi-entity, multi-hierarchy workflow to be constructed, where the workflow comprises a set of interrelated sequential and/or parallel tasks (e.g., related to a collaboration object).

Figure 7A:
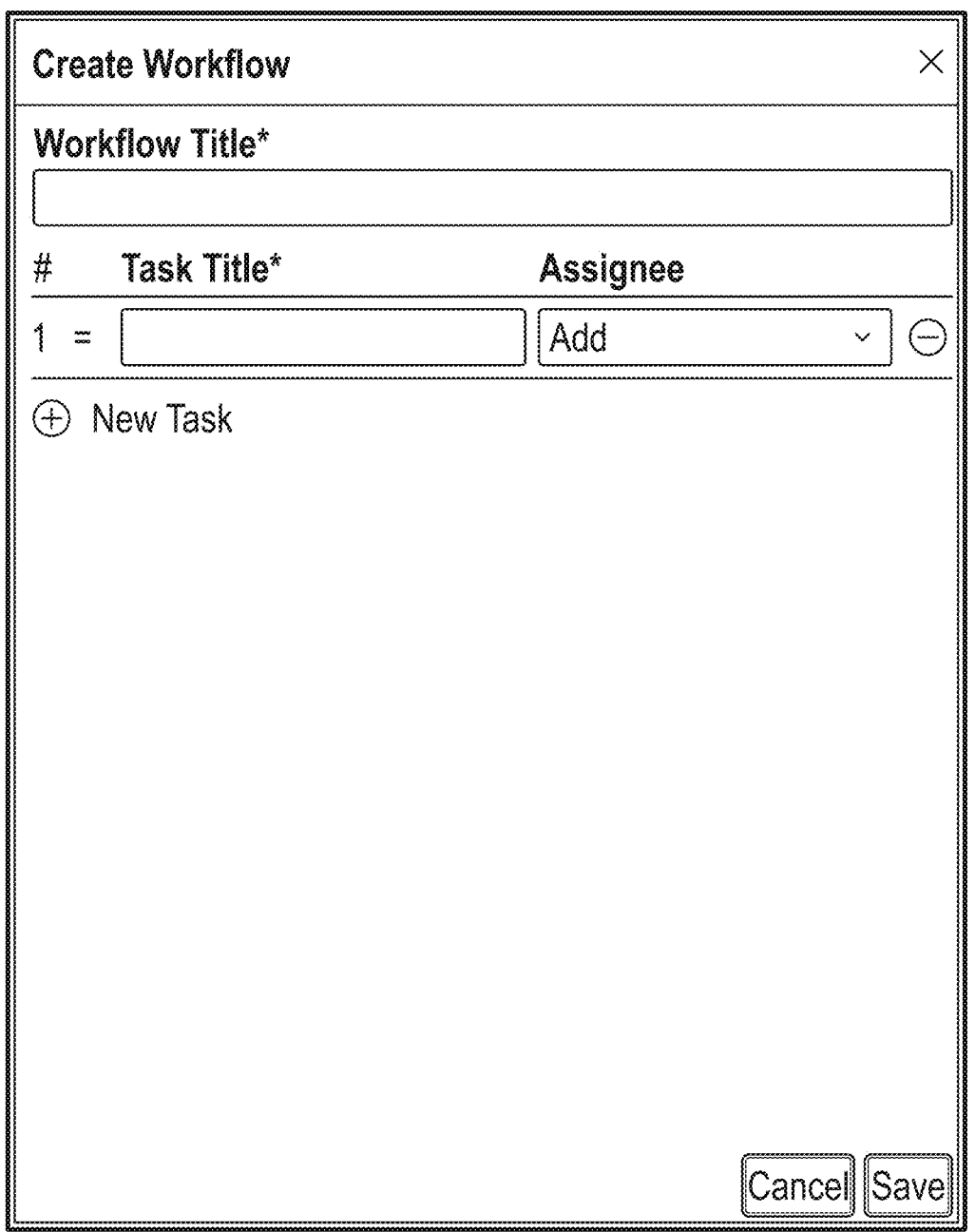

FIG. 7A illustrates an example workflow creation user interface for defining a workflow for a collaboration object. A workflow title field is provided configured to receive a textual workflow name (which may be a descriptive name that is meaningful to the users to whom tasks are assigned). A task assignment area includes a task title field configured to receive a textual task name (which may be a descriptive name) and a task assignee field configured to enable a user to specify a user or group (e.g., a team or other set of users) to whom the workflow task is assigned to. Optionally, the assignee field may provide a menu of potential task assignees from which the user may select. Optionally, the assignee field is configured to receive an assignee name as a text entry. The assignee field may optionally include an image of the assignee instead or in addition to a textual assignee name. A given assignee may be granted access to the workflow by nature of configured multi-entity user permissions (as similarly discussed elsewhere herein). Optionally, the user interface may have an assignee delete control which when activated causes a corresponding assignee to be removed from the workflow. Optionally, tasks may be deleted via a task delete control.

Optionally, the system automatically assigns a task identifier (e.g., a task number). The task number may be automatically incremented for each new task. Optionally, the task numbers may correspond to a sequence order in which the tasks are to be performed. A new task control enables a user to add an additional workflow task. A save control may be provided that enables a user to save the user entries.

Optionally, hierarchical tasks may be defined, where a given task may include multiple subtasks with associated assignees and due dates.

Figure 7B:
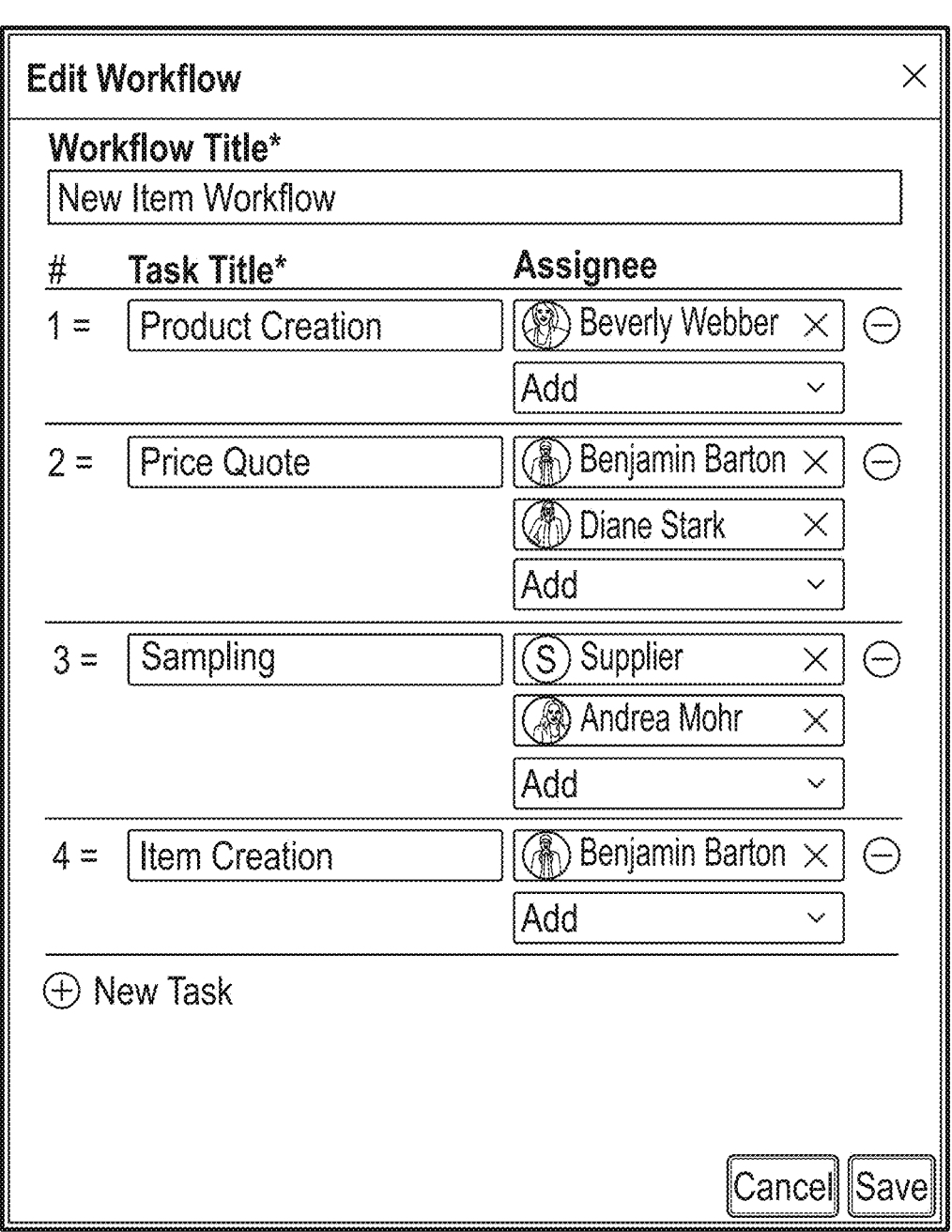

Referring now to FIG. 7B, the user interface of FIG. 7A is illustrated with four example workflow tasks created. The user interface may be used to edit the workflow. As illustrated in this example, certain tasks have one assigned individual person (task 1 and task 4), certain tasks have two assigned individual persons (task 2), and certain tasks have one assigned individual person and one assigned team (task 3), where the assigned team may have multiple team members that will receive the corresponding task notifications and have access to the corresponding task data. Optionally, tasks (e.g., displayed using task titles) may be selected from a dropdown menu of tasks.

Figure 7C:
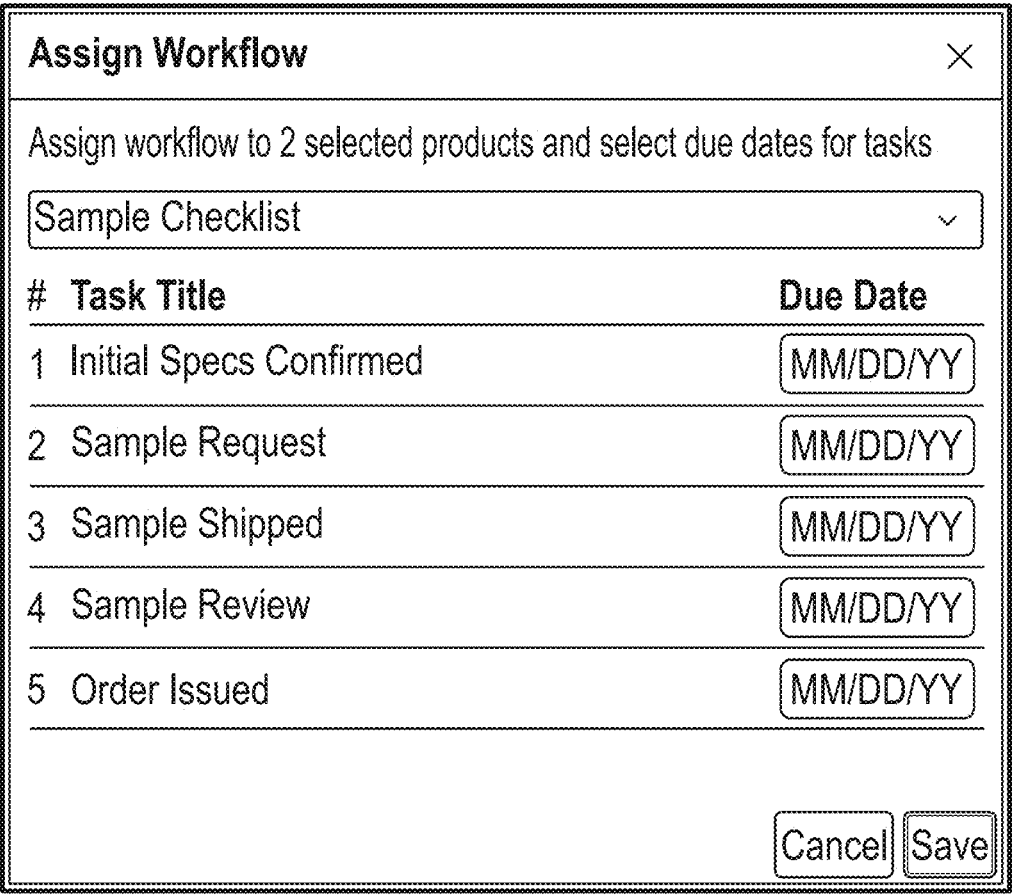

Referring now to FIG. 7C, a workflow menu is provided via which a user may select a collaboration object workflow that the user is authorized to access. The workflow menu may optionally be dynamically generated based on an identification of the user currently accessing the user interface (e.g., as determined via the authentication module 102B) so that the menu only includes workflows the user is authorized to access. The user interface may enable the workflow to be assigned to one or more collaboration objects (e.g., products). The corresponding workflow tasks named using the interface described with respect to FIGS. 7A and 7B are listed, ordered sequentially, according to the task numbering. A due date may be assigned to a given task. The user interface may enable a user to designate a corresponding due date/time and set notifications (e.g., via in-app alerts, mobile text/multimedia messages, emails, and/or the like) for a given workflow task. Optionally, the user interface enables the user to drag and drop the tasks into a different order (which may reflect the order in which the tasks are to be performed). Optionally, the tasks are automatically renumbered based on the new ordering. A save control may be provided that enables a user to save the user entries.

Figure 7D:
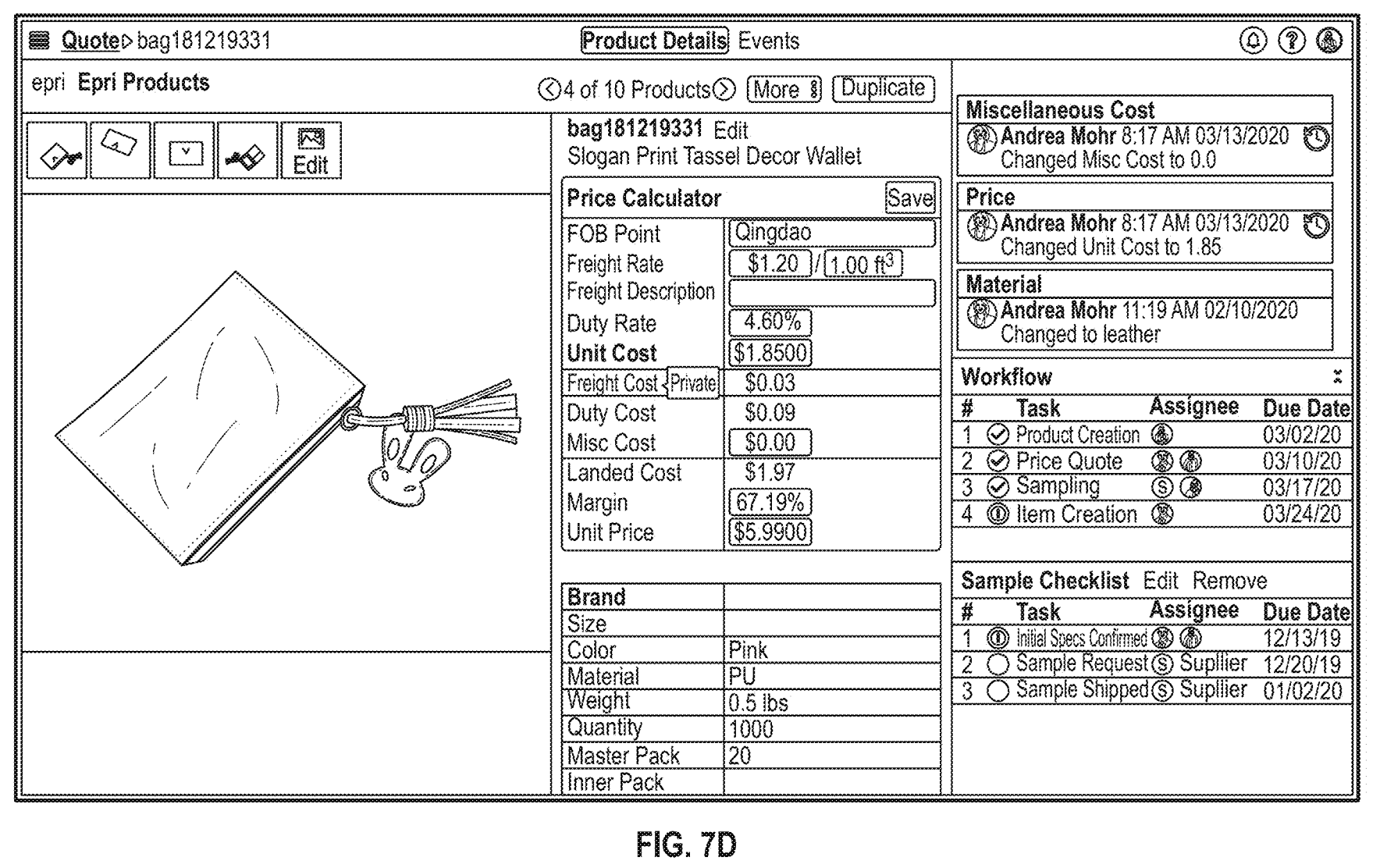

Referring now to FIG. 7D, an example user interface includes an object-oriented workflow user interface. In the illustrated example, the tasks are listed in sequential order, the task numberings are provided, the task assignees are identified (e.g., by name and/or image), the due dates are provided, and the current status is provided. Controls are provided via which task entries may be removed or edited. The user interface enables users to communicate (e.g., via text, images, icons, sound, or video) with other users across one or more teams assigned to the workflow, at one or more entities.

For example, a workflow checklist matrix may be presented that includes a collaboration object column and a column for each workflow task. The top row may include column identifiers. For example, the collaboration object column may identify the collaboration object type ("product" in this example). A task column may include a task name and may identify the task assignees.

The collaboration object column may list collaboration objects (e.g., products) including unique collaboration object (e.g., product) identifiers, a collaboration object (e.g., product) description, and optionally a collaboration object image. A task column may include an identifier of an assignee, a color coding indicating a status triggered by an assignee action, the status, and the status date.

Advantageously, the workflow user interface may be presented together with an item detail page corresponding to the collaboration object. For example, the item detail page may include multiple distinct sections (which may be referred to as panes). A product image section may display images of the collaboration object (a product in this example), and may contain controls enabling the upload of new collaboration object images, the management or deletion of existing images, and may enable the addition of notes/comments about the collaboration object. A collaboration object section may display significant relevant product information, such as brand name, size, material, color, weight, pricing, MOQ, lead time, product components, origin, freight rate, freight cost, duty, estimated landed cost, margin, and/or other information. Tools, such as a pricing calculator, may be provided. Tracked changes to the collaboration object may be listed (e.g., change in cost, material, color, etc.), including an identification of the person and/or team that made the change (e.g., name and/or image), date/time of the change, and a description of the change.

Thus, the example user interface enables users to interact with a collaboration object (e.g., a product), and communicate with other users across one or more teams at one or more entities, while also tracking the status of the collaboration object in one or more workflows with users (e.g., from one or more teams) at one or more entities via an integrated user interface.

Figure 7E:
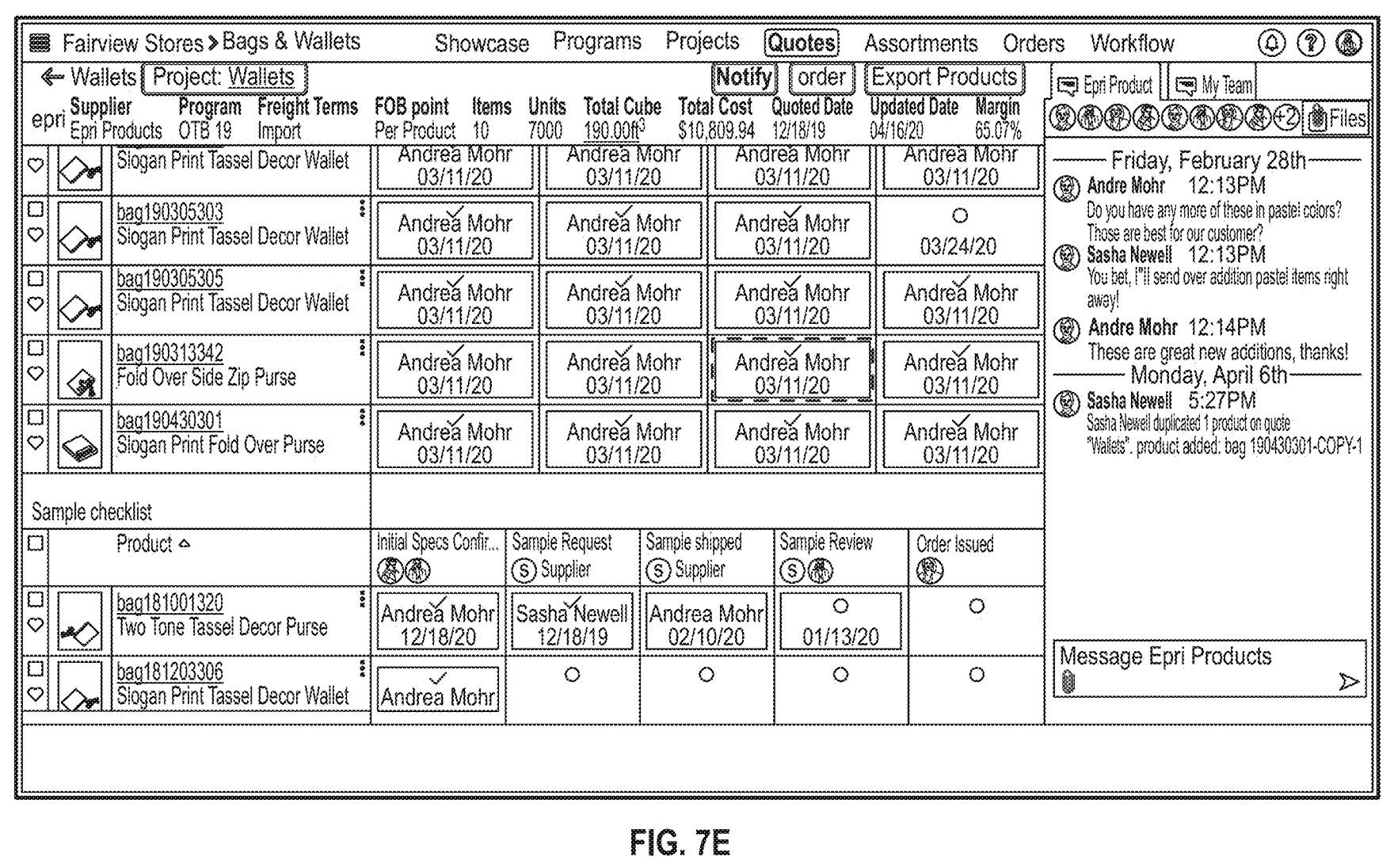

Referring now to FIG. 7E, an example user interface is illustrated that displays entries for multiple collaboration objects (e.g., products) from a related group (e.g., a quote in this example, a showcase, a program, a project, an order, etc.) positioned in tables with associated workflows. A given workflow may be associated with one or more corresponding collaboration objects (e.g., a group of products), corresponding workflow tasks, task assignees (e.g., individual users and teams, groups, or other sets of users) responsible for the workflow task, attributable dates, and multiple available statuses. Optionally, assigned users/sets of users, task due dates/times, and statuses for each collaboration object (e.g., a product) and task combination can be designated by authorized users who have the proper permissions, by a user defined algorithm, and/or by an artificial intelligence engine.

Different workflow task statuses may be visually indicated using different colors to provide efficient and clear visualization of workflow task statuses. A communication user interface is provided that enables multi-entity communication regarding a collaboration object, workflow, and/or workflow task (e.g., using real time chat, text messaging service, video communication, recorded audio messages, and/or the like).

Referring now to FIG. 7F, an example user interface is illustrated that displays information regarding a multi-object, multi-entity workflow. A desired workflow may be accessed from a menu workflows (listed on the left hand side of the example user interface). As similarly discussed above, the menu may be dynamically generated to only display the workflows that the current user is authorized to access (e.g., as determined using user authentication data). A given listed workflow may be associated with one or more collaboration objects, such as a group of products from several different entities (suppliers). Controls are provided via which a selected workflow can be filtered, sorted, or grouped by one or more variables such as the entity (supplier), product, task, status, due date, assignee identifier, and/or the like. Controls may be provided via which a user may add or remove collaboration objects (e.g., products) from a workflow, select a task from the selected workflow, edit the selected task status, and/or add comments to a task.

As discussed herein, the disclosed system may enable a multi-entity, multi-hierarchy implementation that provides for cross-entity and intra-entity collaboration and communication. Optionally, users assigned to a given hierarchy at a given entity share common permissions assigned to that particular hierarchy. Such users may be collectively referred to as a hierarchy team or simply as a team. For example, buyers and all assistant buyers of a given retailer's (e.g., Acme Furniture) indoor furniture buying team may be assigned to the following hierarchy: Acme>Furniture>Indoor Furniture. Optionally, a user may be assigned to multiple teams and be granted corresponding different sets of permissions to access information under several hierarchies to which the user is assigned. Different teams within the same entity may be granted different permissions to interact with different collaboration objects and teams at different entities.

Figure 7G:
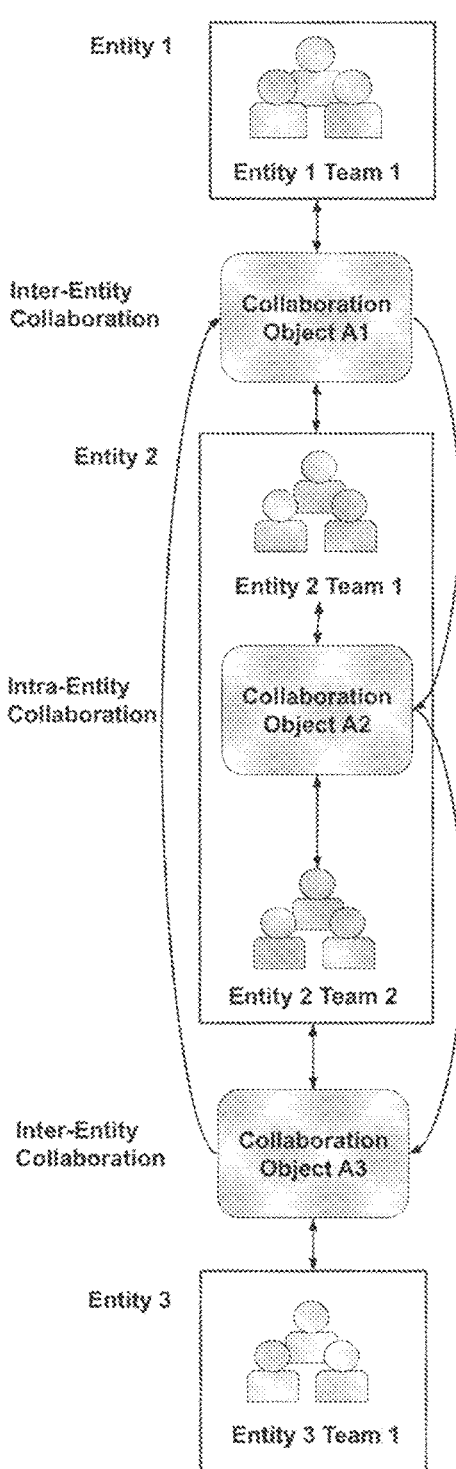
FIG. 7G illustrates an example process.

Referring now to FIG. 7G, an example process is illustrated of inter-entity and intra-entity communications regarding collaboration objects in one or more workflows. In this example, an individual or a team (Team 1) at a first entity (Entity 1) is collaborating regarding a first collaboration object (Object A1) with a second entity (Entity 2). Object A1 may be an input to Collaboration Object A2 (Object A2). For example, Object A1 may be a component in a product corresponding to Object A2. Entity A2 may have multiple internal teams (intra-entity teams Entity 2 Team 1, and Entity 2 Team 2) that collaborate regarding the workflow for Object A2. Entity 1 may collaborate with Entity 3 with respect to a third collaboration object (Object A3). Object A2 may be an input to Object A3. As similarly discussed elsewhere herein, communication channels are provided via which both inter-entity and intra-entity communications may be performed regarding respective collaboration objects and associated workflows (e.g., wherein the communications may include data, discussions, notes, comments, text messages, multimedia messages (still images, video images, sound files, and/or the like), emails, and/or the like). When a collaboration object interface is presented, the associated entity communications may be accessed from memory and presented.

Further, as illustrated in FIG. 7G, Entity 2 Team 2 may opt to share Collaboration Object A2 with Entity 3 Team 1 by deriving Collaboration Object A3 (which may be similar to Object A2 but with modified attributes, such as material or color. Additionally, Entity 2 Team 2 may choose to share updates regarding Collaboration Object A3 as updates to Collaboration Object A1. In the illustrated example architecture, a collaboration object shared by Entity 1 and Entity 2 may be used to derive variant collaboration objects shared by Entity 2 and Entity 3, and the collaboration objects shared by Entity 2 and Entity 3 may be used to update collaboration objects shared by Entity 1 and Entity 2. This scenario (simplified for illustrative purposes) may also be applicable from the perspective where Entity 2 Team 1 and Entity 2 Team 2 simultaneously collaborate with multiple entities.

As similarly discussed elsewhere herein, communication channels may be provided via which both inter-entity and intra-entity communications may be performed regarding respective collaboration objects and associated workflows (e.g., wherein the communications may include data, discussions, notes, comments, text messages, graphics, emojis, multimedia messages (still images, video images, sound files, graphic files, and/or the like), emails, and/or the like). When a collaboration object interface is presented, the associated entity communications may be accessed from memory and presented.

Thus, with respect to intra-entity communications, a team (or individual user) from one entity can provide communications with respect to a collaboration object (e.g., an intra-entity collaboration object or an inter-entity collaboration object) with other teams (or individual users) inside of their own entity.

With respect to inter-entity communications, a team (or individual user) from one entity can provide communications with respect to a collaboration object (e.g., an inter-entity collaboration object) with other teams (or individual users) at different entities.

Thus, teams within one or more entities are enabled to conveniently share collaboration objects with teams within the same entity and with teams in different entities via the multi-entity, multi-hierarchy system without requiring users to download and/or manually re-enter data from and among multiple disparate systems.

Figure 7H:
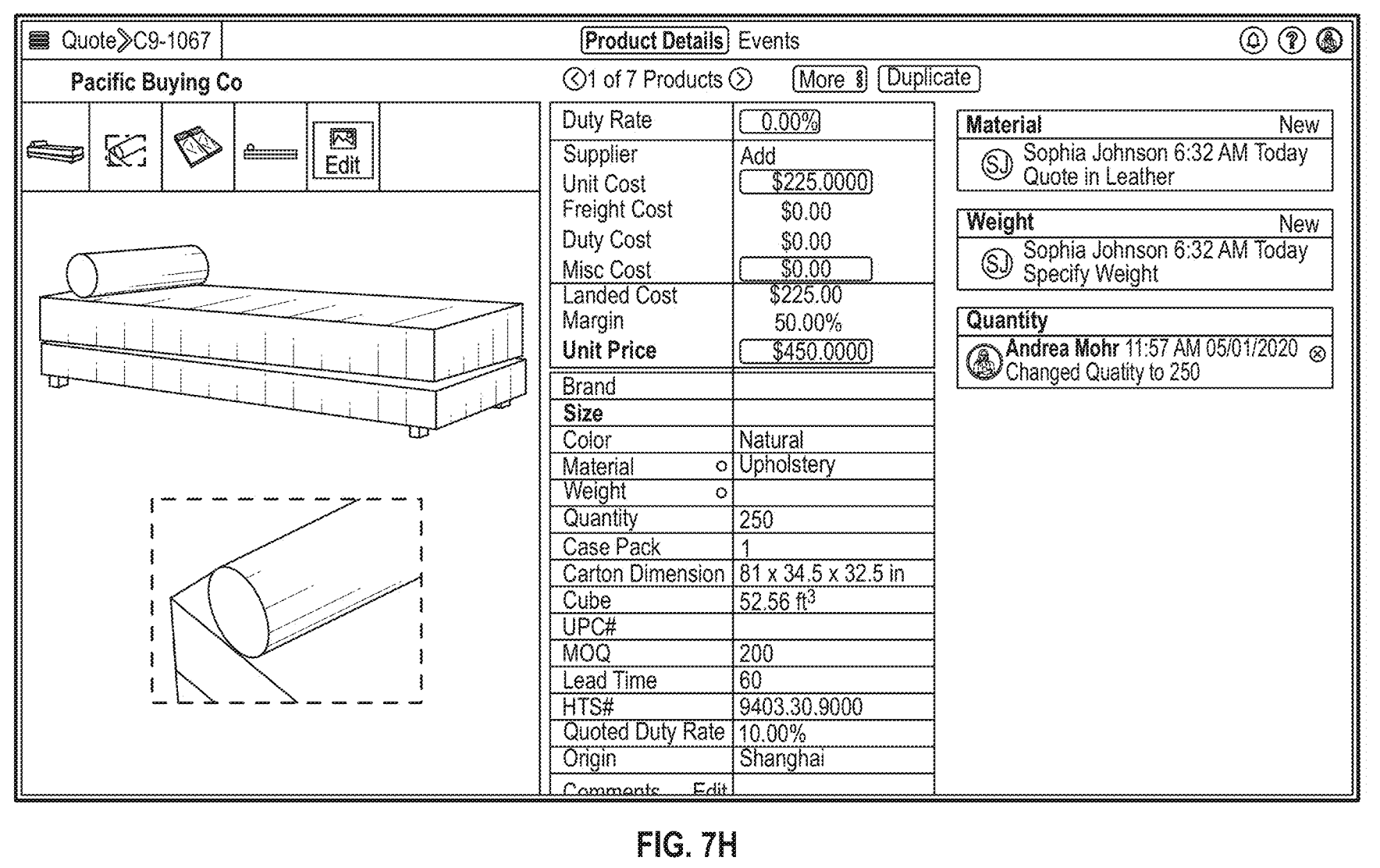

FIG. 7H illustrates an example user interface providing inter-entity and intra-entity communications regarding a collaboration object. In the illustrated example, a communications pane is presented on the right side of the user interface. Optionally, inter-entity communications (e.g., between a retailer and a supplier) may indicatively be color-coded (e.g., using a neutral/white background) using a first color coding, and intra-entity communications may indicatively be color-coded (e.g., using a grey or primary color background) using a second color coding. In addition, collaboration data may be presented in association with the related communications. For example, the collaboration data may include one or more images of the collaboration object (e.g., still images and/or video images), collaboration object attributes (e.g., size, color weight, dimensions, MOQ, lead time, quoted data rate, place of origin, pricing, etc.).

Figure 7I:
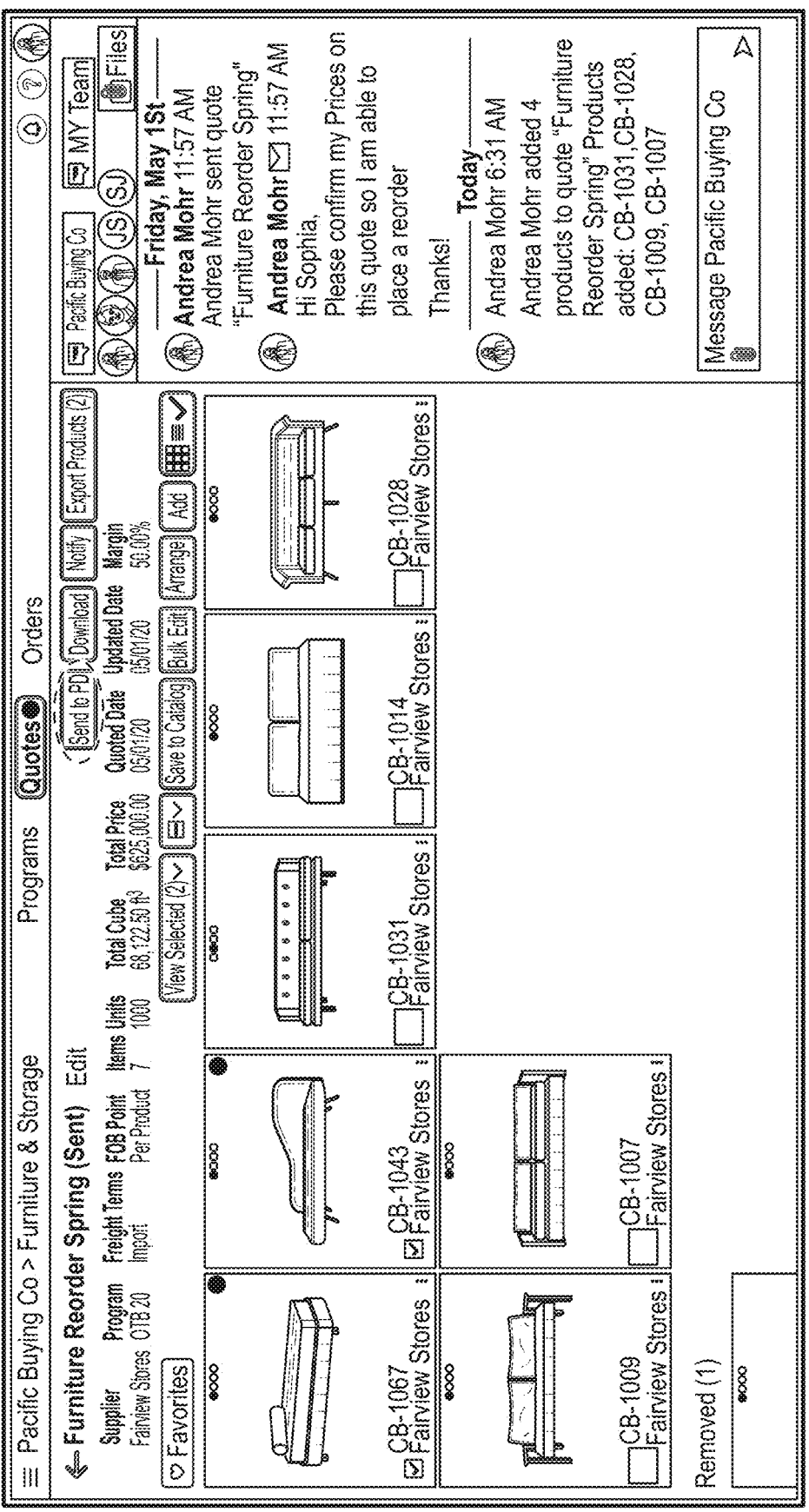

FIG. 7I illustrates an example user interface providing inter-entity communications (displayed on the right side) between users from multiple entities (e.g., retailers and a supplier) regarding a collaboration object (e.g., a quote) together with information regarding the collaboration object (e.g., images, identifiers, attributes, pricing of a product corresponding to the collaboration object, and/or other attributes described herein). Controls may be provided via which the user can specify that: only communications from the team(s) internal to the user's entity are to be presented; only communications from the team(s) external to the user's entity are to be presented; or both communications from the team(s) internal to the user's entity and from the team(s) external to the user's entity are to be presented. The user interface may enable a user of a team of a given entity to select one or more collaboration objects and specify one or more teams within the user's entity (e.g., who may not otherwise have access to the selected collaboration objects) and/or with one or more teams one or more external entities with whom the selected collaboration objects are to be shared.

Figure 7J:
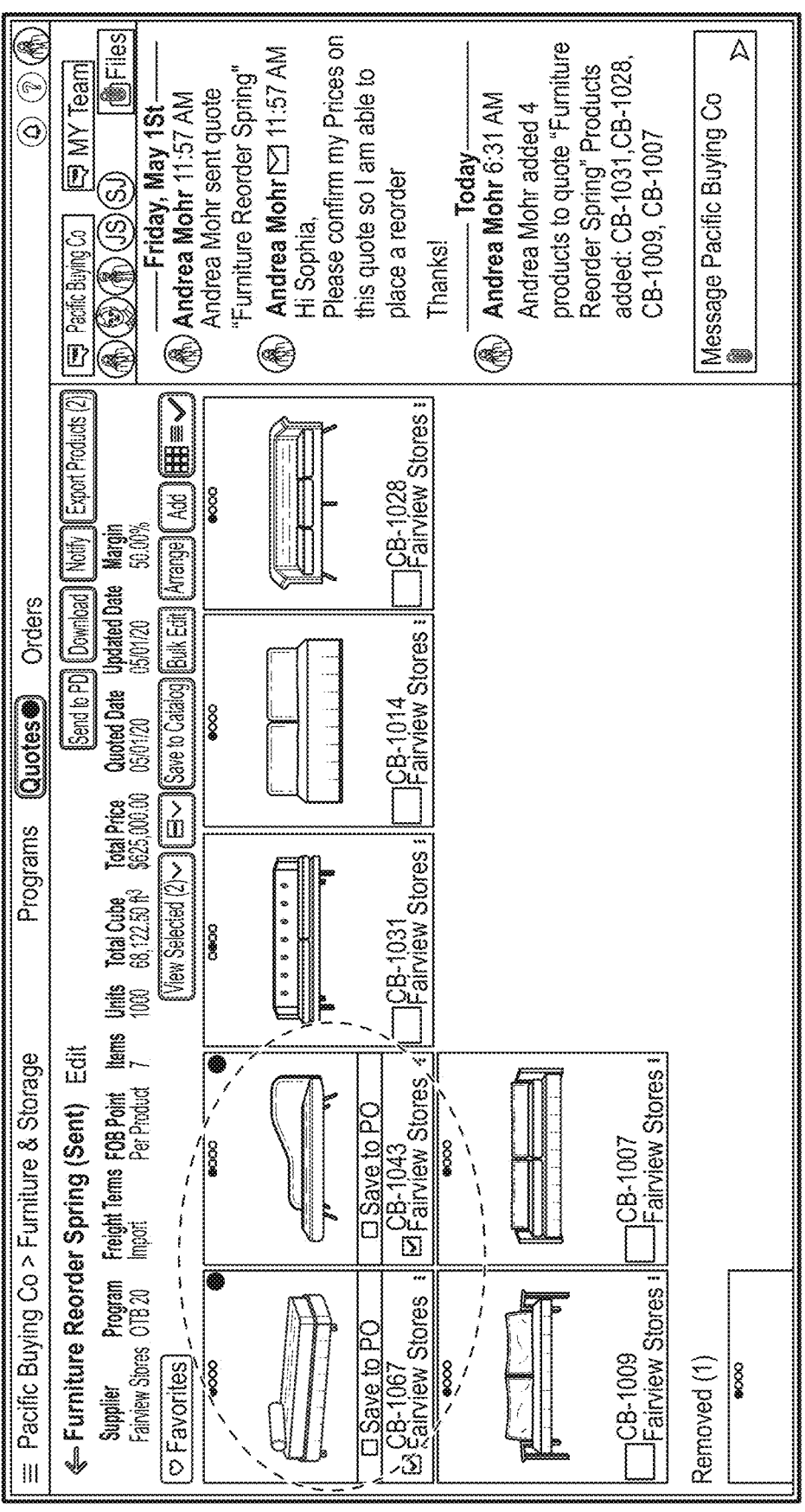

FIG. 7J illustrates another example user interface providing intra-entity communications (displayed on the right side)

regarding a collaboration object, together with information regarding the collaboration object (e.g., images, identifiers, retailer name, and/or the like). In this example, the collaboration object is a quote. The collaboration object contains multiple sub or related collaboration objects (e.g., multiple products for which a quote is being requested). A user in a team at one entity can select collaboration objects (the two circled products in this example), and transmit communications regarding the selected collaboration objects to a different group or team of users in the user's own entity (e.g., a product development (PD) team, a sales team, a purchasing team, an accounting team, etc.) by activating a corresponding control (e.g., a send to PD control, which may cause the send user interface illustrated in FIG. 7K to be presented on the user device). The status of a given collaboration object may be displayed in association with an image of the collaboration object (e.g., "Send to PD"), where the status may optionally be highlighted using a corresponding color.

Authorized users at a given entity may opt to share collaboration objects internally within its team(s), including with teams within the entity who may not otherwise have access to the collaboration objects. Optionally, authorized users at a given entity may opt to share collaboration objects with users or teams at other entities.

For example, the disclosed system provides teams/sets of users (or individuals) within one or more entities the appropriate visibility to both teams (or individuals) within their own entity and teams (or individuals) at external entities with respect to developments and statuses that affect (e.g., adversely or positively affect) their collaboration regarding an object without requiring an entity to manually export data and without requiring manual data re-entry. This is achieved by enabling users utilizing the disclosed multi-entity multi-hierarchy system to select, via a corresponding user interface, collaboration objects from other inter-entity collaboration or intra-entity collaboration to share with intra-entity users or inter-entity users respectively.

Figure 7K:
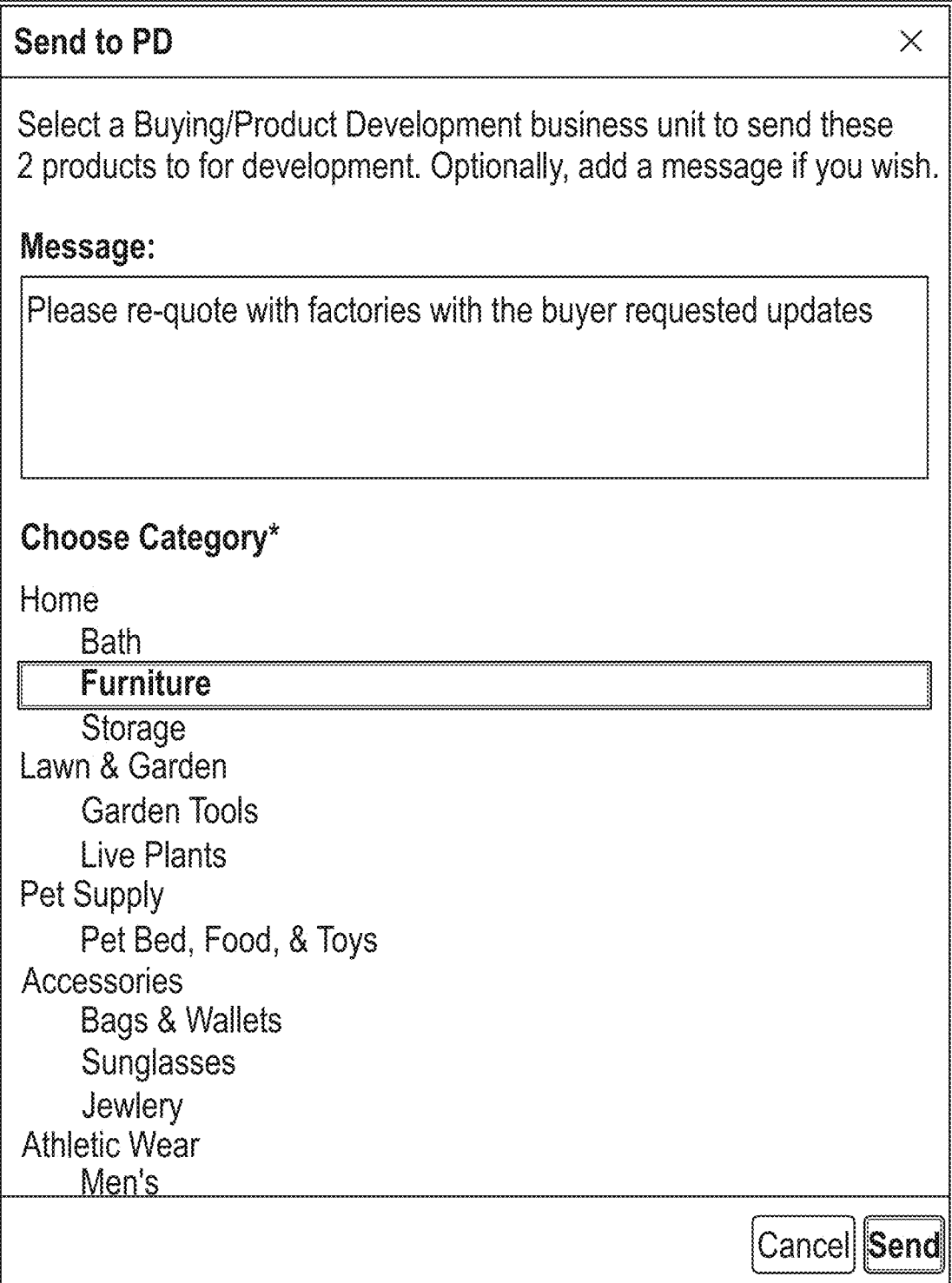

Referring now to FIG. 7K, an example user interface is illustrated that enables inter-entity and/or intra-entity communications to be created. The user interface optionally comprises a form, such as a modal form (where no input (keyboard, touch, or mouse click) can occur except to objects on the modal form), where a user may select one or more teams of users (within and/or external to an entity) that have been granted the appropriate permission (e.g., within the corresponding category selected via the user interface) to share selected collaboration objects (e.g., selected in the using the interface illustrated in FIG. 7I or 7J). The user may optionally include communications via in-app chat messages, via an app pop-up alert, via a webpage hosted by a server and accessed by a user device browser, via an email, via a short/instant messaging service, and/or otherwise to provide additional context regarding the selected collaboration objects.

Figure 7L:
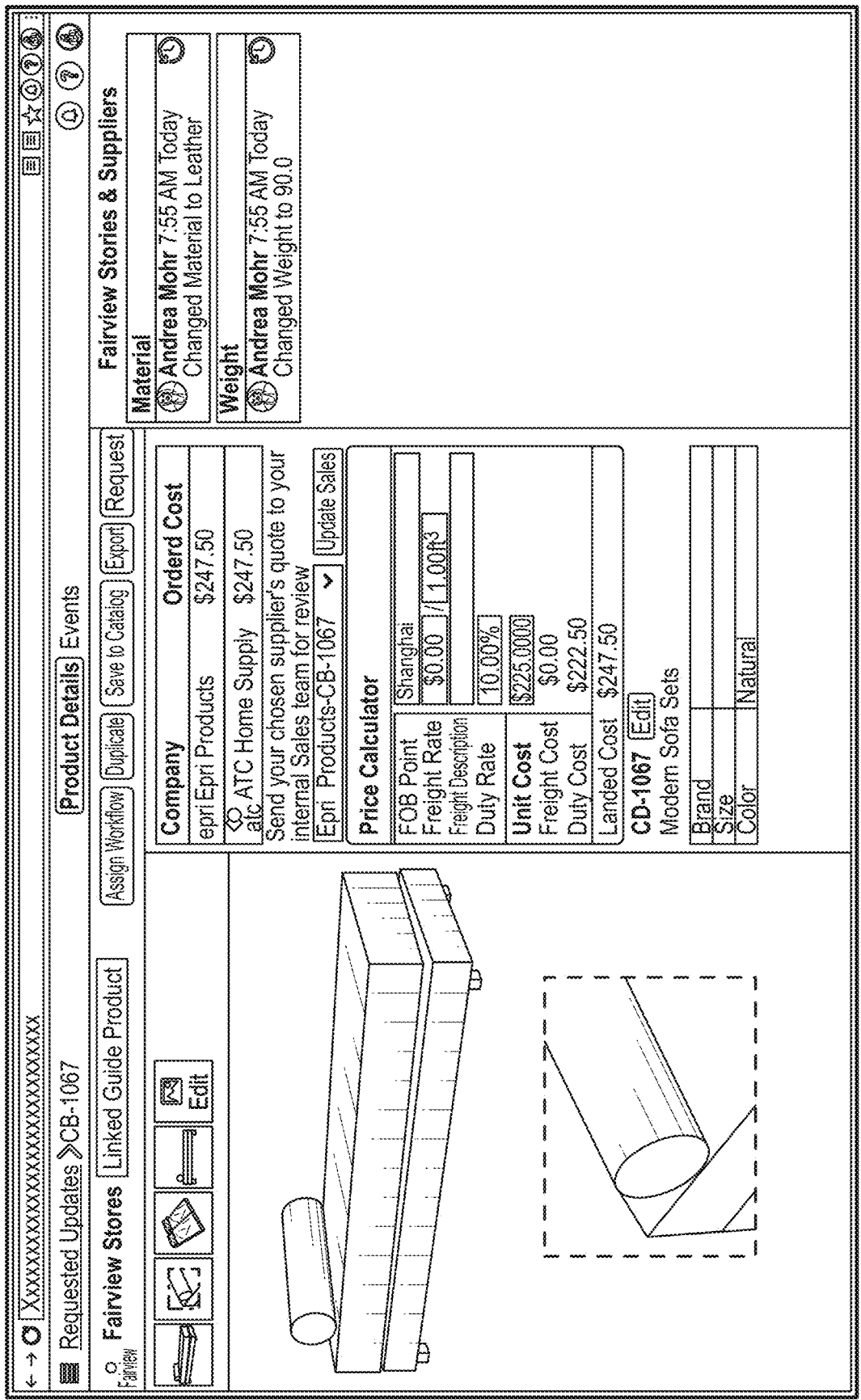

Referring now to FIG. 7L, an example user interface is illustrated that enables sharing, by a user in a first team at a given entity, of a collaboration object with users at a different team within the same entity. The user interface further enables sharing of the selected collaboration object with teams at different entities that are connected with the foregoing different team within the same entity (although the teams at the different entities may not have any direct connections with the first team at the first entity). The collaboration object in this example is a product (a couch). Quotes from multiple entities/companies (in the form of landed cost quotes in this example) are listed. The user may select a given quote and transmit the selected quote to an internal team (e.g., an internal sales team for review). Thus for example, when users at Team 1 in Entity 1 choose to share a collaboration object, such as a product, with users at a different team with different permissions within the same entity, the selected collaboration object can also be shared with teams at other entities that are connected with the second team at the first entity (even if the first team at the first entity does not have a direct connection with the other teams at other entities).

In the illustrated example user interface, a collaboration object (a product) has been shared between teams at the same entity and is now shared again with teams at different entities. This is depicted by a table in the top middle of the user interface listing multiple entities to whom the collaboration object has been sent to with a request for quotation updates.

A form may be provided that enables a user to select a version (from multiple versions) of a collaboration object (that has been shared with one or more teams at one or more entities) to update the original team at the first entity that originally defined the collaboration object, and had shared the collaboration object with the second team at the first entity. When a user shares a selected version of the collaboration object to update another team within their entity, this form will show the selected version.

Referring now to FIG. 7M, an example user interface is illustrated comprising a form via which users can share updates to a collaboration object between teams (and users at such teams) at the same entity. This form may be enabled when a user selects a version of a collaboration object to share with teams in the user's own entity (e.g., from a dropdown list of collaboration objects presented via the user interface illustrated in FIG. 7L, where the dropdown list may be populated with collaboration objects that the user has permissions to share or update). The form provides a selectable list of users within other teams at the entity (e.g., automatically populated with the names of users assigned to the collaboration object) that may be notified of the updates to the collaboration object, and includes a message input field via which the user sending the collaboration object updates may provide additional context to the users receiving the updates. Optionally, a "select all" control is provided via which the user may select all of the listed users to whom updates are to be sent to.

Figure 7N:
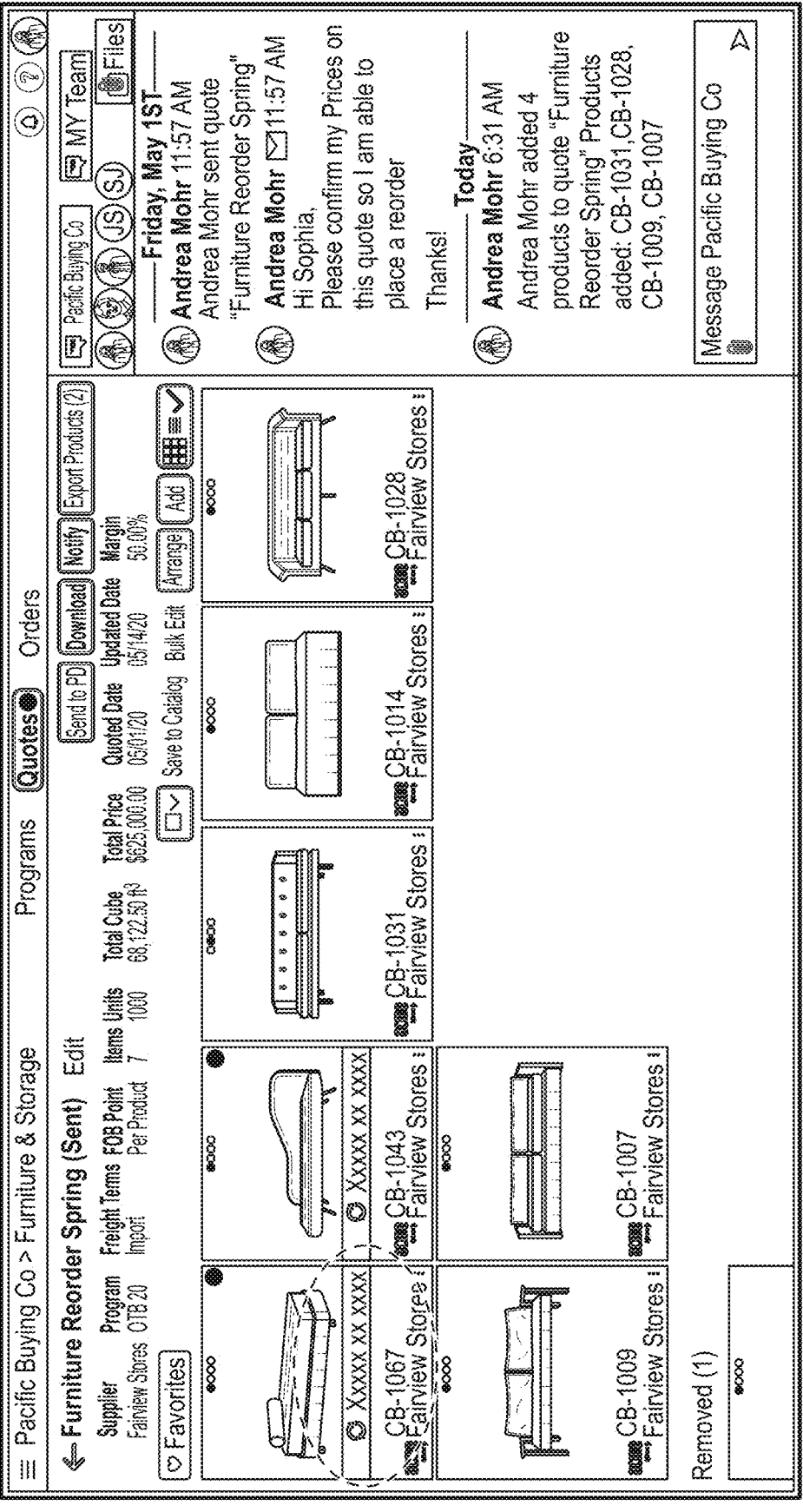
Figure 70:
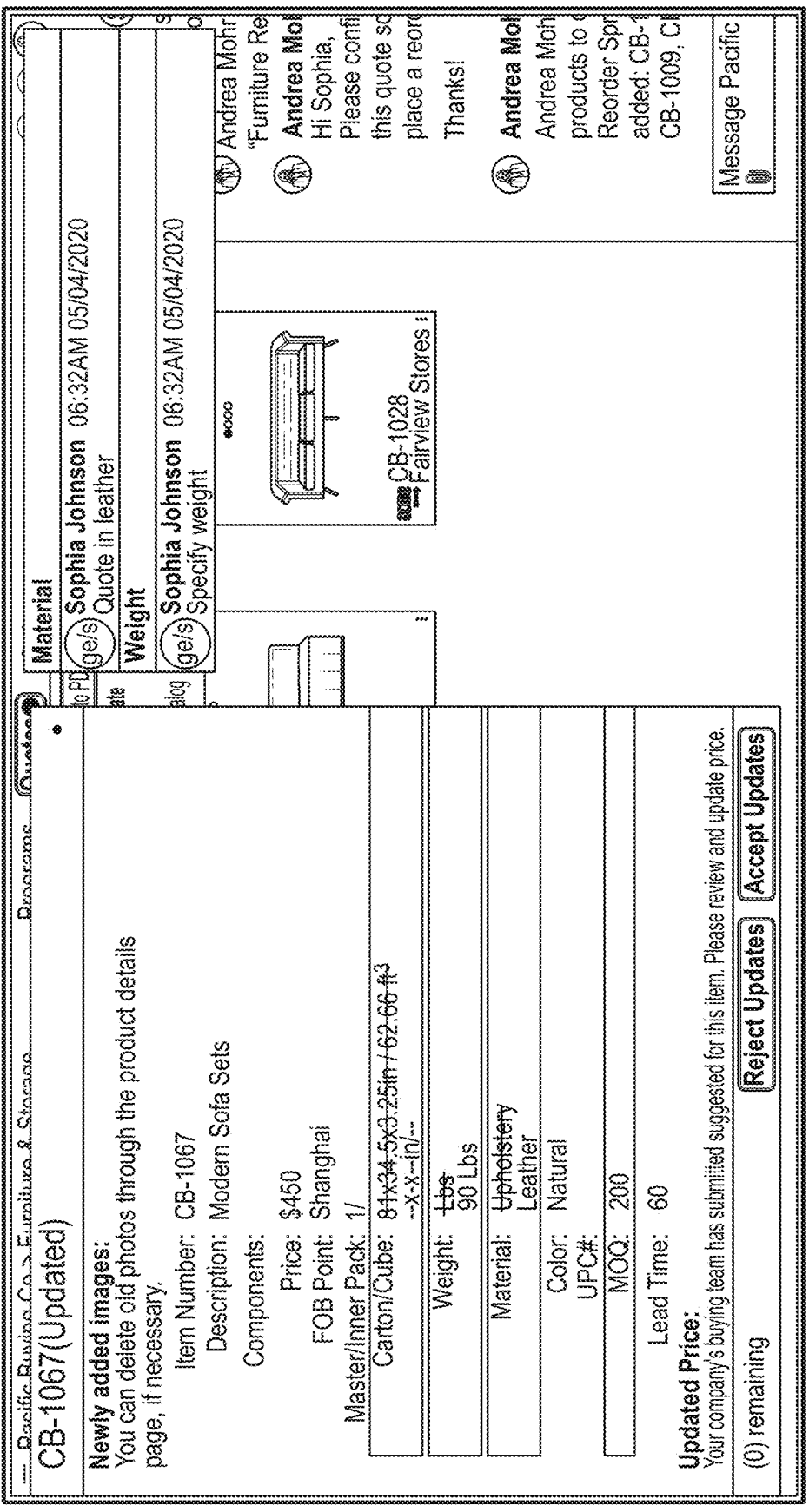

Referring now to FIG. 7N, an example user interface is illustrated that enables updating of a collaboration object with a separate collaboration object. The user interface depicts a collaboration object, such as a quote, with subsequent/related collaboration objects, such as products, where one or more of the collaboration objects has been shared by a team (e.g., the team that defined the collaboration object) with one or more teams within the same entity, and provides status and updates from one or more of those teams that are available for review by users on the team that originally shared the collaboration object. For example, with reference to the circled couch, a "read to review" notification is presented, which when clicked on, may cause the updates to be presented. By way of further example, the status of a given collaboration object may be displayed in association with an image of the collaboration object (e.g., "Send to PD"), where the status may optionally be highlighted using a corresponding color.

Referring now to FIG. 7O, an example user interface is illustrated that may be launched in response to the user selecting a collaboration object with new updates to review (e.g., via the user interface illustrated in FIG. 7N). The user interface enables users of a team to review updates, suggestions/changes, or comments with respect to a collaboration object that has been shared with one or more teams within the team's own entity. Such updates/changes, suggestions, or comments may assist the team's interactions and collaborations with one or more other teams at one or more other entities. The user interface enables the user to review and accept or reject (via corresponding controls provided via the user interface) updates and suggestions to the collaboration object while contextualizing notes, communication, and/or requests from users at one or more other teams from one or more other entities. Changes and suggestions may be identified via color coding, cross-outs, bolding, italics, boxes/ellipses, and/or otherwise. In the example user interface, changes/suggestions include price, size, weight, and materials. As discussed elsewhere herein, such updates, comments, acceptances or rejections may be reported to one or more users via status reports (e.g., provided via various user interfaces described herein, via an app pop-up alert, via an email, via a short/instant messaging service, and/or otherwise).

Example user interfaces may enable entities to add inter-entity user defined fields. For example, a given entity typically has information that may be unique and that is useful, valuable, and proprietary to their business operations. For example a given entity may have used an identifier system that enables its employees to identify product attributes based on the identifier value. Corresponding user defined data fields may be added to certain user interfaces.

Just as there is value in collecting, managing and tracking these fields within a system for a single entity, there is also value in collecting, managing, and tracking these fields as they relate to multi-entity collaboration regarding a collaboration market. Corresponding user defined data fields may be added to certain user interfaces for many different types of collaboration objects such as products, quotes, orders, projects, purchase programs, documents, transactions, and/or other types of collaboration objects.

Using the disclosed multi-entity, multi-hierarchy communication system, user defined fields from a first entity may be associated with collaboration objects shared internally and/or with related or other entities based on the designated relationships of those entities and/or an identification of those entities by the first entity. Optionally, the custom user-defined fields and corresponding data are distinct from common fields (that are accessible by multiple entities sharing a collaboration object). For example, optionally, the custom user-defined fields and corresponding data are only shareable within the entity that defined the custom fields, and are not accessible by other entities.

Similarly, custom user-defined functions may be created by a given entity that perform desired programming tasks (e.g., that may be unique and valuable to the creating entity). For example, a user-defined function may be implemented using modular and/or reusable code to perform one or more repeatable tasks (e.g., queries, calculations, etc.) related to one or more custom, user-defined fields and/or common data fields (and associated data). Optionally, only the entity whose user defined a given function may access and use the entity's user-defined function (as opposed to common functions to which entities are generally granted access). Optionally, the entity may share/grant access to the entity's user-defined functions with other specified entities.

Optionally and advantageously, the disclosed multi-entity, multi-hierarchy communication system enables a user to define attributes associated with an object, such as a collaboration object. For example, referring to FIG. 1P, within the context of a software system shared by multiple entities, data governance around collaboration objects (e.g., a product, a quotation, a purchase order, etc.) is important in transmitting appropriate data between collaborating users and organizations. Aligning expectations around data field types may reduce or eliminate miscommunications and may greatly facilitate transacting data with third party systems (e.g., purchasing systems of retailers, systems of manufacturers selling products to retailers, other systems described herein, and/or other systems) that interface with the communication/collaboration system.

By way of example, differences in units of measurements may often be a source of miscommunication, which can result in the wrong items being manufactured, sold, and purchased. By way of illustration, a given entity may specify an attribute/data field of a given collaboration object, such as the size of a shirt, in centimeters whereas a partner entity (e.g., a shirt manufacturer) may expect to provide the same measurement in inches. By way of further illustration, even when two entities utilize the same units of measurement, a given entity may want to place restrictions on the length or value of data that is attributed to a given field on a collaboration object. For example, a given entity may be configured to input data from a data field that briefly describes a collaboration object (e.g., a shirt) with values such as "Blue Shirt". The given entity may have a desire to limit the number of characters in the values for these fields, such as 12 characters, since they may use the data from this data field to print on physical tags that can only physically accommodate a limited number of clear, human readable characters (e.g. 12 characters in Time New Roman, with a font size of 12).

To address the foregoing technical challenges, optionally the disclosed multi-entity, multi-hierarchy communication system may preconfigure common data fields with field types, length limitations, and other attributes, that may be generally accepted by relevant third party systems. Optionally, in addition, the system may provide enhanced flexibility by enabling users to create fields with different field types, length limitations, and/or other attributes. Certain processes and user interfaces will now be described that enable users to create field types and define maximum field lengths, and/or other attributes for User Defined Fields (UDF) to enhance with other entities and other entity systems. The User Defined Fields may also enable data grooming (e.g., deleting old or stale data to reduce the total database size and memory utilization) and/or governance that facilitate migrating data from or through the communication/collaboration system to other systems controlled by a given entity that may not be shared with other entities.

Figure 7P:
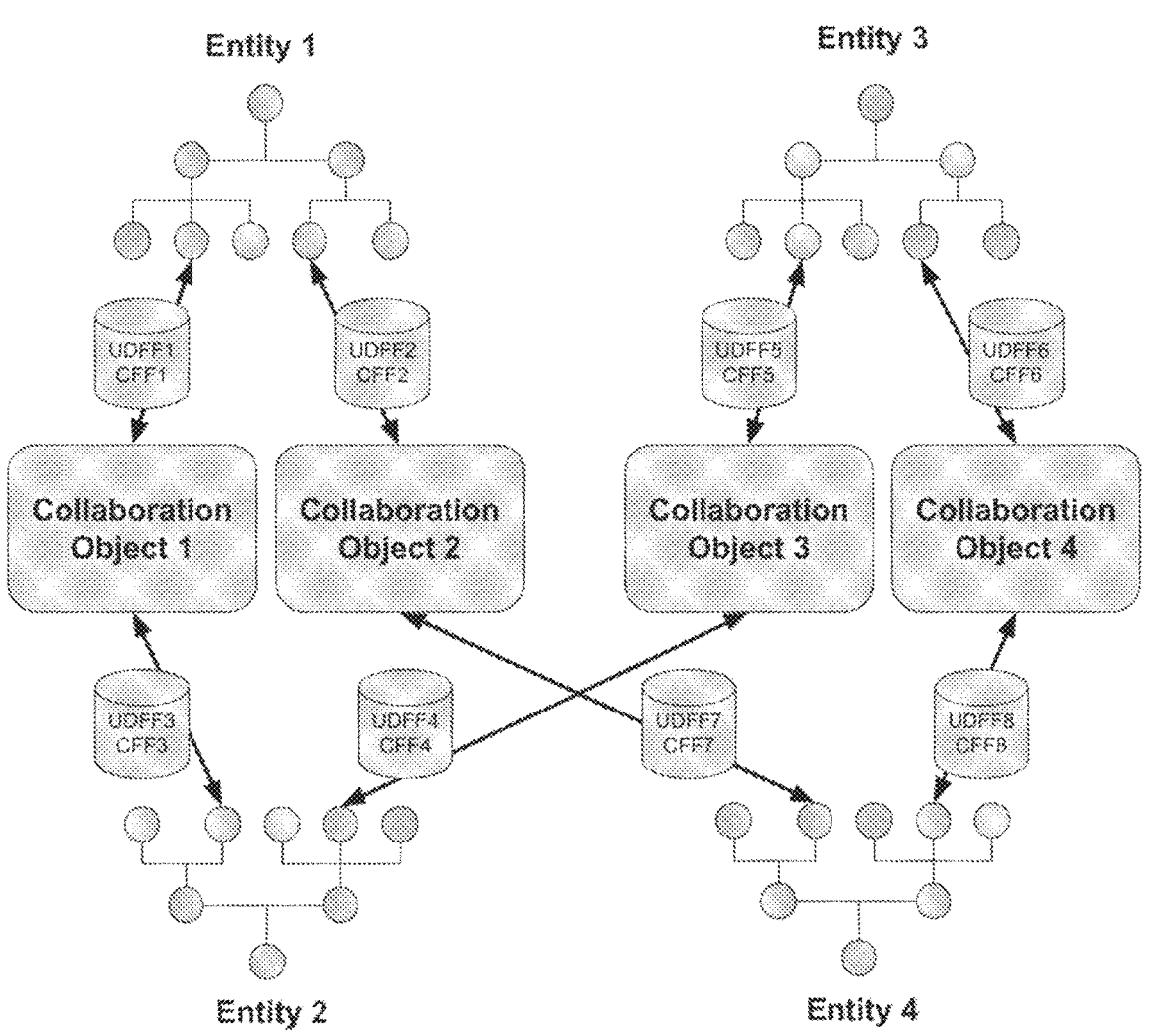
FIG. 7P illustrates an example sharing of collaboration objects.

Referring to FIG. 7P, user-defined fields and user defined functions are sometimes collectively referred to herein as User Defined Fields and Functions ("UDFF"). Common data fields and common functions (that are generally available to all participating entities) are sometimes collectively referred to herein as Common Fields and Functions ("CFF").

FIG. 7P provides a representation of how, in a multi-entity multi-hierarchy system, a set of UDFF and CFF (and associated data) under one or more hierarchies may be selected and shared with one or more hierarchies of one or more entities via one or more collaboration objects (e.g., a product, a product offer, a Request for Quote (RFQ), a quote, a Purchase Order (PO), a project, a purchase program, a document, a transaction, and/or the like). The User Defined Fields and Functions (UDFF) and Common Fields and Functions (CFF), including fields/functions with applied data types, values, and/or restrictions, may be applied to collaboration objects within the communication/collaboration system. FIG. 7P further illustrates the data interface between collaboration objects within the multi-entity, multi-hierarchy communication system and third party systems of third party entities that may define the data types, values, and restrictions of the UDFF applied to collaboration objects.

In the illustrated example, a first set of user defined fields (and associated field data) and user defined functions (UDFF1) and common fields (and associated field data) and functions (CCF1) under a hierarchy (of users) of Entity 1 may be selected and shared via Collaboration Object 1 with a hierarchy of Entity 2.

A second set (UDFF2 and CFF2), which may include fields and functions that are also in the first set (UDFF1 and CFF1), are under a different hierarchy of Entity 1. UDFF2 and CFF2 may be selected and shared via Collaboration Object 2 with a hierarchy of Entity 4.

A third set (UDFF3 and CFF3) under a hierarchy of Entity 2 may be selected and shared via Collaboration Object 1 with a hierarchy of Entity 1. A fourth set (UDFF 7 and CFF7) under a hierarchy of Entity 4 may be selected and shared via Collaboration Object 2 with a hierarchy of Entity 1.

The data sharing enables via the UDFF provides real-time data interchange between various entities in a multi-entity multi-hierarchy system, significantly improving data flow while removing or reducing the need for maintaining multiple siloed systems across multiple disconnected entities and lengthy data mapping during system integrations. Such an approach enables a reduction in the amount of memory that would otherwise be needed to store duplicative siloed data, and further enables data to be shared more quickly as the number of data stores that need to be accessed and the number of systems that need to be traversed are reduced.

Further, UDFFs defined by a given entity that are not shared with other entities will remain private UDFFs of the given Entity and may be privately managed by users within the given Entity, thereby further enhancing security and data privacy.

Referring now to FIG. 7Q, an example user interface is illustrated that comprises a modal form that enables users of a given entity to configure data fields that may be unique in form or requirement for the given entity (a UDFF). There may be predefined fields from which the user may select and/or an interface may be provided via which the user can define entirely new form fields (e.g., by entering a field name, field type, expected data type, etc.). The illustrated form may also enable users at a given entity to specify whether a given field (UDFF) is to be "private" (and so only available to users at the given entity) or "not private," whereby the corresponding fields and field data are to be made available to users at other entities based on a predetermined relationship permissions hierarchy structure specified by the given entity.

Referring now to FIG. 7R, an example user interface is illustrated that enables users to configure a set of UDFFs and CFFs via page/interface views. The user interface enables users to select a set of UDFF and CFF (e.g., via the table in the middle section) from a list of page views in the left section and assign the set of selected fields to one or more hierarchies of the given entity listed in the right section. Users may further sort and rearrange the order of UDFF and CFF in the middle section via sort controls. The user interface enables an entity user to specify select which relationships to other entities the user wants to share the entity's UDFF. The user interface enables users to create groupings or "Page Views" of one or more fields, including unique user defined fields, and then select or otherwise specify relationships subjected to a multi-entity, multi-hierarchy permissions structure to adopt the set of fields assigned to those relationships. Controls are provided via which a user may specify field position (e.g., first, second, third, etc.), field name, field type (e.g., standard, custom), data type (e.g., integer, floating value, character, image, graphic, etc.). Controls may be provided via which a user may delete corresponding fields. The user interface may enable a field entry to be dragged and dropped to change the field positioning. A control may be provided via which a user can add fields. Controls may be provided via which the user may specify to which entity departments/groups and/or catalog categories the settings are to be applied.

Figure 7S:
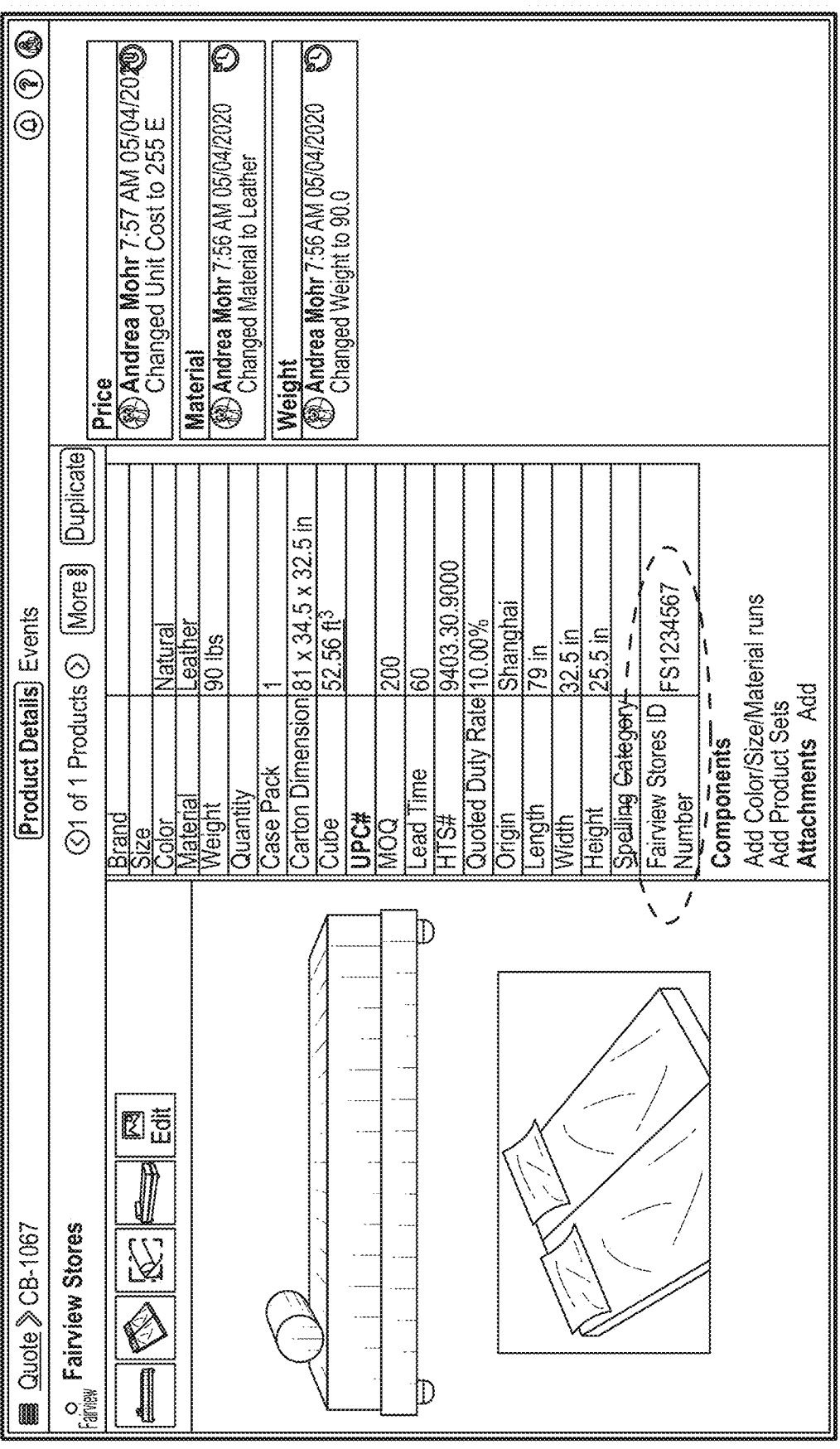

Referring now to FIG. 7S, an example user interface is illustrated that displays a collaboration object and that enables users from one or more entities to view and update in real-time a selected shared UDFF, selected as a part of product attributes (e.g., the circled attributes). In particular, the user interface depicts a collaboration object from a first entity, where user defined fields from a second entity are available to interact with for the depicted collaboration object. Users may select which set of related entity fields they want to interact via a drop down form positioned above the lower table in the interface. In this example, both the entities and sets of fields may be subject to pre-determined permissions both for the individual users as well as between the related entities and hierarchies.

FIG. 1Q illustrates an example user interface enabling a user of an entity to create new user defined fields to apply to collaboration objects with which the user's entity and partner entities can interacts. The user interface includes controls (e.g., fields, dropdown and/or other menus, and/or the like) where a user may specify a field name (e.g., via a menu of predefined field names, a field name entered as text by the user, etc.), a data type for the field (e.g., short text, long text, inter value, floating point value, yes/no, date, etc.) and constraints (e.g., "Private", "Default Value", "Maximum Character Length", "Minimum Character Length", "Forbidden Characters, etc.) on values for a user defined field. A control may be provided in association with a given field that enables the position of a given field to be moved up or down in the list of fields.

FIG. 1R illustrates an example user interface configured to enable a user to create new user defined fields and choose the field type (e.g., from a menu of field type options). This technique of specifying field types, in combination with an interface that enables the selection of pre-defined options for field values, advantageously enables users from a given entity to enforce data standardization when compiling data on one or more collaboration objects. Data standardization is particularly important to the supply chain industry where an entity wants to share crucial data sets (e.g., via a shared user defined field and function) with other entities (e.g., upstream and/or downstream throughout the industry), where if data is not accurately communicated, the wrong item may be manufactured, the wrong quantity of items may be delivered, the item may be delivered to the wrong destination, etc.

FIG. 1S illustrates an example user interface configured to enable a user to create a user defined field and specify default value and/or range. For example, a field is provided via which the field name and data type may be specified, a default value field is provided via which a field default value may be specified, and a maximum value field is provided via which a maximum permitted field value may be specified, further facilitating the collection of well-governed data by a given entity. Advantageously, the use of a prespecified default value and range helps users from a given entity quickly and accurately compile information regarding collaboration objects and significantly reduces data errors.

FIG. 1T illustrates an example user interface configured to enable detection of user-entered values for a given field that violate a field type specification and/or constraints (e.g., specified using the user interface illustrated in FIG. 1S). In response to detecting that a user entered value for a given field that violates a field type specification and/or constraints, the user interface generates visual, audible, and/or haptic warnings and alerts that indicate to a user that a value entered in one or more fields violates the field type specification and/or constraints. This feature advantageously aids users in standardizing data when initially collecting such data and enforces an efficient non-obstructive way of grooming/governing data, thereby reducing system conflicts and the use of computer resources that would otherwise be needed to resolve such conflicts. In this example, a color-coded textual alert is provided indicating that the number entered in the WM Item Number field violates the maximum number of permitted characters.

FIG. 1U illustrates an example user interface that enables the bulk editing of values of a given user defined field of one or more collaboration objects (e.g., multiple products) at the same time, while restricting field types and value ranges of the user defined field to those permitted. For example, the user interface may access and depict images of various collaboration objects, such as products (e.g., dresses in this example). A given collaboration object may be displayed in association with a selection control (e.g., a checkbox). A user can select the collaboration objects that are to have respective field values modified for a given field type. The user may select the field whose values are to be edited and a corresponding field value editing user interface may be displayed that depicts the selected collaboration objects and that includes a field that enables an existing field value to be edited or a new field value to be entered.

An aspect of the present disclosure relates to collaboration workspaces that may be shared amongst registered and unregistered entities, users, and/or groups of users, with respect to one or multiple collaboration objects.

In particular, within a multi entity/multi hierarchy system such as the communication/collaboration system described herein, it would be advantageous to enable users to utilize the hierarchies, collaboration objects, and collaboration tools of the disclosed system to collaborate on collaboration objects with external users and entities who have not yet registered for access to the system as well as with those who are registered users and entities.

For example, an external entity may encounter practical hurdles to registering for access to the multi-entity/multi-hierarchy system (e.g., because of a lack of technical resources, purchasing authority, and/or financial resources). To facilitate the utilization of the multi-entity/multi-hierarchy system beyond its registered user base, it may be advantageous to remove gateways and friction in providing access to the system by non-registered users and/or entities (e.g., companies).

Consider a first set of users within a first entity that is registered on the multi-entity/multi-hierarchy system, where the first set of users shares collaboration objects with a second set of external users (that are not part of the first entity) and entities who have not yet registered/signed up or signed into the multi-entity/multi-hierarchy system. The system may enable the first set of registered users to transmit a communication (e.g., an email, a short messaging service message, and/or other type of communication) comprising a unique network resource link containing or providing access to secured browser tokens to a second set of external non-registered users and entities. Through the link and tokens, the second set of external non-registered users and entities may access the shared collaboration objects as specified by the first set of registered users.

FIG. 1V illustrates a representation of users granted hierarchical permissions within a registered entity (Entity 1) sharing a collaboration object with a non-registered user via the system disclosed herein.

FIG. 1W illustrates a representation of users granted hierarchical permissions within a registered entity (Entity 1) sharing multiple different collaboration objects with respective different non-registered users via the system disclosed herein.

FIG. 1X illustrates a representation of users granted hierarchical permissions within a registered entity (Entity 1), sharing multiple different collaboration objects (Collaboration Object 1, Collaboration Object 2) with different non-registered users where one or more non-registered users have access to one or more collaboration objects via the disclosed system. In this example, a given collaboration object may be shared with multiple non-registered users.

FIG. 1Y illustrates a representation of users granted hierarchical permissions within a registered entity (Entity 1), sharing multiple different collaboration objects (Collaboration Object 1, Collaboration Object 2) with respective different groups of non-registered users (Group 1, Group 2), where individual non-registered users with a given group of non-registered users may have access to one or more collaboration objects via the system disclosed herein.

FIG. 1Z illustrates a representation of multiple users granted hierarchical permissions within multiple registered entities (Entity 1, Entity 2) sharing respective different collaboration objects (Collaboration Object 1, Collaboration Object 2) with the same non-registered user, where the non-registered user may access both collaboration objects and interact with one or more users from one or more registered entities via the disclosed system. The system may provide the non-registered user with access to the different collaboration objects (Collaboration Object 1, Collaboration Object 2) from different registered entities (Entity 1, Entity 2) via a single interface (e.g., where access is provided via unique keys such the non-registered user's email address, phone number, security tokens, or IP data).

FIG. 1AA illustrates a representation of multiple users granted hierarchical permissions within multiple registered entities (Entity 1, Entity 2) sharing multiple different collaboration objects (Collaboration Object 1, Collaboration Object 2) via the disclosed system with the same group of non-registered users (group 1) where the non-registered users within the group (Group 1) may access both collaboration objects (Collaboration Object 1, Collaboration Object 2) and interact with one or more users from one or more registered entities (Entity 1, Entity 2). The system may provide the non-registered user within the group (Group 1) access to the different collaboration objects (Collaboration Object 1, Collaboration Object 2) from different registered entities (Entity 1, Entity 2) via a single interface (e.g., where access is provided via unique keys such the non-registered user's email address, phone number, security tokens, or IP data)

FIG. 1BB illustrates an example user interface enabling one or more users at a registered entity to define access to a collaboration object for one or more non-registered users or user groups using email addresses. A message may be transmitted to the email address, where the message may contain a link to a unique web address with secured tokens, IP information, group IDs, and/or otherwise. The example user interface may identify a default team (e.g., a default set of users within a given entity that has access permissions to a corresponding collaboration object), and a "my team" set of users (e.g., a customized, user-specified set of users within a given entity that has access permissions to a corresponding collaboration object). An "add participants" user interface may be provided via which the user at the given entity may specify non-registered users (e.g., via corresponding email addresses) that are to be granted permission to access the collaboration object. The corresponding email address may then be used to transmit the foregoing message.

FIG. 1CC illustrates an example representation of users (Entity 1 Team 1, Entity 1 Team 2) granted hierarchical permissions within a registered entity (Entity 1) sharing a collaboration object (Collaboration Object 1) with a non-registered user. In this representation, another collaboration object (Collaboration Object) may also be shared within separate users/teams/hierarchies at the registered entity (Entity 1) via the disclosed system. The collaboration object (Collaboration Object) shared with teams (Entity 1 Team 1, Entity 1 Team 2) within the registered entity (Entity 1) may be based on, but a modified version of the collaboration object (Collaboration Object 1) shared with the non-registered user.

FIG. 1DD illustrates a representation of users granted hierarchical permissions within a registered entity (Entity 1) sharing multiple different collaboration objects (Collaboration Object 1, Collaboration Object 2) with respective different non-registered users via the disclosed system. In this example, the collaboration objects (Collaboration Object 1, Collaboration Object 2) may also be shared within separate users/teams/hierarchies (Entity 1 Team 1, Entity 1 Team 2) at the registered entity (Entity 1). The collaboration objects shared with teams within the registered entity may be based on, but a modified version of the collaboration object (Collaboration Object 1, Collaboration Object 2) shared with the non-registered users.

FIG. 1 EE illustrates a representation of users granted hierarchical permissions within a registered entity sharing multiple different collaboration objects (Collaboration Object 1, Collaboration Object 2) with different non-registered users via the disclosed system, where one or more non-registered users have access to one or more collaboration objects, and where multiple non-registered users may access the same collaboration object. In this representation, the collaboration objects may also be shared within separate users/teams/hierarchies at the registered entity. The collaboration objects shared with teams within the registered entity may be based on, but a modified version of the collaboration object (Collaboration Object 1, Collaboration Object 2) shared with the non-registered users.

FIG. 1FF illustrates a representation of users granted hierarchical permissions within a registered entity (Entity 1) sharing multiple different collaboration objects (Collaboration Object 1, Collaboration Object 2) with different groups of non-resident users (Group 1, Group 2) via the disclosed system, where individual non-registered users may have access to one or more collaboration objects (Collaboration Object 1, Collaboration Object 2) if they are a member of a group of non-registered users to whom access has been granted via the system. In this representation, the collaboration objects may also be shared within separate users/ teams/hierarchies at the registered entity. Separately the collaboration objects shared with teams within the registered entity (Entity 1) may be modified versions of the collaboration object shared with the non-registered user groups (Group 1, Group 2).

An aspect of the present disclosure relates to sharing data amongst entities and users, such as via product data syndication.

In a system, such as that disclosed herein, where entities create and store large amounts of data (e.g., in the terabytes), it becomes computer resource-intensive (e.g., with respect to processor, memory, and network utilization) and time consuming for such entities to share a large set of data from a given system with other computer systems (which may have their own restrictions on data formatting), where such other systems may either be controlled by the same entity or controlled by one or more separate external entities. For example, collaboration object data, such as product data and order data, created in a multi-entity multi-hierarchy collaboration system, such as that disclosed herein, may be shared with other software applications and/or computer systems such as accounting, inventory management, and/or ecommerce systems controlled by the given entity or its external business partners.

The disclosed techniques for syndicating such data overcome the disclosed technical challenges in sharing large amounts of data. Syndicated data may be an aggregated collection of the same set of data across multiple internal and external systems and platforms. The real-time and/or scheduled transmission (e.g., over a network via a network interface) and sharing of a set of syndicated data (such as product, order and inventory data which may be associated with collaboration objects) among multiple internal and external systems may be referred to herein as product data syndication.

FIG. 1GG Illustrates a representation of an example data syndication architecture within a multi-entity multi-hierarchy system, such as that disclosed herein. The multi-entity multi-hierarchy system may include a syndication platform. The syndication platform may include an external systems authentication module, an object mapping module, and an object data transaction service module. The syndication platform, and one or more of its modules, may access data from and store data (e.g., collaboration object data disclosed herein) to a collaboration object database.

The external systems authentication module may receive and verify external system authentication credentials from external systems (e.g., External System 1, External System 2) and users. For example, authentication may be provided using an access key ID, a secret access key, double factor authentication, a token, and/or otherwise. The object data mapping module may receive data requirements/specifications from external systems (e.g., External System 1, External System 2) and/or from users. The object data transaction service module may receive and/or transmit object data and transaction responses with external systems (e.g., External System 1, External System 2).

An example product data syndication process executed using the syndication platform may perform some or all of the following tasks:

1) Enable users of the multi-entity multi-hierarchy collaboration system to provide authentication credentials to one or more external target systems (e.g., using the external systems authentication module);

2) Gather data requirements or specifications from one or more external target systems (e.g., using the object data mapping module);

3) Map or translate data between collaboration objects in the multi-entity multi-hierarchy collaboration system and external target system(s) by field/attribute names and/or predefined rules and conditions (e.g., using the object data mapping module);

4) Transmit and share collaboration object data across various systems using a transaction engine (sometimes referred to herein as a job scheduler) in real-time and/or on a preset schedule (e.g., using the object data transaction service module); and/or 5) Monitor (e.g., using the object data transaction service module) data transaction status (e.g., success, failure, pending, errors, event logs, etc.) and maintain data accuracy (e.g., detect the transmission or receipt of faulty data, and cause data to be retransmitted if faulty data is detected).

FIG. 1NN illustrates an example multi-layer service architecture that enables a multi-hierarchy multi-enterprise system to transact authentication data via one or more external authentication platforms. For example, an authorization protocol or framework may be utilized that provides applications the ability for secure designated access. By way of illustration the authentication protocol may utilize authorization tokens to prove an identity between a person/user and service providers. The authentication protocol may enable a user to approve a given application interacting with another application without providing a password. Optionally, in the multi-layer service architecture, a multi-hierarchy multi-enterprise system may transact collaboration object data from a database layer with one or more external platforms (e.g., through data attribution mapping).

The user may interact with the syndication platform via a client layer, such as a web application. The syndication platform may include a publish request handler, and an external platform adapter configured using specified categories and configurations. The syndication platform may access syndication data from and store syndication data (and/or other data) to a storage layer that may include a syndication database.

The syndication platform may communication with a product lifecycle management service, which may be hosted on a dedicated server or via a cloud system. The product lifecycle service may communication with a database that stores some or all of the data disclosed herein. The external platform adapter may be configured to communicate with one or more external platforms, such as an authentication platform that provides authentication services using the authentication platform described above, a catalog system, a pricing system, and/or other external platform system.

FIG. 1HH illustrates an example user interface that enables users of the multi-entity multi-hierarchy system to provide authentication credentials for external systems, to thereby establish connections between the multi-entity multi-hierarchy system and one or more external systems. In this example, fields are configured to receive a platform identifier (e.g., selected via a dropdown menu prepopulated with platform identifiers or otherwise), an access key ID, a secret access key, and country (e.g., selected via a dropdown menu prepopulated with county identifiers).

FIG. 1II illustrates an example user interface that enables users of the multi-entity multi-hierarchy system to specify a channel name to be used in publishing a product data syndication, a connection, and object classifications from a specified connected external system (as illustrated in the example depicted in FIG. 1GG). Such object classifications (e.g., corresponding product types) may be retrieved via an application programming interface and used to populate a category menu. The object classifications may differ from one external system to another. A "create channel" control may be activated to initiate the syndicated data channel generation.

A channel (e.g., an accessories channel) may be specified via a channel name menu of channels or an editable field. A menu of external system connections may be provided via which a user may select a desired connection (e.g., of an entity, such as a purchasing retailer named Acme) that will be associated with the channel. The object classifications may determine the set of available data attributes and requirements with which a user of the multi-entity multi-hierarchy system may use to map between the data in the multi-entity multi-hierarchy system and one or more external systems (see, e.g., FIG. 1JJ).

A search field may be provided that enables a user to enter a search query for categories. In response to a user search query (e.g., specified using text and/or images), a search engine returns matching categories which may be displayed via the user interface.

FIG. 1JJ illustrates a depiction of an example object data mapping service provided via a multi-entity multi-hierarchy system, such as that described herein. Users may utilize a set of data attributes and requirements/specifications retrieved from one or more external systems and create mappings by setting rules and/or conditions. The user interface facilitates and enhances data mapping accuracy performed by users.

Fields are provided via which a user can specify a product identifier code (e.g., an ASIN, UPC, EIN and/or other product identifier code), an item number, and a description. Controls are provided via which images and text may be mapped from one entity's schema to another entity's schema. A control may be provided via which a user can specify that the user interface is to be automatically populated with images from a source entity. The user may then map a primary image of a first entity to a primary image of a second entity, a second image of the first entity to a second image of a second entity, a first field of the first entity to a first field of a second entity, etc. Controls may be provided in association with unmapped images and fields of the first entity via which a user may add a mapping of images and fields of a first entity to images and fields of a second entity. The number of mapped fields and/or images may be determined and displayed. A search field may be provided that enables a user to enter a search query for fields of the second entity. In response to a search query (e.g., specified using text and/or images), a search engine returns matching fields and/or images which may be displayed via the user interface.

Users who have permissions to perform such mappings for a given entity may be determined and have their names, images, and/or titles displayed via the user interface.

The system may be configured to predict which fields of the second entity (the target entity) correspond to files of the first entity. The prediction may be performed based on the field labels using pattern matching, dictionary lookups, and/or learning engines. For example, a learning engine may be trained with respect to a corpus of words to identify synonyms for a current word by using nearest neighbors or by based on a defined notion of "similarity". Optionally, a database of synonyms may be utilized to predict a field match. The predicted matching fields may then be used to prepopulate the user interface. The user interface may enable the user to edit the prepopulated matching fields (e.g., in the event the prediction is wrong the user can select a different field of the second entity). In the event no match is found, a corresponding "no match" notification may optionally be provided to the user (e.g., via text, graphic, and/or sound). In the event a match is found, a corresponding "match found" notification may optionally be provided to the user (e.g., via text, graphic, and/or sound).

FIG. 1KK illustrates an example user interface that enables users of a multi-entity multi-hierarchy system to publish/transact data of one or more collaboration objects to one or more external systems, such as via syndication of a channel of product data. The user interface may also be configured to access and display transaction status (e.g., success, failure, errors, non-attempt, event logs, etc.) with one or more external systems. The user interface may also be configured to display an identifier for the target external system or systems that the collaboration object is to be transacted. In addition, the user interface may access and display feedback on the translation of collaboration object data as viewed by the multi-entity multi-hierarchy system and as the data translation will be received by one or more target external systems.

The example user interface may display the corresponding connection (the target external system), the corresponding channel, the status (e.g., published, unpublished), and the match status (e.g., matches, does not match, etc.). The user interface may display required fields (e.g., item number, description, unit price, etc.) of a source entity, corresponding matching target entity fields (e.g., product name, product description, price, etc.), and corresponding field values. The user interface may similarly display media (e.g., still and/or video images, audio recording, etc.) of a source entity and corresponding identifiers, matching identifiers of the target external system, corresponding media, and controls via which media may be selected.

FIG. 1LL illustrates an example user interface that enables users of a multi-entity multi-hierarchy system to publish/transact data of multiple collaboration objects between one or more external systems. A menu may be provided via which the user can select a desired connection and a desired channel. The example user interface accesses and displays, in accordance with the selected connection and channel, the status of transactions (success, failure, errors, non-attempt, event log, etc.) of one or more collaboration objects. The example user interface may also display the target external system or systems with which the collaboration objects are to be transacted. In addition, the user interface may provide feedback on the translation of data from the collaboration objects as viewed in the multi-entity multi-hierarchy system and as it will be received in one or more target external systems.

The user interface may display the corresponding connection, the corresponding channel, and a table of the collaboration objects (e.g., products). The table may have a media column that displays one or more still or video images of the collaboration object, a publishing status column displaying the current publication status (e.g., unpublished, pending, published, etc.), a last published column (e.g., indicating the date and time of the last publication of the collaboration object data), a collaboration object description column, a brand column displaying the brand of the collaboration object, a size column displaying the size of the collaboration object, a color column displaying the color of the collaboration object, and a material column displaying the material of the collaboration object.

The user interface provides a publish control, which when activated, causes the collaboration objects to be published to the user-specified channel for the user-specified connection.

FIG. 1MM illustrates an example user interface (which may be displayed in response to a user selecting a "published" tab) that enables users of a multi-entity multi-hierarchy system to access and view records and statuses of more multiple collaboration objects that have been transacted between the multi-entity multi-hierarchy system and one or more external systems. The user interface accesses and displays the status of transactions (e.g., success, failure, errors, non-attempt, event log, etc.) of multiple collaboration objects.

The user interface may include a pane identifying different entities, and channels associated with the different entities, from which a user can select. Filter controls may be provided via which the user can specify which statuses are to be displayed and which are to be filtered out and not displayed. For example, the user may specify that collaboration objects with the status of published, pending, and/or rejected are to be displayed. Further, a control may be provided via which the user can specify that a specified matching status is to be displayed and a different matching status be filtered out and not displayed. For example, a user may specify that those collaboration objects associated with a matching status of matching and/or non-matching be displayed. In accordance with the filter specifications, the collaboration objects may accordingly be filtered so that only the selected type of collaboration objects (e.g., matching or non-matching) are displayed.

The example user interface includes a table. The table may have a media column that displays one or more still or video images of the collaboration object and an associated publication date, a product number column displaying a corresponding product number, a publishing status column displaying the current publication status (e.g., unpublished, pending, published, etc.), a matching status column displaying the match status (e.g., published, pending, unpublished), a last refreshed column (e.g., indicating the date and time of the data was last refreshed), a collaboration object description column, a brand column displaying the brand of the collaboration object, a size column displaying the size of the collaboration object, a color column displaying the color of the collaboration object, and a material column displaying the material of the collaboration object. A given collaboration object may be selected (e.g., via a checkbox) and a desired operation may be performed on all the selected collaboration objects in a batch mode. A refresh control may be provided which when activated causes the table to be refreshed with the most recent collaboration object data and attributes.

As similarly discussed elsewhere herein, a multi-entity and cross-entity collaboration and messaging platform, such as the communication/collaboration system disclosed herein, may be configured to enable users from one or more entities communicate and collaborate on collaboration objects. Such collaboration may be performed by users within a given entity and/or between users at different entities. Collaboration objects may contain one or more types of data as representations of a given item (e.g., a product, a product component, a business objective, etc.). For example, such data types may include one or more of text based data, numerical data, calculated data, visual media/data, data files, and/or historical data logs/revisions.

Advantageously, the multi-entity and cross-entity collaboration and messaging platform may enable users within and/or between entities to communicate regarding and collaborate on the different forms of data associated to a collaboration object. For example, it is advantageous for users of one entity to collaborate with users from that same entity and/or another entity with regards to the visual media or data contained within a collaboration object.

To further enhance collaboration, the system may be configured to enable collaboration via visual markups of product or product component images (which may comprise a still image, a video, a drawing, and/or other depiction). For example, the system may provide a user interface to a user device for display that enables the user to upload one or more images to the system, such as described elsewhere herein, which may be associated with a definition of the collaboration object. The system then enables the user and one or more other users at one or more entities to provide visual markups and text comments related to the image(s) of that product.

Figure 8A:
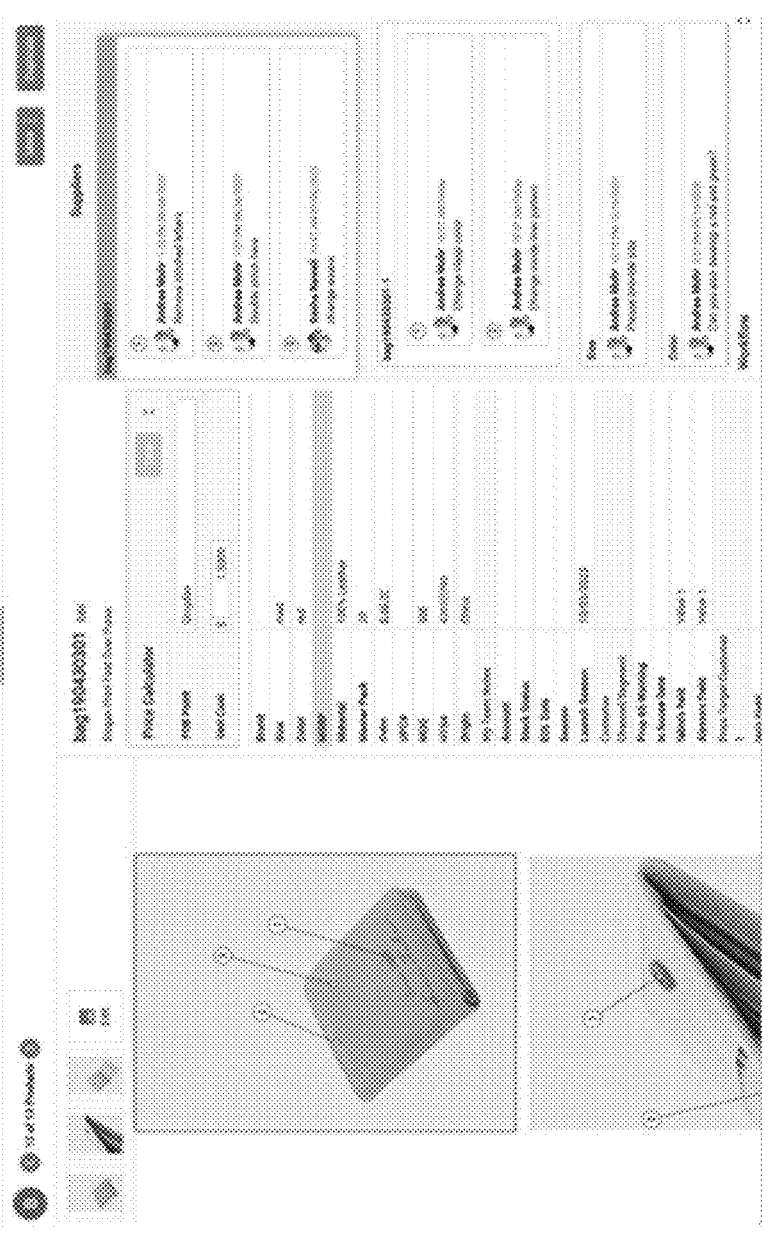
FIGS. 8A-8C illustrate example user interfaces configured to enable visual media collaboration via visual markups with respect to a collaboration object.

FIG. 8A illustrates an example user interface displaying multiple pointers/markups on multiple different items of visual media/data (e.g., photographs) of collaboration objects. The user interface enables users to associate one or more comments with a given pointer/markup on a given item of visual media/data. The example user interface also displays indicators identifying which, if any pointer/markup and comment combinations are accessible to users of a single entity or accessible to users of multiple entities. In this example user interface, two collaborating users, Andrea Mohr and Sasha Newell, are representatives of different organizations/entities.

As illustrated, one or more images of a given collaboration object (e.g., a product, such as a purse in this example) may be rendered. For example, multiple images of a given product may be displayed, showing different views of the product (e.g., top view, bottom view, side view), at different apparent distances or magnifications. Optionally, a scroll control may be provided via which the user can cause the images of a given collaboration object or of different collaboration objects to be scrolled through and displayed. Previously added markers may be displayed on the scrolled through images.

An annotation tool may be provided via which a user can point to an area of the depicted product on one or more images, drop a marker (e.g., a pointer or other indicator), and then pull a portion of the marker via a pointing device (e.g., a mouse, a finger, a touchpad, etc.) to define a lead line with a sequential annotation identifier (e.g., a number, such as 1, 2, 3) automatically generated and presented. The user may then enter text which may be displayed in a comments section in association with the corresponding annotation identifier, and optionally a product identifier. The comments may be displayed over the image and/or in a separate area (e.g., a separate pane). The user-specified markers, comments, and associated metadata (e.g., user identifiers, times/dates of comments, times/dates of markups, collaboration identifier, and/or other such data described herein) may be stored in memory in association with the marked up images for later retrieval. For example, such information may be utilized to populate user interfaces described herein.

The annotations may optionally be stored in a structured format (e.g., as JSON or XML files), that includes coordinates of shapes, labels, and other metadata. This structured format enables annotations to be linked to their corresponding images and enables efficient data retrieval and processing. In addition, the structured format enables easy parsing, manipulation, and integration with the disclosed tools and systems.

The comments may comprise comments from users at one or more entities. Optionally, a user of a first entity, can specify whether a given comment is to be only visible to other users of the first entity or is to be visible to users of other entities. Optionally, a user may specify which other users within one or more entities may view the user's comments and/or annotations.

The comments may be visually arranged by source (e.g., supplier, purchaser, etc.) and/or product feature/field (e.g., size, color, etc.). Each image may be associated with a respective grouping of comments. For example, the comments for each image may optionally be displayed in a respective box/pane. Optionally, in response to a user selecting a given product image (e.g., by pointing at or clicking on the image), the corresponding box or comment grouping may be highlighted by the user interface. Similarly, in response to a user selecting a given box or comment grouping (e.g., by pointing at or clicking on thereon), the corresponding product image and/or the corresponding box or comment grouping may be highlighted. A given comment may be displayed in association with the name of the user that provided the comment and the date/time the comment was posted.

For example, an HTML structure may be created where a given text segment is associated with a specific image. Data attributes may be utilized to link text segments to images. For example, text segments may be wrapped in <span> elements with the class highlightable and a data-image attribute that links a given segment to a corresponding image. Images are given unique id attributes that match the values of the data-image attributes. A CSS file (Cascading Style Sheet) may be created to style the images and the bounding box. For example, the images may be styled to have a transparent border by default. When the highlighted class is added to an image, the border color changes to a specified color, and a box-shadow may be added to create a bounding box effect to thereby emphasize the associated image. JavaScript may be utilized to handle the text selection and image highlighting. For example, an event listener may be added to respective highlightable elements to detect when the user selects text. When text is selected, the corresponding image's id is retrieved from the data-image attribute. The highlight_image function removes the highlighted class from all images and adds it to the selected image, highlighting it with a bounding box.

Figure 8B:
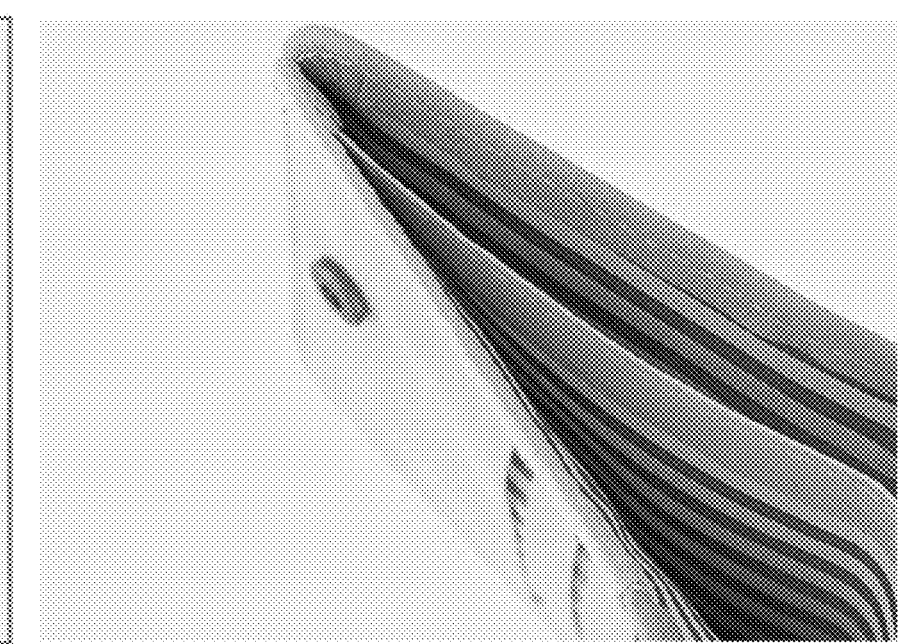
Figure 8C:
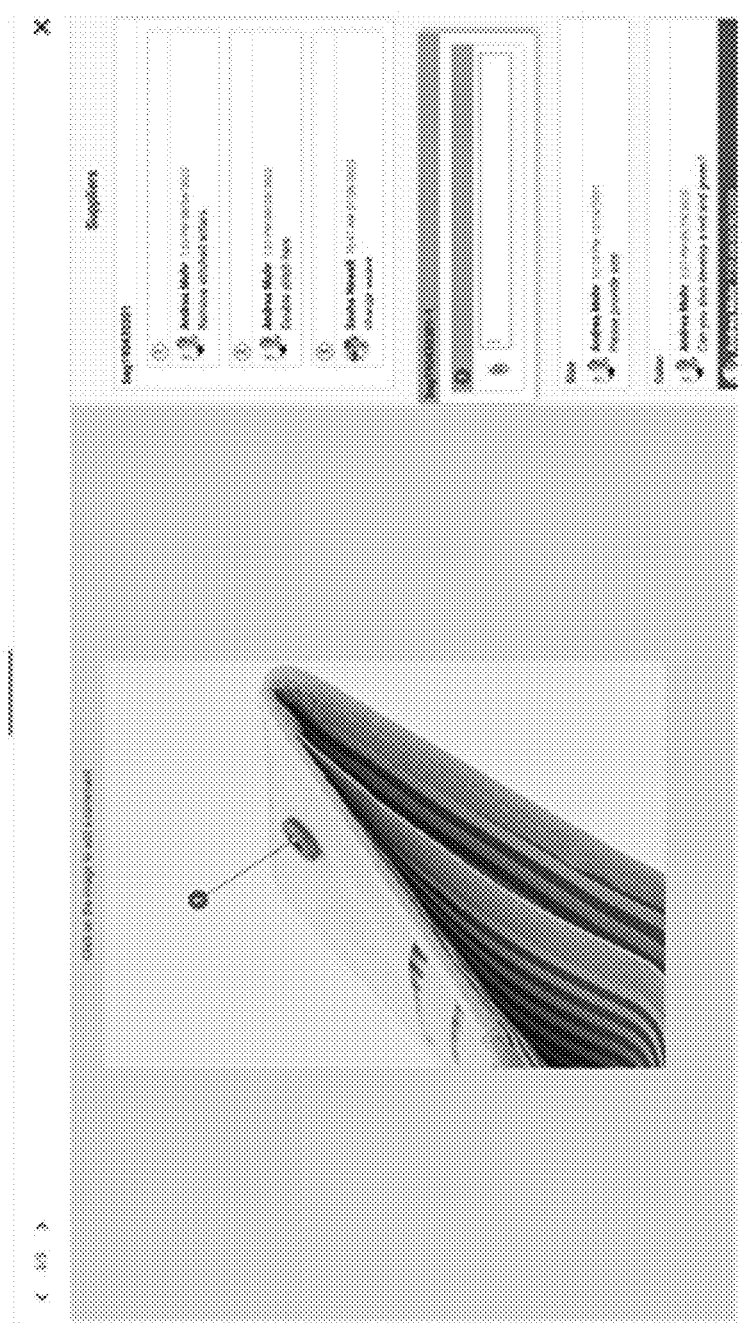

FIG. 8B illustrates a user interface with a comment control which when activated enables a user to select one or more items of visual media/data for a collaboration object and provide pointers/markups and comments regarding the same. For example, in response to the user activating the comment control, the user interface illustrated in FIG. 8C may be rendered. A comment field is presented via which the user can enter a text comment which is associated with a corresponding marker. The comment field is presented in association with a corresponding collaboration object identifier (e.g., a unique product identifier).

As discussed elsewhere herein. within the context of a multi-entity and cross-entity collaboration and messaging platform, users from one or more entities may communicate and collaborate regarding collaboration objects. It would be technically advantageous for users to have the ability to quickly extract data from the system regarding one or more collaboration objects. A technical challenge to such data extraction is that, users within an entity or in different entities have many differing needs in terms of utilizing data about collaboration objects. Hence, a single type of extraction may not be suitable for a mix of users from the same or different entities. In order to overcome this technical challenge, the disclosed system enables users to create custom selections in regard to the file format to be used for the extracted data, specify sets or subsets of data collaboration object data to be included in the file, and/or specify how the chosen data is arranged within the chosen file format. Such custom selections and specified arrangement may then be used to extract the data into a corresponding file.

Figure 9A:
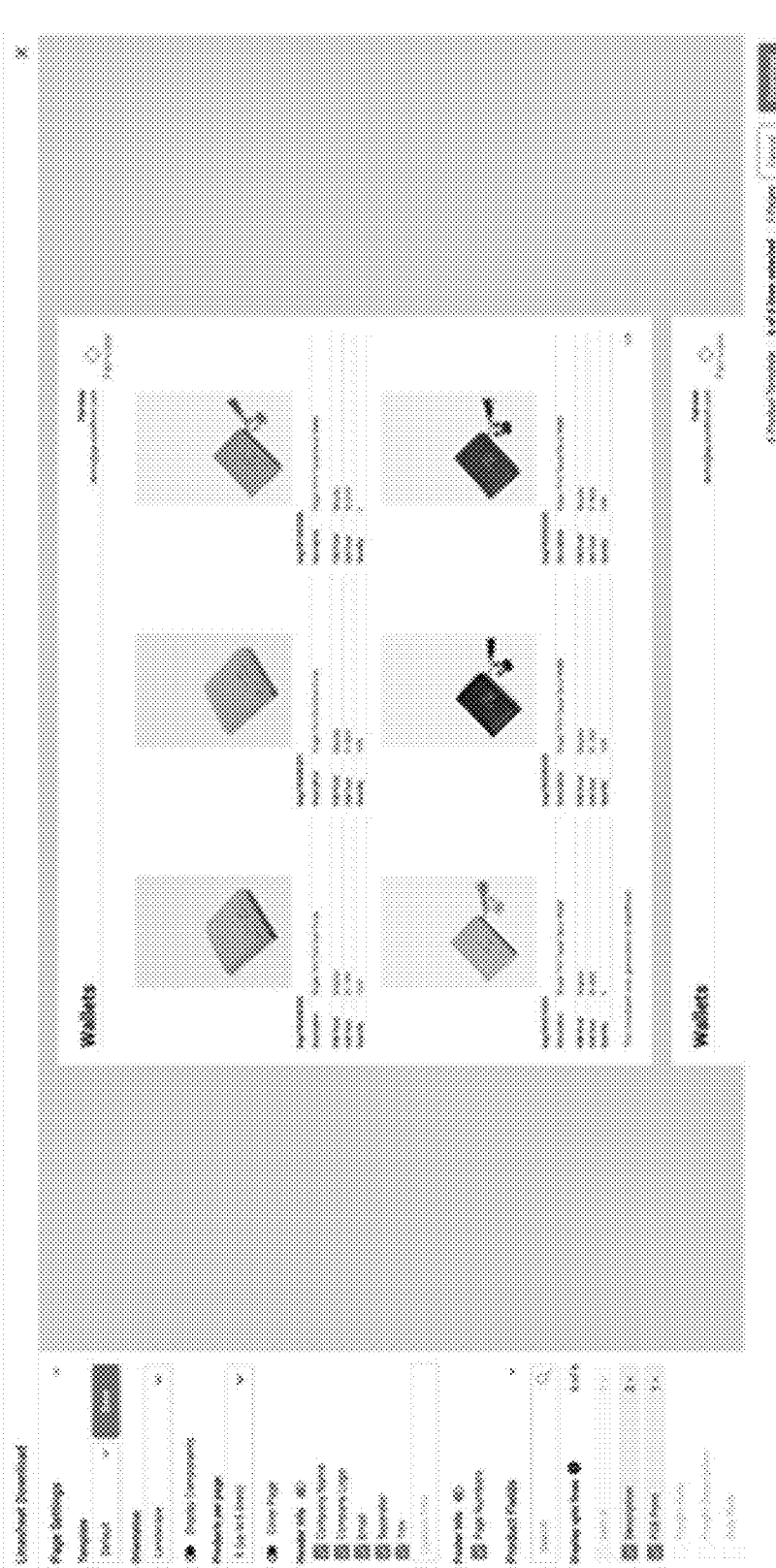
FIGS. 9A-9H illustrate user interfaces with customization options.

FIG. 9A illustrates an example user interface comprising a panel of customization options, wherein the webpage is automatically re-rendered, optionally in real time based on a user's selected customization instructions.

The user interface enables the user to specify various webpage customizations which are then used to render the user interface accordingly. The user interface enables a template to be selected from a drop down menu of templates, modified, and saved. An orientation control enables the user to specify whether the user interface is to be displayed in landscape of portrait mode. A products per page menu is provided via which the user can specify how many collaboration objects (e.g., images of collaboration objects and corresponding lines/fields of detail information) are to be displayed per page. A menu of header detail items is displayed via which the user can specify what header information is to be displayed on the user interface. For example, the header detail menu may enable the user to specify that the company name, company log, company email, a separator, a title (e.g., a custom title) are to be displayed.

A footer information interface is provided via which a user may specify what information is to be included in a webpage footer (e.g., page numbers). A products fields search field is provided via which the user can search for available product fields (e.g., product details) that are available for display, and then specify from the search results which product fields are to be displayed in association with a corresponding collaboration object image. The webpage code and/or the system may determine the maximum number of product fields that may be displayed for a given collaboration object based on the selected template, selected number of products (collaboration objects) per page, the page orientation, and the number and/or types of information specified to be included in the header and/or footer, and/or other criteria.

Figure 9B:
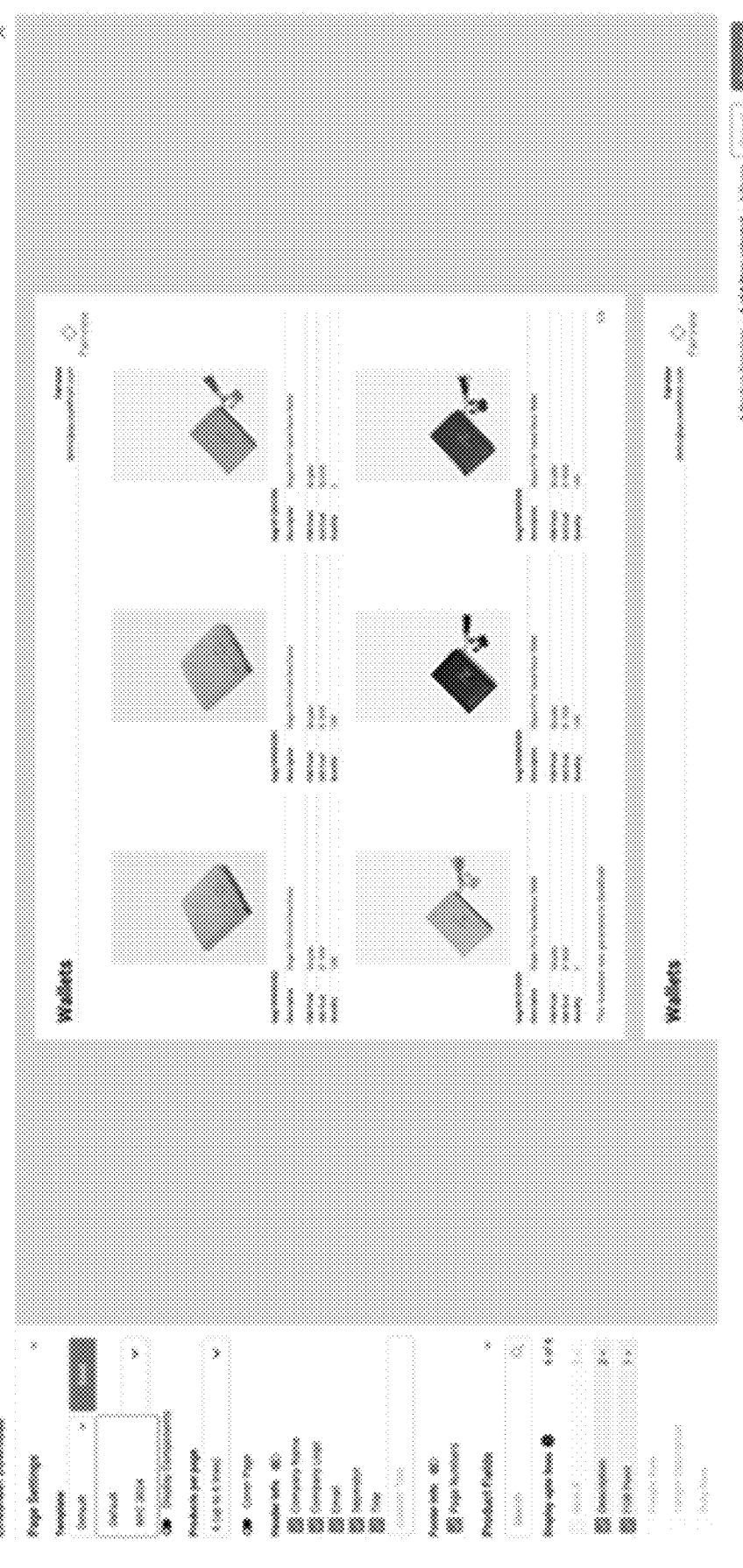

FIG. 9B illustrates the user interface of FIG. 9A, with the save template control activated. The user interface enables the user to specify a template name and to save the template with the specified name in accordance with the user specified customization specifications (e.g., such as those discussed above with respect to FIG. 9A). A user may then select and utilize the template for use with the same or a different collaboration object.

Figure 9C:
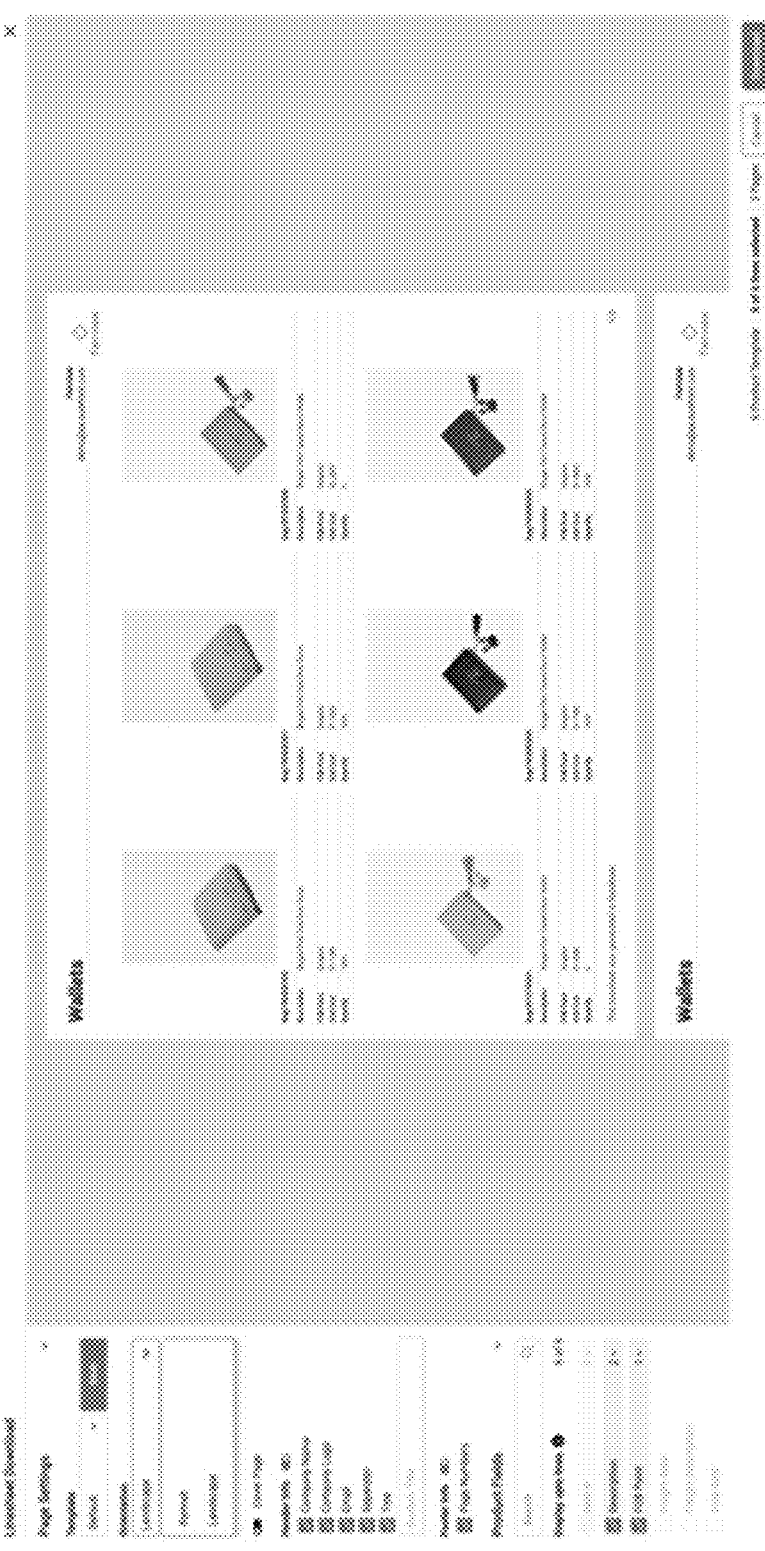

FIG. 9C illustrates the user interface of FIG. 9A, with the orientation control activated. The orientation control enables the user to specify whether the page layout is to be in the landscape mode or the portrait mode. The page may be re-rendered in real time in accordance with the configured page layout orientation.

Figure 9D:
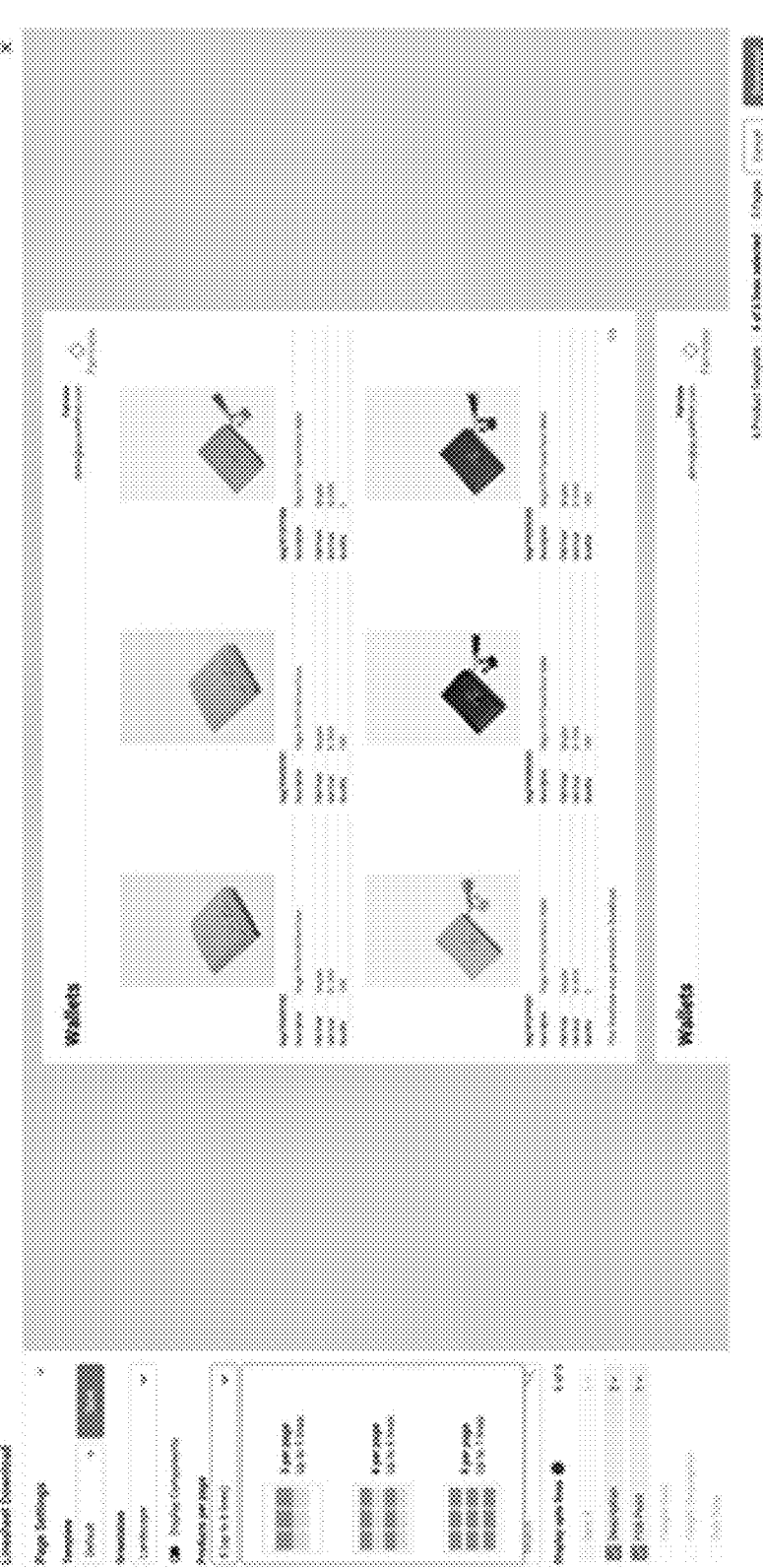

FIG. 9D illustrates the user interface of FIG. 9A, with the products per page control activated. The products per page interface presents customization options that enables the user to specify and customize the layout, sizing, and number of items of visual media and data attributes with respect to each collaboration object in a given file. For example, the user may specify that there are to be three images of respective collaboration objects per page with up to nine lines of detail fields per collaboration object, six images of respective collaboration objects per page with up to six lines of detail fields per collaboration object, nine images of respective collaboration objects per page with up to one line of detail fields per collaboration object. The system may automatically calculate the maximum number of lines of detail fields for which there is sufficient room based on the number of collaboration images per page specified by the user and display the calculated number to the user.

Figure 9E:
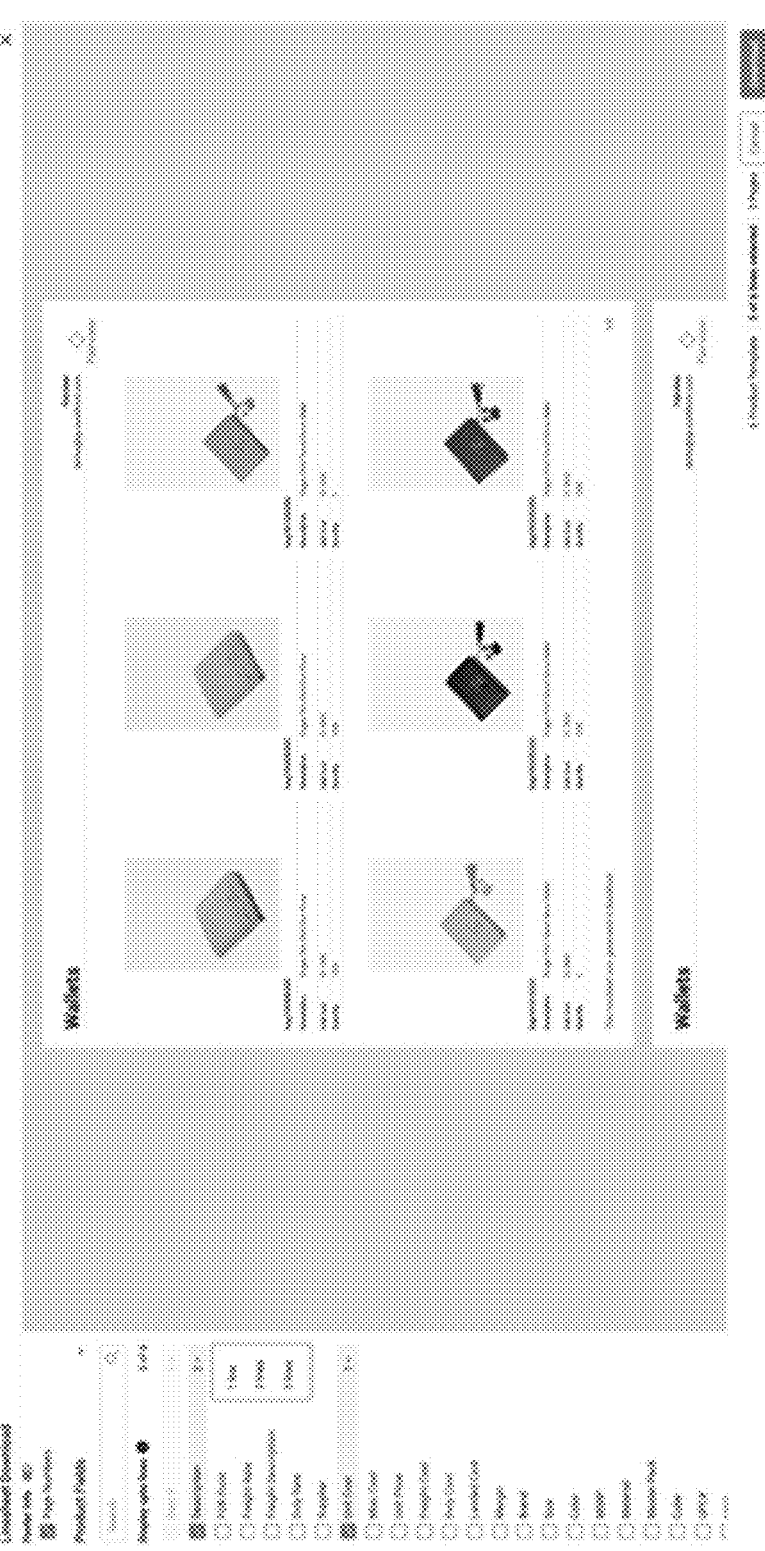

FIG. 9E illustrates the user interface of FIG. 9D, with the "up to number of lines" control activated. The "up to number of lines" interface displays the maximum number of lines available for each field based on the number of fields the user has specified that are to be displayed in association with a collaboration object image and on the number of collaboration object images that are to be displayed per page. Thus, a user can configure the amount of space allocated/budgeted to selected data attributes.

For example, if the user specified that six collaboration objects are to be displayed per page, there may be up to six lines of detail fields available per collaboration object. If the user first selected a description field to be displayed, a drop down menu may be displayed via which the user may specify how many lines of the six line budget are to be allocated to the description. If the user specifies that two lines are to be assigned to the description, the system may calculate that there are four lines remaining (six minus two) that may be allocated to other detail fields. The user may continue specifying detail fields that are to be displayed and the associated lines for each field, until the entire six line budget is utilized. If the user attempts to continue selecting fields, a notification may be presented informing the user that the user may not select additional fields unless the user unselects one or more fields or reduces the lines of fields allocated to previously selected fields in order to free up previously budgeted lines.

Figure 9F:
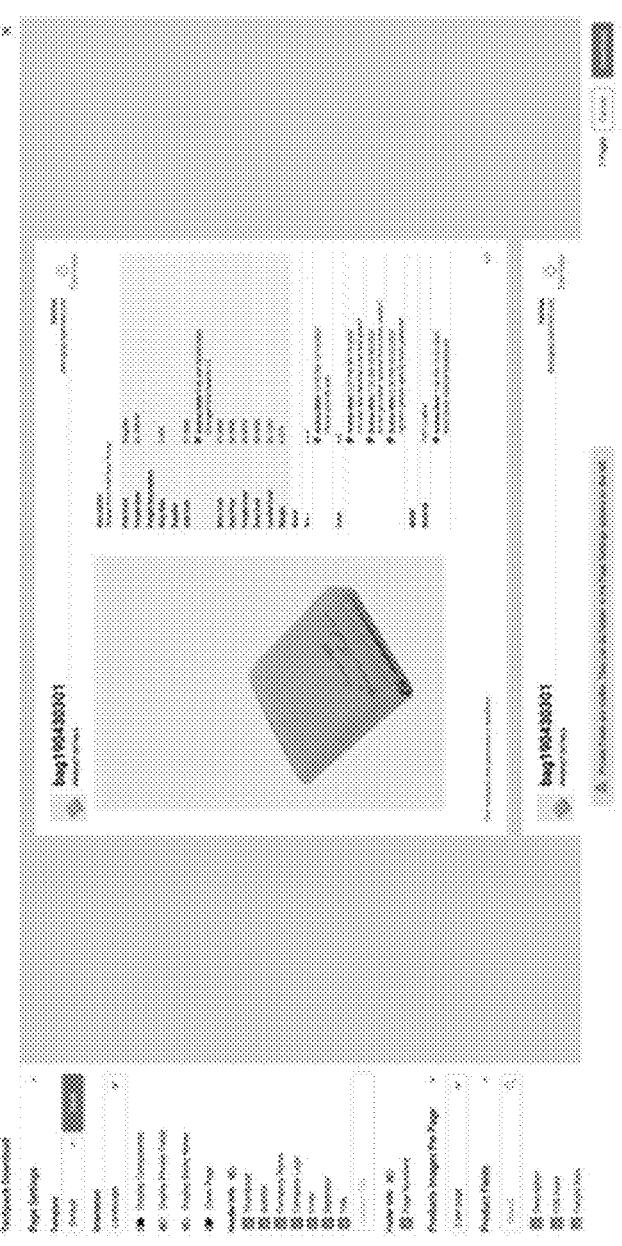

FIG. 9F illustrates the user interface of FIG. 9A, wherein a user can optionally select attribute level comments and collaboration data from one or more collaboration objects to be exported to an export file. The user interface also includes controls via which the user can specify whether components, private fields, and/or notes are to be displayed. The user interface may be rendered in real time in accordance with the user specification.

Figure 9G:
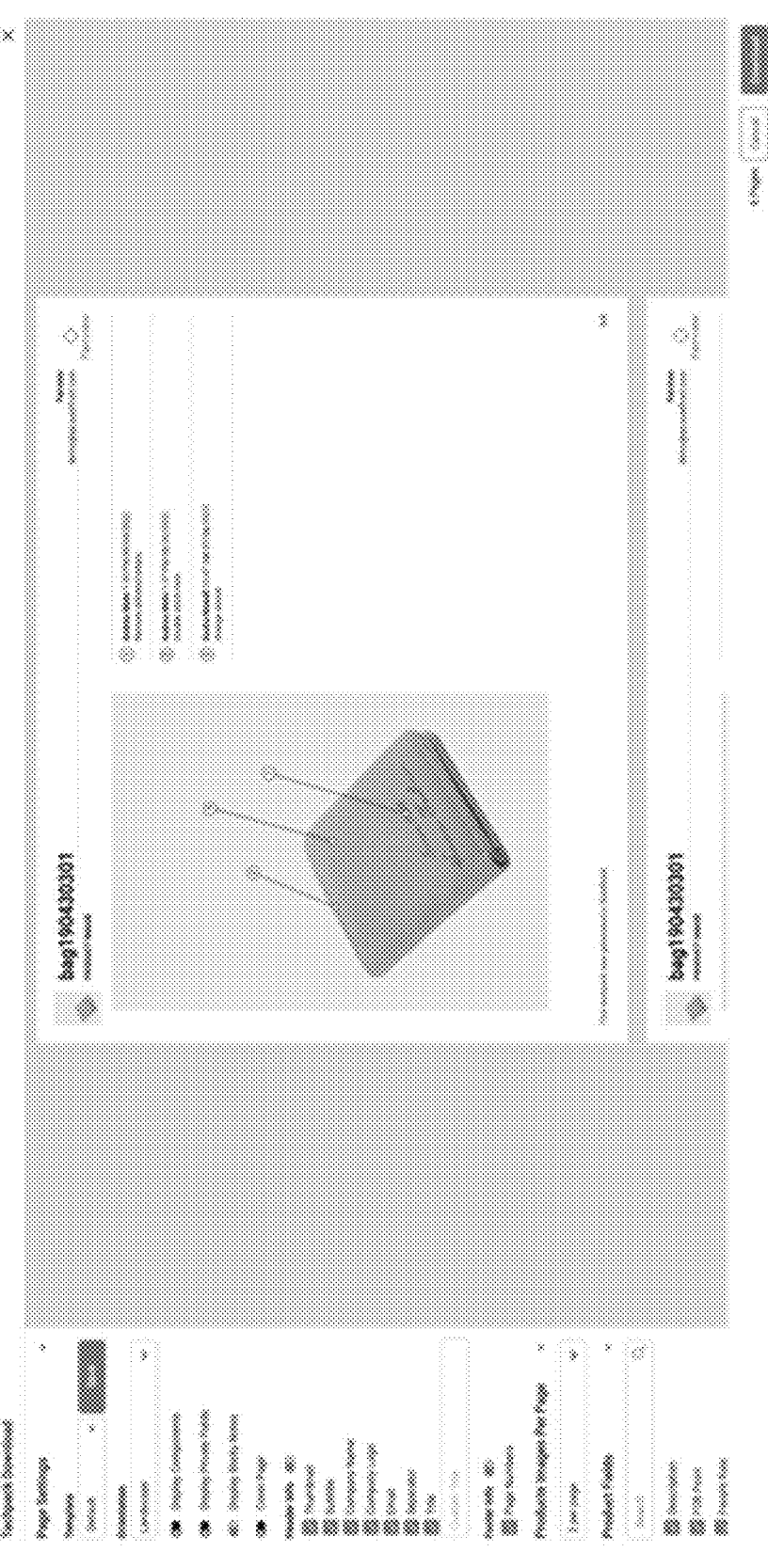

FIG. 9G illustrates the user interface of FIG. 9A, wherein a user can optionally select visual media pointers/markups and associated comments and collaboration data from one or more collaboration objects to be included in an export file.

Figure 9H:
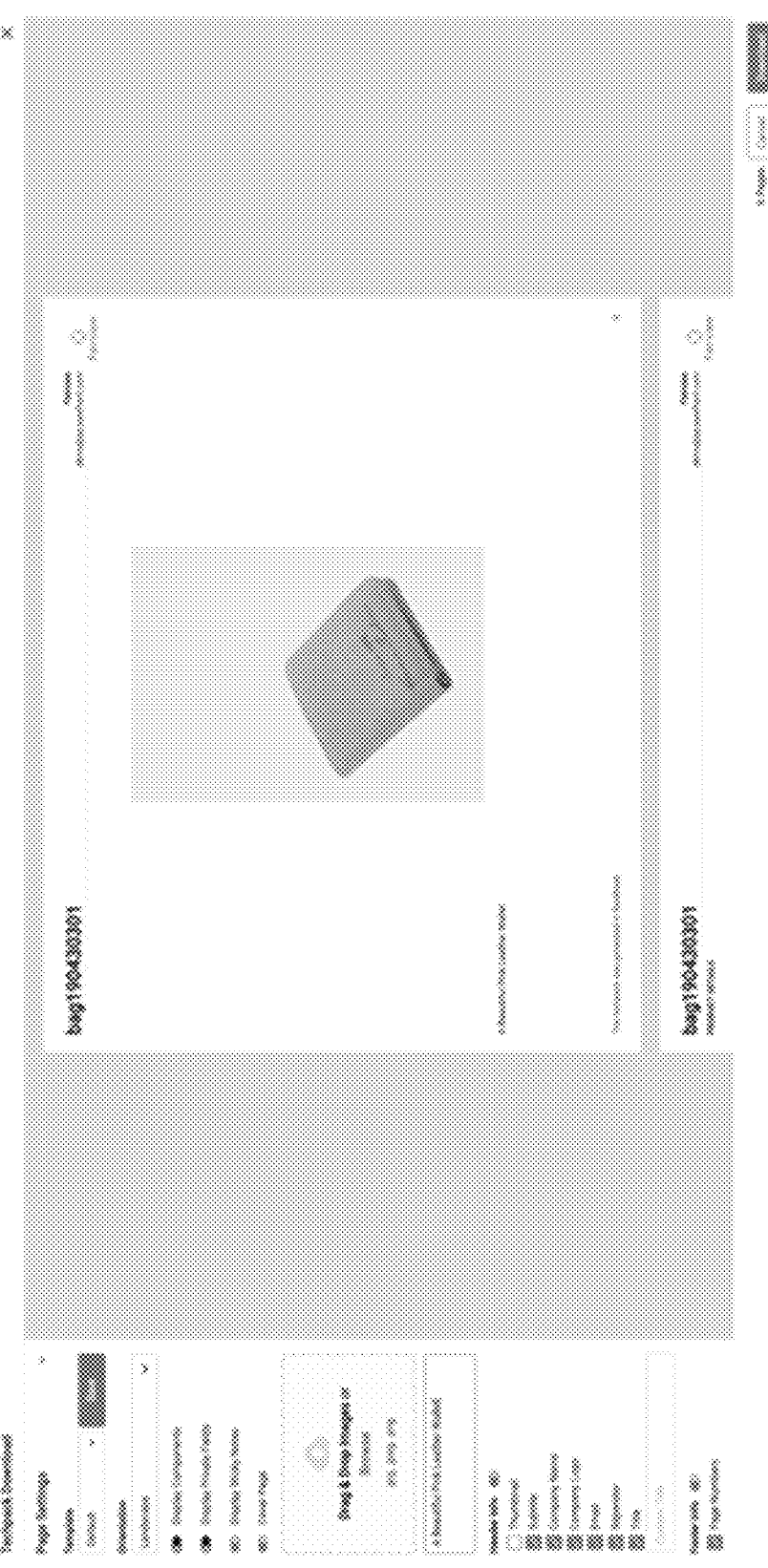

FIG. 9H illustrates the user interface of FIG. 9A, wherein a user can optionally create customizable pages within a file of a selected collaboration object by providing additional visual media and data attribute(s). In this example, a drag and drop interface is provided, wherein a user can drag and drop an image to a defined area, and the file may then be uploaded to the system and stored in association with the collaboration object. Optionally, a user may be enabled to navigate to a file and select the image file for upload. A text field is provided via which a user may enter text (e.g., descriptive text) that may be stored in association with the image. The additional image(s) and text may be later presented via a display device in association with the collaboration object.

Figure 10A:
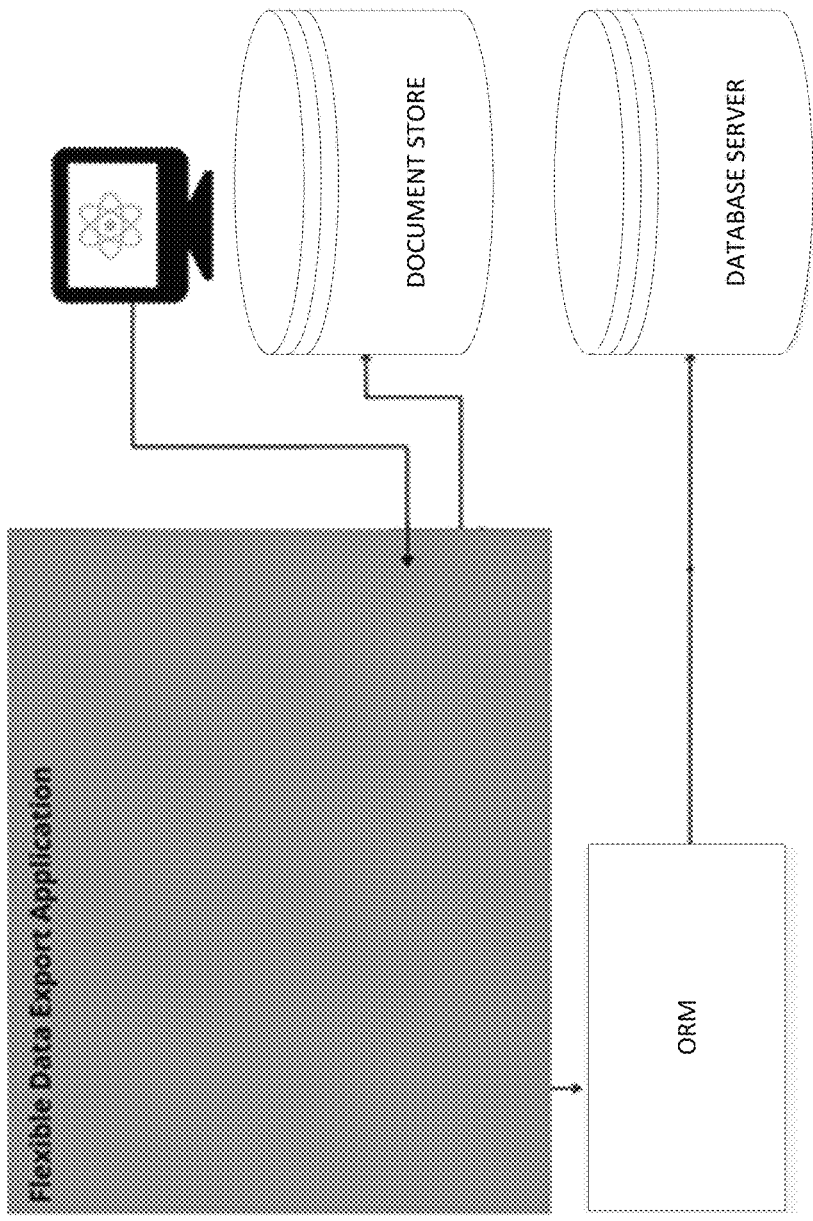

FIG. 10A illustrates an example data architecture configured to provide a front end interface to user devices, enabling users to interact with data from one or more databases (such as collaboration objects related data disclosed herein), such as a relational database, to retrieve information (such as the collaboration object images and related data) and to present on the user device user interfaces providing such data. For example, the example data architecture may be utilized to provide functionality and user interfaces described herein.

The architecture may include a flexible data export application, an Object-Relational Mapper (ORM), a document store, a database server, and a user terminal. The ORM comprises a programming tool that enables developers to interact with a relational database using an object-oriented paradigm. Instead of writing SQL queries directly, developers can manipulate database data using the programming language's objects and methods. The ORM maps database tables to classes, rows to instances of these classes, and columns to attributes of these instances. This abstraction simplifies database operations and reduces the need for extensive SQL code. The database server may comprise a relational database management system (RDBMS) configured to handle a wide range of workloads with many concurrent users. The database server may support SQL (relational) and JSON (non-relational) querying. For example, the database may store data disclosed herein. The document store may comprise a scalable, web-based cloud storage service providing online backup and archiving of data. The document store is configured to store and manage unstructured data such as PDFs, images, videos, and other document types (e.g., collaboration object still images, video images, catalog pages, and/or the like).

Figure 10B:
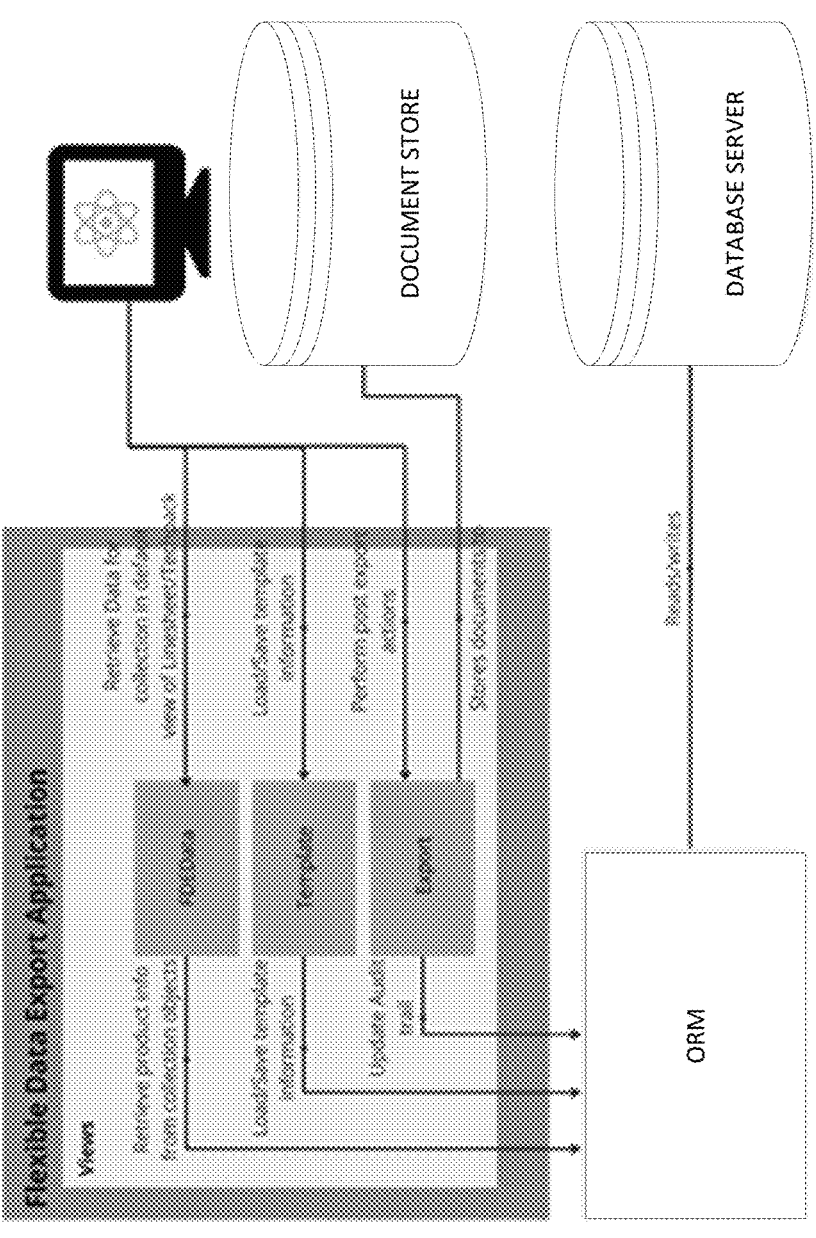

FIG. 10B illustrates the example data architecture of FIG. 10A, and depicts additional detail regarding the flexible data export application. The flexible data export application may comprise sub-applications configured to retrieve and render data disclosed herein, creating, save, and retrieve templates of data representations, such as those disclosed herein, and exporting the data representations into one or more file types and storing the exported files in the cloud-based document store.

Figure 10C:
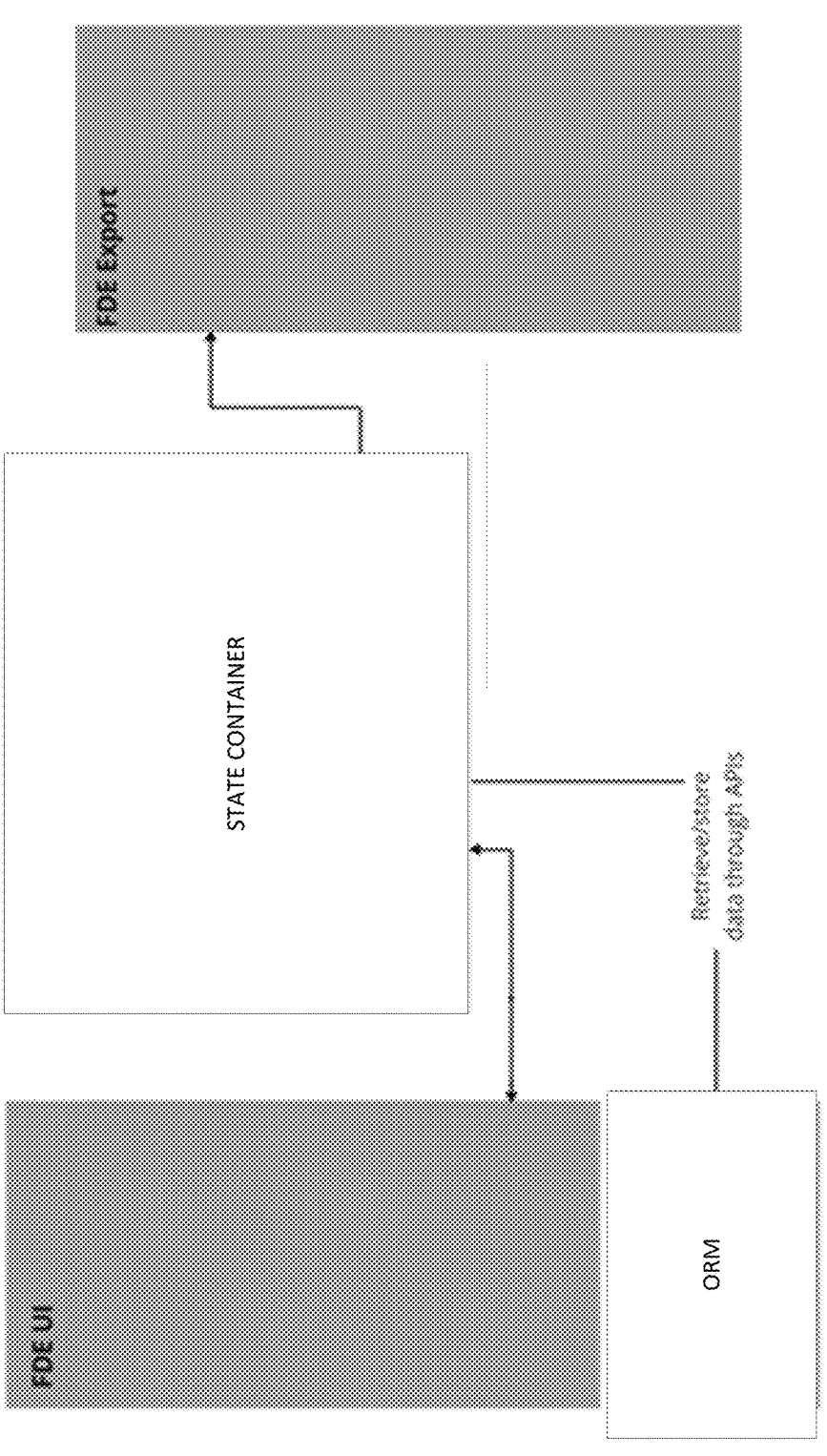

FIG. 10C illustrates an example front-end user interface architecture for a customizable export service configured to export data and documents disclosed herein. The example front-end user interface architecture is configured to retrieve data, render "What you see is what you get" (WYSIWYG) interfaces, such as those disclosed herein, via which users may customize data formats, and export the resulting format into one or more files or documents.

The example front-end user interface architecture may comprise a predictable state container for JavaScript applications, which may be utilized with libraries for managing the application state. The state container may provide a single source of truth for the application's state, ensuring that state changes in a consistent and predictable manner. The state container may utilize actions (e.g., JavaScript objects) to describe changes, reducers to handle such changes and update the state, and a store to hold the state tree. The reducer comprises a function that takes the current state and an action as arguments and returns a new state. The reducer may specify how the application's state changes in response to actions sent to the store. The reducer may reduce a collection of actions (over time) into a single state object. This architecture ensures a predictable flow of data throughout the application. Data may be retrieved and stored via an API.

Figure 10D:
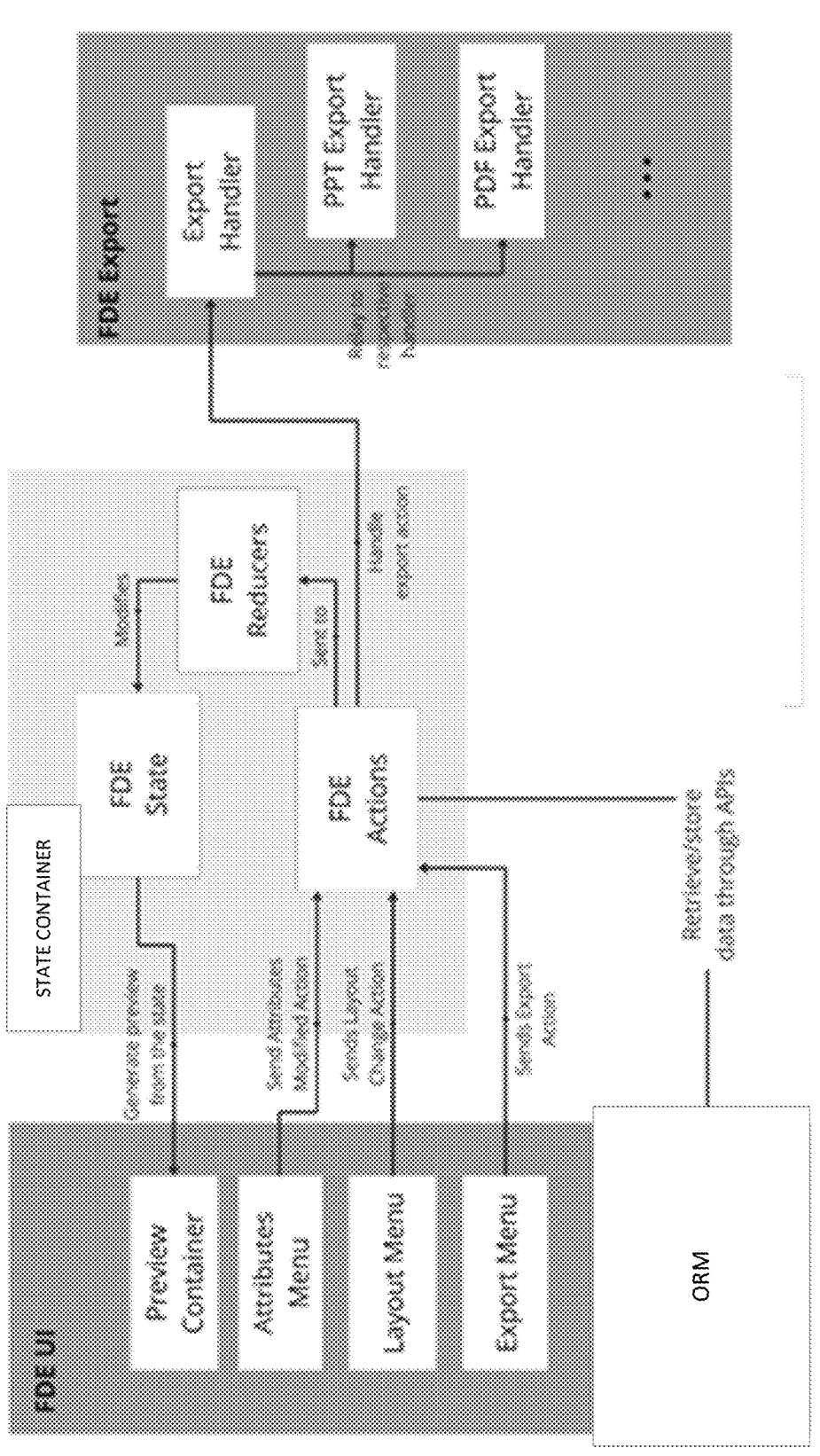

FIG. 10D illustrates the example front-end user interface architecture of FIG. 10C in greater detail. The architecture comprises a front end web application to retrieve data, render a "What you see is what you get" (WYSIWYG) interface where users may customize data formats, and export the resulting format into one or more files or documents. The illustrated sub-applications for the front end user interface are configured to provide specific services such as generating file previews, creating menus with which users may view customization options and provide customization instructions, and export documents or files of one or more type. As similarly discussed elsewhere herein, within the context of a multi-entity and cross-entity collaboration and messaging platform, users from one or more entities may communicate and collaborate regarding collaboration objects (e.g., materials or manufactured products). The disclosed system advantageously enables a user to create relationships or associations between one or more collaboration objects and/or between specific data fields/attributes of one or more collaboration objects. This functionality enables users to create libraries of collaboration objects that may be reused and tracked.

By way of example, a collaboration object may represent a physical product such as a wheel, or a type of wood, or a fabric. When defining the details of a given collaboration object, such as a chair, it is useful in many cases to create an association between one or more collaboration objects, such as a wheel, a material such as wood, and a fabric. Furthermore it may also be useful to assign data attributes to the nature of the specific relationship between one or more collaboration objects, in one example ratio. For example, a collaboration object representing a chair may have a relationship with a collaboration object representing a wheel (e.g., for a chair with wheels at the base of the legs) where the ratio value assigned to such a relationship is one chair to four wheels (where there is a wheel for each chair leg of a four legged chair). Thus, disclosed herein are user interfaces the enable a user to define a hierarchy of collaboration objects. For example, a user interface may enable a user to graphically define a hierarchy of collaboration objects in the form of a tree (e.g., in the form of drag and drop operations) or to textually define a hierarchy of collaboration objects.

Figure 11A:
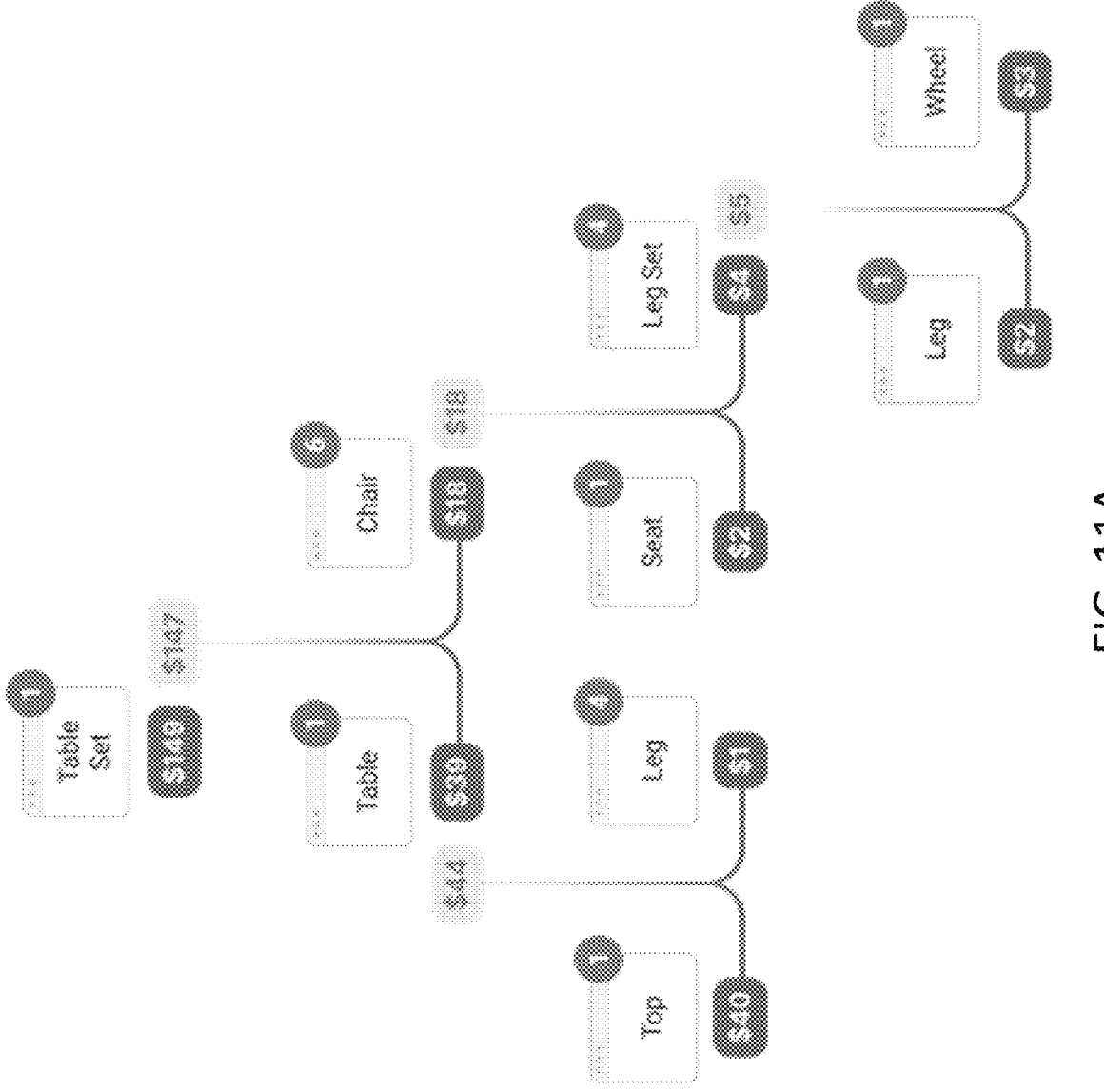

FIG. 11A illustrates a hierarchical diagram, in the form of a tree structure, representing relationships between collaboration objects. In this example, the collaboration objects have been assigned specific relationships with respect to other collaboration objects to thereby create a useful set of associated details and data to describe still additional collaboration objects. The table set hierarchical diagram and/or a text representation thereof may be stored in memory (e.g., in a database) in association with metadata, such as a collaboration object identifier for the table set. The collaboration object identifier and/or a text description stored in association with the collaboration object (e.g., "table set") may be utilized in a database query to later retrieve the table collaboration object. Optionally, each collaboration object in the table set hierarchical diagram may be stored in association with corresponding identifiers. Optionally, each collaboration object in the table set hierarchical diagram may be separately retrieved from the database via a database query using the corresponding identifier and/or text description. Optionally, each collaboration object may be separately added to another collaboration, as described herein with respect to FIG. 11B.

In the example illustrated in FIG. 11A, a table set has been assigned a specific relationship with one table and six chairs in a hierarchical manner to thereby associate useful data about the table collaboration object and chair collaboration objects to the table set. The table and chair collaboration objects are themselves assigned additional relationships with other collaboration objects. As depicted in FIG. 11A, relationships between collaboration objects may be direct in nature or may exist via a mutual relationship with a different collaboration object. A quantity may be associated with a given collaboration object (e.g., a number depicted in a circle). For example, there may be one table set that comprises 1 table and 6 chairs. The table may comprise 1 top and 4 legs. A chair may in turn comprise 4 legs, and each leg may be associated with 1 wheel.

FIG. 11A further illustrates how one or more data attributes of associated collaboration objects, in this case, cost in dollars, may traverse the hierarchical relationship of collaboration objects, optionally with respect to relationship ratios, to produce useful calculations or associations of data (e.g., where the data attributes may be summed or processed using a mathematical function). The hierarchical diagram may also provide the corresponding aggregated hierarchical costs using a different color, icon, or other costs. In this example, a leg has an associated cost of $2 and a wheel has an associated costs of $3, and so a leg set (comprising one leg and one wheel) has a cost of $5, as illustrated. In this case, the diagram is showing a calculated cost for the table set of $147 as derived from the costs and ratios of the 1st, 2nd, and 3rd order associated collaboration objects.

Figure 11B:
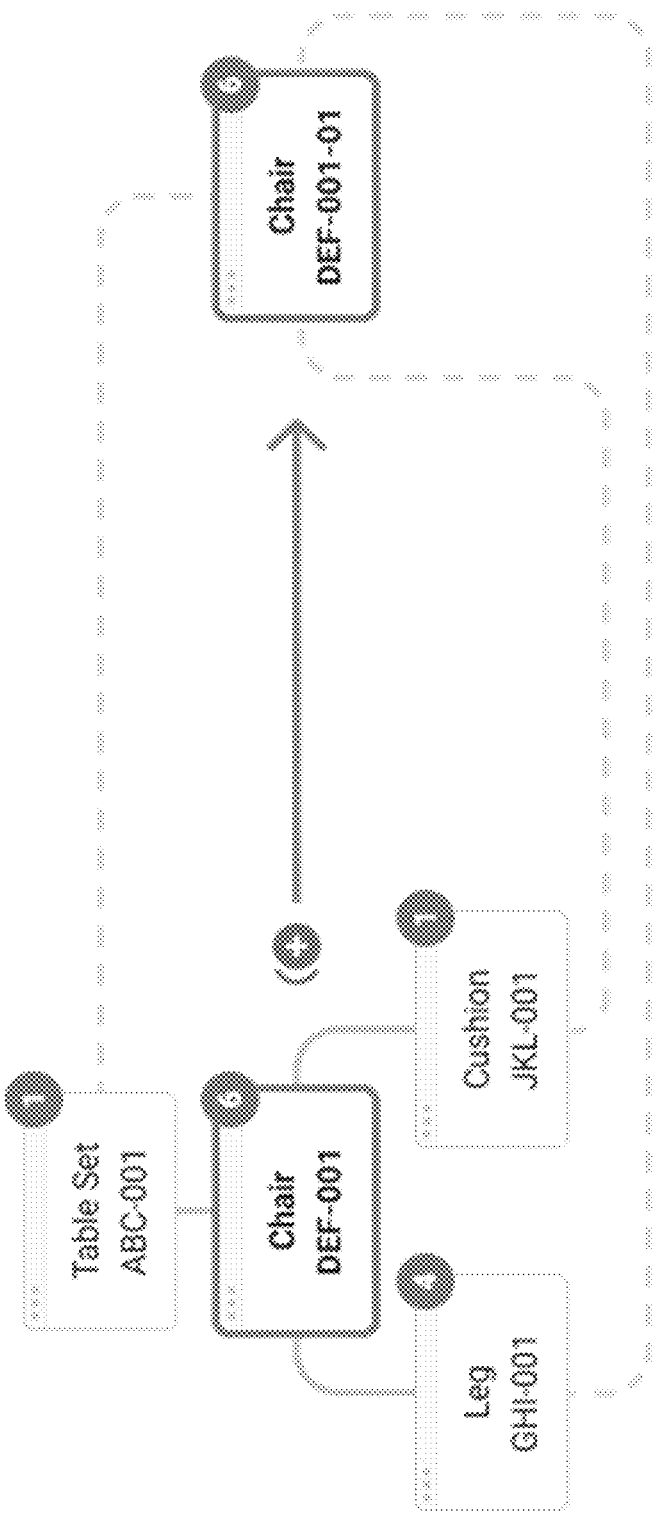

FIG. 11B illustrates an example diagram depicting relationships between collaboration objects, wherein a given collaboration object may be included as part of another collaboration. Thus, collaboration objects stored in a database may form a reuseable library of collaboration objects. In this example, a chair collaboration object (having a product identifier of DEF-001 and comprising of leg and cushion collaboration objects) has been defined as part of a table set hierarchy (having a product identifier of ABC-001). The chair collaboration object (DEF-001) is accessed from memory from a library of collaboration objects and is reused as part of another collaboration object. The reused collaboration object may be assigned another identifier (DEF-001-01 in this example) and may optionally be modified by a user and stored as another collaboration object in the collaboration object library. The reused chair collaboration object may include links to other collaboration objects at lower hierarchical level (leg GHI-001 and cushion JKL-001 in this example). The data associated with the reused collaboration may include the corresponding metadata, such as the number of other collaboration objects included, and their respective costs. Thus, when a given collaboration object is reused, its associated information may be utilized in generating aggregated information, such as aggregated costs and aggregated component counts.

Figure 12A:
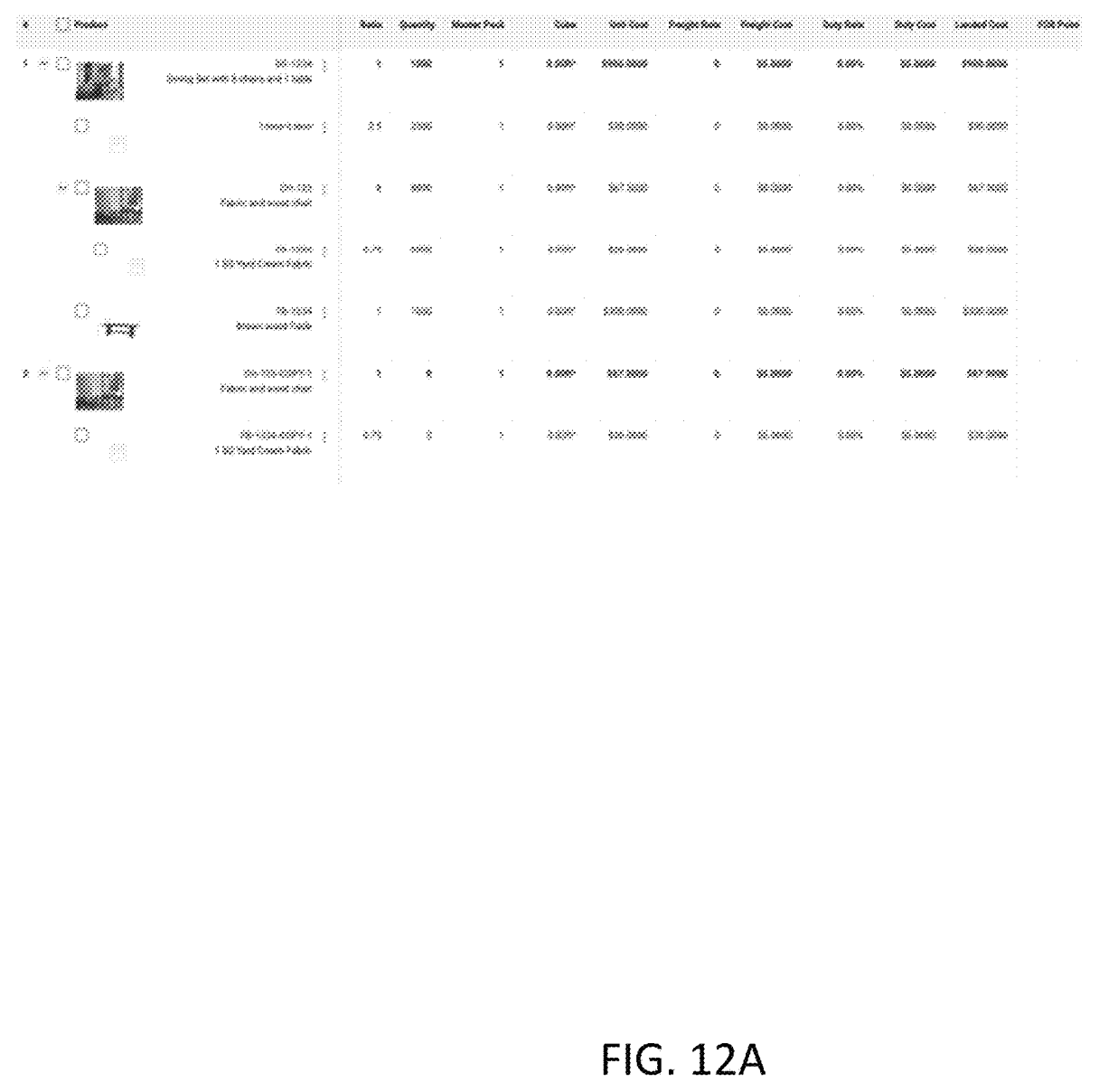

FIG. 12A illustrates an example user interface providing information indicating relationships between collaboration objects and indicating specific data attribute associations. In particular, the illustrated user interface indicates the relationship between a plurality of collaboration objects and indicates how a specified field (e.g., Unit Cost) traverses a multi-level relationship between collaboration objects and respective ratios and be used to calculate or describe the Unit Cost of other collaboration objects.

The user interface comprises a product column that includes an image, a text description, and a product identifier for respective collaboration objects. The hierarchical relationship may be indicated via indents of respective images, text description, product identifier, and the amount of labor needed to assemble and/or package the physical instantiation of the collaboration object. For example the dining set collaboration object, which is at the highest level of the hierarchy, may be positioned to the left, and the lower level collaboration objects may be displayed in an indented manner corresponding to how low they are in the hierarchy. The user interface may include columns for respective ratios, quantities, master pack, cube size, unit cost, freight cost, duty rate, duty cost, landed cost, and Freight on Board (FOB) point.

Figure 12B:
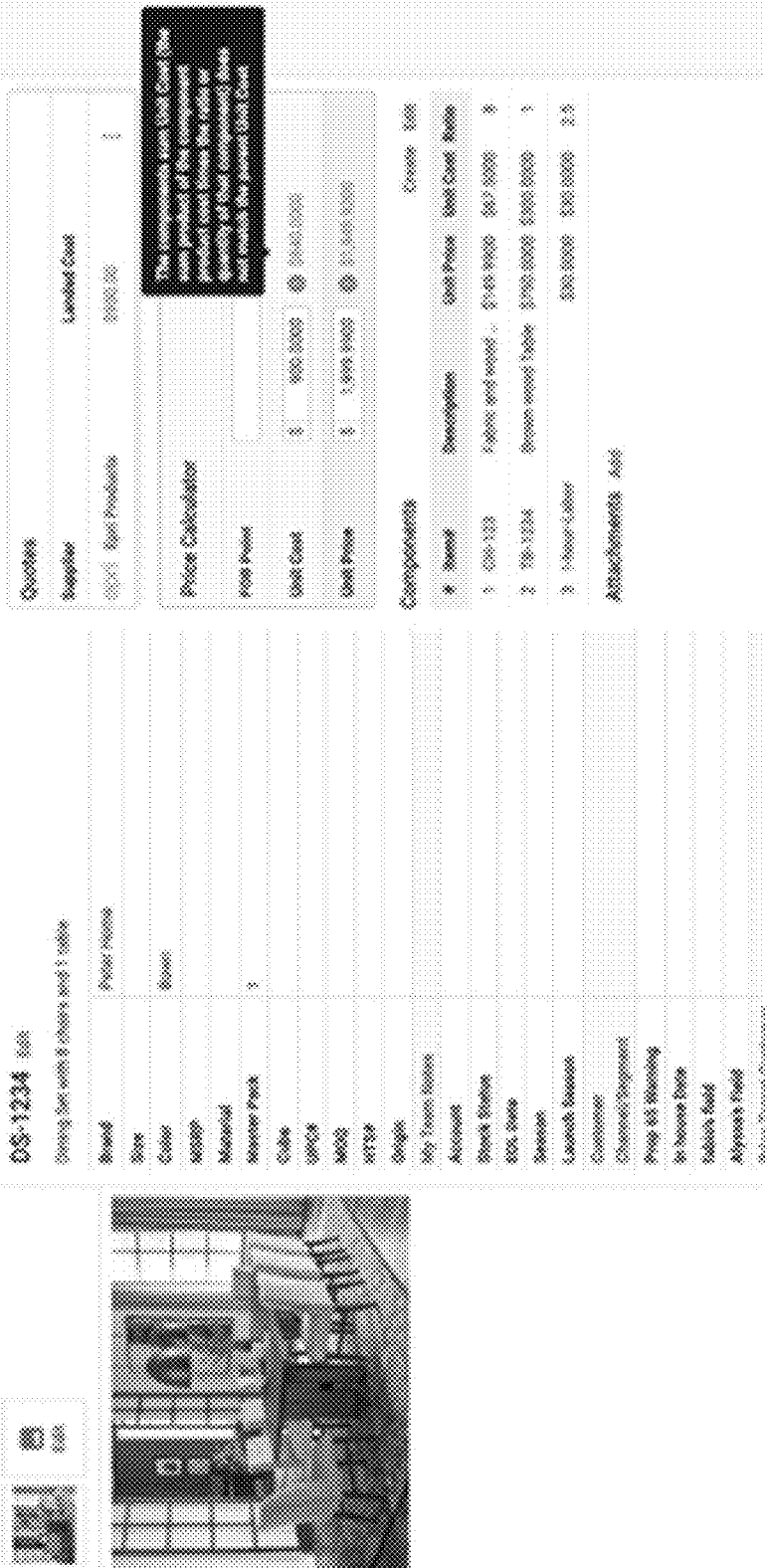

In response to selecting a given collaboration object (or in response to a search for a given collaboration object using a corresponding identifier and/or description), the example user interface illustrated in FIG. 12B may be rendered. The example user interface may be populated from memory (e.g., from a collaboration database). The user interface presents an image of the collaboration object. An edit control is provided which, when activated, provides image editing controls (e.g., add marker/comment, such as described elsewhere herein, crop, adjust contrast up/down, adjust brightness up/down, and/or the like). A collaboration object identifier, which may be edited by the user, and a textual description are displayed. In addition, various other attributes are displayed (e.g., brand, size, color, MSRP, material, master pack, UPC, cube, etc.).

A components pane is provided which includes columns for component item identifier, description, unit price, unit cost, and ratio. A price calculator pane is provided which calculates the sum unit cost (the sum product of the component product costs times the ratio or quantity of that component) and the unit price. Thus, the example user interface provides a relationship between multiple collaboration objects and shows how multiple specified fields (e.g., Unit Cost and Unit Price), may traverse a multi-level relationship between collaboration objects and their respective ratios and be used to calculate or describe the Unit Cost and/or Unit Price of other collaboration objects.

Figure 13:
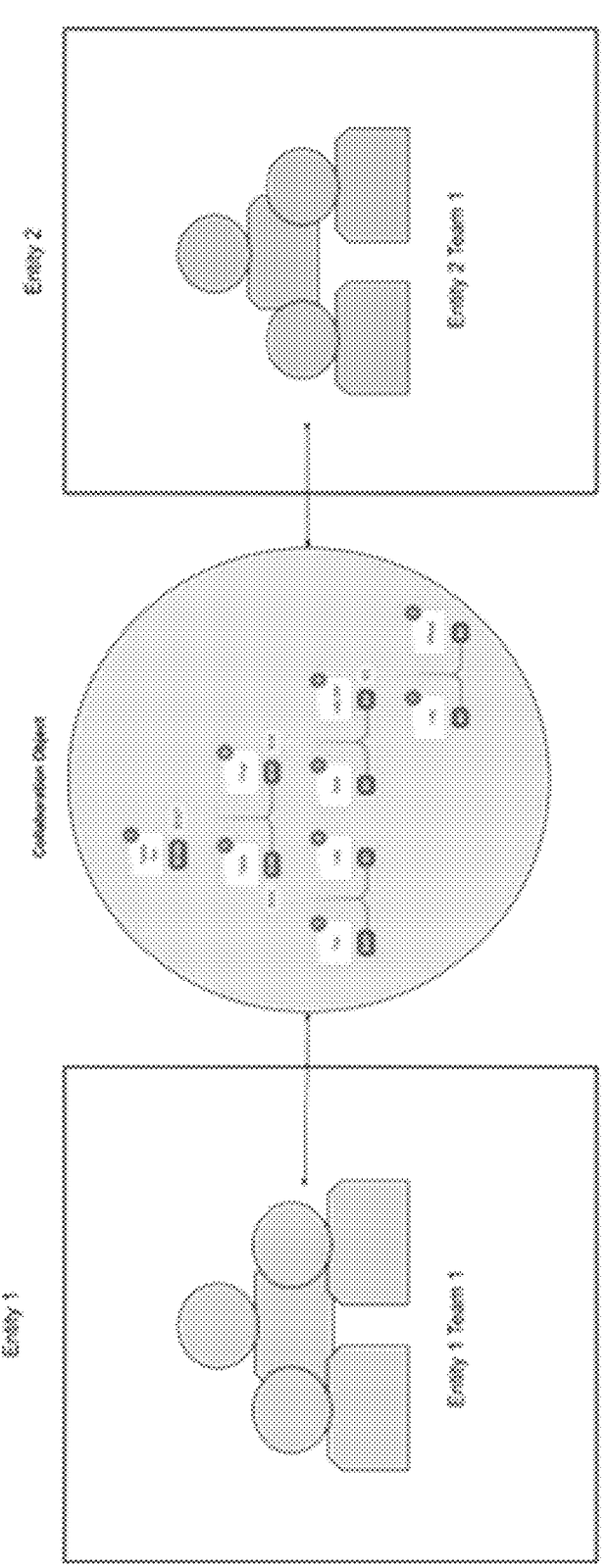
FIG. 13 illustrates a representation of one or more teams from one or more entities interacting with a set of hierarchically related collaboration objects.

FIG. 13 depicts teams from different entities interacting with a set of hierarchically related collaboration objects such as those described herein.

Thus, methods and systems are disclosed for facilitating communication among users at different entities. It is understood that although certain examples are described with respect to retailer and supplier collaboration, the methods and systems may be used for service collaboration, content collaboration, design collaboration, and other collaboration applications.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

User interfaces described herein are optionally presented (and user instructions may be received) via a user computing device using a browser, other network resource viewer, or otherwise. For example, the user interfaces may be presented (and user instructions received) via an application (sometimes referred to as an "app"), such as an app configured specifically for building plan-related activities, installed on the user's mobile phone, laptop, pad, desktop, television, set top box, or other terminal. Various features described or illustrated as being present in different embodiments or user interfaces may be combined into the same embodiment or user interface. While the disclosure may make reference to a user hovering over, pointing at, or clicking on a particular item, other techniques may be used to detect an item of user interest. For example, the user may touch the item via a touch screen, or otherwise indicate an interest. Further, while certain interfaces may be described for selecting an item, such as a checkbox, other selection interfaces may be used, such as a link, radio button, or voice command input. Similarly, while certain references may be made to a user interface pane, the user interfaces may be utilized using other sectioning technologies (e.g., pop-up interfaces) or no sectioning technology may be used within a given user interface.

While the foregoing discussion and figures may illustrate various types of menus, other types of menus may be used. For example, menus may be provided via a drop down menu, a tool bar, a pop up menu, interactive voice response system, or otherwise.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others.

What is claimed is:

1. A communication and collaboration system, comprising:

one or more processing devices;

a network interface;

non-transitory memory that stores instructions that when executed by the one or more processing devices are configured to cause the communication and collaboration system to perform operations comprising:

provide a user interface for display on a first user device that enables a first user at a first entity having a first permission to define a first collaboration object comprising a hierarchical definition, the first user device associated with a first user of a first entity;

receive a hierarchical definition of the first collaboration object from the first user device, the hierarchical definition identifying at least a second collaboration object and a third collaboration object;

receive, via the network interface, a first image of the first collaboration object, receive a second image of the second collaboration object, and receive a third image of the third collaboration object;

receive, via the network interface, a first attribute of the first collaboration object, receive a second attribute of the second collaboration object, and receive a third attribute of the third collaboration object;

generate a hierarchical representation of the first collaboration object;

cause the hierarchical representation of the first collaboration object to be rendered on the first user device, the hierarchical representation of the first collaboration object comprising the first image of the first collaboration object positioned at a first level of the hierarchical representation, the second image of the second collaboration object at a second level of the hierarchical representation, and the third image of the third collaboration object at a third level of the hierarchical representation;

cause the second attribute to be rendered on the first user device in association with the second image and cause the third attribute to be rendered on the first user device in association with the third image;

cause a value calculated using the second attribute and the third attribute to be rendered on the first user device in association with the first image;

enable an authorized second user of a second entity to access the first collaboration object, including the first image of the first collaboration object via a second user device;

cause the first image of the first collaboration object to be rendered via the second user device in association with an annotation tool;

receive a first graphical annotation to the first image of the first collaboration object from the second user device;

automatically assign an identifier to the first graphical annotation to the first image; and cause the identifier assigned to the first graphical annotation to the first image to be rendered in association with the first graphical annotation to the first image.

2. The communication and collaboration system as defined in claim 1, the operations further comprising:

establish a virtual private network to communicate with a first computer system of the first entity;

use a secure transfer tunnel to encrypt communications to the first computer system of the first entity; and store communications from the first computer system using file encryption in a cloud-based data store.

3. The communication and collaboration system as defined in claim 1, wherein the hierarchical representation of the first collaboration object comprises a tree structure.

4. The communication and collaboration system as defined in claim 1, the operations further comprising: cause the hierarchical representation of the first collaboration object to be rendered in a list, wherein the second collaboration object is indented in a first direction relative to the first collaboration object, and the third collaboration object is indented in the first direction relative to the second collaboration object.

5. The communication and collaboration system as defined in claim 1, the operations further comprising:

receive a ratio definition indicating how many of the third collaboration objects are associated with the second collaboration object; and wherein the value calculated using the second attribute and the third attribute is calculated using the ratio definition.

6. The communication and collaboration system as defined in claim 1, the operations further comprising:

receive from the second user device a first text associated with the first graphical annotation to the first image of the first collaboration object;

store the first text received from the second user device in association with the first graphical annotation and in association with an identifier of the second user; and cause the first image of the first collaboration object to be rendered together with the first graphical annotation and the first text, wherein the first text is rendered in association with the identifier of the second user.

7. The communication and collaboration system as defined in claim 1, the operations further comprising:

maintain a library of collaboration objects in a data store, the library of collaboration objects comprising the second collaboration object; and enable the second collaboration object to be used as part of a fourth collaboration object.

8. The communication and collaboration system as defined in claim 1, the operations further comprising:

provide a second user interface for display on the first user device, the second user interface comprising:

a first menu that enables a user to specify a page orientation for a first document;

a second menu that enables a user to specify a number of product images that are to be displayed by the first document;

a dynamic menu that includes field number quantities, where the field number quantities are based at least in part on a specified number of product images that are to be displayed by the first document;

a field menu providing a set of selectable fields that enables a user to specify what data fields are to be displayed in association with respective product images;

receive via the first menu, a first page orientation specification for the first document, receive via the second menu a first specification of a number of product images that are to be displayed by the first document, receive, via the dynamic menu a specified field quantity, receive via the field menu a specification of fields that are to be displayed in association with respective product images; and cause the first document to be rendered in real time in accordance with the first page specification, the first specification of the number of product images that are to be displayed by the first document, the specified field quantity, and the specified fields.

9. A computer system:

one or more processing devices;

a network interface;

non-transitory memory that stores instructions that when executed by the one or more processing devices are configured to cause the computer system to perform operations comprising:

provide a user interface for display on a first user device that enables a first user at a first entity having a first permission to define a first collaboration object comprising a hierarchical definition, the first user device associated with a first user of a first entity;

receive a hierarchical definition of the first collaboration object from the first user device, the hierarchical definition identifying at least a second collaboration object at a lower hierarchical level than the first collaboration object;

receive, via the network interface, a first image of the first collaboration object and receive a second image of the second collaboration object;

receive, via the network interface, a first attribute of the first collaboration object and receive a second attribute of the second collaboration object;

generate a hierarchical representation of the first collaboration object;

cause the hierarchical representation of the first collaboration object to be rendered on the first user device, the hierarchical representation of the first collaboration object comprising the first image of the first collaboration object positioned at a first level of the hierarchical representation and the second image of the second collaboration object at a second level of the hierarchical representation;

cause the second attribute to be rendered on the first user device in association with the second image;

enable an authorized second user of a second entity to access the first collaboration object, including the first image of the first collaboration object via a second user device;

cause the first image of the first collaboration object to be rendered via the second user device in association with an annotation tool;

receive a first graphical annotation to the first image of the first collaboration object from the second user device;

automatically assign an identifier to the first graphical annotation to the first image; and cause the identifier assigned to the first graphical annotation to the first image to be rendered in association with the first graphical annotation to the first image.

10. The computer system as defined in claim 9, the operations further comprising:

establish a virtual private network to communicate with a first computer system of the first entity;

use a secure transfer tunnel to encrypt communications to the first computer system of the first entity; and store communications from the first computer system using file encryption in a cloud-based data store.

11. The computer system as defined in claim 9, wherein the hierarchical representation of the first collaboration object comprises a tree structure.

12. The computer system as defined in claim 9, the operations further comprising: cause the hierarchical representation of the first collaboration object to be rendered in a list, wherein the second collaboration object is indented in a first direction relative to the first collaboration object.

13. The computer system as defined in claim 9, the operations further comprising:

receive a ratio definition indicating how many of the second collaboration objects are associated with the first collaboration object; and cause a value calculated using the second attribute and the ratio definition to be rendered on the first user device in association with the first image.

14. The computer system as defined in claim 9, the operations further comprising:

receive from the second user device a first text associated with the first graphical annotation to the first image of the first collaboration object;

store the first text received from the second user device in association with the first graphical annotation and in association with an identifier of the second user;

cause the first image of the first collaboration object to be rendered together with the first graphical annotation and the first text, wherein the first text is rendered in association with the identifier of the second user.

15. The computer system as defined in claim 9, the operations further comprising:

maintain a library of collaboration objects in a data store, the library of collaboration objects comprising the second collaboration object; and enable the second collaboration object to be used as part of a fourth collaboration object.

16. The computer system as defined in claim 9, the operations further comprising:

provide a second user interface for display on the first user device, the second user interface comprising:

a first menu that enables a user to specify a page orientation for a first document;

a second menu that enables a user to specify a number of product images that are to be displayed by the first document;

a dynamic menu that includes field number quantities, where the field number quantities are based at least in part on a specified number of product images that are to be displayed by the first document;

a field menu that enables a user to specify what data fields are to be displayed in association with respective product images;

receive via the first menu, a first page orientation specification for the first document, receive via the second menu a first specification of a number of product images that are to be displayed by the first document, receive, via the dynamic menu a specified field quantity, receive via the field menu a specification of fields that are to be displayed in association with respective product images; and cause the first document to be rendered in real time in accordance with the first page specification, the first specification of the number of product images that are to be displayed by the first document, the specified field quantity, and the specified fields.

17. A computer implemented method, the method comprising:

providing, by a computer system, a user interface for display on a first user device that enables a first user at a first entity having a first permission to define a first collaboration object comprising a hierarchical definition, the first user device associated with a first user of a first entity;

receiving a hierarchical definition of the first collaboration object from the first user device, the hierarchical definition identifying at least a second collaboration object at a lower hierarchical level than the first collaboration object;

receiving a first image of the first collaboration object and receive a second image of the second collaboration object;

receiving a first attribute of the first collaboration object and receive a second attribute of the second collaboration object;

generating a hierarchical representation of the first collaboration object;

causing the hierarchical representation of the first collaboration object to be rendered on the first user device, the hierarchical representation of the first collaboration object comprising the first image of the first collaboration object positioned at a first level of the hierarchical representation and the second image of the second collaboration object at a second level of the hierarchical representation;

causing the second attribute to be rendered on the first user device in association with the second image;

enabling an authorized second user to access the first collaboration object, including the first image of the first collaboration object via a second user device;

causing the first image of the first collaboration object to be rendered via the second user device in association with an annotation tool;

receiving a first graphical annotation to the first image of the first collaboration object from the second user device; and causing the graphical annotation to the first image to be rendered on the second user device.

18. The computer implemented as defined in claim 17, the method further comprising:

establishing a virtual private network to communicate with a first computer system of the first entity;

using a secure transfer tunnel to encrypt communications to the first computer system of the first entity; and storing communications from the first computer system using file encryption in a cloud-based data store.

19. The computer implemented as defined in claim 17, wherein the hierarchical representation of the first collaboration object comprises a tree structure.

20. The computer implemented as defined in claim 17, the method further comprising: causing the hierarchical representation of the first collaboration object to be rendered in a list, wherein the second collaboration object is indented in a first direction relative to the first collaboration object.

21. The computer implemented as defined in claim 17, the method further comprising:

receiving a ratio definition indicating how many of the second collaboration objects are associated with the first collaboration object; and causing a value calculated using the second attribute and the ratio definition to be rendered on the first user device in association with the first image.

22. The computer implemented as defined in claim 17, the method further comprising:

receiving from the second user device a first text associated with the first graphical annotation to the first image of the first collaboration object;

storing the first text received from the second user device in association with the first graphical annotation and in association with an identifier of the second user; and causing the first image of the first collaboration object to be rendered together with the first graphical annotation and the first text, wherein the first text is rendered in association with the identifier of the second user.

23. The computer implemented as defined in claim 17, the method further comprising:

maintaining a library of collaboration objects in a data store, the library of collaboration objects comprising the second collaboration object; and enabling the second collaboration object to be used as part of a fourth collaboration object.

24. The computer implemented as defined in claim 17, the method further comprising:

providing a second user interface for display on the first user device, the second user interface comprising:

a first menu that enables a user to specify a page orientation for a first document;

a second menu that enables a user to specify a number of product images that are to be displayed by the first document;

a dynamic menu that includes field number quantities, where the field number quantities are based at least in part on a specified number of product images that are to be displayed by the first document;

a field menu that enables a user to specify what data fields are to be displayed in association with respective product images;

receiving via the first menu, a first page orientation specification for the first document, receive via the second menu a first specification of a number of product images that are to be displayed by the first document, receive, via the dynamic menu a specified field quantity, receive via the field menu a specification of fields that are to be displayed in association with respective product images; and causing the first document to be rendered in real time in accordance with the first page specification, the first specification of the number of product images that are to be displayed by the first document, the specified field quantity, and the specified fields.

* * * * *